US008756093B2

(12) United States Patent  
Isozaki et al.

(10) Patent No.: US 8,756,093 B2  
(45) Date of Patent: Jun. 17, 2014

(54) METHOD OF MONITORING A COMBINED WORKFLOW WITH REJECTION DETERMINATION FUNCTION, DEVICE AND RECORDING MEDIUM THEREFOR

(75) Inventors: Yohsuke Isozaki, Tokyo (JP); Shinji Kikuchi, Tokyo (JP); Yoshihiro Kanna, Tokyo (JP)

(73) Assignee: NEC Corporation, Tokyo (JP)

( * ) Notice: Subject to any disclaimer, the term of this patent is extended or adjusted under 35 U.S.C. 154(b) by 751 days.

(21) Appl. No.: 12/810,969

(22) PCT Filed: Dec. 26, 2008

(86) PCT No.: PCT/JP2008/073819  
§ 371 (c)(1),  
(2), (4) Date: Jun. 28, 2010

(87) PCT Pub. No.: WO2009/084669  
PCT Pub. Date: Jul. 9, 2009

(65) Prior Publication Data  
US 2010/0287016 A1     Nov. 11, 2010

(30) Foreign Application Priority Data

Dec. 28, 2007    (JP) ................................. 2007-340383  
Aug. 11, 2008    (JP) ................................. 2008-206914

(51) Int. Cl.  
*G06Q 10/00*         (2012.01)

(52) U.S. Cl.  
USPC ........................................ 705/7.27; 705/7.11

(58) Field of Classification Search  
USPC ................................................ 705/7.11, 7.27  
See application file for complete search history.

(56) References Cited

U.S. PATENT DOCUMENTS 5,907,829 A *   5/1999   Kida ............................. 705/7.16  
6,115,640 A *   9/2000   Tarumi ............................ 700/99  
(Continued)

FOREIGN PATENT DOCUMENTS

JP        08-190584       7/1996  
JP        2004-362449     12/2004  
(Continued)

OTHER PUBLICATIONS

Abstract of International Publication No. WO 2005/096192 A1, dated Oct. 13, 2005.

(Continued)

*Primary Examiner* — Jonathan G Sterrett  
*Assistant Examiner* — Folashade Anderson  
(74) *Attorney, Agent, or Firm* — Scully, Scott, Murphy & Presser, P.C.

(57) ABSTRACT

A rejection determination is made taking into consideration of an agreed service level for a combine workflow executed on a combine workflow system wherein a plurality of business application are collaborated with one another for business collaborations. A state is expressed which will appear when the combined workflow is hypothetically rejected, based on the progress thereof. A processing operation of the combined workflow is predicted based on the expressed state, taking into consideration the influence exerted on the plurality business application systems and the plurality of workflow systems in respect of response performance. A processing operation, which is the result of the prediction, and historical information of event information from the event information recording means are retrieved, and an evaluation value is calculated based on the result of the statistical processing of the historical information. It is determined whether or not the evaluation value satisfies a condition defined by said agreed service level. When the evaluation value does not satisfy the condition defined by the agreed service level, a rejection-target-specific progress for selecting/specifying an execution which has an arbitrary progress equal to or less than a maximum progress, is generated as a rejection target.

13 Claims, 47 Drawing Sheets

(56) References Cited

U.S. PATENT DOCUMENTS

| | | | |
|---|---|---|---|
| 6,901,405 B1* | 5/2005 | McCrady et al. | 1/1 |
| 7,580,994 B1* | 8/2009 | Fiszman et al. | 709/223 |
| 8,429,527 B1* | 4/2013 | Arbogast | 715/255 |
| 2006/0235732 A1* | 10/2006 | Miller et al. | 705/7 |
| 2007/0129976 A1* | 6/2007 | Hochberg et al. | 705/7 |
| 2008/0103866 A1* | 5/2008 | Wiener et al. | 705/9 |

FOREIGN PATENT DOCUMENTS

| | | |
|---|---|---|
| JP | 2005-011053 | 1/2005 |
| JP | 2005-184165 | 7/2005 |
| JP | 2005-267476 | 9/2005 |
| JP | 2007-066497 | 3/2007 |
| JP | 2007-257513 | 10/2007 |
| JP | 2007-531130 | 11/2007 |

OTHER PUBLICATIONS

Kanna, Yoshihiro et al., "Verification of Visualization and Error Detection of Distributed WS-BPEL Processes with Web Services", IPSJ SIG Technical Reports (Mar. 9, 2007), vol. 2007, No. 24, pp. 25-30.

International Search Report dated Mar. 10, 2009.

* cited by examiner

Fig.7
T00100 execution state management table

| T00101 | combined workflow ID | | | |
|---|---|---|---|---|
| T00102 | the number of steps | | | |
| T00103 | combined workflow definition ID | | | |

Fig.8 hypothetical rejection condition data management table
T00700

| T00701 | hypothetical rejection condition ID | |
|---|---|---|
| T00702 | rejection volume | |
| T00703 | rejection-targeted combined workflow volume | |
| T00704 | the number of combinations | |
| T00705 | the number of steps in the rejection-targeted combined workflow | |
| T00706 | rejection-targeted combined workflow definition ID | |

Fig.9 predicted combined workflow input management table
T00200

| T00201 | combined workflow ID | | | |
|---|---|---|---|---|
| T00202 | predicted input time | | | |
| T00203 | combined workflow definition ID | | | |

Fig.10
T00900 simulation basic data management table

| T00901 | combined workflow ID | | | |
|---|---|---|---|---|
| T00902 | the number of steps | | | |
| T00903 | time | | | |
| T00904 | combined workflow definition ID | | | |

Fig.11
hypothetically rejected combined workflow data management table
T00600

| T00601 | hypothetically rejected combined workflow ID | | | |
|---|---|---|---|---|
| T00602 | simulation ID | | | |
| T00603 | hypothetical rejection condition ID | | | |
| T00604 | rejected combined workflow ID | | | |

Fig.12 hypothetical rejection data management table T00800

| | | | |
|---|---|---|---|
| T00801 | simulation ID | | |
| T00802 | combined workflow ID | | |
| T00803 | the number of steps | | |
| T00804 | time | | |
| T00805 | combined workflow definition ID | | |

Fig.13

T00300 simulation result management table

| | | | |
|---|---|---|---|
| T00301 | simulation ID | | |
| T00302 | combined workflow ID | | |
| T00303 | combined workflow predicted response time | | |
| T00304 | combined workflow definition ID | | |

Fig.14 statistical information data management table T01000

| | |
|---|---|
| T01001 | statistical information ID |
| T01002 | hypothetical rejection condition ID |
| T01003 | executed combined workflow volume |
| T01004 | executed combined workflow average response time |
| T01005 | rejected combined workflow volume |

Fig.15

T00400 evaluation value management table

| | | | |
|---|---|---|---|
| T00401 | simulation ID | | |
| T00402 | combined workflow ID | | |
| T00403 | evaluation value | | |

Fig.16

T00500 minimum evaluation value management table

| | | | |
|---|---|---|---|
| T00501 | simulation ID | | |
| T00502 | minimum evaluation value | | |

Fig.17

T01100 maximum evaluation value management table

| | |
|---|---|
| T01101 | simulation ID |
| T01102 | maximum evaluation value |

Fig.18

T10100 execution state management table

| combined workflow ID | 000363 | 000364 | 000365 | 000366 | 000367 |
|---|---|---|---|---|---|
| the number of steps | 6 | 4 | 2 | 2 | 1 |
| combined workflow definition ID | 0001 | 0001 | 0002 | 0001 | 0001 |

Fig.19

T10101 execution state management table

| combined workflow ID | 000363 | 000364 | 000365 | 000366 | 000367 |
|---|---|---|---|---|---|
| the number of steps | 6 | 5 | 2 | 2 | 1 |
| combined workflow definition ID | 0001 | 0001 | 0002 | 0001 | 0001 |

Fig.20 hypothetical rejection condition data management table T10700

| hypothetical rejection condition ID | 00025 |
|---|---|
| rejection volume | 0 |
| rejection-targeted combined workflow volume | 4 |
| the number of combinations | 1 |
| the number of steps in the rejection-targeted combined workflow | −1 |
| rejection-targeted combined workflow definition ID | 0001 |

Fig.21 predicted combined workflow input management table T00200

| combined workflow ID | S001 | S002 | S003 |
|---|---|---|---|
| predicted input time | 13:51:02:533 | 13:54:32:902 | 13:59:15:284 |
| combined workflow definition ID | 0001 | 0002 | 0001 |

Fig.22

T10900 simulation basic data management table

| combined workflow ID | 000363 | 000364 | 000365 | 000366 | 000367 | S001 | S002 | S003 |
|---|---|---|---|---|---|---|---|---|
| the number of steps | 6 | 5 | 2 | 2 | 1 | 0 | 0 | 0 |
| time | 13:48:32.107 | 13:48:32.107 | 13:48:32.107 | 13:48:32.107 | 13:48:32.107 | 13:51:02.533 | 13:54:32.902 | 13:59:15.284 |
| combined workflow definition ID | 0001 | 0001 | 0002 | 0001 | 0001 | 0001 | 0002 | 0001 |

Fig.23 hypothetical rejection data management table
T10800

| simulation ID | 00027 | 00027 | 00027 | 00027 | 00027 | 00027 | 00027 |
|---|---|---|---|---|---|---|---|
| combined workflow ID | 00027 | 00027 | 00027 | 00027 | 00027 | 00027 | 00027 |
| | 000363 | 000364 | 000365 | 000366 | 000367 | S001 | S002 | S003 |
| the number of steps | 6 | 5 | 2 | 2 | 1 | 0 | 0 | 0 |
| time | 13:48:32.107 | 13:48:32.107 | 13:48:32.107 | 13:48:32.107 | 13:48:32.107 | 13:51:02.533 | 13:54:32.902 | 13:59:15.284 |
| combined workflow definition ID | 0001 | 0001 | 0002 | 0001 | 0001 | 0001 | 0002 | 0001 |

T10801

T10802

Fig.24 hypothetically rejected combined workflow data management table
T10600

| hypothetically rejected combined workflow ID | 00058 | 00059 | 00060 | 00061 | 00062 | 00063 | 00064 | 00065 | 00066 | 00067 |
|---|---|---|---|---|---|---|---|---|---|---|
| simulation ID | 00027 | 00028 | 00029 | 00030 | 00031 | 00031 | 00032 | 00032 | 00033 | 00033 |
| hypothetical rejection condition ID | 00025 | 00026 | 00026 | 00026 | 00027 | 00027 | 00027 | 00027 | 00027 | 00027 |
| rejected combined workflow ID | None | 000364 | 000366 | 000367 | 000364 | 000366 | 000364 | 000367 | 000366 | 000367 |

T10300 simulation result management table

| simulation ID | combined workflow ID | combined workflow predicted response time | combined workflow definition ID |
|---|---|---|---|
| 000027 | 000363 | 50 | 0001 |
| 000027 | 000364 | 80 | 0001 |
| 000027 | 000365 | 25 | 0002 |
| 000027 | 000366 | 60 | 0001 |
| 000027 | 000367 | 75 | 0001 |
| 000027 | S001 | 45 | 0001 |
| 000027 | S002 | 25 | 0002 |
| 000027 | S003 | 45 | 0001 |

Fig.26 statistical information data management table
T11000

| | |
|---|---|
| statistical information ID | 005 |
| hypothetical rejection condition ID | 00025 |
| executed combined workflow volume | 200 |
| executed combined workflow average response time | 47.0 |
| rejected combined workflow volume | 9 |

Fig.27
T10400 evaluation value management table

| simulation ID | 00027 | 00027 | 00027 | 00027 | 00027 | 00027 |
|---|---|---|---|---|---|---|
| combined workflow ID | 000363 | 000364 | 000366 | 000367 | S001 | S003 |
| evaluation value | 1.277 | 0.798 | 1.064 | 0.851 | 1.419 | 1.419 |

T10401   T10402

Fig.28
T10500 minimum evaluation value management table

| simulation ID | 00027 |
|---|---|
| minimum evaluation value | 0.798 |

Fig.29
T11100 maximum evaluation value management table

| simulation ID | 00027 |
|---|---|
| maximum evaluation value | 0.798 |

Fig.30  hypothetical rejection condition data management table
T10701

| hypothetical rejection condition ID | 00026 |
|---|---|
| rejection volume | 1 |
| rejection-targeted combined workflow volume | 3 |
| the number of combinations | 3 |
| the number of steps in the rejection-targeted combined workflow | 5 |
| rejection-targeted combined workflow definition ID | 0001 |

Fig.31
T10102 execution state management table

| combined workflow ID | 000363 | 000364 | 000365 | 000366 | 000367 |
|---|---|---|---|---|---|
| the number of steps | 6 | 5 | 2 | 2 | 1 |
| combined workflow definition ID | 0001 | 0001 | 0002 | 0001 | 0001 |

Fig.32
predicted combined workflow input management table
T10201

| combined workflow ID | S001 | S002 | S003 |
|---|---|---|---|
| predicted input time | 13:51:02:533 | 13:54:32:902 | 13:59:15:284 |
| combined workflow definition ID | 0001 | 0002 | 0001 |

Fig.33

T10901 simulation basic data management table

| combined workflow ID | 000363 | 000364 | 000365 | 000366 | 000367 | S001 | S002 | S003 |
|---|---|---|---|---|---|---|---|---|
| the number of steps | 6 | 5 | 2 | 2 | 1 | 0 | 0 | 0 |
| time | 13:48:32.427 | 13:48:32.427 | 13:48:32.427 | 13:48:32.427 | 13:48:32.427 | 13:51:02.533 | 13:54:32.902 | 13:59:15.284 |
| combined workflow definition ID | 0001 | 0001 | 0002 | 0001 | 0001 | 0001 | 0002 | 0001 |

Fig.34 hypothetical rejection data management table
T10803

| simulation ID | 00028 | 00028 | 00028 | 00028 | 00028 | 00028 | 00028 | 00028 |
|---|---|---|---|---|---|---|---|---|
| combined workflow ID | 000363 | 000364 | 000365 | 000366 | 000367 | S001 | S002 | S003 |
| the number of steps | 6 | REJECT | 2 | 2 | 1 | 0 | 0 | 0 |
| time | 13:48:32.107 | 13:48:32.107 | 13:48:32.107 | 13:48:32.107 | 13:48:32.107 | 13:51:02.533 | 13:54:32.902 | 13:59:15.284 |
| combined workflow definition ID | 0001 | 0001 | 0002 | 0001 | 0001 | 0001 | 0002 | 0001 |

T10804

Fig.35 hypothetical rejection data management table
T10805

| simulation ID | 00029 | 00029 | 00029 | 00029 | 00029 | 00029 | 00029 | 00029 |
|---|---|---|---|---|---|---|---|---|
| combined workflow ID | 000363 | 000364 | 000365 | 000366 | 000367 | S001 | S002 | S003 |
| the number of steps | 6 | 5 | 2 | REJECT | 1 | 0 | 0 | 0 |
| time | 13:48:32.107 | 13:48:32.107 | 13:48:32.107 | 13:48:32.107 | 13:48:32.107 | 13:51:02.533 | 13:54:32.902 | 13:59:15.284 |
| combined workflow definition ID | 0001 | 0001 | 0002 | 0001 | 0001 | 0001 | 0002 | 0001 |

Fig.36 hypothetical rejection data management table
T10806

| simulation ID | 00030 | 00030 | 00030 | 00030 | 00030 | 00030 | 00030 | 00030 |
|---|---|---|---|---|---|---|---|---|
| combined workflow ID | 000363 | 000364 | 000365 | 000366 | 000367 | S001 | S002 | S003 |
| the number of steps | 6 | 5 | 2 | 2 | REJECT | 0 | 0 | 0 |
| time | 13:48:32.107 | 13:48:32.107 | 13:48:32.107 | 13:48:32.107 | 13:48:32.107 | 13:51:02.533 | 13:54:32.902 | 13:59:15.284 |
| combined workflow definition ID | 0001 | 0001 | 0002 | 0001 | 0001 | 0001 | 0002 | 0001 |

Fig.37

T10301 simulation result management table

| simulation ID | 00028 | 00028 | 00028 | 00028 | 00028 | 00028 | 00028 |
|---|---|---|---|---|---|---|---|
| combined workflow ID | 000363 | 000365 | 000366 | 000367 | S001 | S002 | S003 |
| combined workflow predicted response time | 50 | 30 | 70 | 70 | 50 | 25 | 40 |
| combined workflow definition ID | 0001 | 0002 | 0001 | 0001 | 0001 | 0002 | 0001 |

Fig.38

T10302 simulation result management table

| simulation ID | 00029 | 00029 | 00029 | 00029 | 00029 | 00029 | 00029 |
|---|---|---|---|---|---|---|---|
| combined workflow ID | 000363 | 000364 | 000365 | 000367 | S001 | S002 | S003 |
| combined workflow predicted response time | 50 | 90 | 30 | 75 | 55 | 25 | 45 |
| combined workflow definition ID | 0001 | 0001 | 0002 | 0001 | 0001 | 0002 | 0001 |

Fig.39

T10303 simulation result management table

| simulation ID | 000030 | 000030 | 000030 | 000030 | 000030 | 000030 | 000030 |
|---|---|---|---|---|---|---|---|
| combined workflow ID | 000363 | 000364 | 000365 | 000366 | S001 | S002 | S003 |
| combined workflow predicted response time | 50 | 90 | 25 | 75 | 55 | 25 | 45 |
| combined workflow definition ID | 0001 | 0001 | 0002 | 0002 | 0001 | 0002 | 0001 |

Fig.40

T10403 evaluation value management table

| simulation ID | 00028 | 00028 | 00028 | 00028 | 00028 |
|---|---|---|---|---|---|
| combined workflow ID | 000363 | 000366 | 000367 | S001 | S003 |
| evaluation value | 1.281 | 0.915 | 0.915 | 1.281 | 1.601 |

Fig.41

T10404 evaluation value management table

| simulation ID | 00029 | 00029 | 00029 | 00029 | 00029 |
|---|---|---|---|---|---|
| combined workflow ID | 000363 | 000364 | 000367 | S001 | S003 |
| evaluation value | 1.277 | 0.709 | 0.851 | 1.160 | 1.418 |

Fig.42

T10405 evaluation value management table

| simulation ID | 00030 | 00030 | 00030 | 00030 | 00030 |
|---|---|---|---|---|---|
| combined workflow ID | 000363 | 000364 | 000366 | S001 | S003 |
| evaluation value | 1.277 | 0.709 | 0.851 | 1.160 | 1.418 |

Fig.43

T10501 minimum evaluation value management table

| simulation ID | 00028 | 00029 | 00030 |
|---|---|---|---|
| minimum evaluation value | 0.915 | 0.709 | 0.709 |

Fig.44

T11101 maximum evaluation value management table

| simulation ID | 00028 |
|---|---|
| maximum evaluation value | 0.915 |

Fig.45 hypothetical rejection condition data management table
T10702

| hypothetical rejection condition ID | 00027 |
|---|---|
| rejection volume | 2 |
| rejection-targeted combined workflow volume | 3 |
| the number of combinations | 3 |
| the number of steps in the rejection-targeted combined workflow | 5 |
| rejection-targeted combined workflow definition ID | 0001 |

Fig.46

T10103 execution state management table

| combined workflow ID | 000363 | 000364 | 000365 | 000366 | 000367 |
|---|---|---|---|---|---|
| the number of steps | 6 | 5 | 2 | 2 | 1 |
| combined workflow definition ID | 0001 | 0001 | 0002 | 0001 | 0001 |

Fig.47 predicted combined workflow input management table
T10202

| combined workflow ID | S001 | S002 | S003 |
|---|---|---|---|
| predicted input time | 13:51:02:533 | 13:54:32:902 | 13:59:15:284 |
| combined workflow definition ID | 0001 | 0002 | 0001 |

Fig.48

T10902 simulation basic data management table

| combined workflow ID | 000363 | 000364 | 000365 | 000366 | 000367 | S001 | S002 | S003 |
|---|---|---|---|---|---|---|---|---|
| the number of steps | 6 | 5 | 2 | 2 | 1 | 0 | 0 | 0 |
| time | 13:48:32.827 | 13:48:32.827 | 13:48:32.827 | 13:48:32.827 | 13:48:32.827 | 13:51:02.533 | 13:54:32.902 | 13:59:15.284 |
| combined workflow definition ID | 0001 | 0001 | 0002 | 0001 | 0001 | 0001 | 0002 | 0001 |

Fig.49 hypothetical rejection data management table
T10807

| simulation ID | 00031 | 00031 | 00031 | 00031 | 00031 | 00031 | 00031 |
|---|---|---|---|---|---|---|---|
| combined workflow ID | 000363 | 000364 | 000365 | 000366 | 000367 | S001 | S002 | S003 |
| the number of steps | 6 | REJECT | 2 | REJECT | 1 | 0 | 0 | 0 |
| time | 13:48:32.107 | 13:48:32.107 | 13:48:32.107 | 13:48:32.107 | 13:48:32.107 | 13:51:02.533 | 13:54:32.902 | 13:59:15.284 |
| combined workflow definition ID | 0001 | 0001 | 0002 | 0001 | 0001 | 0001 | 0002 | 0001 |

Fig.50 hypothetical rejection data management table
T10808

| simulation ID | 00032 | 00032 | 00032 | 00032 | 00032 | 00032 | 00032 |
|---|---|---|---|---|---|---|---|
| combined workflow ID | 000363 | 000364 | 000365 | 000366 | 000367 | S001 | S002 | S003 |
| the number of steps | 6 | REJECT | 2 | 2 | REJECT | 0 | 0 | 0 |
| time | 13:48:32.107 | 13:48:32.107 | 13:48:32.107 | 13:48:32.107 | 13:48:32.107 | 13:51:02.533 | 13:54:32.902 | 13:59:15.284 |
| combined workflow definition ID | 0001 | 0001 | 0002 | 0001 | 0001 | 0001 | 0002 | 0001 |

Fig.51 hypothetical rejection data management table
T10809

| simulation ID | 00033 | 00033 | 00033 | 00033 | 00033 | 00033 | 00033 | 00033 |
|---|---|---|---|---|---|---|---|---|
| combined workflow ID | 000363 | 000364 | 000365 | 000366 | 000367 | S001 | S002 | S003 |
| the number of steps | 6 | 5 | 2 | REJECT | REJECT | 0 | 0 | 0 |
| time | 13:48:32.107 | 13:48:32.107 | 13:48:32.107 | 13:48:32.107 | 13:48:32.107 | 13:51:02.533 | 13:54:32.902 | 13:59:15.284 |
| combined workflow definition ID | 0001 | 0001 | 0002 | 0001 | 0001 | 0001 | 0002 | 0001 |

Fig.52

T10304 simulation result management table

| simulation ID | 00031 | 00031 | 00031 | 00031 | 00031 | 00031 |
|---|---|---|---|---|---|---|
| combined workflow ID | 000363 | 000365 | 000367 | S001 | S002 | S003 |
| combined workflow predicted response time | 50 | 30 | 60 | 55 | 25 | 45 |
| combined workflow definition ID | 0001 | 0002 | 0001 | 0001 | 0002 | 0001 |

Fig.53

| T10305 simulation result management table | | | | | | |
|---|---|---|---|---|---|---|
| simulation ID | 00032 | 00032 | 00032 | 00032 | 00032 | 00032 |
| combined workflow ID | 000363 | 000365 | 000366 | S001 | S002 | S003 |
| combined workflow predicted response time | 50 | 35 | 80 | 55 | 25 | 45 |
| combined workflow definition ID | 0001 | 0002 | 0001 | 0001 | 0002 | 0001 |

Fig.54

T10306 simulation result management table

| simulation ID | 000033 | 000033 | 000033 | 000033 | 000033 | 000033 |
|---|---|---|---|---|---|---|
| combined workflow ID | 000363 | 000364 | 000365 | S001 | S002 | S003 |
| combined workflow predicted response time | 50 | 75 | 25 | 55 | 25 | 45 |
| combined workflow definition ID | 0001 | 0001 | 0002 | 0001 | 0002 | 0001 |

Fig.55

T10406 evaluation value management table

| simulation ID | 00031 | 00031 | 00031 | 00031 |
|---|---|---|---|---|
| combined workflow ID | 000363 | 000367 | S001 | S003 |
| evaluation value | 1.285 | 1.071 | 1.168 | 1.427 |

Fig.56

T10407 evaluation value management table

| simulation ID | 00032 | 00032 | 00032 | 00032 |
|---|---|---|---|---|
| combined workflow ID | 000363 | 000366 | S001 | S003 |
| evaluation value | 1.282 | 0.801 | 1.166 | 1.425 |

Fig.57

T10408 evaluation value management table

| simulation ID | 00033 | 00033 | 00033 | 00033 |
|---|---|---|---|---|
| combined workflow ID | 000363 | 000364 | S001 | S003 |
| evaluation value | 1.283 | 0.855 | 1.166 | 1.425 |

Fig.58

T10502 minimum evaluation value management table

| simulation ID | 00031 | 00032 | 00033 |
|---|---|---|---|
| minimum evaluation value | 1.071 | 0.801 | 0.855 |

Fig.59

T11102 maximum evaluation value management table

| simulation ID | 00031 |
|---|---|
| maximum evaluation value | 1.071 |

Fig.60

T10307 simulation result management table

| simulation ID | 000028 | 000028 | 000028 | 000028 | 000028 | 000028 | 000028 |
|---|---|---|---|---|---|---|---|
| process ID | 000363 | 000365 | 000366 | 000367 | S001 | S002 | S003 |
| TAT | 50 | 30 | 62 | 60 | 50 | 25 | 40 |
| service type ID | 0001 | 0002 | 0001 | 0001 | 0001 | 0002 | 0001 |

Fig.61

T10409 evaluation value management table

| simulation ID | 00028 | 00028 | 00028 | 00028 | 00028 |
|---|---|---|---|---|---|
| process ID | 000363 | 000366 | 000367 | S001 | S003 |
| evaluation value | 1.284 | 1.035 | 1.070 | 1.284 | 1.604 |

Fig.62

T10503 minimum evaluation value management table

| simulation ID | 00028 | 00029 | 00030 |
|---|---|---|---|
| minimum evaluation value | 1.035 | 0.709 | 0.709 |

Fig.63

T11103 maximum evaluation value management table

| simulation ID | 00028 |
|---|---|
| maximum evaluation value | 1.035 |

Fig.64

T10308 simulation result management table

| simulation ID | 000031 | 000031 | 000031 | 000031 | 000031 | 000031 |
|---|---|---|---|---|---|---|
| process ID | 000363 | 000365 | 000367 | S001 | S002 | S003 |
| TAT | 50 | 30 | 63 | 55 | 25 | 45 |
| service type ID | 0001 | 0002 | 0001 | 0001 | 0002 | 0001 |

Fig.65

T10410 evaluation value management table

| simulation ID | 00031 | 00031 | 00031 | 00031 |
|---|---|---|---|---|
| process ID | 000363 | 000367 | S001 | S003 |
| evaluation value | 1.284 | 1.019 | 1.168 | 1.427 |

Fig.66

T10504 minimum evaluation value management table

| simulation ID | 00031 | 00032 | 00033 |
|---|---|---|---|
| minimum evaluation value | 1.036 | 0.801 | 0.855 |

Fig.67

T11104 maximum evaluation value management table

| simulation ID | 00031 |
|---|---|
| maximum evaluation value | 1.036 |

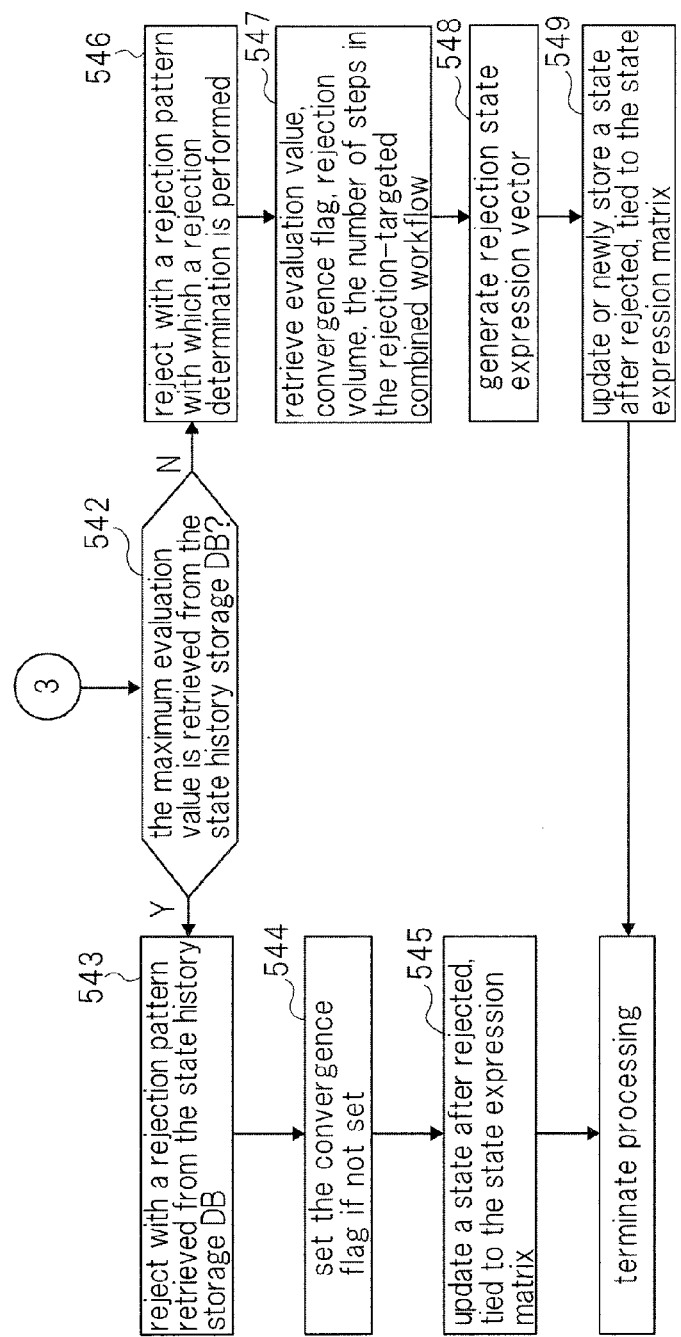

Fig.76    V00100 state expression vector $$\begin{pmatrix} v_1 \\ v_2 \\ v_3 \\ \vdots \\ v_{n-2} \\ v_{n-1} \\ v_n \end{pmatrix} \begin{array}{l} \cdots \text{ combined workflow definition ID} \\ \cdots \text{ the number of combined workflows with 1 step} \\ \cdots \text{ the number of combined workflows with 2 steps} \\ \\ \cdots \text{ the number of combined workflows with (n-3) steps} \\ \cdots \text{ average input interval} \\ \cdots \text{ variance} \end{array}$$

Fig.77    M00100 state expression matrix $$(\vec{V}_1, \vec{V}_2, \cdots, \vec{V}_m)$$

Fig.78    state history information management table T01300

| | | |
|---|---|---|
| T01301 state expression matrix | | |
| T01302 rejection-targeted combined workflow volume | | |
| T01303 rejection state expression vector | | |
| T01304 evaluation value | | |
| T01305 convergence determination flag | | |
| T01306 rejection volume | | |
| T01307 the number of steps in the rejection-targeted combined workflow | | |

Fig.79    V00200 rejection state expression vector $$\begin{pmatrix} w_1 \\ w_2 \\ w_3 \\ \vdots \\ w_n \end{pmatrix} \begin{array}{l} \cdots \text{ combined workflow definition ID} \\ \cdots \text{ the number of workflows rejected with 1 step} \\ \cdots \text{ the number of workflows rejected with 2 steps} \\ \\ \cdots \text{ the number of workflows rejected with (n-1) steps} \end{array}$$

Fig.80    combined workflow input information management table T1200

| combined workflow definition ID | 0001 | 0002 |
|---|---|---|
| average input interval | 493 | 526 |
| variance | 64.9 | 160.5 |

Fig.81

V10100 state expression vector $$\begin{pmatrix} 1 \\ 1 \\ 1 \\ 0 \\ 0 \\ 1 \\ 1 \\ 493 \\ 64.9 \end{pmatrix} \begin{array}{l} \cdots \cdot \text{combined workflow definition ID} \\ \cdots \cdot \text{the number of workflows with 1 step} \\ \cdots \cdot \text{the number of workflows with 2 steps} \\ \cdots \cdot \text{the number of workflows with 3 steps} \\ \cdots \cdot \text{the number of workflows with 4 steps} \\ \cdots \cdot \text{the number of workflows with 5 steps} \\ \cdots \cdot \text{the number of workflows with 6 steps} \\ \cdots \cdot \text{average input interval} \\ \cdots \cdot \text{variance} \end{array}$$

Fig.82

M10100 state expression matrix $$\begin{pmatrix} 1 & 2 \\ 1 & 0 \\ 1 & 1 \\ 0 & 0 \\ 0 & 0 \\ 1 & 0 \\ 1 & 0 \\ 493 & 526 \\ 64.9 & 160.5 \end{pmatrix}$$

Fig.83 state history information management table T11300

| state expression matrix | M10101 | M10203 | M10100 |
|---|---|---|---|
| rejection-targeted combined workflow volume | 0001 | 0002 | 0001 |
| rejection state expression vector | V12345 | V23456 | V10200 |
| evaluation value | 1.205 | 0.75 | 0.915 |
| convergence determination flag | 1 | 0 | 0 |
| rejection volume | 2 | 3 | 2 |
| the number of steps in the rejection-targeted combined workflow | 5 | 2 | 5 |

Fig.84 maximum evaluation value management table T11102

| simulation ID | -1 |
|---|---|
| maximum evaluation value | 0.915 |

Fig.85   hypothetical rejection condition data management table
         T10703

| hypothetical rejection condition ID | 00025 |
|---|---|
| rejection volume | 3 |
| rejection-targeted combined workflow volume | 3 |
| the number of combinations | 1 |
| the number of steps in the rejection-targeted combined workflow | 5 |
| rejection-targeted combined workflow definition ID | 0001 |

Fig.86  hypothetical rejection data management table T10810

| simulation ID | 00027 | 00027 | 00027 | 00027 | 00027 | 00027 | 00027 | 00027 |
|---|---|---|---|---|---|---|---|---|
| combined workflow ID | 000363 | 000364 | 000365 | 000366 | 000367 | S001 | S002 | S003 |
| the number of steps | 6 | REJECT | 2 | REJECT | REJECT | 0 | 0 | 0 |
| time | 13:48:32.107 | 13:48:32.107 | 13:48:32.107 | 13:48:32.107 | 13:48:32.107 | 13:51:02.533 | 13:54:32.902 | 13:59:15.284 |
| combined workflow definition ID | 0001 | 0001 | 0002 | 0001 | 0001 | 0001 | 0002 | 0001 |

Fig.87 hypothetical rejection combined workflow data management table

T10602

| hypothetically rejected combined workflow ID | 00058 | 00059 | 00060 |
|---|---|---|---|
| simulation ID | 00027 | 00027 | 00027 |
| hypothetical rejection condition ID | 00025 | 00025 | 00025 |
| rejected combined workflow ID | 000364 | 000366 | 000367 |

Fig.88

T10309 simulation result management table

| simulation ID | 00027 | 00027 | 00027 | 00027 | 00027 |
|---|---|---|---|---|---|
| combined workflow ID | 000363 | 000365 | S001 | S002 | S003 |
| combined workflow predicted response time | 50 | 25 | 45 | 25 | 45 |
| combined workflow definition ID | 0001 | 0002 | 0001 | 0002 | 0001 |

Fig.89

T10411 evaluation value management table

| simulation ID | 00027 | 00027 | 00027 |
|---|---|---|---|
| combined workflow ID | 000363 | S001 | S003 |
| evaluation value | 1.285 | 1.434 | 1.434 |

Fig.90

T10505 minimum evaluation value management table

| simulation ID | 00027 |
|---|---|
| minimum evaluation value | 1.285 |

Fig.91

T11106 maximum evaluation value management table

| simulation ID | 00027 |
|---|---|
| maximum evaluation value | 1.285 |

Fig.92

V10201 rejection state expression vector $$\begin{pmatrix} 1 \\ 1 \\ 1 \\ 0 \\ 0 \\ 1 \\ 0 \end{pmatrix} \begin{matrix} \cdots\text{ combined workflow definition ID} \\ \cdots\text{ the number of workflows rejected with 1 step} \\ \cdots\text{ the number of workflows rejected with 2 steps} \\ \cdots\text{ the number of workflows rejected with 3 steps} \\ \cdots\text{ the number of workflows rejected with 4 steps} \\ \cdots\text{ the number of workflows rejected with 5 steps} \\ \cdots\text{ the number of workflows rejected with 6 steps} \end{matrix}$$

Fig.93 state history information management table
T11301

| state expression matrix | M10101 |
|---|---|
| rejection-targeted combined workflow definition ID | 0001 |
| rejection state expression vector | V10201 |
| evaluation value | 1.285 |
| convergence determination flag | 1 |
| rejection volume | 3 |
| the number of steps in the rejection-targeted combined workflow | 5 |

Fig.94 state history information management table
T01302

| state expression matrix | M10101 | M10203 | M10100 |
|---|---|---|---|
| rejection-targeted combined workflow definition ID | 0001 | 0002 | 0001 |
| rejection state expression vector | V12345 | V23456 | V10201 |
| evaluation value | 1.205 | 0.75 | 1.285 |
| convergence determination flag | 1 | 0 | 1 |
| rejection volume | 2 | 3 | 3 |
| the number of steps in the rejection-targeted combined workflow | 5 | 2 | 5 |

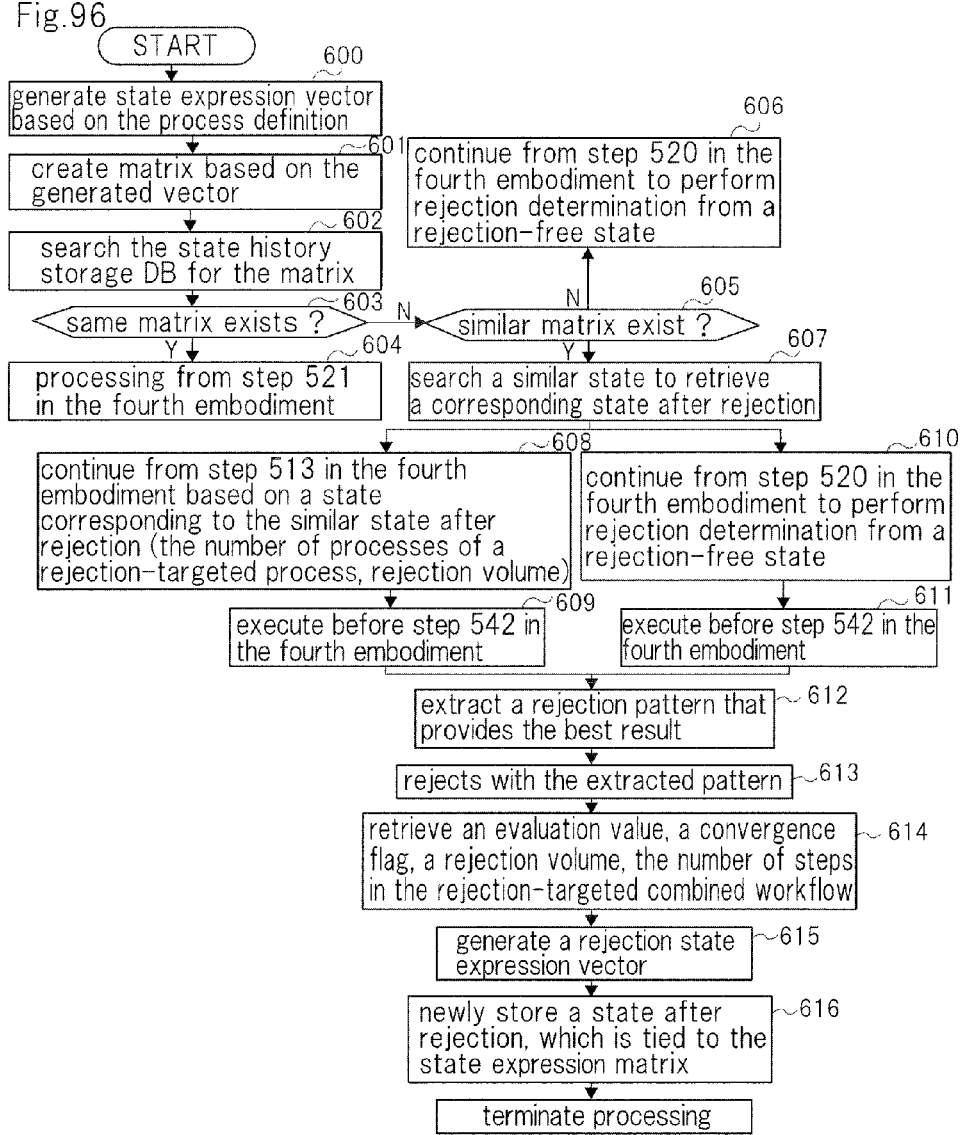

Fig.98

M10101 state expression matrix $$\begin{pmatrix} 1 & 2 \\ 1 & 0 \\ 1 & 1 \\ 0 & 0 \\ 1 & 0 \\ 0 & 0 \\ 1 & 0 \\ 392 & 556 \\ 80.7 & 162.1 \end{pmatrix}$$

Fig.99

M10102 state expression matrix $$\begin{pmatrix} 1 & 2 \\ 1 & 1 \\ 1 & 1 \\ 0 & 0 \\ 1 & 0 \\ 1 & 0 \\ 1 & 0 \\ 490 & 521 \\ 79.5 & 152.1 \end{pmatrix}$$

Fig.100

T11107 maximum evaluation value management table

| simulation ID | 00027 |
|---|---|
| maximum evaluation value | 0.915 |

Fig.101

T11108 maximum evaluation value management table

| simulation ID | 00027 |
|---|---|
| maximum evaluation value | 1.281 |

Fig.102 hypothetical rejection combined workflow data management table
T10603

| hypothetically rejected combined workflow ID | 00058 | 00059 | 00060 | 00061 | 00062 | 00062 |
|---|---|---|---|---|---|---|
| simulation ID | 00025 | 00025 | 00026 | 00026 | 00027 | 00027 |
| hypothetical rejection condition ID | 00025 | 00025 | 00025 | 00025 | 00025 | 00025 |
| rejected combined workflow ID | 000364 | 000366 | 000364 | 000367 | 000366 | 000367 |

Fig.103 hypothetical rejection condition data management table T10704

| hypothetical rejection condition ID | 00025 |
|---|---|
| rejection volume | 2 |
| rejection-targeted combined workflow volume | 3 |
| the number of combinations | 3 |
| the number of steps in the rejection-targeted combined workflow | 5 |
| rejection-targeted combined workflow definition ID | 0001 |

Fig.104

V10202 rejection state expression vector $$\begin{pmatrix} 1 \\ 1 \\ 1 \\ 0 \\ 0 \\ 0 \\ 0 \end{pmatrix} \begin{array}{l} \cdots \text{ combined workflow definition ID} \\ \cdots \text{ the number of workflows rejected with 1 step} \\ \cdots \text{ the number of workflows rejected with 2 steps} \\ \cdots \text{ the number of workflows rejected with 3 steps} \\ \cdots \text{ the number of workflows rejected with 4 steps} \\ \cdots \text{ the number of workflows rejected with 5 steps} \\ \cdots \text{ the number of workflows rejected with 6 steps} \end{array}$$

Fig.105 state history information management table T11304

| state expression matrix | M10100 |
|---|---|
| rejection-targeted combined workflow definition ID | 0001 |
| rejection state expression vector | V10202 |
| evaluation value | 1.281 |
| convergence determination flag | 0 |
| rejection volume | 2 |
| the number of steps in the rejection-targeted combined workflow | 5 |

Fig.106 state history information management table T11305

| state expression matrix | M10101 | M10203 | M10102 | M10100 |
|---|---|---|---|---|
| rejection-targeted combined workflow definition ID | 0001 | 0002 | 0001 | 0001 |
| rejection state expression vector | V12345 | V23456 | V10201 | V10202 |
| evaluation value | 1.205 | 0.75 | 1.285 | 1.281 |
| convergence determination flag | 1 | 0 | 1 | 0 |
| rejection volume | 2 | 3 | 3 | 2 |
| the number of steps in the rejection-targeted combined workflow | 5 | 2 | 5 | 5 |

METHOD OF MONITORING A COMBINED WORKFLOW WITH REJECTION DETERMINATION FUNCTION, DEVICE AND RECORDING MEDIUM THEREFOR

TECHNICAL FIELD

The present invention relates to a combined workflow monitoring device with a rejection determination function, for monitoring a combined workflow system in which business application systems and workflows are collaborated with one another for business collaborations.

BACKGROUND ART

Patent Document 1 describes the following means which is intended to employ a rejection determination device which has taken into consideration of an agreed service level. This rejection determination device employs a traffic control device installed between a particular server and a plurality of clients which monitors communication data exchange between the server and the clients, as a technical strategy for allowing the server to more stably provide services without degrading the service level. The rejection determination device estimates a waiting time associated with an exchange of communication data, and when the waiting time is predicted to be equal to or longer than a certain time, transmits an access regulation message to a client to reject an access.

In the foregoing traffic control device and a service system which employs the same, the rejection determination device, which has taken into consideration an agreed service level, suffers from the following problems because the rejection determination device is intended for simple exchanges of communication data and makes the determination of rejection only taking into consideration of an average response time related to the aforementioned data exchanges.

First, since the foregoing rejection determination device is intended for simple exchanges of communication data between a particular server and clients, the rejection determination device is incapable of identifying a combined workflow defined by a plurality of data exchanges unless appropriate means is provided, and cannot therefore be applied to the determination of rejection.

Second, in a long transaction in which a plurality of business application systems and a plurality of workflow systems are collaborated with one another, a compensation operation is performed when a rejection is exercised. When the compensation operation is performed, another transaction may be newly generated, and this transaction will affect the plurality of business application systems and the plurality of workflow systems, which are in collaboration, and also affects other combined workflows. However, the aforementioned rejection determination device does not assume the compensation operation, because it monitors only data exchanges between a server and clients, and cannot therefore apply the determination of rejection to a combined workflow.
Patent Document 1: JP2005-184165A

DISCLOSURE OF THE INVENTION

Problems to be Solved by the Invention

It is an object of the present invention to provide a combined workflow monitoring method, device, and recording medium which are capable of pronouncing a rejection determination for a combined workflow defined by a plurality of data exchanges, by taking into consideration of an agreed service level, and by further taking into consideration of influences exerted by a compensation operation accompanied by the rejection on a plurality of business application systems, a plurality of workflow systems, and a combined workflow.

Means to Solve the Problems

A combined workflow monitoring device having a rejection determination function of the present invention includes event information recording means, progress observing means, hypothetical rejection state expressing means, processing operation predicting means, evaluation value expressing means, determining means, and rejection-target specific progress generating means.

The event information recording means coordinates, associates with one another, retains, and records each item of event information related to a combined workflow which is defined through collaboration of a plurality of business application systems and a plurality of workflow systems with one another. Progress observing means obtains the progress of a combined workflow by monitoring each item of event information in the event information recording means. The hypothetical rejection state expressing means expresses a state which will appear when a combined workflow is hypothetically rejected, based on the progress. The processing operation predicting means predicts a processing operation of a combined workflow based on the state expressed by the hypothetical rejection state expressing means, taking into consideration of the influence exerted on the business application systems and the plurality of workflow systems in respect of response performance. The evaluation value expressing means retrieves event information from the processing operation, which is the result of the prediction by the processing operation predicting means, and the event information recording means, performs statistical processing for historical information thereof, and calculates, based on the result of the statistical processing, an evaluation value which is defined on the basis of information on an agreed service level concluded with respect to the combined workflow. The determining means determines whether or not the evaluation value satisfies a condition defined by the agreed service level information. The rejection-targeted-specific progress generating means generates a rejection-targeted-specific progress for selecting/specifying an execution which has an arbitrary progress equal to or less than a maximum progress as a rejection-target when the evaluation value calculated using the progress related to the combined workflow and defined on the basis of the agreed service level information does not satisfy the condition defined by the agreed service level information.

First, event data resulting from a plurality of data exchanges related to combined workflows is coordinated, associated, and stored, and the progress is found for each combined workflow based on the associated event data. This allows each combined workflow that is being executed to be expressed by the progress, so that a processing operation of each combined workflow is predicted on the basis of the progress. The result of predicting each combined workflow is individually expressed by an evaluation value, and it is determined whether or not each evaluation value satisfies the condition defined by the agreed service level information. It is determined that no rejection is required when all evaluation values satisfy the condition, but if some evaluation values do not satisfy the condition, one of the evaluation values that does not satisfy the condition and presents the highest progress is chosen from among the evaluation values for use as the rejection-targeted-specific progress. The rejection-targeted-specific progress serves to limit targets which are hypothetically rejected from combined workflows that are being executed to efficiently extract rejection-targeted combined workflows in a shorter time. Next, an expression is made, taking into consideration of combinations, for a state where combined workflows that are being executed are rejected if they have their progresses equal to or lower than the rejection-targeted-specific progress, and the processing operation is again predicted on the basis of this expression taking into consideration of the influence exerted by the rejection on a plurality of business application systems and a plurality of combined workflow systems in respect of response performance. Each predication result is again expressed by an evaluation value, and it is determined whether or not the evaluation value satisfies the condition defined by the agreed service level information. If the evaluation value does not satisfy the condition, a rejected state is again expressed with a different combination, and similar processing is continued. When all evaluation values satisfy the condition, a forced rejection is made to the hypothetically rejected combined workflows.

The present invention enables the rejection determination to be pronounced taking into consideration of an agreed service level for combined workflows defined by a plurality of data exchanges, and taking into consideration of how a compensation operation caused by the rejection will exert influences on a plurality of business application systems, a plurality of workflow systems, and combined workflows. Also, since hypothetically rejected targets are limited from combined workflows that are being executed to efficiently extract rejection-targeted combined workflows in a shorter time, the present invention is more advantageous by courtesy of a high efficiency which can be expected.

BRIEF DESCRIPTION OF THE DRAWINGS

FIG. 7 is a diagram showing an exemplary execution state management table in the first and second, a third, a fourth, and a fifth exemplary embodiments.

FIG. 8 is a diagram showing an exemplary hypothetical rejection condition data management table in the first second, third, fourth, and fifth exemplary embodiments.

FIG. 9 is a diagram showing an exemplary predicted combined workflow input management table in the first, second, third, fourth, and fifth exemplary embodiments.

FIG. 10 is a diagram showing an exemplary simulation basic data management table in the first, second, third, fourth, and fifth exemplary embodiments.

FIG. 11 is a diagram showing an exemplary hypothetically rejected combined workflow data management table in the first, second, third, fourth, and fifth exemplary embodiments.

FIG. 12 is a diagram showing an exemplary hypothetical rejection data management table in the first, second, third, fourth, and fifth exemplary embodiments.

FIG. 13 is a diagram showing exemplary simulation result management table in the first, second, third, fourth, and fifth exemplary embodiments.

FIG. 14 is a diagram showing an exemplary statistical information data management table in the first, second, third, fourth, and fifth exemplary embodiments.

FIG. 15 is a diagram showing an exemplary evaluation value management table in the first, second, third, fourth, and fifth exemplary embodiments.

FIG. 16 is a diagram showing an exemplary minimum evaluation value management table in the first, second, third, fourth, and fifth exemplary embodiments.

FIG. 17 is a diagram showing an exemplary maximum evaluation value management table in the first, second, third, fourth, and fifth exemplary embodiments.

FIG. 18 is a diagram showing a specific example of the execution state management table in the first, second, third, and fourth exemplary embodiments.

FIG. 19 is a diagram showing a specific example of the execution state management table in the first, second, third, and fourth exemplary embodiments.

FIG. 20 is a diagram showing a specific example of the hypothetical rejection condition data management table in the first, second, and third exemplary embodiments.

FIG. 21 is a diagram showing a specific example of the predicted combined workflow input management table in the first, second, third, fourth, and fifth exemplary embodiments.

FIG. 22 is a diagram showing a specific example of the simulation basic data management table in the first, second, third, fourth, and fifth exemplary embodiments.

FIG. 23 is a diagram showing a specific example of the hypothetical rejection data management table in the first, second, and third exemplary embodiments.

FIG. 24 is a diagram showing a specific example of the hypothetically rejected combined workflow data management table in the first, second, and third exemplary embodiments.

FIG. 25 is a diagram showing a specific example of the simulation result management table in the first, second, third, and fourth exemplary embodiments.

FIG. 26 is a diagram showing a specific example of the statistical information data management table in the first, second, third, and fourth exemplary embodiments.

FIG. 27 is a diagram showing a specific example of the evaluation value management table in the first, second, and third exemplary embodiments.

FIG. 28 is a diagram showing a specific example of the minimum evaluation value management table in the first, second, and third exemplary embodiments.

FIG. 29 is a diagram showing a specific example of the maximum evaluation value management table in the first, second, and third exemplary embodiments.

FIG. 30 is a diagram showing a specific example of the hypothetical rejection condition data management table in the first, second, and third exemplary embodiments.

FIG. 31 is a diagram showing a specific example of the execution state management table in the first, second, and third exemplary embodiments.

FIG. 32 is a diagram showing a specific example of the predicted combined workflow input management table in the first, second, and third exemplary embodiments.

FIG. 33 is a diagram showing a specific example of the simulation basic data management table in the first, second, and third exemplary embodiments.

FIG. 34 is a diagram showing a specific example of the hypothetical rejection data management table in the first, second, and third exemplary embodiments.

FIG. 35 is a diagram showing a specific example of the hypothetical rejection data management table in the first, second, and third exemplary embodiments.

FIG. 36 is a diagram showing a specific example of the hypothetical rejection data management table in the first, second, and third exemplary embodiments.

FIG. 37 is a diagram showing a specific example of the simulation result management table in the first and third exemplary embodiments.

FIG. 38 is a diagram showing a specific example of the simulation result management table in the first, second, and third exemplary embodiments.

FIG. 39 is a diagram showing a specific example of the simulation management table in the first, second, and third exemplary embodiments.

FIG. 40 is a diagram showing a specific example of the evaluation value management table in the first and third exemplary embodiments.

FIG. 41 is a diagram showing a specific example of the evaluation value management table in the first, second, and third exemplary embodiments.

FIG. 42 is a diagram showing a specific example of the evaluation value management table in the first, second, and third exemplary embodiments.

FIG. 43 is a diagram showing a specific example of the minimum evaluation value management table in the first and third exemplary embodiments.

FIG. 44 is a diagram showing a specific example of the maximum evaluation value management table in the first and third exemplary embodiments.

FIG. 45 is a diagram showing a specific example of the hypothetical rejection condition data management table in the first, second, and third exemplary embodiments.

FIG. 46 is a diagram showing a specific example of the execution state management table in the first, second, and third exemplary embodiments.

FIG. 47 is a diagram showing a specific example of the predicted combined workflow input management table in the first, second, and third exemplary embodiments.

FIG. 48 is a diagram showing a specific example of the simulation basic data management table in the first, second, and third exemplary embodiments.

FIG. 49 is a diagram showing a specific example of the hypothetical rejection data management table in the first, second, and third exemplary embodiments.

FIG. 50 is a diagram showing a specific example of the hypothetical rejection data management table in the first, second, and third exemplary embodiments.

FIG. 51 is a diagram showing a specific example of the hypothetical rejection data management table in the first, second, and third exemplary embodiments.

FIG. 52 is a diagram showing a specific example of the simulation result management table in the first exemplary embodiment.

FIG. 53 is a diagram showing a specific example of the simulation result management table in the first, second, and third exemplary embodiments.

FIG. 54 is a diagram showing a specific example of the simulation result management table in the first, second, and third exemplary embodiments.

FIG. 55 is a diagram showing a specific example of the evaluation value management table in the first exemplary embodiment.

FIG. 56 is a diagram showing a specific example of the evaluation value management table in the first, second, and third exemplary embodiments.

FIG. 57 is a diagram showing a specific example of the evaluation value management table in the first, second, and third exemplary embodiments.

FIG. 58 is a diagram showing a specific example of the minimum evaluation value management table in the first exemplary embodiment.

FIG. 59 is a diagram showing a specific example of the maximum evaluation value management table in the first exemplary embodiment.

FIG. 60 is a diagram showing a specific example of the simulation result management table in the second exemplary embodiment.

FIG. 61 is a diagram showing a specific example of the evaluation value management table in the second exemplary embodiment.

FIG. 62 is a diagram showing a specific example of the minimum evaluation value management table in the second exemplary embodiment.

FIG. 63 is a diagram showing a specific example of the maximum evaluation value management table in the second exemplary embodiment.

FIG. 64 is a diagram showing a specific example of the simulation result management table in the second and third exemplary embodiments.

FIG. 65 is a diagram showing a specific example of the evaluation value management table in the second and third exemplary embodiments.

FIG. 66 is a diagram showing a specific example of the minimum evaluation value management table in the second exemplary embodiment.

FIG. 67 is a diagram showing a specific example of the maximum evaluation value management table in the second exemplary embodiment.

FIG. 74 is a flow chart showing the operation of the combined workflow monitoring device of the fourth exemplary embodiment.

FIG. 75 is a diagram showing an exemplary combined workflow input information management table in the fourth and fifth exemplary embodiments.

FIG. 76 is a diagram showing an exemplary state expression vector in the fourth and fifth exemplary embodiments.

FIG. 77 is a diagram showing an exemplary state expression matrix in the fourth and fifth exemplary embodiments.

FIG. 78 is a diagram showing an exemplary state historical information management table in the fourth and fifth exemplary embodiments.

FIG. 79 is a diagram showing an exemplary rejection state expression vector in the fourth and fifth exemplary embodiments.

FIG. 80 is a diagram showing a specific example of the combined workflow input information management table in the fourth and fifth exemplary embodiments.

FIG. 81 is a diagram showing a specific example of the state expression vector in the fourth and fifth exemplary embodiments.

FIG. 82 is a diagram showing a specific example of the state expression matrix in the fourth and fifth exemplary embodiments.

FIG. 83 is a diagram showing a specific example of the state historical information management table in the fourth exemplary embodiment.

FIG. 84 is a diagram showing a specific example of the maximum evaluation value management table in the fourth exemplary embodiment.

FIG. 85 is a diagram showing a specific example of the hypothetical rejection condition data management table in the fourth exemplary embodiment.

FIG. 86 is a diagram showing a specific example of the hypothetical rejection data management table in the fourth exemplary embodiment.

FIG. 87 is a diagram showing a specific example of the hypothetically rejected combined workflow data management table in the fourth exemplary embodiment.

FIG. 88 is a diagram showing a specific example of the simulation result management table in the fourth exemplary embodiment.

FIG. 89 is a diagram showing a specific example of the evaluation value management table in the fourth exemplary embodiment.

FIG. 90 is a diagram showing a specific example of the minimum evaluation value management table in the fourth exemplary embodiment.

FIG. 91 is a diagram showing a specific example of the maximum evaluation value management table in the fourth exemplary embodiment.

FIG. 92 is a diagram showing a specific example of the rejection state expression vector in the fourth exemplary embodiment.

FIG. 93 is a diagram showing a specific example of the state historical information management table in the fourth exemplary embodiment.

FIG. 94 is a diagram showing a specific example of the state historical information management table in the fourth exemplary embodiment.

FIG. 96 is a flow chart showing the operation of the combined workflow monitoring device of the fifth exemplary embodiment.

FIG. 97 is a diagram showing a specific example of the state historical information management table in the fifth exemplary embodiment.

FIG. 98 is a diagram showing a specific example of the state expression matrix in the fifth exemplary embodiment.

FIG. 99 is a diagram showing a specific example of the state expression matrix in the fifth exemplary embodiment.

FIG. 100 is a diagram showing a specific example of the maximum evaluation value management table in the fifth exemplary embodiment.

FIG. 101 is a diagram showing a specific example of the maximum evaluation value management table in the fifth exemplary embodiment.

FIG. 102 is a diagram showing a specific example of the hypothetically rejected combined workflow data management table in the fifth exemplary embodiment.

FIG. 103 is a diagram showing a specific example of the hypothetical rejection condition data management table in the fifth exemplary embodiment.

FIG. 104 is a diagram showing a specific example of the rejection state expression vector in the fifth exemplary embodiment.

FIG. 105 is a diagram showing a specific example of the state historical information management table in the fifth exemplary embodiment.

FIG. 106 is a diagram showing a specific example of the state historical information management table in the fifth exemplary embodiment.

Figure 1:
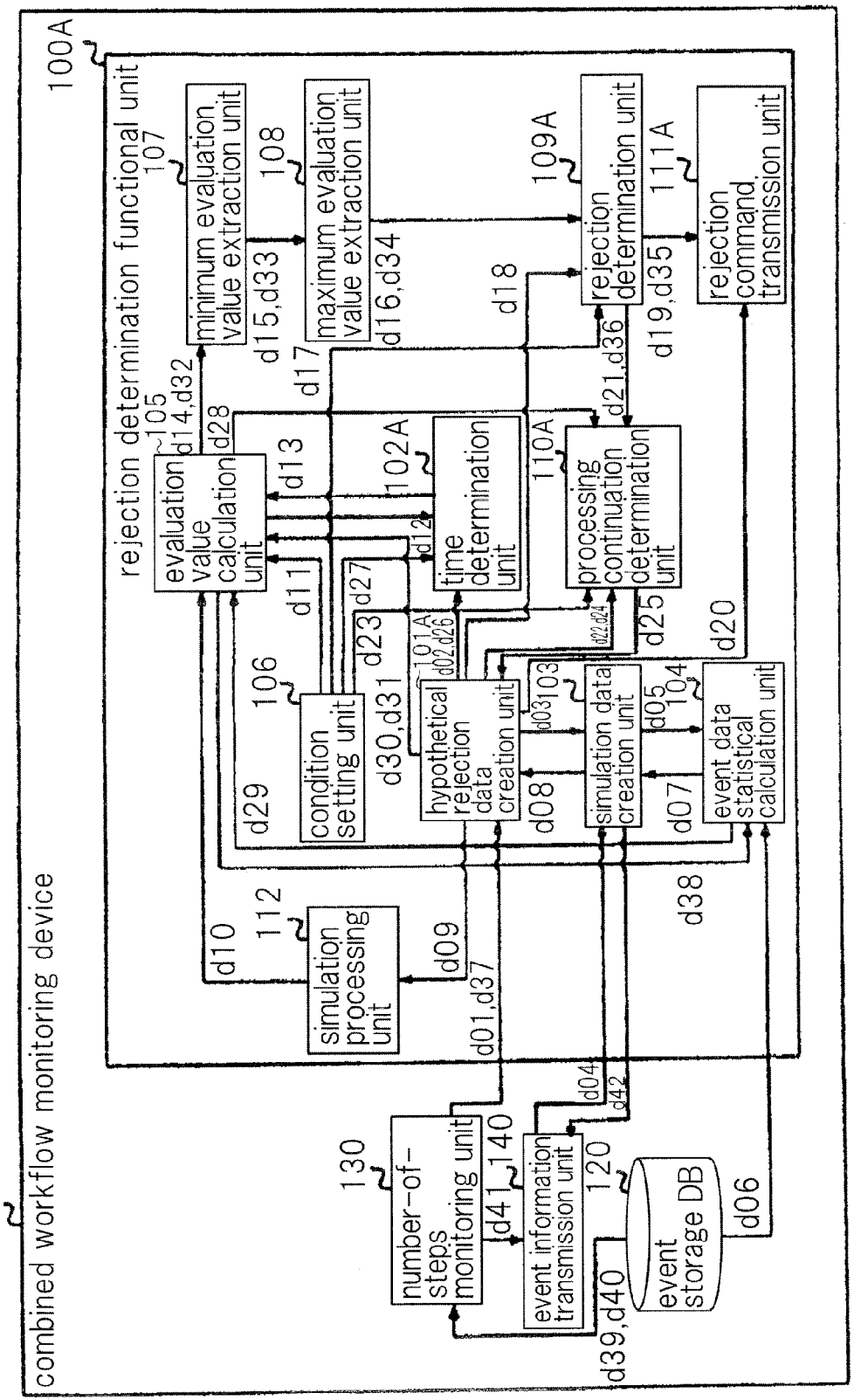
FIG. 1 is a block diagram of a combined workflow monitoring device according to a first exemplary embodiment of the present invention.

EXPLANATION OF REFERENCE CHARACTERS 1A-1B-1C-1D combined workflow monitoring device
100A-100B-100C-100D-100E rejection determination functional unit
101A-101B-101C-101D-101E hypothetical rejection data creation unit
102A-102B-102C-102D-102E time determination unit
103 simulation data creation unit
104 event data statistical calculation unit
105 evaluation value calculation unit
106 condition setting unit
107 minimum evaluation value extraction unit
108 maximum evaluation value extraction unit
109A-109B-109C-109D-109E rejection determination unit
110A-110B-110C-110D-110E processing continuation determination unit
111A-111B-111C-111D-111E rejection command transmission unit
112 simulation processing unit
113 evaluation value recording unit
120 event storage DB
130 number-of-steps monitoring unit
140 event information transmission unit
150 maximum number-of-steps holding unit
160 evaluation value comparison unit
200D, 200E state comparison functional unit
201D, 201E state expression generation unit
202D, 202E state history storage DB
203D, 203E state expression search unit
204D, 204E rejection state capture unit
205D, 205E state expression recording unit
206D, 206E rejection state expression generation unit
207E search policy setting unit
200~230 step
300~334 step
400~433 step
500~549 step
600~616 step
d01 hypothetical rejection data creation unit activation signal
d02 time determination unit activation signal
d03 simulation data creation unit activation signal
d04 execution state management table
d05 event data statistical calculation unit activation signal
d06 event information
d07 predicted combined workflow input management table
d08 simulation basic data management table
d09 hypothetical rejection condition data management table d10 simulation result management table
d11 evaluation value calculation function
d12 time limit determination request
d13 time limit determination response
d14 evaluation value management table
d15 minimum evaluation value management table
d16 maximum evaluation value management table
d17 agreed service level determination threshold
d18 hypothetical rejection condition data management table
d19 maximum evaluation value management table
d20 hypothetically rejected combined workflow data management table
d21 maximum evaluation value management table
d22 hypothetical rejection condition data management table
d23 agreed service level determination threshold
d24 hypothetical rejection data management table
d25 the number of steps in the rejection-targeted combined workflow
d26 determination start time notification
d27 time limit
d28 evaluation value management table
d29 statistical information data management table
d30 evaluation value calculation unit activation signal
d31 hypothetical rejection condition data management table
d32 minimum evaluation value extraction unit activation signal
d33 maximum evaluation value extraction unit activation signal
d34 rejection determination unit activation signal
d35 rejection command transmission unit activation signal
d36 processing continuation determination unit activation signal
d37 combined workflow definition ID
d38 the number of steps in the rejection-targeted combined workflow
d39 request message event data
d40 response message event data
d41 execution state management table
d42 execution state query signal
d43 evaluation value recording unit activation signal
d44 rejection determination start/end notification
d45 hypothetical rejection condition data management table
d46 rejection command transmission unit activation signal
d47 rejection command transmission unit activation signal
d48 maximum evaluation value management table
d49 rejection determination end notification
d50 rejection determination end notification
d51 maximum evaluation value management table request signal
d52 maximum evaluation value management table not-yet-retained signal
d53 maximum evaluation value management table
d54 maximum evaluation value management table
d55 combined workflow input information management table
d56 combined workflow input information management table
d57 state expression generation unit activation signal
d58 simulation basic data management table
d59 combined workflow input information management table
d60 rejection-targeted combined workflow definition ID
d61 maximum number of steps
d62 state expression search unit activation signal
d63 state expression matrix
d64 rejection-targeted combined workflow definition ID
d65 the number of steps in the rejection-targeted combined workflow
d66 rejection volume
d67 rejection state expression vector
d68 evaluation value
d69 convergence determination flag
d70 rejection volume
d71 the number of steps in the rejection-targeted combined workflow
d72 rejection command transmission unit activation signal
d73 rejection state expression vector
d74 simulation basic data management table
d75 maximum evaluation value management table
d76 convergence determination flag
d77 convergence determination flag
d78 rejection state capture unit activation signal
d79 maximum evaluation value management table
d80 convergence determination flag
d81 state expression matrix
d82 rejection-targeted combined workflow definition ID
d83 rejection state expression vector
d84 evaluation value
d85 rejection volume
d86 the number of steps in the rejection-targeted combined workflow
d87 state expression recording unit activation signal
d88 state historical information management table
d89 rejection volume
d90 number-of-steps in a rejection-targeted combined workflow
d91 rejection state expression generation unit activation signal
d92 maximum evaluation value management table
d93 hypothetically rejected combined workflow data management table
d94 simulation basic data management table
d95 maximum number-of-steps
d96 rejection state expression vector
d97 evaluation value comparison unit activation signal
d98 maximum evaluation value management table
d99 convergence determination flag
d100 rejection command transmission unit activation signal
d101 maximum evaluation value management table
d102 convergence determination flag
d103 search policy
d104 rejection determination end notification
T00100 execution state management table
T00101 combined workflow ID field
T00102 number-of-steps field
T00103 combined workflow definition ID field
T00200 predicted combined workflow input management table
T00201 combined workflow ID field
T00202 predicted input time field
T00203 combined workflow definition ID field
T00300 simulation result management table
T00301 simulation ID field
T00302 combined workflow ID field
T00303 combined workflow predicted response time field
T00304 combined workflow definition ID field
T00400 evaluation value management table
T00401 simulation ID field
T00402 combined workflow ID field
T00403 evaluation value field
T00500 minimum evaluation value management table
T00501 simulation ID field
T00502 minimum evaluation value field
T00600 hypothetically rejected combined workflow data management table
T00601 hypothetically rejected combined workflow ID field
T00602 simulation ID field T00603 hypothetical rejection condition ID field
T00604 rejected combined workflow ID field
T00700 hypothetical rejection condition data management table
T00701 hypothetical rejection condition ID field
T00702 rejection volume field
T00703 rejection-targeted combined workflow volume field
T00704 number-of-combinations field
T00705 the number of steps in the rejection-targeted combined workflow field
T00706 rejection-targeted combined workflow definition ID
T00700' hypothetical rejection condition data management table
T00701' hypothetical rejection condition ID field
T00702' rejection volume field
T00703' rejection-targeted combined workflow volume field
T00704' number-of-combinations field
T00705' the number of steps in the rejection-targeted combined workflow field
T00706' rejection-targeted combined workflow definition ID
T00800 hypothetical rejection data management table
T00801 simulation ID field
T00802 combined workflow ID field
T00803 number-of-steps field
T00804 time field
T00805 combined workflow definition ID field
T00900 simulation basic data management table
T00901 combined workflow ID field
T00902 number-of-steps field
T00903 time field
T00904 combined workflow definition ID field
T00900' simulation basic data management table
T00901' combined workflow ID field
T00902' number-of-steps field
T00903' time field
T00904' combined workflow definition ID field
T01000 statistical information data management table
T01001 statistical information ID field
T01002 hypothetical rejection condition ID field
T01003 executed combined workflow volume field
T01004 executed combined workflow average response time field
T01005 rejected combined workflow volume field
T01100 maximum evaluation value management table
T01100' maximum evaluation value management table
T01101 simulation ID field
T01102 maximum evaluation value field
T01200 combined workflow input information management table
T01201 combined workflow definition ID field
T01202 average input interval field
T01203 variance field
T01300 state historical information management table
T01301 state expression matrix field
T01302 rejection-targeted combined workflow definition ID field
T01303 rejection state expression vector field
T01304 evaluation value field
T01305 convergence determination flag field
T01306 rejection volume field
T01307 the number of steps in the rejection-targeted combined workflow
T10100 execution state management table
T10101 execution state management table
T10102 execution state management table
T10103 execution state management table
T10200 predicted combined workflow input management table
T10201 predicted combined workflow input management table
T10202 predicted combined workflow input management table
T10300 simulation result management table
T10301 simulation result management table
T10302 simulation result management table
T10303 simulation result management table
T10304 simulation result management table
T10305 simulation result management table
T10306 simulation result management table
T10307 simulation result management table
T10308 simulation result management table
T10309 simulation result management table
T10400 evaluation value management table
T10401 evaluation value entry
T10402 evaluation value entry
T10403 evaluation value management table
T10404 evaluation value management table
T10405 evaluation value management table
T10406 evaluation value management table
T10407 evaluation value management table
T10408 evaluation value management table
T10409 evaluation value management table
T10410 evaluation value management table
T10411 evaluation value management table
T10500 minimum evaluation value management table
T10501 minimum evaluation value management table
T10502 minimum evaluation value management table
T10503 minimum evaluation value management table
T10504 minimum evaluation value management table
T10505 minimum evaluation value management table
T10600 hypothetically rejected combined workflow data management table
T10601 hypothetically rejected combined workflow data entry
T10602 hypothetical rejection combined workflow data management table
T10700 hypothetical rejection condition data management table
T10701 hypothetical rejection condition data management table
T10702 hypothetical rejection condition data management table
T10703 hypothetical rejection condition data management table
T10704 hypothetical rejection condition data management table
T10800 hypothetical rejection condition data management table
T10801 hypothetical rejection data entry
T10802 hypothetical rejection data entry
T10803 hypothetical rejection data management table
T10804 hypothetical rejection data entry
T10805 hypothetical rejection data management table
T10806 hypothetical rejection data management table
T10807 hypothetical rejection data management table
T10808 hypothetical rejection data management table
T10809 hypothetical rejection data management table
T10810 hypothetical rejection data management table
T10900 simulation basic data management table
T10901 simulation basic data management table
T10902 simulation basic data management table
T11000 statistical information data management table
T11100 maximum evaluation value management table T11101 maximum evaluation value management table
T11102 maximum evaluation value management table
T11103 maximum evaluation value management table
T11104 maximum evaluation value management table
T11105 maximum evaluation value management table
T11106 maximum evaluation value management table
T11107 maximum evaluation value management table
T11108 maximum evaluation value management table
T11200 combined workflow input information management table
T11300 state historical information management table
T11301 state historical information management table
T11302 state historical information management table
T11303 state historical information management table
T11304 state historical information management table
T11305 state historical information management table
V00100 state expression vector
V10100 state expression vector
V10200 rejection state expression vector
V00201 rejection state expression vector
V00202 rejection state expression vector
M00100 state expression matrix
M10100 state expression matrix
M10101 state expression matrix
M10102 state expression matrix

BEST MODE FOR CARRYING OUT THE INVENTION

First Exemplary Embodiment

FIG. 1 is a block diagram showing the general configuration of a combined workflow monitoring device according to a first exemplary embodiment of the present invention.

Combined workflow monitoring device 1A of this exemplary embodiment comprises event storage DB 120, number-of-steps monitoring unit 130, event information transmission unit 140, and rejection determination functional unit 100A. Event storage DB 120 coordinates and associates event data related to each combined workflow with one another, and stores the associated event data. Number-of-steps monitoring unit 130 calculates the number of steps, which is indicative of the degree of the progress of each combined workflow, from the event data stored in event storage DB 120, and monitors and retains the calculated number of steps. Event information transmission unit 140, in response to a request, retrieves data representative of the current situation in which a combined workflow is executed, using the number of steps from number-of-steps monitoring unit 130, and transmits the data to rejection determination functional unit 100A. Rejection determination functional unit 100A retrieves information from event storage DB 120, number-of-steps monitoring unit 130, and event information transmission unit 140 and performs a rejection determination.

Number-of-steps monitoring unit 130 monitors event storage DB 120. When it newly observes a request message for or a response message to a business application, or a request message for or a response message to a workflow, number-of-steps monitoring unit 130 determines that the processing of a combined workflow has progressed and updates the number of steps which is indicative of the progress of the relevant combined workflow. Number-of-steps monitoring unit 130 also retains a combined workflow definition ID which uniquely identifies combined workflows that are subjected to the rejection determination. When the number-of-steps is updated for, in particular, a combined workflow which has a combined workflow definition ID, number-of-steps monitoring unit 130 activates hypothetical rejection data creation unit 101A in rejection determination functional unit 100A and notifies hypothetical rejection data generation unit 101A of the combined workflow definition ID.

Rejection determination functional unit 100A includes event data statistical calculation unit 104 which retrieves historical information related to each combined workflow, and performs statistical calculations and creation of predicted combined workflow input data. Event data statistical calculation unit 104 references past histories identified by the combined workflow definition ID to calculate the number of combined workflows, the processing of which have been completed, the number of rejected combined workflows, the past average response time, and the like. Event data statistical calculation unit 104 also performs statistical processing for past histories such as calculating a combined workflow average input interval, the variance thereof and the like to create, as predicted combined workflow input data, the combined workflow input pattern that is most likely in the future. The predicted combined workflow input data is used for simulator basic data, later described. Since business application systems and workflow systems which process combined workflows may sometimes share resources, loads on the respective systems are significantly affected by other combined workflows which are being simultaneously executed. Therefore, a more precise simulation is intended by making an input prediction. The predicted combined workflow input data may be simply required to describe which combined workflow definition ID contains a combined workflow to be input, and when the combined workflow will be input.

Rejection determination functional unit 100A further includes simulation data creation unit 103 which retrieves execution situation data indicative of the current situation in which a combined workflow is being executed, retrieves predicted combined workflow input data, and creates simulator basic data which represents the current and future states of each combined workflow. The execution situation data may be simply required to indicate which combined workflow definition ID contains a currently executed combined workflow uniquely identified by a combined workflow ID, and indicate, by the number of steps, the degree to which the combined workflow is progressing. Additionally, the simulator basic data may be simply required to indicate which combined workflow definition ID contains combined workflows, the combined workflows being uniquely identified by a combined workflow ID, and that are being currently executed or predicted to be input, to indicate when the combined workflow will be input, and to indicate, by the number of steps, the degree to which the combined workflow is progressing.

Rejection determination functional unit 100A further includes hypothetical rejection data creation unit 101A which retrieves a combined workflow definition ID that identifies combined workflows to be subjected to the rejection determination, retrieves the simulator basic data, and creates simulator data in which combined workflows are hypothetically rejected, the number of combined workflows being equal to the rejection volume from the simulator basic data. When hypothetically rejecting combined workflows, hypothetical rejection data creation unit 101A extracts, from combined workflows that are being executed, those combined workflows, the degrees of progress of which are equal to or lower than a certain reference, as expressed by the number of steps, and considers all possible combinations of combined workflows, the number of which is equal to the rejection volume, which are to be rejected from the extracted ones.

Hypothetical rejection data creation unit 101A does not designate all combined workflows which are being executed as combined workflows which are subjected to rejection, but restricts the combined workflows which are subjected to rejection to those which have the degrees of progress, expressed by the number of steps, which are equal to or lower than the certain reference. Accordingly, the rejection determination can be performed more efficiently and in a shorter time. To this end, hypothetical rejection data creation unit 101A stores a number-of-steps reference value for narrowing down combined workflows to be subjected to rejection, the number of combined workflows to be subjected to rejection, the number of combined workflows to be hypothetically rejected, and the number of combinations of combined workflows, the number of which is equal to the number of combined workflows to be hypothetically rejected, which are selected from the combined workflows to be subjected to rejection. Since simulator data of the number of combinations is created, hypothetical rejection data creation unit 101A also stores a management table which establishes a link between simulator data and a combined workflow ID that contains a combined workflow that the simulator data has hypothetically rejected. The combined workflow simulator data may be simply required to indicate which combined workflow definition ID contains combined workflows, the combined workflows being uniquely identified by a combined workflow ID, and that are being currently executed or predicted to be input, to indicate when the combined workflow will be input, and to indicate, by the number of steps, the degree to which the combined workflow is progressing, or whether the combined workflow will be rejected.

In order to determine whether or not a combined workflow currently being executed satisfies an agreed service level which is concluded between a service provider and a service coordinator, hypothetical rejection data creation unit 101A initially sets the number of combined workflows to be hypothetically rejected to zero, and sets the number-of-steps reference value for narrowing down workflows to be rejected to a code which signifies that the combined workflows that are being executed are not selected for rejection, at the time of activation. Then, hypothetical rejection data creation unit 101A performs a rejection determination process.

Upon acquisition of the number-of-steps reference value for narrowing down workflows to be rejected from processing continuation determination unit 110A, later described, hypothetical rejection data creation unit 101A increments the number of combined workflows to be hypothetically rejected by one from the retained number of combined workflows to be rejected, and again performs the rejection determination process. Stated another way, since the agreed service level that is concluded between the service provider and the service coordinator cannot be satisfied with the number of workflows to be hypothetically rejected which was determined at the preceding time, hypothetical rejection data creation unit 101A determines whether or not the agreed service level that is concluded between the service provider and the service coordinator can be satisfied by increasing by one the number of combined workflows to be hypothetically rejected.

When again performing the rejection determination process with the number of combined workflows to be hypothetically rejected being increased by one, hypothetical rejection data creation unit 101A, which stores the simulator basic data, again retrieves the simulator basic data, and determines whether or not there is a difference between the number-of-steps included in the again retrieved simulator basic data and the number-of-steps included in the stored simulator basic data. If there is a difference, in order to show that there are changes in the degrees of progress of combined workflows that are being executed; hypothetical rejection data creation unit 101A resets the number of combined workflows to be hypothetically rejected to zero, and continues the rejection determination process, using the again retrieved simulator basic data indicative of the current situation.

Rejection determination functional unit 100A further includes simulation processing unit 112 which predicts the response time of each combined workflow once it is applied with data, expressed by the number-of-steps, indicative of the degree and the time at which a combined workflow uniquely identified by a combined workflow ID is progressing, or when it will be rejected. Simulation processing unit 112 creates and outputs a simulation result list which enumerates a combined workflow uniquely identified by a combined workflow ID, a combined workflow definition ID to which the combined workflow belongs, and the response time of the combined workflow.

Rejection determination functional unit 100A further includes condition setting unit 106 which retains a rejection determination condition that is dependent upon information on the agreed service level that is concluded between a service provider and a service coordinator. Condition setting unit 106 retains a time limit for performing the rejection determination. Condition setting unit 106 also retains an evaluation value calculation function which is created on the basis of the information on the agreed service level that is concluded between the service provider and the service coordinator. The evaluation value calculation function has variables for determining the agreed service level, such as a processing time, an average processing time, a rejection ratio and the like of a combined workflow. The evaluation value calculation function is defined such that the higher the evaluation value that is calculated from the evaluation value calculation function, the more frequently the agreed service level will be satisfied. The evaluation value calculation function need not necessarily be defined with a mathematical expression, but may be described with a computer program format. Condition setting unit 106 also retains an agreed service level determination threshold. When an evaluation value that is calculated from the evaluation value calculation function exceeds the agreed service level determination threshold, then condition setting unit 106 determines that the agreed service level that is concluded between the service provider and the service coordinator has been satisfied.

Rejection determination functional unit 100A further includes time determination unit 102A which retrieves a determination start notification and a time limit for performing the rejection determination and retains the rejection determination end time. Upon receipt of a time limit determination request, time determination unit 102A retrieves the current time, and compares the rejection determination end time with the current time to determine whether or not the rejection determination could have been completed within the time limit.

Rejection determination functional unit 100A further includes evaluation value calculation unit 105 which extracts a combined workflow ID which has a combined workflow definition ID that is subjected to the rejection determination, from the simulation result list, and calculates an evaluation value using the evaluation value calculation function based on the response time, the average response time, and the rejection ratio for the combined workflow definition ID to create an evaluation value list. Evaluation value calculation unit 105 retains the number of combinations of simulations. After creating an evaluation value list for the results of respective simulations of the number of combinations, evaluation value calculation unit 105 notifies time determination unit 102A of the time limit determination request to ascertain whether or not a process has been completed within the defined time limit. When the process has been completed within the defined time limit, rejection determination functional unit 100A continues the process. However, when the process cannot be completed within the defined time limit, rejection determination functional unit 100A terminates the series of rejection determination processing operations.

Rejection determination functional unit 100A further includes minimum evaluation value extraction unit 107 which extracts a minimum value from each evaluation value list based on the evaluation value lists of the number equal to the number of combinations, and creates a minimum value list which enumerates the minimum values of the number equal to the number of combinations in list form.

Rejection determination functional unit 100A includes maximum evaluation value extraction unit 108 which extracts a maximum value from minimum values of the number equal to the number of combinations, based on the minimum value list. The maximum value implies that when combined workflows of the number equal to the number of combinations are hypothetically rejected from among those combined workflows which are being executed and which present the number-of-steps equal to or less than the number-of-steps reference value for narrowing down combined workflows to be rejected, evaluation values for combined workflows that were not rejected, can be set to at least the maximum value.

Rejection determination functional unit 100A further includes rejection determination unit 109A which retrieves the maximum evaluation value and the agreed service level determination threshold, and determines whether or not the maximum evaluation value meets the agreed service level determination threshold. Rejection determination unit 109A retains the number of combined workflows to be hypothetically rejected. If the maximum evaluation value meets the agreed service level determination threshold when the number of combined workflows to be hypothetically rejected is zero, then rejection determination unit 109A determines that the agreed service level that is concluded between the service provider and the service coordinator has been satisfied even without rejecting any combined workflows that are being executed, and terminates the series of rejection determination processing operations. Also, if the maximum evaluation value meets the agreed service level determination threshold when the number of combined workflows to be hypothetically rejected is a value other than zero, then rejection determination unit 109A determines that the agreed service level that is concluded between the service provider and the service coordinator can be satisfied provided that combined workflows of the number equal to the number of workflows to be hypothetically rejected are rejected from among combined workflows which are being executed. On the other hand, if the maximum evaluation value does not meet the agreed service level determination threshold, then rejection determination unit 109A determines that the agreed service level that is concluded between the service provider and the service coordinator cannot be satisfied even if combined workflows of the number equal to the number of combined workflows to be hypothetically rejected are rejected from among the combined workflows which are being executed.

Rejection determination functional unit 100A further includes processing continuation determination unit 110A which when it is determined that the agreed service level that is concluded between the service provider and the service coordinator cannot be satisfied, even if combined workflows of the number equal to the number of combined workflows to be hypothetically rejected are rejected from among the combined workflows that are being executed, retrieves the number of combined workflows that are subjected to rejection, and the number of combined workflows to be hypothetically rejected, and determines whether or not the rejection determination process can be continued with the number of combined workflows to be hypothetically rejected being further increased. When determining that the number of combined workflows to be hypothetically rejected cannot be increased, processing continuation determination unit 110A determines that the agreed service level that is concluded between the service provider and the service coordinator cannot be satisfied no matter how the combined workflows that are being executed are rejected, and terminates the series of rejection determination processing operations. On the other hand, when determining that the number of combined workflows to be hypothetically rejected can be increased, processing continuation determination unit 110A retrieves the number-of-steps reference value for narrowing down combined workflows to be rejected. When the number-of-steps reference value includes a code set therein which indicates that all of the combined workflows that are being executed should not be rejected, processing continuation determination unit 110A retrieves the evaluation value list and the agreed service level determination threshold in order to newly set the number-of-steps reference value, extracts from the combined workflows that are being executed a combined workflow which cannot satisfy the agreed service level and which has the largest number of steps, i.e., a combined workflow which cannot satisfy the agreed service level and exhibits the most advanced processing progress, and sets the number-of-steps in this combined workflow to the number-of-steps reference value. On the other hand, when a value has been already retained in the retrieved number-of-steps reference value, processing continuation determination unit 110A designates this value as the number-of-steps reference value. Processing continuation determination unit 110A notifies hypothetical rejection data creation unit 101A of the number-of-steps reference value.

Rejection determination functional unit 100A further includes rejection command transmission unit 111A which transmits a command for executing a forced rejection to combined workflows to be rejected when it is determined that rejection has been pronounced.

Figure 2:
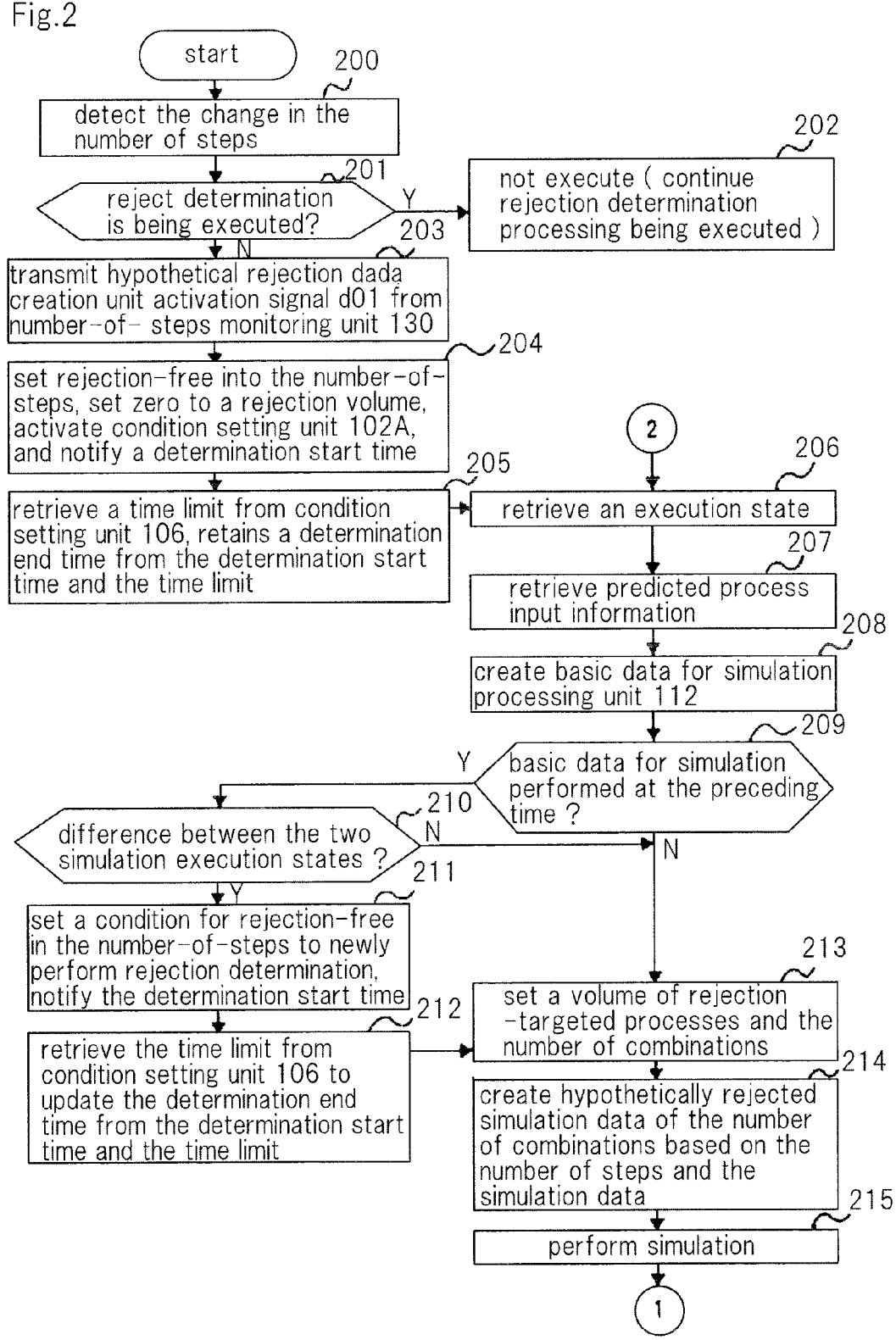
FIG. 2 is a flow chart showing the operation of the combined workflow monitoring device of the first exemplary embodiment.
Figure 3:
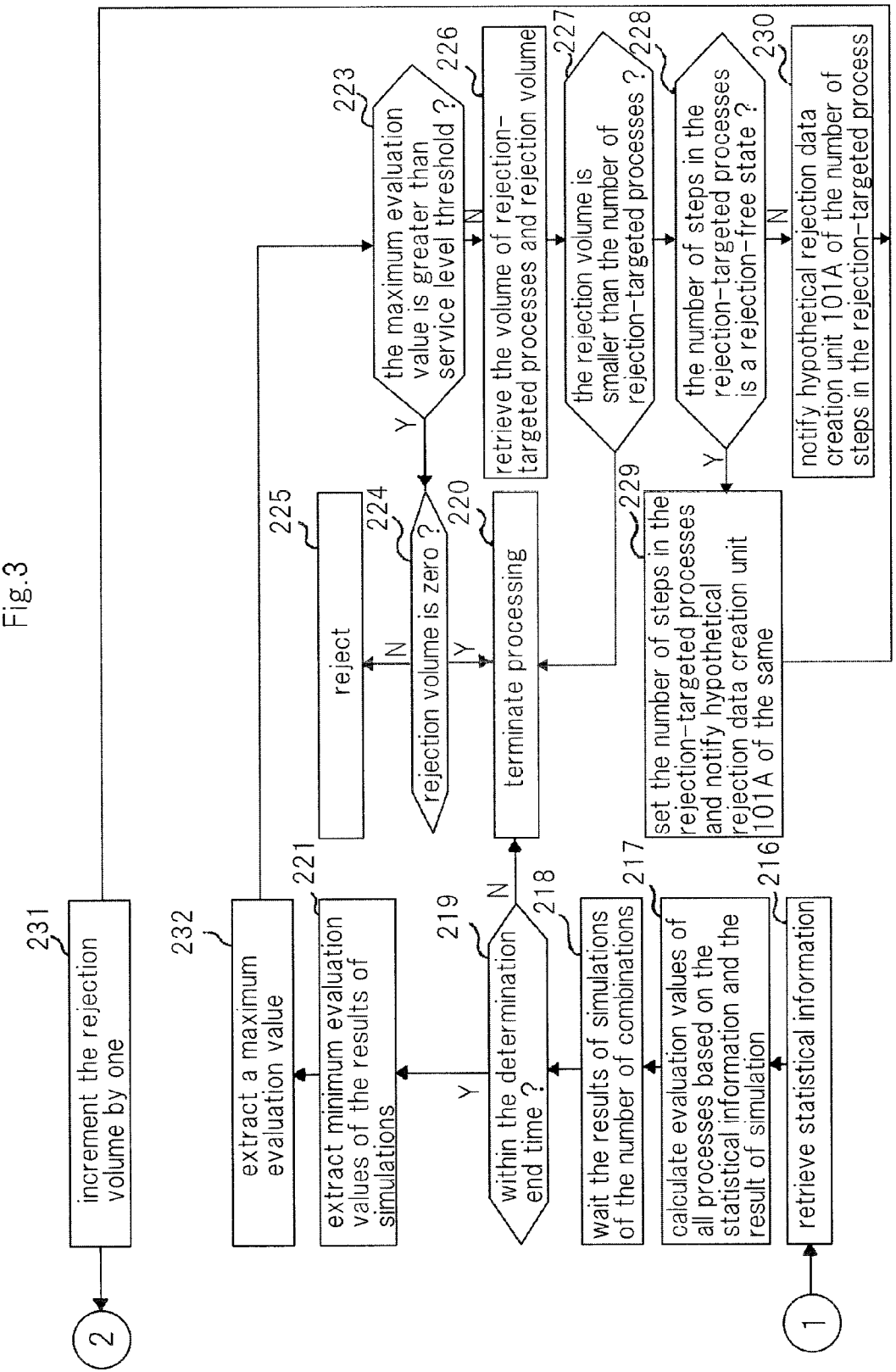
FIG. 3 is a flow chart showing the operation of the combined workflow monitoring device of the first exemplary embodiment.

Next, the operation of combined workflow monitoring device 1A of this exemplary embodiment will be described in detail with reference to FIG. 1 and the flow charts of FIGS. 2 and 3.

Number-of-steps monitoring unit 130 retains combined workflow definition IDs which uniquely identify combined workflows that are subjected to rejection determination, and always monitors event storage DB 120 which coordinates and associates with each other event data related to each combined workflow, and stores the coordinated and associated event data. When it newly detects event data d39, d40 related to a request message for or a response message to a business application, as well as to a request message for or a response message to a workflow, then number-of-steps monitoring unit 130 updates execution state management table T00100 stored therein. When it detects event data for a request message for or a response message to a combined workflow which, in particular, has a combined workflow definition ID, number-of-steps monitoring unit 130 causes rejection determination functional unit 100A to start the rejection determination process (step 200).

FIG. 7 shows an exemplary structure of execution state management table T00100. Execution state management table T00100 is a table having combined workflow ID field T00101 as a key, and is used to manage the number of steps in a relevant combined workflow, and a combined workflow definition ID which contains the relevant combined workflow through the use of number-of-steps field T00102 and combined workflow definition ID field T00103, respectively.

When it detects event data d39, d40 for a request message for or a response message to a combined workflow which has a combined workflow definition ID, number-of-steps monitoring unit 130 determines whether or not hypothetical rejection data creation unit 101A is active (step 201). When hypothetical rejection data creation unit 101A is active, number-of-steps monitoring unit 130 does not newly make a rejection determination because a rejection determination process is already being executed (step 202). When hypothetical rejection data creation unit 101A is not activated, number-of-steps monitoring unit 130 notifies hypothetical rejection data creation unit 101A of hypothetical rejection data creation unit activation signal d01. Number-of-steps monitoring unit 130 also notifies hypothetical rejection data creation unit 101A of combined workflow definition ID d37 for identifying combined workflows which are subjected to the rejection determination (step 203).

Hypothetical rejection data creation unit 101A is activated in response to the receipt of hypothetical rejection data creation unit activation signal d01 to create hypothetical rejection condition data management table T00700. For initially simulating a rejection-free scenario, hypothetical rejection data creation unit 101A sets "0" to rejection volume field T00702 and "−1" to the number of steps in the rejection-targeted combined workflow field T00705 in hypothetical rejection condition data management table T00700, respectively. The number of steps in the rejection-targeted combined workflow needs not be "−1" as long as it can be indicated that no combined workflow will be rejected when it is being executed. Hypothetical rejection data creation unit 101A sets combined workflow definition ID d37 received from number-of-steps monitoring unit 130 in rejection-targeted combined workflow definition ID field T00706. Note that, at this time, no values have been set in rejection-targeted combined workflow volume field T00703 and number-of-combinations field T00704. Hypothetical rejection data creation unit 101A notifies simulation data creation unit 103 of simulation data creation unit activation signal d03. Hypothetical rejection data creation unit 101A also notifies time determination unit 102A of time determination unit activation signal d02, and notifies time determination unit 102A of determination start time notification d26 as determination information as to whether the determination has been completed within a time limit (step 204).

FIG. 8 shows an exemplary structure of hypothetical rejection condition data management table T00700. Hypothetical rejection condition data management table T00700 is a table having hypothetical rejection condition ID field T00701 as a key, and is used to manage the rejection volume, the rejection-targeted combined workflow volume, the number of combinations, the number of steps in the rejection-targeted combined workflow, and the rejection-targeted combined workflow definition ID of a relevant hypothetical rejection condition ID through the use of rejection volume field T00702, rejection-targeted combined workflow volume field T00703, number-of-combinations field T00704, the number of steps in rejection-targeted combined workflow field T00705, and rejection-targeted combined workflow definition ID field T00706, respectively. The rejection volume indicates the number of combined workflows which are rejected from among combined workflows that belong to a combined workflow definition ID that undergoes the agreed service level determination, and which are being executed. The rejection-targeted combined workflow volume indicates the number of combined workflows that are used in the rejection determination from among combined workflows that are being executed and which belong to a combined workflow definition ID that undergoes an agreed service level determination. The number of combinations indicates the number of combinations of combined workflows, equal in number to the rejection volume, selected from the rejection-targeted combined workflows. The number of steps in the rejection-targeted combined workflow is an index value for use in determining combined workflows which are subjected to the rejection determination among combined workflows that are being executed and which belong to the combined workflow definition ID that undergoes an agreed service level determination. Each combined workflow is determined to be subjected to the rejection determination when it has the number of steps that is equal to or less than the number of steps in the rejection-targeted combined workflow. The rejection-targeted combined workflow definition ID is an identifier that uniquely identifies a combined workflow which undergoes the agreed service level determination.

Time determination unit 102A is activated in response to the receipt of time determination unit activation signal d02. Time determination unit 102A retrieves time limit d27 from condition setting unit 106, calculates a determination end time based on the time at which it received determination start time notification d26, and retains the calculated determination end time (step 205). Condition setting unit 106 retains information about conditions for performing the rejection determination based on the agreed service level that is concluded between the service provider and the service coordinator. Condition setting unit 106 defines an evaluation value calculation function which is set based on the agreed service level information. The evaluation value calculation function is defined to have variables which include a combined workflow response time, a combined workflow average response time, and a rejection ratio which are dictated by the agreed service level. The evaluation value calculation function may be arbitrarily defined, but it is defined such that the larger the value derived from the evaluation value function, the more frequently will the agreed service level be satisfied. Also, the evaluation value calculation function need not be described with a mathematical expression, but may be described with a computer program format. Condition setting unit 106 also defines an agreed service level determination threshold for determining the agreed service level. The agreed service level determination threshold is determined by the evaluation value calculation function. The agreed service level determination threshold is an index value for determining that the agreed service level that is concluded between the service provider and the service coordinator is satisfied when the agreed service level determination threshold is exceeded by a value which is calculated by using a combined workflow response time, a combined workflow average response time, and a rejection ratio, that are found through a simulation, and by substituting them into the evaluation value calculation function.

Simulation data creation unit 103 is activated in response to the receipt of simulation data creation unit activation signal d03. Simulation data creation unit 103 notifies event information transmission unit 140 of execution state query signal d42. Event information transmission unit 140 retrieves execution state management table T00100 (d41) from number-of-steps monitoring unit 130, and notifies simulation data creation unit 103 of execution state management table T00100 (d04). Simulation data creation unit 103 notifies event data statistical calculation unit 104 of event data statistical calculation unit activation signal d05 (step 206).

Event data statistical calculation unit 104 is activated in response to the receipt of event data statistical calculation unit activation signal d05. Event data statistical calculation unit 104 retrieves event information d06 from event storage DB 120, performs statistical processing for past histories, such as calculating the combined workflow average input interval, the variance thereof and the like, and creates the combined workflow input pattern that is most likely in the future as predicted combined workflow input management table T00200. Event data statistical calculation unit 104 notifies simulation data creation unit 103 of predicted combined workflow input management table T00200 (d07) (step 207).

FIG. 9 shows an exemplary structure of predicted combined workflow input management table T00200. Predicted combined workflow input management table T00200 is a table having combined workflow ID field T00201 as a key, and is used to manage the input time of a relevant predicted combined workflow, and the combined workflow definition ID to which the combined workflow belongs, through the use of predicted input time field T00202 and combined workflow definition ID field T00203, respectively. Predicted combined workflow input management table T00200 is a table for directly indicating at which time in the future a combined workflow that belongs to a combined workflow definition ID will be input into the combined workflow device.

Simulation data creation unit 103 creates simulation basic data management table T00900 based on predicted combined workflow input management table T00200 received from event data statistical calculation unit 104, and execution state management table T00100. Simulation data creation unit 103 notifies hypothetical rejection data creation unit 101A of simulation basic data management table T00900 (d08) (step 208).

FIG. 10 shows an exemplary structure of simulation basic data management table T00900. Simulation basic data management table T00900 is a table having combined workflow ID field T00901 as a key, and is used to manage the number of steps, a time, a combined workflow definition ID of a relevant combined workflow through the use of number-of-steps field T00902, time field T00903, and combined workflow definition ID field T00904, respectively. Simulation basic data management table T00900 is a table for directly showing when, including the future, and which combined workflow belongs to which combined workflow definition and to which degree it is progressing. The number of steps is similar to that in number-of-steps field T00102 in execution state management table T00100 with respect to the combined workflow that is being executed, and need not to be zero for a predicted combined workflow but may be any value which indicates that the predicted combined workflow is not currently executed. The time is a current time set for a combined workflow that is being executed, and is similar to that in predicted input time field T00202 in predicted combined workflow input management table T00200 for a predicted combined workflow. The combined workflow definition ID is similar to that in combined workflow definition ID field T00103 in execution state management table T00100 for a combined workflow that is being executed, and is similar to that in combined workflow definition ID field T00203 in predicted combined workflow input management table T00200 for a predicted combined workflow.

Hypothetical rejection data creation unit 101A ascertains whether or not hypothetical rejection data creation unit 101 retains basic data management table T00900' for a simulation performed at the preceding time (step 209). When hypothetical rejection data creation unit 101 retains simulation basic data management table T00900', hypothetical rejection data creation unit 101A compares combined workflow ID field T00904 in newly received simulation basic data management table T0090 (d08) with combined workflow ID field T00901' in basic data management table T00900' for the simulation performed at the preceding time in order to determine whether or not there is a change in the processing progress of combined workflows that are being executed during the rejection determination. Similarly, hypothetical rejection data creation unit 101A compares number-of-steps field T00902 in newly received simulation basic data management table T00900 with number-of-steps field T00902' in basic data management table T00900' for the simulation performed at the preceding time (step 210). When the comparison reveals a difference, this means that there is a change in the processing progress of the combined workflows that are being executed during the rejection determination, so that hypothetical rejection data creation unit 101A performs the rejection determination again from a rejection-free state after the situation has been changed. In order to update hypothetical rejection condition data management table 100700 to initially simulate a rejection-free situation, hypothetical rejection data creation unit 101A sets "0" into rejection volume field T00702 and "–1" into the number of steps in the rejection-targeted combined workflow field T00705 in hypothetical rejection condition data management table T00700. The number of steps in the rejection-targeted combined workflow need not be "–1" as long as it can be indicated that any combined workflow that are being executed will not be rejected. Hypothetical rejection data creation unit 101A sets a combined workflow definition ID (d37) received from number-of-steps monitoring unit 130 into rejection-targeted combined workflow definition ID field T00706. Hypothetical rejection data creation unit 101A notifies time determination unit 102A of determination start time notification d26 as information for determining whether or not the determination has been completed within a time limit (step 211).

Time determination unit 102A updates the determination end time retained therein using determination start time notification d26 and time limit d27 received from condition setting unit 106 (step 212).

Hypothetical rejection data creation unit 101A retains simulation basic data management table T00900. Hypothetical rejection data creation unit 101A compares number-of-steps field T00902 in simulation basic data management table T00900 with the number of steps in the rejection-targeted combined workflow retained in the number of steps in the rejection-targeted combined workflow field T00705 in hypothetical rejection condition data management table T00700 for combined workflows that are being executed. Hypothetical rejection data creation unit 101A calculates the number of combined workflow ID fields T00901 which are associated with number-of-steps field T00902, the value of which is equal to or less than the number of steps in the rejection-targeted combined workflow and which are associated with combined workflow definition ID field T00904 that matches rejection-targeted combined workflow definition ID field T00706, and retains the calculated number in rejection-targeted combined workflow volume field T00703. This number indicates the number of combined workflows which are subjected to the rejection determination among combined workflows that are being executed, and which belong to a combined workflow definition that undergoes the agreed service level determination. Then, combined workflows, that are currently being executed and that have the number of steps equal to or less than the number of steps in the rejection-targeted combined workflow, are extracted from among combined workflows that are being currently executed, thereby reducing the number of combined workflows which are subjected to the rejection determination. In this way, it is possible to efficiently implement the rejection determination process in a shorter time. Next, hypothetical rejection data creation unit 101A retrieves the rejection volume from rejection volume field T00702 in hypothetical rejection condition data management table T00700, calculates the number of combinations of combined workflows, equal in number to the rejection volume, selected from the rejection-targeted combined workflows, and retains the number of combinations in number-of-combinations field T00704 in hypothetical rejection condition data management table T00700. After creating hypothetical rejection condition data management table T00700, hypothetical rejection data creation unit 101A ascertains whether or not evaluation value calculation unit 105 is active. When evaluation value calculation unit 105 is not activated, hypothetical rejection data creation unit 101A notifies evaluation value calculation unit 105 of evaluation value calculation unit activation signal d30. Hypothetical rejection data creation unit 101A also notifies evaluation value calculation unit 105 of hypothetical rejection condition data management table T00700 (d31) (step 213).

Evaluation value calculation unit 105 is activated in response to the receipt of evaluation value calculation unit activation signal d30 from hypothetical rejection data creation unit 101A. Evaluation value calculation unit 105 retains hypothetical rejection condition data management table T00700 (d31) notified from hypothetical rejection data creation unit 101A.

After the completion of processing at step 213, hypothetical rejection data creation unit 101A creates and retains hypothetically rejected combined workflow data management table T00600, and hypothetical rejection data management table T00800 as input data to simulation processing unit 112. Hypothetical rejection data creation unit 101A creates, as hypothetical rejection condition data management table T000800, data which results from the exclusion of hypothetically rejected combined workflows that are being executed, the number of which is equal to the rejection volume that is retained in rejection volume field T00702, from combined workflows that are being executed and which are associated with number-of-steps field T00902 in simulation basic data management table T00900, equal to or less than the number of steps in the rejection-targeted combined workflow field T00705, and which are associated with combined workflow definition ID field T00904 in simulation basic data management table T00900 that matches rejection-targeted combined workflow definition ID field T00706. When some combined workflow is hypothetically rejected, hypothetical rejection data creation unit 101A sets a code indicative of rejection in number-of-steps field T00803. In this case, combined workflow ID fields T00802 of combined workflows subjected to the rejection, the number of which is equal to the rejection volume retained in rejection volume field T00702, are retained in rejected combined workflow ID fields T00604 in hypothetically rejected combined workflow data management table T00600. Hypothetical rejection data creation unit 101A eventually creates hypothetically rejected combined workflow data management tables T00600 and hypothetical rejection data management tables T00800, the number of which is equal to the number retained in number-of-combinations field T00704. Hypothetical rejection data creation unit 101A notifies simulation processing unit 112 of the created hypothetical rejection data management tables T00800 (d09), the number of which is equal to the number of combinations (step 214).

FIG. 11 shows an exemplary structure of hypothetically rejected combined workflow data management table T00600. Hypothetically rejected combined workflow data management table T00600 is a table having hypothetically rejected combined workflow ID field T00601 as a key, and is used to manage associations of a relevant simulation ID, hypothetical rejection condition ID, and rejected combined workflow ID with one another through the use of simulation ID field T00602, hypothetical rejection condition ID field T00603, rejected combined workflow ID field T00604, respectively. Hypothetically rejected combined workflow data management table T00600 is a table for directly showing which simulation was performed under which conditions, and which combined workflow ID a rejected combined workflow had during the execution of the simulation. When rejection volume field T00702 presents zero, a symbol indicative of rejection-free may be set into rejected combined workflow ID field T00604 instead of the combined workflow ID.

FIG. 12 shows an exemplary structure of hypothetical rejection data management table T00800. Hypothetical rejection data management table T00800 is a table having simulation ID field T00801 and combined workflow ID field T00802 as keys, and is used to manage a relevant simulation ID, combined workflow ID, the number of steps, time, and combined workflow definition ID through the use of number-of-steps field T00803, time field T00804, and combined workflow definition ID field T00805, respectively. When some combined workflow is hypothetically rejected, a code indicative of the rejection is set into number-of-steps field T00803.

Simulation processing unit 112 performs a simulation process in accordance with hypothetical rejection data management table T00800 (d09), creates simulation result management table T00300 corresponding to each hypothetical rejection data management table T00800, and notifies evaluation value calculation unit 105 of simulation result management tables T00300 (d10) (step 215).

FIG. 13 shows an exemplary structure of simulation result management table T00300. Simulation result management table T00300 is a table having simulation ID field T00301 and combined workflow ID field T00302 as keys, and is used to manage a combined workflow predicted response time and a combined workflow definition ID of a relevant simulation ID and combined workflow definition ID through the use of combined workflow predicted response time field T00303, combined workflow definition ID field T00304, respectively.

Evaluation value calculation unit 105 receives simulation result management table T00300 (d10) from simulation processing unit 112, and notifies event data statistical calculation unit 104 of rejection-targeted combined workflow definition ID (d38) which is set in rejection-targeted combined workflow definition ID field T00706 in hypothetical rejection condition data management table T00700 retained therein. Event data statistical calculation unit 104 creates statistical information data management table T01000 for a service identified by a rejection-targeted combined workflow definition ID, based on the rejection-targeted combined workflow definition ID (d38) received from evaluation value calculation unit 105 and event information (d06), and notifies evaluation value calculation unit 105 of statistical information data management table T01000 (d29) (step 216).

FIG. 14 shows an exemplary structure of statistical information data management table T01000. Statistical information data management table T01000 is a table having statistical information ID field T01001 as a key, and is used to manage a relevant statistical information ID, hypothetical rejection condition ID, the number of executed combined workflows, executed combined workflow average response time, and the number of rejected combined workflows through the use of statistical information ID field T01001, hypothetical rejection condition ID field T01002, hypothetical rejection condition ID executed combined workflow volume field T01003, executed combined workflow average response time field T01004, and rejected combined workflow volume field T01005, respectively.

After receiving statistical information data management table T01000 (d29), evaluation value calculation unit 105 receives evaluation value calculation function d11 defined by condition setting unit 106. Evaluation value calculation unit 105 calculates an evaluation value in accordance with the evaluation value calculation function, based on combined workflow predicted response time field T00303 associated with combined workflow definition ID field T00304 which matches rejection-targeted combined workflow definition ID field T00706 in simulation result management table T00300, and on statistical information data management table T01000, and creates evaluation value management table T00400 (step 217).

FIG. 15 shows an exemplary structure of evaluation value management table T00400. Evaluation value management table T00400 is a table having simulation ID field T00401 and combined workflow ID field T00402 as keys, and is used to manage an evaluation value of a relevant simulation ID and combined workflow ID through the use of evaluation value field T00403.

Evaluation value calculation unit 105 waits until it creates evaluation value management tables T00400, the number of which is equal to the number of combinations which is retained in number-of-combinations field T00704 in hypothetical rejection condition data management table T00700 which is retained in evaluation value calculation unit 105. After creating all evaluation value management tables T00400, the number of which is equal to the number of combinations, evaluation value calculation unit 105 transmits time limit determination request d12 to time determination unit 102A (step 218).

Time determination unit 102A compares the time at which it received time limit determination request d12 with a determination end time retained therein (step 119). When the time at which time limit determination request d12 was received has passed the determination end time retained by time determination unit 102A, time determination unit 102A determines that the rejection determination could not be performed within the time limit, and terminates the series of rejection determination processing operations (step 220). When the time at which time limit determination request d12 was received has not passed the determination end time retained by time determination unit 102A, time determination unit 102A notifies evaluation value calculation unit 105 of control time determination response d13. Upon receipt of control time determination response d13, evaluation value calculation unit 105 ascertains whether or not minimum evaluation value extraction unit 107 is active. When it is not activated, evaluation value calculation unit 105 notifies minimum evaluation value extraction unit 107 of minimum evaluation value extraction unit activation signal d32. Minimum evaluation value extraction unit 107 is activated in response to the receipt of minimum evaluation value extraction unit activation signal d32 from evaluation value calculation unit 105. Evaluation value calculation unit 105 notifies minimum evaluation value extraction unit 107 of evaluation value management tables T00400 (d14), the number of which is equal to the number of combinations, retained therein. Upon receipt of evaluation value management tables T00400 (d14), the number of which is equal to the number of combinations, minimum evaluation value extraction unit 107 extracts those evaluation value fields T00403 that have a minimum value from respective evaluation value management tables T00400, and creates minimum evaluation value management table T00500. Minimum evaluation value extraction unit 107 ascertains whether or not maximum evaluation value extraction unit 108 is active. When maximum evaluation value extraction unit 108 is not activated, minimum evaluation value extraction unit 107 notifies maximum evaluation value extraction unit 108 of maximum evaluation value extraction unit activation signal d33. Minimum evaluation value extraction unit 107 notifies maximum evaluation value extraction unit 108 of minimum evaluation value management table T00500 (d15) (step 221).

FIG. 16 shows an exemplary structure of minimum evaluation value management table T00500. Minimum evaluation value management table T00500 is a table having simulation ID field T00501 as a key, and is used to manage the minimum evaluation value of a relevant simulation ID through the use of minimum evaluation value field T00502.

Maximum evaluation value extraction unit 108 is activated in response to the receipt of maximum evaluation value activation signal d33 from minimum evaluation value extraction unit 107. Upon receipt of minimum evaluation value management table T00500 from minimum evaluation value extraction unit 107, maximum evaluation value extraction unit 108 extracts an evaluation value which presents the maximum value from among those evaluation values retained in minimum evaluation value field T00502, and creates maximum evaluation value management table T01100. Maximum evaluation value extraction unit 108 ascertains whether or not rejection determination unit 109A is active. When rejection determination unit 109A is not activated, maximum evaluation value extraction unit 108 notifies rejection determination unit 109A of rejection determination unit activation signal d34. Maximum evaluation value extraction unit 108 also notifies rejection determination unit 109A of maximum evaluation value management table T01100 (d16) (step 222).

FIG. 17 shows an exemplary structure of maximum evaluation value management table T01100. Maximum evaluation value management table T01100 is a table having simulation ID field T01101 as a key, and is used to manage the maximum evaluation value of a relevant simulation ID through the use of maximum evaluation value field T01102.

Rejection determination unit 109A is activated in response to the receipt of rejection determination unit activation signal d34 from maximum evaluation value extraction unit 108. After being activated, rejection determination unit 109A retrieves and retains agreed service level determination threshold d17 from condition setting unit 106. Upon receipt of maximum evaluation value management table T01100 (d16) from maximum evaluation value extraction unit 108, rejection determination unit 109A retrieves hypothetical rejection condition data management table T00700 (d18) from hypothetical rejection data creation unit 101A. Rejection determination unit 109A extracts the maximum evaluation value retained in maximum evaluation value field T01102 and compares the same with agreed service level determination threshold d17 (step 223). When the maximum evaluation value extracted from maximum evaluation value field T01102 is larger than agreed service level determination threshold d17, it can be considered that the agreed service level will be satisfied by rejecting the combined workflow that is being executed and that corresponds to rejected combined workflow ID (T00604) in hypothetically rejected combined workflow data management table T00600 which is tied to simulation ID field T01101 in maximum evaluation value management table T01100. However, since some simulation is being performed with the rejection volume equal to zero, rejection determination unit 109A confirms the rejection volume retained in rejection volume field T00702 in retrieved hypothetical rejection condition data management table T00700 (step 224). When the maximum evaluation value extracted from maximum evaluation value field T01102 is larger than agreed service level determination threshold d17, and when zero is retained as the rejection volume in rejection volume field T00702 in hypothetical rejection condition data management table T00700, rejection determination unit 109A determines that the agreed service level is satisfied even without rejecting any combined workflows that are being executed, and terminates the series of rejection determination processing operations (step 220). When the maximum evaluation value extracted from maximum evaluation value field T01102 is larger than agreed service level determination threshold d17, and when any value other than zero is retained as the rejection volume in rejection volume field T00702 in hypothetical rejection condition data management table T00700, then rejection determination unit 109A determines that the agreed service level can be satisfied if combined workflows that are being executed are rejected, and notifies rejection command transmission unit 111A of rejection command transmission unit activation signal d35 and maximum evaluation value management table T01100 (d19).

Rejection command transmission unit 111A is activated in response to the receipt of rejection command transmission unit activation signal d35 from rejection determination unit 109A. Upon receipt of maximum evaluation value management table T01100 (d19), rejection command transmission unit 111A retrieves a simulation ID from simulation ID field T01101 in maximum evaluation value management table T01100, and retrieves, from hypothetical rejection data creation unit 101A, hypothetically rejected combined workflow data management table T00600 (d20) which has simulation ID field T00602 that matches the retrieved simulation ID, among hypothetically rejected combined workflow data management tables T00600 retained in hypothetical rejection data creation unit 101A. Rejection command transmission unit 111A issues a forced rejection command to each combined workflow that is being executed and which has a combined workflow ID which is retained in rejected combined workflow ID field T00604 in retrieved hypothetically rejected combined workflow data management table T00600 (step 225).

When the maximum evaluation value extracted from maximum evaluation value field T01102 is equal to or less than agreed service level determination threshold d17, rejection determination unit 109A ascertains whether or not processing continuation determination unit 110A is active. When processing continuation determination unit 110A is not activated, rejection determination unit 109A notifies processing continuation determination unit 110A of processing continuation determination unit activation signal d36. Rejection determination unit 109A also notifies processing continuation determination unit 110A of maximum evaluation value management table T01100 (d21).

Processing continuation determination unit 110A is activated in response to the receipt of processing continuation determination unit activation signal d36 from rejection determination unit 109A. Upon receipt of maximum evaluation value management table T01100 (d21) from rejection determination unit 109A, processing continuation determination unit 110A retrieves hypothetical rejection condition data management table T00700 (d22) retained in hypothetical rejection data creation unit 101A. Processing continuation determination unit 110A retrieves a rejection volume from rejection volume field T00702 in hypothetical rejection condition data management table T00700. Processing continuation determination unit 110A also retrieves a rejection-targeted combined workflow volume from rejection-targeted combined workflow volume field T00703 in hypothetical rejection condition data management table T00700 (step 226). Processing continuation determination unit 110A compares the retrieved rejection volume with the rejection-targeted combined workflow volume to see which is larger. That is, processing continuation determination unit 110A determines whether or not the rejection volume can be further increased from among rejection-targeted combined workflows to find any combination of combined workflows which can be rejected (step 227). Processing continuation determination unit 110A compares the retrieved rejection volume with the rejection-targeted combined workflow volume to see which is larger. When the retrieved rejection volume is the same as the rejection-targeted combined workflow volume, then processing continuation determination unit 110A determines that even if the rejection volume is further increased from among the rejection-targeted combined workflows, there will be no combination of combined workflows which can be rejected, and terminates the series of rejection determination processing operations (step 220). Processing continuation determination unit 110A compares the retrieved rejection volume with the rejection-targeted combined workflow volume to see which is larger. When the rejection-targeted combined workflow volume is larger than the rejection volume, processing continuation determination unit 110A determines that the rejection volume can be further increased to find a combination of combined workflows which can be rejected. Processing continuation determination unit 110A retrieves the number of steps in the rejection-targeted combined workflow from the number of steps in the rejection-targeted combined workflow field T00705 in retrieved hypothetical rejection condition data management table T00700, and ascertains whether or not the number of steps in the rejection-targeted combined workflow indicates a state where no combined workflow should be rejected (step 228). When processing continuation determination unit 110A determines that the rejection volume can be further increased to find a combination of combined workflows which can be rejected, and when the number of steps in the rejection-targeted combined workflow indicates a state where no combined workflow should be rejected, processing continuation determination unit 110A newly sets the number of steps in the rejection-targeted combined workflow into hypothetical rejection condition data management table T00700. Processing continuation determination unit 110A retrieves agreed service level determination threshold d23 from condition setting unit 106, retrieves evaluation value management table T00400 (d28) from evaluation value calculation unit 105, and retrieves hypothetical rejection data management table T00800 (d24) from hypothetical rejection data creation unit 101A. Since this state is free from rejection-targeted combined workflows, the number of combinations is one, that is, there is only one evaluation value management table T00400. Processing continuation determination unit 110A compares evaluation value field T00403 in retrieved evaluation value management table T00400 with retrieved agreed service level determination threshold d23, and extracts combined workflow ID field T00402 associated with evaluation value field T00403 which is less than the agreed service level determination threshold d23. Processing continuation determination unit 110A retrieves the largest number of steps in number-ofsteps field T00803 in hypothetical rejection data management table T00800, based in extracted combined workflow ID field T00402 and retrieved hypothetical rejection data management table T00800. The largest number of steps thus retrieved is equal to the number of steps in the rejection-targeted combined workflow. Processing continuation determination unit 110A notifies hypothetical rejection data creation unit 101A of the number-of-steps in the rejection-targeted combined workflow d25 (step 229). When processing continuation determination unit 110A determines that the rejection volume can be further increased to find a combination of combined workflows which can be rejected, and when the number of steps in the rejection-targeted combined workflow does not indicate a state where no combined workflows should be rejected (i.e., when the number of steps in the rejection-targeted combined workflow has been set), processing continuation determination unit 110A notifies hypothetical rejection data creation unit 101A of the number of steps in the rejection-targeted combined workflow d25 (step 230).

Upon receipt of the number of steps in the rejection-targeted combined workflow d25 from processing continuation determination unit 110A, hypothetical rejection data creation unit 101A newly creates hypothetical rejection condition data management table T00700'. Specifically, hypothetical rejection data creation unit 101A sets the number of steps in the rejection-targeted combined workflow d25 into the number of steps in the rejection-targeted combined workflow field T00705' in hypothetical rejection condition data management table T00700', and rejection-targeted combined workflow definition ID field T00706 into rejection-targeted combined workflow definition ID field T000706' in hypothetical rejection condition data management table T00700', respectively. Hypothetical rejection data creation unit 101A sets into rejection volume field T00702' the sum of one and rejection volume field T00702 in hypothetical rejection condition data management table T00700 retained by hypothetical rejection data creation unit 101A. Subsequently, hypothetical rejection data creation unit 101A discards hypothetical rejection condition data management table T00700 so far retained therein, and control proceeds to step 206 using newly created hypothetical rejection condition data management table T00700' (step 231).

As described hereinabove, in the first exemplary embodiment, a combined workflow to be input is predicted from past histories, and a hypothetically rejected situation is simulated using information in step with a current execution situation, thereby making it possible to predict more precise response times of combined workflows. Also, the number-of-steps indicative of the progress of a combined workflow is input, and combined workflows to be subjected to the rejection are limited to those combined workflows which have a certain number of steps or less, thereby making it possible to efficiently perform the rejection determination process in a shorter period of time.

Second Exemplary Embodiment

Figure 4:
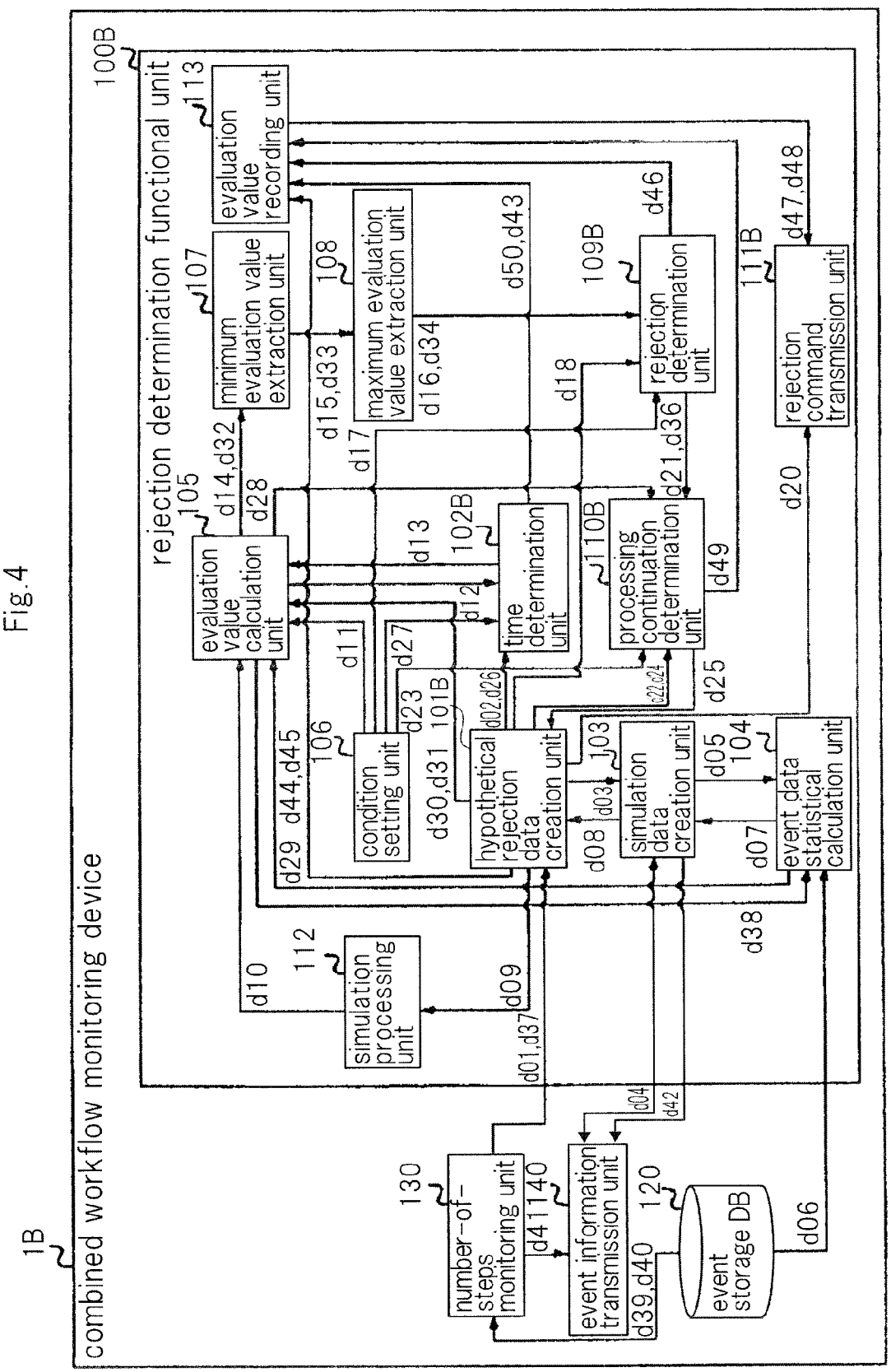
FIG. 4 is a block diagram of a combined workflow monitoring device according to a second exemplary embodiment of the present invention.

FIG. 4 is a block diagram showing the general configuration of a combined workflow monitoring device according to a second exemplary embodiment of the present invention.

Combined workflow monitoring device 1B of this exemplary embodiment comprises event storage DB 120, number-of-steps monitoring unit 130, event information transmission unit 140, and rejection determination functional unit 100B. Event storage DB 120 coordinates and associates event data related to each combined workflow with one another, and stores the associated event data. Number-of-steps monitoring unit 130 calculates the number of steps, which is indicative of the degree of the progress of each combined workflow, from the event data stored in event storage DB 120, and monitors and retains the calculated number of steps. Event information transmission unit 140, in response to a request, retrieves data representative of the current situation in which a combined workflow is executed, using the number of steps from number-of-steps monitoring unit 130, and transmits the data to rejection determination functional unit 100B. Rejection determination functional unit 100B retrieves information from event storage DB 120, number-of-steps monitoring unit 130, and event information transmission unit 140 and performs a rejection determination.

Number-of-steps monitoring unit 130 monitors event storage DB 120. When it newly observes a request message for or a response message to a business application, or a request message for or a response message to a workflow, number-of-steps monitoring unit 130 determines that the processing of a combined workflow has progressed and updates the number of steps which is indicative of the progress of the relevant combined workflow. Number-of-steps monitoring unit 130 also retains a combined workflow definition ID which uniquely identifies combined workflows that are subjected to the rejection determination. When the number-of-steps is updated for, in particular, a combined workflow which has the combined workflow definition ID, number-of-steps monitoring unit 130 activates hypothetical rejection data creation unit 101B in rejection determination functional unit 100B and notifies hypothetical rejection data generation unit 101B of the combined workflow definition ID.

Rejection determination functional unit 100B includes event data statistical calculation unit 104 which retrieves historical information related to each combined workflow, and performs statistical calculations and creation of predicted combined workflow input data. Event data statistical calculation unit 104 references past histories identified by the combined workflow definition ID to calculate the number of combined workflows, the processing of which have been completed, the number of rejected combined workflows, the past average response time, and the like. Event data statistical calculation unit 104 also performs statistical processing for past histories such as calculating a combined workflow average input interval, the variance thereof and the like to create, as predicted combined workflow input data, the combined workflow input pattern that is most likely in the future. The predicted combined workflow input data is used for simulator basic data, later described. Since business application systems and workflow systems which process combined workflows may sometimes share resources, loads on the respective systems are significantly affected by other combined workflows which are being simultaneously executed. Therefore, a more precise simulation is intended by making an input prediction. The predicted combined workflow input data may be simply required to describe which combined workflow definition ID contains a combined workflow to be input, and when the combined workflow will be input.

Rejection determination functional unit 100B further includes simulation data creation unit 103 which retrieves execution situation data indicative of the current situation in which a combined workflow is being executed, retrieves predicted combined workflow input data, and creates simulator basic data which represents the current and future states of each combined workflow. The execution situation data may be simply required to indicate which combined workflow definition ID contains a currently executed combined workflow uniquely identified by a combined workflow ID, and indicate, by the number of steps, the degree to which the combined workflow is progressing. Additionally, the simulator basic data may be simply required to indicate which combined workflow definition ID contains combined workflows, the combined workflows being uniquely identified by a combined workflow ID, and being currently executed or predicted to be input, to indicate when the combined workflow will be input, and to indicate, by the number of steps, the degree to which the combined workflow is progressing.

Rejection determination functional unit 100B further includes hypothetical rejection data creation unit 101B which retrieves a combined workflow definition ID that identifies combined workflows to be subjected to the rejection determination, retrieves the simulator basic data, and creates simulator data in which combined workflows are hypothetically rejected, the number of combined workflows being equal to the rejection volume from the simulator basic data. When hypothetically rejecting combined workflows, hypothetical rejection data creation unit 101B extracts, from combined workflows that are being executed, those combined workflows, the degrees of progress of which are equal to or lower than a certain reference, as expressed by the number of steps, and considers all possible combinations of combined workflows, the number of which is equal to the rejection volume, which are to be rejected from the extracted ones. Hypothetical rejection data creation unit 101B does not designate all combined workflows which are being executed as combined workflows which are subjected to rejection, but restricts the combined workflows which are subjected to rejection to those which have the degrees of progress, expressed by the number of steps, which are equal to or lower than the certain reference. Accordingly, the rejection determination can be performed more efficiently and in a shorter time. To this end, hypothetical rejection data creation unit 101B stores a number-of-steps reference value for narrowing down combined workflows to be subjected to rejection, the number of combined workflows to be subjected to rejection, the number of combined workflows to be hypothetically rejected, and the number of combinations of combined workflows, the number of which is equal to the number of combined workflows to be hypothetically rejected, which are selected from the combined workflows to be subjected to rejection. Since simulator data of the number of combinations is created, hypothetical rejection data creation unit 101B also stores a management table which establishes a link between simulator data and a combined workflow ID that contains a combined workflow that the simulator data has hypothetically rejected. The combined workflow simulator data may be simply required to indicate which combined workflow definition ID contains combined workflows, the combined workflows being uniquely identified by a combined workflow ID, and being currently executed or predicted to be input, to indicate when the combined workflow will be input, and to indicate, by the number of steps, the degree to which the combined workflow is progressing, or whether the combined workflow will be rejected.

In order to determine whether or not a combined workflow currently being executed satisfies an agreed service level which is concluded between a service provider and a service coordinator, hypothetical rejection data creation unit 101B initially sets the number of combined workflows to be hypothetically rejected to zero, and sets the number-of-steps reference value for narrowing down workflows to be rejected to a code which signifies that the combined workflows that are being executed are not selected for rejection, at the time of activation. Then, hypothetical rejection data creation unit 101B performs a rejection determination process.

Upon acquisition of the number-of-steps reference value for narrowing down workflows to be rejected from processing continuation determination unit 110B, later described, hypothetical rejection data creation unit 101B increments the number of combined workflows to be hypothetically rejected by one from the retained number of combined workflows to be rejected, and again performs the rejection determination process. Stated another way, since the agreed service level that is concluded between the service provider and the service coordinator cannot be satisfied with the number of workflows to be hypothetically rejected which was determined at the preceding time, hypothetical rejection data creation unit 101B determines whether or not the agreed service level that is concluded between the service provider and the service coordinator can be satisfied by increasing by one the number of combined workflows to be hypothetically rejected.

When again performing the rejection determination process with the number of combined workflows to be hypothetically rejected being increased by one, hypothetical rejection data creation unit 101B, which stores the simulator basic data, again retrieves the simulator basic data, and determines whether or not there is a difference between the number-of-steps included in the again retrieved simulator basic data and the number-of-steps included in the stored simulator basic data. If there is a difference, in order to show that there are changes in the degrees of progress of combined workflows that are being executed; hypothetical rejection data creation unit 101B resets the number of combined workflows to be hypothetically rejected to zero, and continues the rejection determination process, using the again retrieved simulator basic data indicative of the current situation.

Rejection determination functional unit 100B further includes simulation processing unit 112 which predicts the response time of each combined workflow once it is applied with data, expressed by the number-of-steps, indicative of the degree and the time at which a combined workflow uniquely identified by a combined workflow ID is progressing, or when it will be rejected. Simulation processing unit 112 creates and outputs a simulation result list which enumerates a combined workflow uniquely identified by a combined workflow ID, a combined workflow definition ID to which the combined workflow belongs, and the response time of the combined workflow.

Rejection determination functional unit 100B further includes condition setting unit 106 which retains a rejection determination condition that is dependent upon information on the agreed service level that is concluded between a service provider and a service coordinator. Condition setting unit 106 retains a time limit for performing the rejection determination. Condition setting unit 106 also retains an evaluation value calculation function which is created on the basis of the information on the agreed service level that is concluded between the service provider and the service coordinator. The evaluation value calculation function has variables for determining the agreed service level, such as a processing time, an average processing time, a rejection ratio and the like of a combined workflow. The evaluation value calculation function is defined such that the higher the evaluation value that is calculated from the evaluation value calculation function, the more frequently the agreed service level will be satisfied. The evaluation value calculation function need not necessarily be defined with a mathematical expression, but may be described with a computer program format. Condition setting unit 106 also retains an agreed service level determination threshold. When an evaluation value that is calculated from the evaluation value calculation function exceeds the agreed service level determination threshold, then condition setting unit 106 determines that the agreed service level that is concluded between the service provider and the service coordinator has been satisfied.

Rejection determination functional unit 100B further includes time determination unit 102B which retrieves a determination start notification and a time limit for performing the rejection determination and retains a rejection determination end time. Upon receipt of a time limit determination request, time determination unit 102B retrieves the current time, and compares the rejection determination end time with the current time to determine whether or not the rejection determination could have been completed within the time limit.

Rejection determination functional unit 100B further includes evaluation value calculation unit 105 which extracts a combined workflow ID which has a combined workflow definition ID that is subjected to the rejection determination, from the simulation result list, and calculates an evaluation value using the evaluation value calculation function based on the response time, the average response time, and the rejection ratio for the combined workflow definition ID to create an evaluation value list. Evaluation value calculation unit 105 retains the number of combinations of simulations. After creating an evaluation value list for the results of respective simulations of the number of combinations, evaluation value calculation unit 105 notifies time determination unit 102B of the time limit determination request to ascertain whether or not a process has been completed within the defined time limit. When the process has been completed within the defined time limit, rejection determination functional unit 100A continues the process. However, when the process cannot be completed within the defined time limit, rejection determination functional unit 100B queries evaluation value recording unit 113, later described, to ascertain whether or not a maximum evaluation value is retained therein.

Rejection determination functional unit 100B further includes minimum evaluation value extraction unit 107 which extracts a minimum value from each evaluation value list based on the evaluation value lists of the number equal to the number of combinations, and creates a minimum value list which enumerates the minimum values of the number equal to the number of combinations in list form.

Rejection determination functional unit 100B includes maximum evaluation value extraction unit 108 which extracts a maximum value from minimum values of the number equal to the number of combinations, based on the minimum value list. The maximum value implies that when combined workflows of the number equal to the number of combinations are hypothetically rejected from among those combined workflows which are being executed and which present the number-of-steps equal to or less than the number-of-steps reference value for narrowing down combined workflows to be rejected, evaluation values for combined workflows that were not rejected, can be set to at least the maximum value.

Rejection determination functional unit 100B further includes rejection determination unit 109B which retrieves the maximum evaluation value and the agreed service level determination threshold, and determines whether or not the maximum evaluation value meets the agreed service level determination threshold. Rejection determination unit 109B retains the number of combined workflows to be hypothetically rejected. If the maximum evaluation value meets the agreed service level determination threshold when the number of combined workflows to be hypothetically rejected is zero, then rejection determination unit 109B determines that the agreed service level that is concluded between the service provider and the service coordinator has been satisfied even without rejecting any combined workflows that are being executed, and terminates the series of rejection determination processing operations. Also, if the maximum evaluation value meets the agreed service level determination threshold when the number of combined workflows to be hypothetically rejected is a value other than zero, then rejection determination unit 109B determines that the agreed service level that is concluded between the service provider and the service coordinator can be satisfied provided that combined workflows of the number equal to the number of workflows to be hypothetically rejected are rejected from among combined workflows that are being executed, and notifies evaluation value recording unit 113, later described, of the maximum evaluation value retained therein. On the other hand, if the maximum evaluation value does not meet the agreed service level determination threshold, then rejection determination unit 109B determines that the agreed service level that is concluded between the service provider and the service coordinator cannot be satisfied even if combined workflows of the number equal to the number of combined workflows to be hypothetically rejected are rejected from among the combined workflows that are being executed.

Rejection determination functional unit 100B further includes processing continuation determination unit 110B which when it is determined that the agreed service level that is concluded between the service provider and the service coordinator cannot be satisfied, even if combined workflows of the number equal to the number of combined workflows to be hypothetically rejected are rejected from among the combined workflows which are being executed, retrieves the number of combined workflows that are subjected to rejection, and the number of combined workflows to be hypothetically rejected, and determines whether or not the rejection determination process can be continued with the number of combined workflows to be hypothetically rejected being further increased. When determining that the number of combined workflows to be hypothetically rejected cannot be increased, processing continuation determination unit 110B determines that the agreed service level that is concluded between the service provider and the service coordinator cannot be satisfied no matter how the combined workflows that are being executed are rejected, and terminates the series of rejection determination processing operations. On the other hand, when determining that the number of combined workflows to be hypothetically rejected can be increased, processing continuation determination unit 110B retrieves the number-of-steps reference value for narrowing down combined workflows to be rejected. When the number-of-steps reference value includes a code set therein which indicates that all of the combined workflows that are being executed should not be rejected, processing continuation determination unit 110B retrieves the evaluation value list and the agreed service level determination threshold in order to newly set the number-of-steps reference value, extracts from the combined workflows that are being executed a combined workflow which cannot satisfy the agreed service level and which has the largest number of steps, i.e., a combined workflow which cannot satisfy the agreed service level and exhibits the most advanced processing progress, and sets the number-of-steps in this combined workflow to the number-of-steps reference value. On the other hand, when a value has been already retained in the retrieved number-of-steps reference value, processing continuation determination unit 110B designates this value as the number-of-steps reference value. Processing continuation determination unit 110B notifies hypothetical rejection data creation unit 101B of the number-of-steps reference value.

Rejection determination functional unit 100B further includes rejection command transmission unit 111B which transmits, when a maximum evaluation value is received, a command for executing a forced rejection to the relevant combined workflows to be subjected to the rejection.

Rejection determination functional unit 100B further includes evaluation value recording unit 113 which receives maximum evaluation values and retains and records the best maximum evaluation value in the rejection determinations so far performed. Evaluation value recording unit 113 ascertains whether or not the maximum evaluation value is retained therein when the time limit is reached. When the maximum evaluation value is not retained, evaluation value recording unit 113 terminates the series of processing operations. When the maximum evaluation value is retained, evaluation value recording unit 113 notifies the retained maximum evaluation value.

Figure 5:
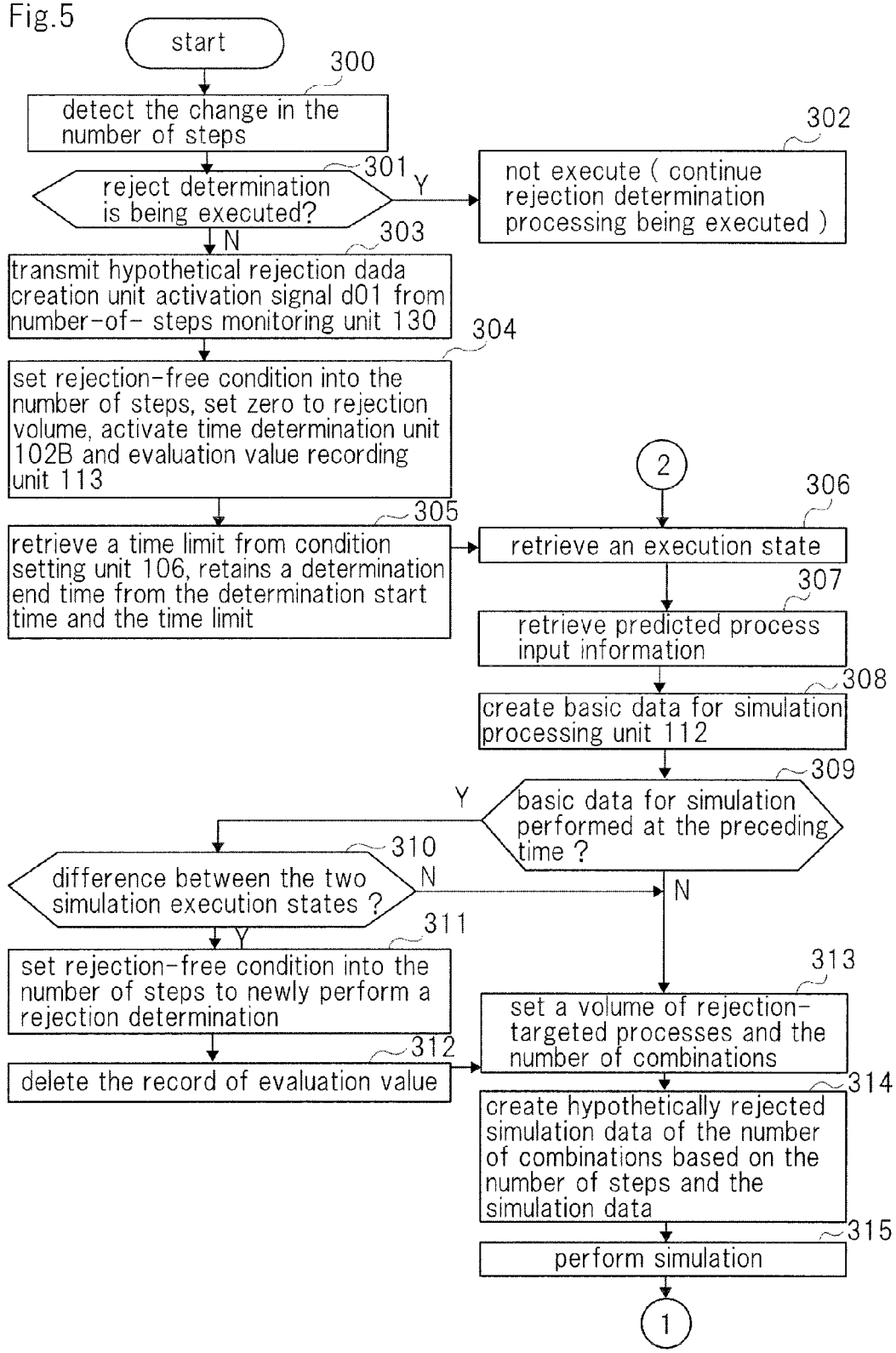
FIG. 5 is a flow chart showing the operation of the combined workflow monitoring device of the second exemplary embodiment.
Figure 6:
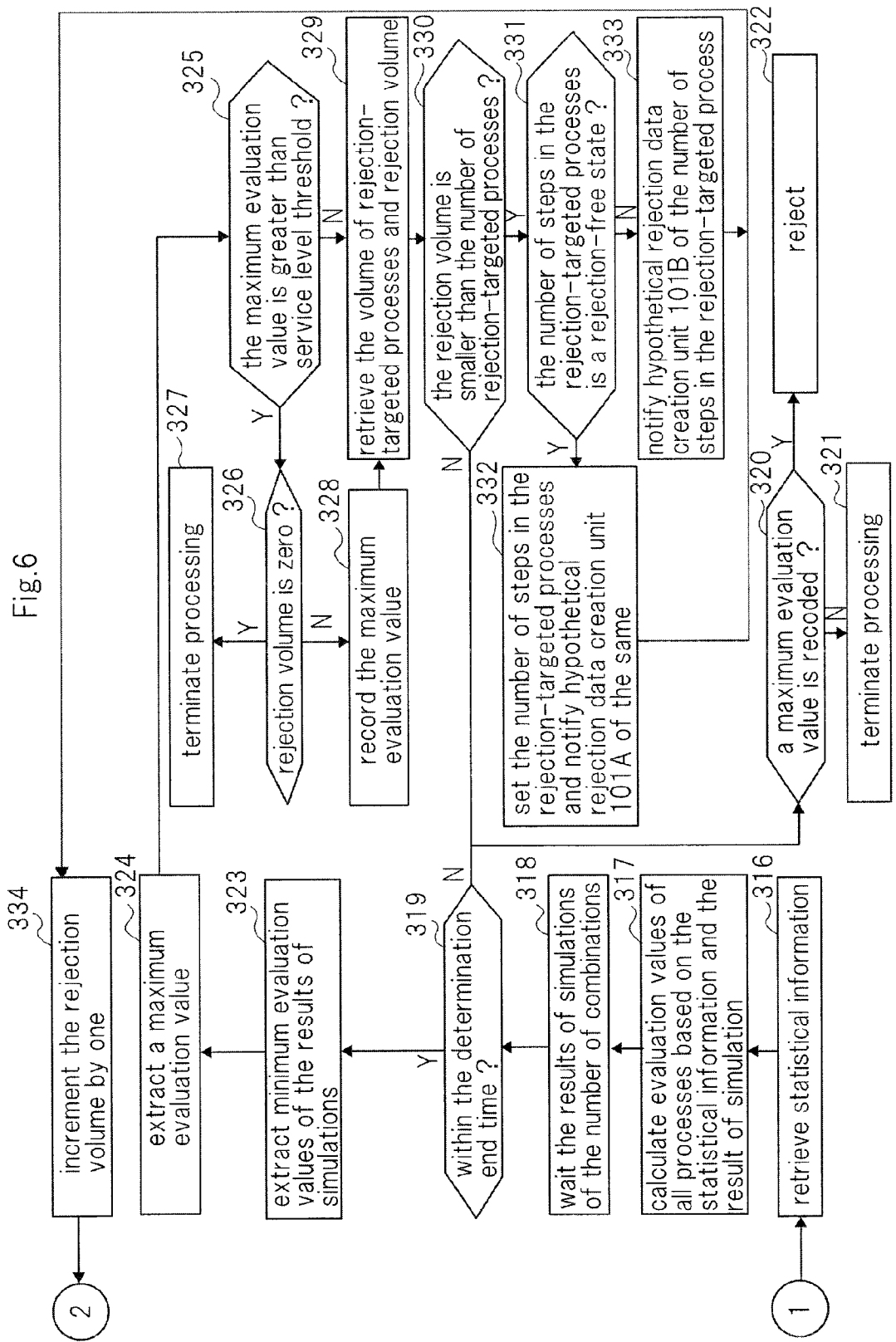
FIG. 6 is a flow chart showing the operation of the combined workflow monitoring device of the second exemplary embodiment.

Next, the operation of combined workflow monitoring device 1B according to the second exemplary embodiment of the present invention will be described in detail with reference to FIG. 4 and flow charts of FIGS. 5 and 6.

Number-of-steps monitoring unit 130 retains combined workflow definition IDs which uniquely identify combined workflows that are subjected to rejection determination, and always monitors event storage DB 120. When it newly detects event data d39, d40 related to a request message for or a response message to a business application, as well as to a request message for or a response message to a workflow, then number-of-steps monitoring unit 130 updates execution state management table T00100 stored therein. When it detects event data for a request message for or a response message to a combined workflow which, in particular, has a combined workflow definition ID, number-of-steps monitoring unit 130 causes rejection determination functional unit 100B to start the rejection determination process (step 300).

When it detects event data d39, d40 for a request message for or a response message to a combined workflow which has a combined workflow definition ID, number-of-steps monitoring unit 130 determines whether or not hypothetical rejection data creation unit 101B is active (step 301). When hypothetical rejection data creation unit 101B is active, number-of-steps monitoring unit 130 does not newly make a rejection determination because a rejection determination process is already being executed (step 302). When hypothetical rejection data creation unit 101B is not activated, number-of-steps monitoring unit 130 notifies hypothetical rejection data creation unit 101B of hypothetical rejection dada creation unit activation signal d01. Number-of-steps monitoring unit 130 also notifies hypothetical rejection data creation unit 101B of combined workflow definition ID d37 for identifying combined workflows which are subjected to the rejection determination (step 303).

Hypothetical rejection data creation unit 101B is activated in response to the receipt of hypothetical rejection data creation unit activation signal d01 to create hypothetical rejection condition data management table T00700. For initially simulating a rejection-free scenario, hypothetical rejection data creation unit 101B sets "0" to rejection volume field T00702 and "−1" to the number of steps in the rejection-targeted combined workflow field T00705 in hypothetical rejection condition data management table T00700, respectively. The number of steps in the rejection-targeted combined workflow needs not be "−1" as long as it can be indicated that any combined workflow will not be rejected when it is being executed. Hypothetical rejection data creation unit 101B sets combined workflow definition ID d37 received from number-of-steps monitoring unit 130 in rejection-targeted combined workflow definition ID field T00706. Note that, at this time, no values have been set in combined workflow to be rejected volume field T00703 and number-of-combinations field T00704. Hypothetical rejection data creation unit 101B notifies simulation data creation unit 103 of simulation data creation unit activation signal d03. Hypothetical rejection data creation unit 101B also notifies time determination unit 102B of time determination unit activation signal d02, and notifies time determination unit 102B of determination start time notification d26 to set a rejection determination processing end time. Time determination unit 102B notifies evaluation value recording unit 113 of evaluation value recording unit activation signal d43. Evaluation value recording unit 113 is activated in response to the receipt of evaluation value recording unit activation signal d43 (step 304).

Time determination unit 102B is activated in response to the receipt of time determination unit activation signal d02. Time determination unit 102B retrieves time limit d27 from condition setting unit 106, calculates a determination end time based on the time at which it received determination start time notification d26, and retains the determination end time (step 305).

Condition setting unit 106 retains information about conditions for performing the rejection determination based on the agreed service level that is concluded between the service provider and the service coordinator. Condition setting unit 106 defines an evaluation value calculation function which is set based on the agreed service level information. The evaluation value calculation function is defined to have variables which include a combined workflow response time, a combined workflow average response time, and a rejection ratio which are dictated by the agreed service level. The evaluation value calculation function may be arbitrarily defined, but it is defined such that the larger the value derived from the evaluation value function, the more frequently will the agreed service level be satisfied. Also, the evaluation value calculation function need not be described with a mathematical expression, but may be described with a computer program format. Condition setting unit 106 also defines an agreed service level determination threshold for determining the agreed service level. The agreed service level determination threshold is determined by the evaluation value calculation function. The agreed service level determination threshold is an index value for determining that the agreed service level that is concluded between the service provider and the service coordinator is satisfied when the agreed service level determination threshold is exceeded by a value which is calculated by using a combined workflow response time, a combined workflow average response time, and a rejection ratio, that are found through a simulation, and by substituting them into the evaluation value calculation function.

Simulation data creation unit 103 is activated in response to the receipt of simulation data creation unit activation signal d03. Simulation data creation unit 103 notifies event information transmission unit 140 of execution state query signal d42. Event information transmission unit 140 retrieves execution state management table T00100 (d41) from number-of-steps monitoring unit 130, and notifies simulation data creation unit 103 of execution state management table T00100 (d04). Simulation data creation unit 103 notifies event data statistical calculation unit 104 of event data statistical calculation unit activation signal d05 (step 306).

Event data statistical calculation unit 104 is activated in response to the receipt of event data statistical calculation unit activation signal d05. Event data statistical calculation unit 104 retrieves event information d06 from event storage DB 120, performs statistical processing for past histories, such as calculating the combined workflow average input interval, the variance thereof and the like, and creates the combined workflow input pattern that is most likely in the future as predicted combined workflow input management table T00200. Event data statistical calculation unit 104 notifies simulation data creation unit 103 of predicted combined workflow input management table T00200 (d07) (step 307).

Simulation data creation unit 103 creates simulation basic data management table T00900 based on predicted combined workflow input management table T00200 received from event data statistical calculation unit 104, and execution state management table T00100. Simulation data creation unit 103 notifies hypothetical rejection data creation unit 101A of simulation basic data management table T00900 (d08) (step 308).

Hypothetical rejection data creation unit 101B ascertains whether or not hypothetical rejection data creation unit 101 retains basic data management table T00900' for a simulation performed at the preceding time (step 309). When hypothetical rejection data creation unit 101 retains simulation basic data management table T00900', hypothetical rejection data creation unit 101B compares combined workflow ID field T00901 in newly received simulation basic data management table T0090 (d08) with combined workflow ID field T00901' in basic data management table T00900' for the simulation performed at the preceding time in order to determine whether or not there is a change in the processing progress of combined workflows that are being executed during the rejection determination. Similarly, hypothetical rejection data creation unit 101B compares number-of-steps field T00902 in newly received simulation basic data management table T00900 with number-of-steps field T00902' in basic data management table T00900' for the simulation performed at the preceding time (step 310). When the comparison reveals a difference, this means that there is a change in the processing progress of the combined workflows that are being executed during the rejection determination, so that hypothetical rejection data creation unit 101B performs the rejection determination again from a rejection-free state after the situation has been changed. In order to update hypothetical rejection condition data management table T00700 to initially simulate a rejection-free situation, hypothetical rejection data creation unit 101B sets "0" into rejection volume field T00702 and "−1" into the number of steps in the rejection-targeted combined workflow field T00705 in hypothetical rejection condition data management table T00700. The number of steps in rejection-targeted combined workflow need not be "−1" as long as hypothetical rejection data creation unit 101B can indicate that any combined workflow that are being executed will not be rejected. Hypothetical rejection data creation unit 101B sets a combined workflow definition ID (d37) received from number-of-steps monitoring unit 130 into rejection-targeted combined workflow definition ID field T00706 (step 311). When a difference results from the comparison, hypothetical rejection data creation unit 101B notifies evaluation value recording unit 113 of rejection determination start notification d44. Upon receipt of rejection determination start notification d44, evaluation value recording unit 113 deletes all information on maximum evaluation values retained therein (step 312).

Hypothetical rejection data creation unit 101B retains simulation basic data management table T00900. Hypothetical rejection data creation unit 101B compares number-of-steps field T00902 in simulation basic data management table T00900 with the number of steps in the rejection-targeted combined workflow retained in the number of steps in the rejection-targeted combined workflow field T00705 in hypothetical rejection condition data management table T00700 for combined workflows that are being executed. Hypothetical rejection data creation unit 101B calculates the number of combined workflow ID fields T00901 which are associated with number-of-steps field T00902, the value of which is equal to or less than the number of steps in the rejection-targeted combined workflow and which are associated with combined workflow definition ID field T00904 that matches rejection-targeted combined workflow definition ID field T00706, and retains the calculated number in rejection-targeted combined workflow volume field T00703. This number indicates the number of combined workflows which are subjected to the rejection determination among combined workflows that are being executed, and which belong to a combined workflow definition that undergoes the agreed service level determination. Then, combined workflows, that are currently being executed and that have the number of steps equal to or less than the number of steps in the rejection-targeted combined workflow, are extracted from among combined workflows that are being currently executed, thereby reducing the number of combined workflows which are subjected to the rejection determination. In this way, it is possible to efficiently implement the rejection determination process in a shorter time. Next, hypothetical rejection data creation unit 101B retrieves the rejection volume from rejection volume field T00702 in hypothetical rejection condition data management table T00700, calculates the number of combinations of combined workflows, equal in number to the rejection volume, selected from the rejection-targeted combined workflows, and retains the number of combinations in number-of-combinations field T00704 in hypothetical rejection condition data management table T00700. After creating hypothetical rejection condition data management table T00700, hypothetical rejection data creation unit 101B ascertains whether or not evaluation value calculation unit 105 is active. When evaluation value calculation unit 105 is not activated, hypothetical rejection data creation unit 101B notifies evaluation value calculation unit 105 of evaluation value calculation unit activation signal d30. Hypothetical rejection data creation unit 101B also notifies evaluation value calculation unit 105 of hypothetical rejection condition data management table T00700 (d31) (step 313).

Evaluation value calculation unit 105 is activated in response to the receipt of evaluation value calculation unit activation signal d30 from hypothetical rejection data creation unit 101B. Evaluation value calculation unit 105 retains hypothetical rejection condition data management table T00700 (d31) notified from hypothetical rejection data creation unit 101B.

After the completion of processing at step 313, hypothetical rejection data creation unit 101B creates and retains hypothetically rejected combined workflow data management table T00600, and hypothetical rejection data management table T00800 as input data to simulation processing unit 112. Hypothetical rejection data creation unit 101B creates, as hypothetical rejection condition data management table T000800, data which results from the exclusion of hypothetically rejected combined workflows that are being executed, the number of which is equal to the rejection volume that is retained in rejection volume field T00702, from combined workflows that are being executed and which are associated with number-of-steps field T00902 in simulation basic data management table T00900, equal to or less than number-of-steps in rejection-targeted combined workflow field T00705, and associated with combined workflow definition ID field T00904 in simulation basic data management table T00900 that matches rejection-targeted combined workflow definition ID field T00706. When some combined workflow is hypothetically rejected, hypothetical rejection data creation unit 101B sets a code indicative of rejection in number-of-steps field T00803. In this case, combined workflow ID fields T00901 of combined workflows subjected to the rejection, the number of which is equal to the rejection volume retained in rejection volume field T00702, are retained in rejected combined workflow ID fields T00604 in hypothetically rejected combined workflow data management table T00600. Hypothetical rejection data creation unit 101B eventually creates hypothetically rejected combined workflow data management tables T00600 and hypothetical rejection data management tables T00800, the number of which is equal to the number retained in number-of-combinations field T00704. Hypothetical rejection data creation unit 101B notifies simulation processing unit 112 of the created hypothetical rejection data management tables T00800 (d09), the number of which is equal to the number of combinations (step 314).

Simulation processing unit 112 performs a simulation process in accordance with hypothetical rejection data management table T00800 (d09), creates simulation result management table T00300 corresponding to each hypothetical rejection data management table T00800, and notifies evaluation value calculation unit 105 of simulation result management tables T00300 (d10) (step 315).

Evaluation value calculation unit 105 receives simulation result management table T00300 (d10) from simulation processing unit 112, and notifies event data statistical calculation unit 104 of rejection-targeted combined workflow definition ID (d38) which is set in rejection-targeted combined workflow definition ID field T00706 in hypothetical rejection condition data management table T00700 retained therein. Event data statistical calculation unit 104 creates statistical information data management table T01000 for a service identified by a rejection-targeted combined workflow definition ID, based on the rejection-targeted combined workflow definition ID (d38) received from evaluation value calculation unit 105 and event information (d06), and notifies evaluation value calculation unit 105 of statistical information data management table T01000 (d29) (step 316).

After receiving statistical information data management table T01000 (d29), evaluation value calculation unit 105 receives evaluation value calculation function d11 defined by condition setting unit 106. Evaluation value calculation unit 105 calculates an evaluation value in accordance with the evaluation value calculation function, based on combined workflow predicted response time field T00303 associated with combined workflow definition ID field T00304 which matches rejection-targeted combined workflow definition ID field T00706 within simulation result management table T00300, and on statistical information data management table T01000, and creates evaluation value management table T00400 (step 317).

Evaluation value calculation unit 105 waits until it creates evaluation value management tables T00400, the number of which is equal to the number of combinations which is retained in number-of-combinations field T00704 in hypothetical rejection condition data management table T00700 which is retained in evaluation value calculation unit 105. After creating all evaluation value management tables T00400, the number of which is equal to the number of combinations, evaluation value calculation unit 105 transmits time limit determination request d12 to time determination unit 102A (step 318).

Time determination unit 102B compares the time at which it received time limit determination request d12 with the determination end time retained therein (step 319). When the time at which time limit determination request d12 was received has passed the determination end time retained by time determination unit 102B, time determination unit 102B notifies evaluation value recording unit 113 of rejection determination end notification d50. Upon receipt of rejection determination end notification d50, evaluation value recording unit 113 ascertains whether or not maximum evaluation value management table T01100 is retained (step 320). When maximum evaluation value management table T01100 is not retained, evaluation value recording unit 113 determines that there is no effective rejection pattern which improves the agreed service level of combined workflows that are being executed, and terminates the series of processing operations (step 321). When maximum evaluation value management table T01100 is retained, evaluation value recording unit 113 notifies rejection command transmission unit 111B of rejection command transmission unit activation signal d47, and notifies maximum evaluation value management table T01100 (d48). Rejection command transmission unit 111B is activated in response to the receipt of rejection command transmission unit activation signal d47 from evaluation value recording unit 113. Upon receipt of maximum evaluation value management table T01100, rejection command transmission unit 111B retrieves a simulation ID from simulation ID field T01101 in maximum evaluation value management table T01100, and retrieves, from hypothetical rejection data creation unit 101B, hypothetically rejected combined workflow data management table T00600 (d20) which has simulation ID field T00602 that matches the retrieved simulation ID, among hypothetically rejected combined workflow data management tables T00600 retained in hypothetical rejection data creation unit 101B. Rejection command transmission unit 111B issues a forced rejection command to each combined workflow that is being executed and which has a combined workflow ID which is retained in rejected combined workflow ID field T00604 in the retrieved hypothetically rejected combined workflow data management table T00600 (step 322).

When the time at which time limit determination request d12 was received has not passed the determination end time retained by time determination unit 102A, time determination unit 102B notifies evaluation value calculation unit 105 of control time determination response d13. Upon receipt of control time determination response d13, evaluation value calculation unit 105 ascertains whether or not minimum evaluation value extraction unit 107 is active. When it is not activated, evaluation value calculation unit 105 notifies minimum evaluation value extraction unit 107 of minimum evaluation value extraction unit activation signal d32. Minimum evaluation value extraction unit 107 is activated in response to the receipt of minimum evaluation value extraction unit activation signal d32 from evaluation value calculation unit 105. Evaluation value calculation unit 105 notifies minimum evaluation value extraction unit 107 of evaluation value management tables T00400 (d14), the number of which is equal to the number of combinations, retained therein. Upon receipt of evaluation value management tables T00400 (d14), the number of which is equal to the number of combinations, minimum evaluation value extraction unit 107 extracts those evaluation value fields T00403 that have a minimum value from respective evaluation value management tables T00400, and creates minimum evaluation value management table T00500. Minimum evaluation value extraction unit 107 ascertains whether or not maximum evaluation value extraction unit 108 is active. When maximum evaluation value extraction unit 108 is not activated, minimum evaluation value extraction unit 107 notifies maximum evaluation value extraction unit 108 of maximum evaluation value extraction unit activation signal d33. Minimum evaluation value extraction unit 107 notifies maximum evaluation value extraction unit 108 of minimum evaluation value management table T00500 (d15) (step 323).

Maximum evaluation value extraction unit 108 is activated in response to the receipt of maximum evaluation value activation signal d33 from minimum evaluation value extraction unit 107. Upon receipt of minimum evaluation value management table T00500 from minimum evaluation value extraction unit 107, maximum evaluation value extraction unit 108 extracts an evaluation value which presents the maximum value from among those evaluation values retained in minimum evaluation value field T00502, and creates maximum evaluation value management table T01100. Maximum evaluation value extraction unit 108 ascertains whether or not rejection determination unit 109B is active. When rejection determination unit 109B is not activated, maximum evaluation value extraction unit 108 notifies rejection determination unit 109B of rejection determination unit activation signal d34. Maximum evaluation value extraction unit 108 also notifies rejection determination unit 109B of maximum evaluation value management table T01100 (d16) (step 324).

Rejection determination unit 109B is activated in response to the receipt of rejection determination unit activation signal d34 from maximum evaluation value extraction unit 108. After being activated, rejection determination unit 109B retrieves and retains agreed service level determination threshold d17 from condition setting unit 106. Upon receipt of maximum evaluation value management table T01100 (d16) from maximum evaluation value extraction unit 108, rejection determination unit 109B retrieves hypothetical rejection condition data management table T00700 (d18) from hypothetical rejection data creation unit 101B. Rejection determination unit 109B extracts the maximum evaluation value retained in maximum evaluation value field T01102 and compares the same with agreed service level determination threshold d17 (step 325). When the maximum evaluation value extracted from maximum evaluation value field T01102 is larger than agreed service level determination threshold d17, rejection determination unit 109B can consider that the agreed service level will be satisfied by rejecting the combined workflow that is being executed and which corresponds to rejected combined workflow ID (T00604) in hypothetically rejected combined workflow data management table T00600 which is tied to simulation ID field T01101 in maximum evaluation value management table T01100. However, since some simulation is being performed with the rejection volume equal to zero, rejection determination unit 109B confirms the rejection volume retained in rejection volume field T00702 in retrieved hypothetical rejection condition data management table T00700 (step 326). When the maximum evaluation value extracted from maximum evaluation value field T01102 is larger than agreed service level determination threshold d17, and when zero is retained as the rejection volume in rejection volume field T00702 in hypothetical rejection condition data management table T00700, rejection determination unit 109B determines that the agreed service level is satisfied even without rejecting any combined workflows that are being executed, and terminates the series of rejection determination processing operations (step 327). When the maximum evaluation value extracted from maximum evaluation value field T01102 is larger than agreed service level determination threshold d17, and when any value other than zero is retained as the rejection volume in rejection volume field T00702 in hypothetical rejection condition data management table T00700, then rejection determination unit 109B notifies evaluation value recording unit 113 of maximum evaluation value management table T01100 (d46). Evaluation value recording unit 113 receives maximum evaluation value management table T01100 (d46) from rejection determination unit 109B. When evaluation value recording unit 113 has not retained maximum evaluation value management table T01100, evaluation value recording unit 113 retains maximum evaluation value management table T01100. When evaluation value recording unit 113 has retained maximum evaluation value management table T01100, evaluation value recording unit 113 compares values retained in maximum evaluation value fields T01102 in maximum evaluation value management tables T01100, and retains the maximum evaluation value management table which presents a larger value. Rejection determination unit 109B ascertains whether or not processing continuation determination unit 110B is active. When it is not active, rejection determination unit 109B notifies processing continuation determination unit 110B of processing continuation determination unit activation signal d36. Rejection determination unit 109B notifies processing continuation determination unit 110B of maximum evaluation value management table T01100 (d21) (step 328). When the maximum evaluation value extracted from maximum evaluation value field T01102 is equal to or less than agreed service level determination threshold d17, rejection determination unit 109B ascertains whether or not processing continuation determination unit 110B is active. When processing continuation determination unit 110B is not activated, rejection determination unit 109B notifies processing continuation determination unit 110B of processing continuation determination unit activation signal d36. Rejection determination unit 109B notifies processing continuation determination unit 110B of maximum evaluation value management table T01100 (d21).

Processing continuation determination unit 110B is activated in response to the receipt of processing continuation determination unit activation signal d36 from rejection determination unit 109B. Upon receipt of maximum evaluation value management table T01100 (d21) from rejection determination unit 109B, processing continuation determination unit 110B retrieves hypothetical rejection condition data management table T00700 (d22) retained in hypothetical rejection data creation unit 101B. Processing continuation determination unit 110B retrieves a rejection volume from rejection volume field T00702 in hypothetical rejection condition data management table T00700. Processing continuation determination unit 110B also retrieves a rejection-targeted combined workflow volume from rejection-targeted combined workflow volume field T00703 in hypothetical rejection condition data management table T00700 (step 329).

Processing continuation determination unit 110B compares the retrieved rejection volume with the rejection-targeted combined workflow volume to see which is larger. That is, processing continuation determination unit 110B determines whether or not the rejection volume can be further increased from among rejection-targeted combined workflows to find any combination of combined workflows which can be rejected (step 330). When the retrieved rejection volume is the same as the rejection-targeted combined workflow volume, then processing continuation determination unit 110B determines that even if the rejection volume is further increased, there will be no combination of combined workflows which can be rejected from among the rejection-targeted combined workflows, and notifies evaluation value recording unit 113 of rejection determination end notification d49. Upon receipt of rejection determination end notification d49, evaluation value recording unit 113 ascertains whether or not maximum evaluation value management table T01100 is retained (step 320). When maximum evaluation value management table T01100 is not retained, evaluation value recording unit 113 determines that there is no effective rejection pattern for improving the agreed service level of combined workflows that are being executed, and terminates the series of processing operations (step 321). When maximum evaluation value management table T01100 is retained, evaluation value recording unit 113 notifies rejection command transmission unit 111B of rejection command transmission unit activation signal d47, and notifies maximum evaluation value management table T01100 (d48) of the same. Rejection command transmission unit 111B is activated in response to the receipt of rejection command transmission unit activation signal d47 from evaluation value recording unit 113. Upon receipt of maximum evaluation value management table T01100 (d48), rejection command transmission unit 111B retrieves a simulation ID from simulation ID field T01101 in maximum evaluation value management table T01100, and retrieves, from hypothetical rejection data creation unit 101B, hypothetically rejected combined workflow data management table T00600 (d20) which has simulation ID field T00602 that matches the retrieved simulation ID, among hypothetically rejected combined workflow data management tables T00600 retained in hypothetical rejection data creation unit 101B. Rejection command transmission unit 111B issues a forced rejection command to each combined workflow that is being executed, and which has a combined workflow ID which is retained in rejected combined workflow ID field T00604 in retrieved hypothetically rejected combined workflow data management table T00600 (step 322).

Processing continuation determination unit 110B compares the retrieved rejection volume with the rejection-targeted combined workflow volume to see which is larger. When the rejection-targeted combined workflow volume is larger than the rejection volume, processing continuation determination unit 110B determines that the rejection volume can be further increased to find a combination of combined workflows which can be rejected. Processing continuation determination unit 110B retrieves the number of steps in the rejection-targeted combined workflow from the number of steps in the rejection-targeted combined workflow field T00705 in retrieved hypothetical rejection condition data management table T00700, and ascertains whether or not the number of steps in the rejection-targeted combined workflow indicates a state where no combined workflow should be rejected (step 331). When processing continuation determination unit 110B determines that the rejection volume can be further increased to find a combination of combined workflows which can be rejected, and when the number of steps in the rejection-targeted combined workflow indicates a state where no combined workflow should be rejected, processing continuation determination unit 110B newly sets the number of steps in the rejection-targeted combined workflow into hypothetical rejection condition data management table T00700. Processing continuation determination unit 110B retrieves agreed service level determination threshold d23 from condition setting unit 106, retrieves evaluation value management table T00400 (d28) from evaluation value calculation unit 105, and retrieves hypothetical rejection data management table T00800 (d24) from hypothetical rejection data creation unit 101B. Since this state is a state in which there are no rejection-targeted combined workflows, the number of combinations is one, i.e., there is only one evaluation value management table T00400. Processing continuation determination unit 110B compares evaluation value field T00403 in retrieved evaluation value management table T00400 with retrieved agreed service level determination threshold d23, and extracts combined workflow ID field T00402 associated with evaluation value field T00403 which is less than agreed service level determination threshold d23. Processing continuation determination unit 110B retrieves the largest number of steps in number-of-steps field T00803 in hypothetical rejection data management table T00800, based on extracted combined workflow ID field T00402 and retrieved hypothetical rejection data management table T00800. The largest number of steps thus retrieved is equal to the number of steps in the rejection-targeted combined workflow, and processing continuation determination unit 110B notifies hypothetical rejection data creation unit 101B of the number of steps in the rejection-targeted combined workflow d25 (step 332).

When processing continuation determination unit 110B determines that the rejection volume can be further increased to find a combination of combined workflows which can be rejected, and when the number of steps in the rejection-targeted combined workflow does not indicate the state where no combined workflows should be rejected (i.e., when the number of steps in the rejection-targeted combined workflow is set), processing continuation determination unit 110B notifies hypothetical rejection data creation unit 101B of the number of steps in the rejection-targeted combined workflow d25 (step 333). Upon receipt of the number of steps in the rejection-targeted combined workflow d25 from processing continuation determination unit 110B, hypothetical rejection data creation unit 101B newly creates hypothetical rejection condition data management table T00700'. Specifically, hypothetical rejection data creation unit 101B sets the number of steps in the rejection-targeted combined workflow d25 into the number of steps in the rejection-targeted combined workflow field T00705' in hypothetical rejection condition data management table T00700', and rejection-targeted combined workflow definition ID field T00706 into rejection-targeted combined workflow definition ID field T000706' in hypothetical rejection condition data management table T00700', respectively. Hypothetical rejection data creation unit 101B sets into rejection volume field T00702' the sum of one and rejection volume field T00702 in hypothetical rejection condition data management table T00700 retained by hypothetical rejection data creation unit 101B. Subsequently, hypothetical rejection data creation unit 101B discards hypothetical rejection condition data management table T00700 so far retained therein, and control proceeds to step 306 using newly created hypothetical rejection condition data management table T00700' (step 334).

In the first exemplary embodiment, at the time when a rejection pattern is found to satisfy an agreed service level within a time limit, each combined workflow that is being executed is rejected if it falls within the rejection pattern. In the second exemplary embodiment, on the other hand, evaluation value recording unit 113 retains and updates maximum evaluation value management table T01100, and performs the rejection determination process operations until the time limit is reached. This makes it possible to find the most effective rejection pattern. Stated another way, as compared with a rejection pattern determined in the first exemplary embodiment, a rejection pattern determined in the second exemplary embodiment can more often satisfy the agreed service level.

Third Exemplary Embodiment

Figure 68:
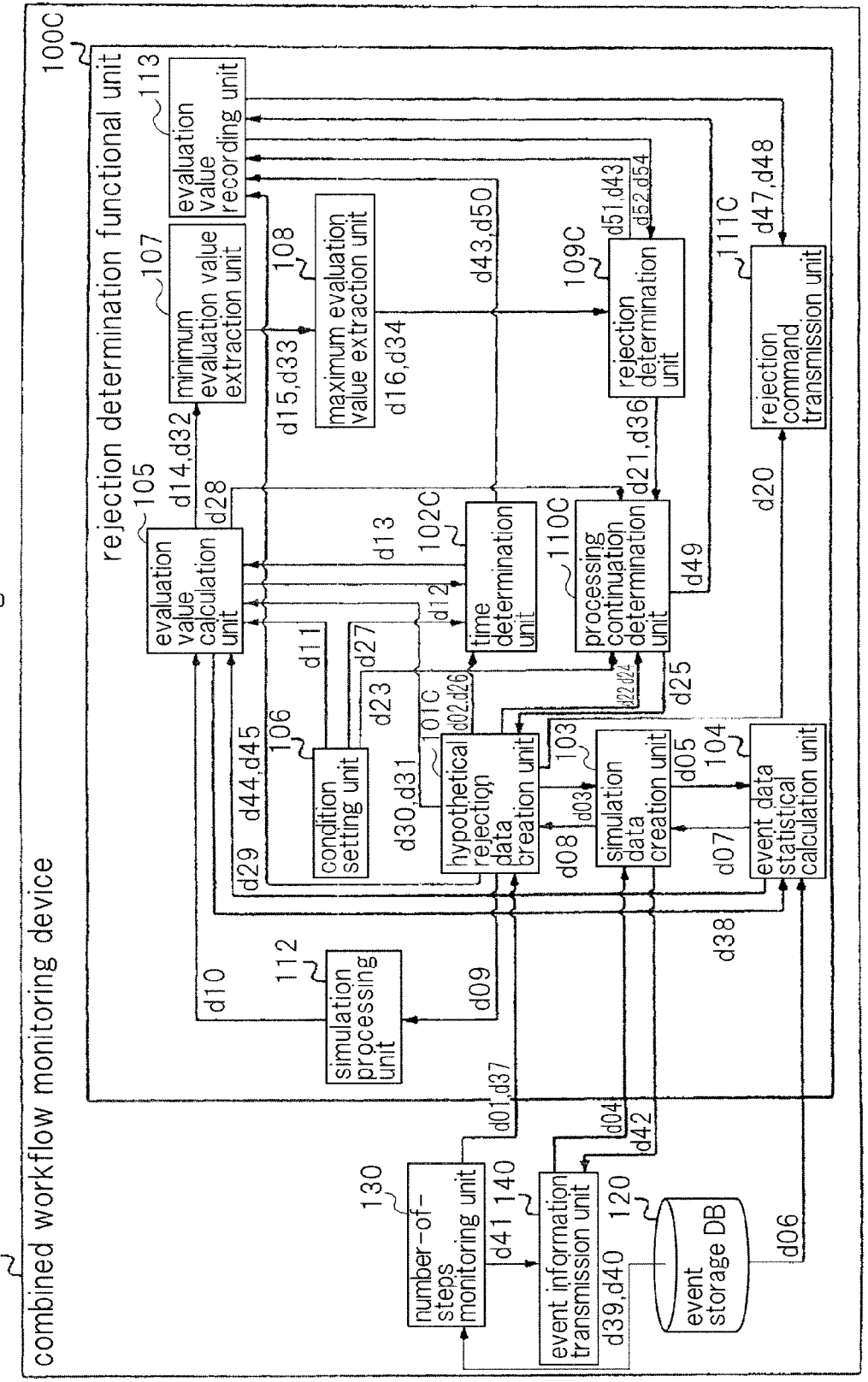
FIG. 68 is a block diagram of a combined workflow monitoring device according to the third exemplary embodiment of the present invention.

FIG. 68 is a block diagram showing the general configuration of a combined workflow monitoring device according to a third exemplary embodiment of the present invention.

Combined workflow monitoring device 1C of this exemplary embodiment comprises event storage DB 120, number-of-steps monitoring unit 130, event information transmission unit 140, and rejection determination functional unit 100C. Event storage DB 120 coordinates and associates event data related to each combined workflow with one another, and stores the associated event data. Number-of-steps monitoring unit 130 calculates the number of steps, which is indicative of the degree of the progress of each combined workflow, from the event data stored in event storage DB 120, and monitors and retains the calculated number of steps. Event information transmission unit 140, in response to a request, retrieves data representative of the current situation in which a combined workflow is executed, using the number of steps from number-of-steps monitoring unit 130, and transmits the data to rejection determination functional unit 100C. Rejection determination functional unit 100C retrieves information from event storage DB 120, number-of-steps monitoring unit 130, and event information transmission unit 140 and performs a rejection determination.

Number-of-steps monitoring unit 130 monitors event storage DB 120. When it newly observes a request message for or a response message to a business application, or a request message for or a response message to a workflow, number-of-steps monitoring unit 130 determines that the processing of a combined workflow has progressed and updates the number of steps which is indicative of the progress of the relevant combined workflow. Number-of-steps monitoring unit 130 also retains a combined workflow definition ID which uniquely identifies combined workflows that are subjected to the rejection determination. When the number-of-steps is updated for, in particular, a combined workflow which has the combined workflow definition ID, number-of-steps monitoring unit 130 activates hypothetical rejection data creation unit 101C in rejection determination functional unit 100A and notifies hypothetical rejection data generation unit 101C of the combined workflow definition ID.

Rejection determination functional unit 100C includes event data statistical calculation unit 104 which retrieves historical information related to each combined workflow, and performs statistical calculations and creation of predicted combined workflow input data. Event data statistical calculation unit 104 references past histories identified by the combined workflow definition ID to calculate the number of combined workflows, the processing of which have been completed, the number of rejected combined workflows, the past average response time, and the like. Event data statistical calculation unit 104 also performs statistical processing for past histories such as calculating a combined workflow average input interval, the variance thereof and the like to create, as predicted combined workflow input data, the combined workflow input pattern that is most likely in the future. The predicted combined workflow input data is used for simulator basic data, later described. Since business application systems and workflow systems which process combined workflows may sometimes share resources, loads on the respective systems are significantly affected by other combined workflows which are being simultaneously executed. Therefore, a more precise simulation is intended by making an input prediction. The predicted combined workflow input data may be simply required to describe which combined workflow definition ID contains a combined workflow to be input, and when the combined workflow will be input.

Rejection determination functional unit 100C further includes simulation data creation unit 103 which retrieves execution situation data indicative of the current situation in which a combined workflow is being executed, retrieves predicted combined workflow input data, and creates simulator basic data which represents the current and future states of each combined workflow. The execution situation data may be simply required to indicate which combined workflow definition ID contains a currently executed combined workflow uniquely identified by a combined workflow ID, and indicate, by the number of steps, the degree to which the combined workflow is progressing. Additionally, the simulator basic data may be simply required to indicate which combined workflow definition ID contains combined workflows, the combined workflows being uniquely identified by a combined workflow ID, and being currently executed or predicted to be input, to indicate when the combined workflow will be input, and to indicate, by the number of steps, the degree to which the combined workflow is progressing.

Rejection determination functional unit 100C further includes hypothetical rejection data creation unit 101C which retrieves a combined workflow definition ID that identifies combined workflows to be subjected to the rejection determination, retrieves the simulator basic data, and creates simulator data in which combined workflows are hypothetically rejected, the number of combined workflows being equal to the rejection volume from the simulator basic data. When hypothetically rejecting combined workflows, hypothetical rejection data creation unit 101C extracts, from combined workflows that are being executed, those combined workflows, the degrees of progress of which are equal to or lower than a certain reference, as expressed by the number of steps, and considers all possible combinations of combined workflows, the number of which is equal to the rejection volume, which are to be rejected from the extracted ones. Hypothetical rejection data creation unit 101C does not designate all combined workflows which are being executed as combined workflows which are subjected to rejection, but restricts the combined workflows which are subjected to rejection to those which have the degrees of progress, expressed by the number of steps, which are equal to or lower than the certain reference. Accordingly, the rejection determination can be performed more efficiently and in a shorter time. To this end, hypothetical rejection data creation unit 101C stores a number-of-steps reference value for narrowing down combined workflows to be subjected to rejection, the number of combined workflows to be subjected to rejection, the number of combined workflows to be hypothetically rejected, and the number of combinations of combined workflows, the number of which is equal to the number of combined workflows to be hypothetically rejected, which are selected from the combined workflows to be subjected to rejection. Since simulator data of the number of combinations is created, hypothetical rejection data creation unit 101C also stores a management table which establishes a link between simulator data and a combined workflow ID that contains a combined workflow that the simulator data has hypothetically rejected. The combined workflow simulator data may be simply required to indicate which combined workflow definition ID contains combined workflows, the combined workflows being uniquely identified by a combined workflow ID, and being currently executed or predicted to be input, to indicate when the combined workflow will be input, and to indicate, by the number of steps, the degree to which the combined workflow is progressing, or whether the combined workflow will be rejected.

In order to determine whether or not a combined workflow currently being executed satisfies an agreed service level which is concluded between a service provider and a service coordinator, hypothetical rejection data creation unit 101C initially sets the number of combined workflows to be hypothetically rejected to zero, and sets the number-of-steps reference value for narrowing down workflows to be rejected to a code which signifies that the combined workflows that are being executed are not selected for rejection, at the time of activation. Then, hypothetical rejection data creation unit 101C performs a rejection determination process.

Upon acquisition of the number-of-steps reference value for narrowing down workflows to be rejected from processing continuation determination unit 110C, later described, hypothetical rejection data creation unit 101C increments the number of combined workflows to be hypothetically rejected by one from the retained number of combined workflows to be rejected, and again performs the rejection determination process. Stated another way, since the agreed service level that is concluded between the service provider and the service coordinator cannot be satisfied with the number of workflows to be hypothetically rejected which was determined at the preceding time, hypothetical rejection data creation unit 101C determines whether or not the agreed service level that is concluded between the service provider and the service coordinator can be satisfied by increasing by one the number of combined workflows to be hypothetically rejected.

When again performing the rejection determination process with the number of combined workflows to be hypothetically rejected being increased by one, hypothetical rejection data creation unit 101C, which stores the simulator basic data, again retrieves the simulator basic data, and determines whether or not there is a difference between the number-of-steps included in the again retrieved simulator basic data and the number-of-steps included in the stored simulator basic data. If there is a difference, in order to show that there are changes in the degrees of progress of combined workflows that are being executed; hypothetical rejection data creation unit 101C resets the number of combined workflows to be hypothetically rejected to zero, and continues the rejection determination process, using the again retrieved simulator basic data indicative of the current situation.

Rejection determination functional unit 100C further includes simulation processing unit 112 which predicts the response time of each combined workflow once it is applied with data, expressed by the number-of-steps, indicative of the degree and the time at which a combined workflow uniquely identified by a combined workflow ID is progressing, or when it will be rejected. Simulation processing unit 112 creates and outputs a simulation result list which enumerates a combined workflow uniquely identified by a combined workflow ID, a combined workflow definition ID to which the combined workflow belongs, and the response time of the combined workflow.

Rejection determination functional unit 100C further includes condition setting unit 106 which retains a rejection determination condition that is dependent upon information on the agreed service level that is concluded between a service provider and a service coordinator. Condition setting unit 106 retains a time limit for performing the rejection determination. Condition setting unit 106 also retains an evaluation value calculation function which is created on the basis of the information on the agreed service level that is concluded between the service provider and the service coordinator. The evaluation value calculation function has variables for determining the agreed service level, such as a processing time, an average processing time, a rejection ratio and the like of a combined workflow. The evaluation value calculation function is defined such that the higher the evaluation value that is calculated from the evaluation value calculation function, the more frequently the agreed service level will be satisfied. The evaluation value calculation function need not necessarily be defined with a mathematical expression, but may be described with a computer program format. Condition setting unit 106 also retains an agreed service level determination threshold. When an evaluation value that is calculated from the evaluation value calculation function exceeds the agreed service level determination threshold, then condition setting unit 106 determines that the agreed service level that is concluded between the service provider and the service coordinator has been satisfied.

Rejection determination functional unit 100C further includes time determination unit 102C which retrieves a determination start notification and a time limit for performing the rejection determination and retains a rejection determination end time. Upon receipt of a time limit determination request, time determination unit 102C retrieves the current time, and compares the rejection determination end time with the current time to determine whether or not the rejection determination could have been completed within the time limit.

Rejection determination functional unit 100C further includes evaluation value calculation unit 105 which extracts a combined workflow ID which has a combined workflow definition ID that is subjected to the rejection determination, from the simulation result list, and calculates an evaluation value using the evaluation value calculation function based on the response time, the average response time, and the rejection ratio for the combined workflow definition ID to create an evaluation value list. Evaluation value calculation unit 105 retains the number of combinations of simulations. After creating an evaluation value list for the results of respective simulations of the number of combinations, evaluation value calculation unit 105 notifies time determination unit 102C of the time limit determination request to ascertain whether or not a process has been completed within the defined time limit. When the process has been completed within the defined time limit, rejection determination functional unit 100C continues processing operations. However, when the process cannot be completed within the defined time limit, rejection determination functional unit 100C queries evaluation value recording unit 113, later described, to ascertain whether or not a maximum evaluation value has been retained therein.

Rejection determination functional unit 100C further includes minimum evaluation value extraction unit 107 which extracts a minimum value from each evaluation value list based on the evaluation value lists of the number equal to the number of combinations, and creates a minimum value list which enumerates the minimum values of the number equal to the number of combinations in list form.

Rejection determination functional unit 100C includes maximum evaluation value extraction unit 108 which extracts a maximum value from minimum values of the number equal to the number of combinations, based on the minimum value list. The maximum value implies that when combined workflows of the number equal to the number of combinations are hypothetically rejected from among those combined workflows which are being executed and which present the number-of-steps equal to or less than the number-of-steps reference value for narrowing down combined workflows to be rejected, evaluation values for combined workflows that were not rejected, can be set to at least the maximum value.

Rejection determination functional unit 100C further includes rejection determination unit 109C which retrieves the maximum evaluation value, and compares the retrieved maximum evaluation value with a maximum evaluation value retained in evaluation value recording unit 113, later described, to determine which presents a higher maximum evaluation value. When the retrieved maximum evaluation value is higher than the maximum evaluation value retained in evaluation value recording unit 113, later described, rejection determination unit 109C determines that an agreed service level that is concluded between a service provider and a service coordinator will be further improved if combined workflows, the number of which is equal to the hypothetical rejection volume, currently subjected to the rejection determination, are rejected from among combined workflows that are being executed, and notifies evaluation value recording unit 113, later described, of the maximum evaluation value retained therein to update the maximum evaluation value. On the other hand, when the retrieved value of the maximum evaluation value is smaller than the maximum evaluation value retained in evaluation value recording unit 113, later described, rejection determination unit 109C determines that the agreed service level that is concluded between the service provider and the service coordinator cannot be further improved even by rejecting the combined workflows, the number of which is equal to the hypothetical rejection volume, currently subjected to the rejection determination, from among the combined workflows that are being executed, as compared with the case in which combined workflows are rejected, the number of which is equal to the rejection volume, which gives the maximum evaluation value retained in evaluation value recording unit 113, later described.

Rejection determination functional unit 100C further includes processing continuation determination unit 110C which retrieves the number of combined workflows that are subjected to rejection, and the number of hypothetically rejected combined workflows, and determines whether or not the rejection determination process can be continued by further increasing the number of hypothetically rejected combined workflows. When determining that the number of hypothetically rejected combined workflows cannot be increased, processing continuation determination unit 110C notifies evaluation value recording unit 113, later described, of a rejection determination end notification. When determining that the number of hypothetically rejected combined workflows can be increased, processing continuation determination unit 110C, retrieves the number-of-steps reference value for narrowing down rejection targets. When the number-of-steps reference value includes a code set therein which means that any of combined workflows that are being executed should not be subjected to rejection, processing continuation determination unit 110C retrieves the evaluation value list and an agreed service level determination threshold in order to newly set a number-of-steps reference value, extracts from combined workflows that are being executed a combined workflow which cannot satisfy the agreed service level and has the largest number of steps, i.e., a combined workflow which cannot satisfy the agreed service level and presents the most advanced processing progress, and designates the number of steps in this combined workflow as the number-of-steps reference value. On the other hand, when a value has been already retained in the retrieved number-of-steps reference value, processing continuation determination unit 110C designates this value as the number-of-steps reference value.

Processing continuation determination unit 110C notifies hypothetical rejection data creation unit 101C of the number-of-steps reference value.

Rejection determination functional unit 100C further includes rejection command transmission unit 111C which transmits a command for executing a forced rejection to combined workflows subjected to the rejection when a maximum evaluation value is received.

Rejection determination functional unit 100C further includes evaluation value recording unit 113 which receives maximum evaluation values and retains and records the best maximum evaluation value in the rejection determinations so far pronounced. Evaluation value recording unit 113 ascertains whether or not the maximum evaluation value retained therein when a time limit is reached. When it does not retain the maximum evaluation value, evaluation value recording unit 113 terminates the series of processing operations, and notifies the retained maximum evaluation value.

Figure 69:
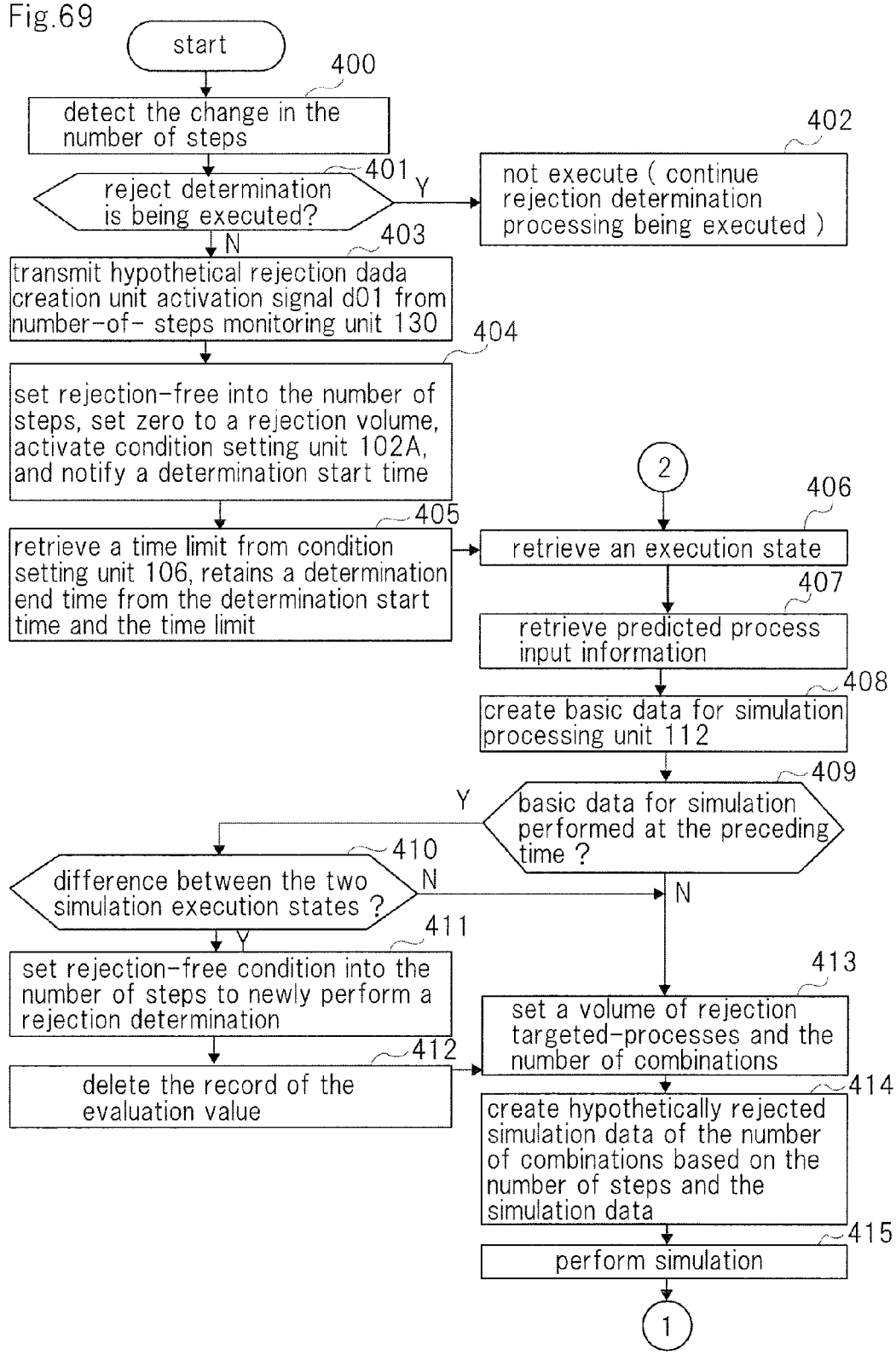
FIG. 69 is a flow chart showing the operation of the combined workflow monitoring device of the third exemplary embodiment.
Figure 70:
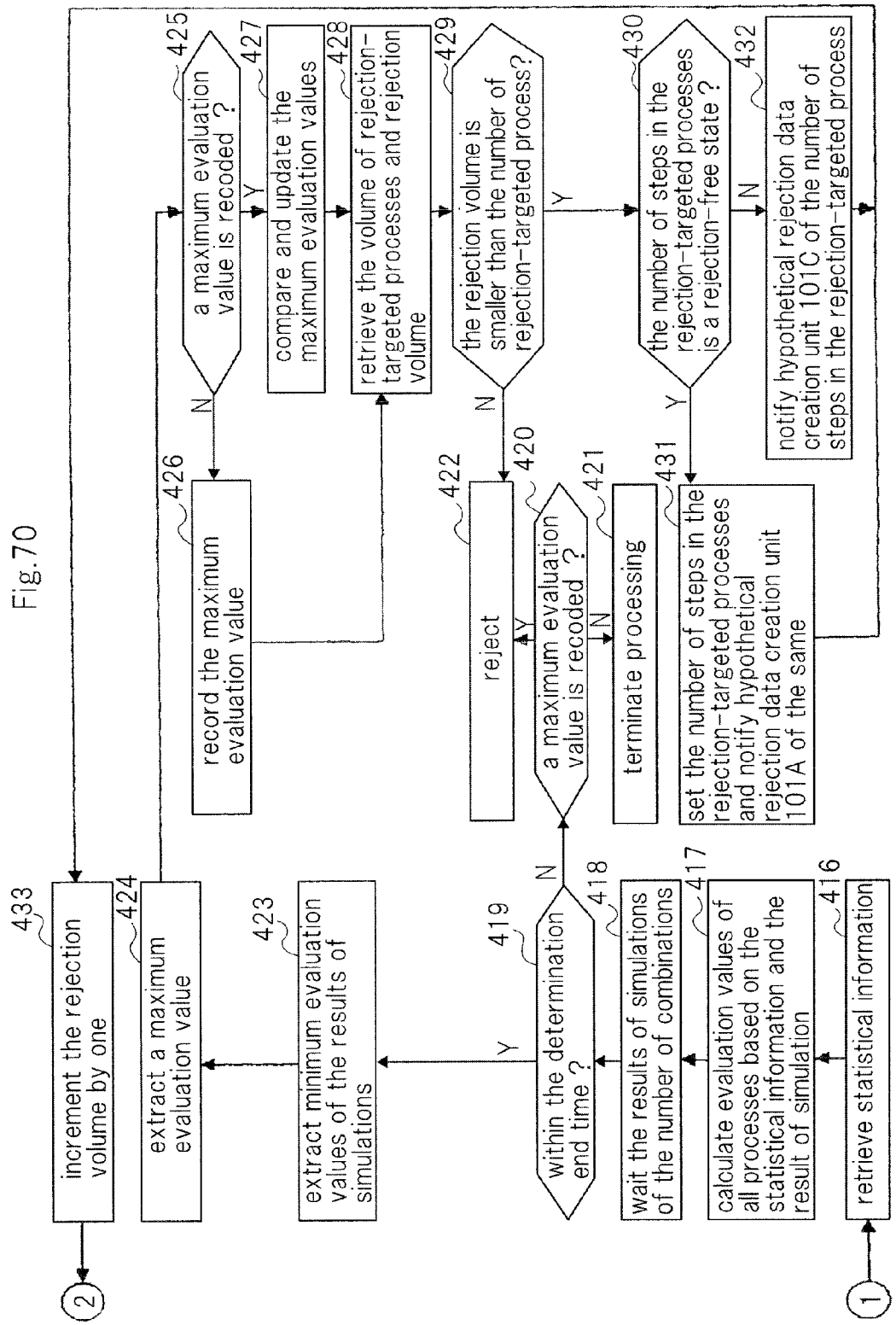
FIG. 70 is a flow chart showing the operation of the combined workflow monitoring device of the third exemplary embodiment.

Next, the operation of the third exemplary embodiment of the present invention will be described in detail with reference to FIG. 68 and flow charts of FIGS. 69 and 70.

Number-of-steps monitoring unit 130 retains combined workflow definition IDs which uniquely identify combined workflows that are subjected to rejection determination, and always monitors event storage DB 120. When it newly detects event data d39, d40 related to a request message for or a response message to a business application, as well as to a request message for or a response message to a workflow, then number-of-steps monitoring unit 130 updates execution state management table T00100 stored therein. When it detects event data for a request message for or a response message to a combined workflow which, in particular, has a combined workflow definition ID, number-of-steps monitoring unit 130 causes rejection determination functional unit 100B to start the rejection determination process (step 400).

When it detects event data d39, d40 for a request message for or a response message to a combined workflow which has a combined workflow definition ID, number-of-steps monitoring unit 130 determines whether or not hypothetical rejection data creation unit 101C is active (step 401). When hypothetical rejection data creation unit 101C is active, number-of-steps monitoring unit 130 does not newly perform a rejection determination because a rejection determination process is already being executed (step 402). When hypothetical rejection data creation unit 101C is not activated, number-of-steps monitoring unit 130 notifies hypothetical rejection data creation unit 101C of hypothetical rejection dada creation unit activation signal d01. Number-of-steps monitoring unit 130 also notifies hypothetical rejection data creation unit 101C of combined workflow definition ID d37 for identifying combined workflows which are subjected to the rejection determination (step 403).

Hypothetical rejection data creation unit 101C is activated in response to the receipt of hypothetical rejection data creation unit activation signal d01, and creates hypothetical rejection condition data management table T00700. For initially simulating a rejection-free scenario, hypothetical rejection data creation unit 101C sets "0" to rejection volume field T00702 and "−1" to the number of steps in the rejection-targeted combined workflow field T00705 in hypothetical rejection condition data management table T00700, respectively. The number of steps in the rejection-targeted combined workflow needs not be "−1" as long as it can be indicated that any combined workflow will not be rejected when it is being executed. Hypothetical rejection data creation unit 101C sets combined workflow definition ID d37 received from number-of-steps monitoring unit 130 in rejection-targeted combined workflow definition ID field T00706. Please note that, at this time, no values have been set in rejection-targeted combined workflow volume field T00703 and number-of-combinations field T00704. Hypothetical rejection data creation unit 101C notifies simulation data creation unit 103 of simulation data creation unit activation signal d03. Hypothetical rejection data creation unit 101C also notifies time determination unit 102C of time determination unit activation signal d02, and notifies time determination unit 102C of determination start time notification d26 to set a rejection determination processing end time. Time determination unit 102C notifies evaluation value recording unit 113 of evaluation value recording unit activation signal d43. Evaluation value recording unit 113 is activated in response to the receipt of evaluation value recording unit activation signal d43 (step 404).

Time determination unit 102C is activated in response to the receipt of time determination unit activation signal d02. Time determination unit 102C retrieves time limit d27 from condition setting unit 106, calculates a determination end time based on the time at which it received determination start time notification d26, and retains the determination end time (step 405).

Condition setting unit 106 retains information about conditions for performing the rejection determination based on the agreed service level that is concluded between the service provider and the service coordinator. Condition setting unit 106 defines an evaluation value calculation function which is set based on the agreed service level information. The evaluation value calculation function is defined to have variables which include a combined workflow response time, a combined workflow average response time, and a rejection ratio which are dictated by the agreed service level. The evaluation value calculation function may be arbitrarily defined, but it is defined such that the larger the value derived from the evaluation value function, the more frequently will the agreed service level be satisfied. Also, the evaluation value calculation function need not be described with a mathematical expression, but may be described with a computer program format. Condition setting unit 106 also defines an agreed service level determination threshold for determining the agreed service level. The agreed service level determination threshold is determined by the evaluation value calculation function. The agreed service level determination threshold is an index value for determining that the agreed service level that is concluded between the service provider and the service coordinator is satisfied when the agreed service level determination threshold is exceeded by a value which is calculated by using a combined workflow response time, a combined workflow average response time, and a rejection ratio, that are found through a simulation, and by substituting them into the evaluation value calculation function.

Simulation data creation unit 103 is activated in response to the receipt of simulation data creation unit activation signal d03. Simulation data creation unit 103 notifies event information transmission unit 140 of execution state query signal d42. Event information transmission unit 140 retrieves execution state management table T00100 (d41) from number-of-steps monitoring unit 130, and notifies simulation data creation unit 103 of execution state management table T00100 (d04). Simulation data creation unit 103 notifies event data statistical calculation unit 104 of event data statistical calculation unit activation signal d05 (step 406).

Event data statistical calculation unit 104 is activated in response to the receipt of event data statistical calculation unit activation signal d05. Event data statistical calculation unit 104 retrieves event information d06 from event storage DB 120, performs statistical processing for past histories, such as calculating the combined workflow average input interval, the variance thereof and the like, and creates the combined workflow input pattern that is most likely in the future as predicted combined workflow input management table T00200. Event data statistical calculation unit 104 notifies simulation data creation unit 103 of predicted combined workflow input management table T00200 (d07) (step 407).

Simulation data creation unit 103 creates simulation basic data management table T00900 based on predicted combined workflow input management table T00200 received from event data statistic calculation unit 104, and execution state management table T00100. Simulation data creation unit 103 notifies hypothetical rejection data creation unit 101C of simulation basic data management table T00900 (d08) (step 408).

Hypothetical rejection data creation unit 101C ascertains whether or not hypothetical rejection data creation unit 101 retains basic data management table T00900' for a simulation performed at the preceding time (step 409). When hypothetical rejection data creation unit 101C retains simulation basic data management table T00900', hypothetical rejection data creation unit 101C compares combined workflow ID field T00904 in newly received simulation basic data management table T0090 (d08) with combined workflow ID field T00901' in basic data management table T00900' for the simulation performed at the preceding time in order to determine whether or not there is a change in the processing progress of combined workflows that are being executed during the rejection determination. Similarly, hypothetical rejection data creation unit 101C compares number-of-steps field T00902 in newly received simulation basic data management table T00900 with number-of-steps field T00902' in basic data management table T00900' for the simulation performed at the preceding time (step 410). When the comparison reveals a difference, this means that there is a change in the processing progress of the combined workflows that are being executed during the rejection determination, so that hypothetical rejection data creation unit 101C performs the rejection determination again from a rejection-free state after the situation has been changed. In order to update hypothetical rejection condition data management table T00700 to initially simulate a rejection-free state, hypothetical rejection data creation unit 101C sets "0" into rejection volume field T00702 and "−1" into the number of steps in the rejection-targeted combined workflow field T00705 in hypothetical rejection condition data management table T00700. The number of steps in the rejection-targeted combined workflow need not be "−1" as long as it can be indicated that any combined workflow that are being executed will not be rejected. Hypothetical rejection data creation unit 101C sets a combined workflow definition ID (d37) received from number-of-steps monitoring unit 130 into rejection-targeted combined workflow definition ID field T00706. Hypothetical rejection data creation unit 101C notifies time determination unit 102C of determination start time notification d26 as information for determining whether or not the determination has been completed within a time limit (step 411). When a difference results from the comparison, hypothetical rejection data creation unit 101C notifies evaluation value recording unit 113 of rejection determination start notification d44. Upon receipt of rejection determination start notification d44, evaluation value recording unit 113 deletes all information on maximum evaluation values retained therein (step 412).

Hypothetical rejection data creation unit 101C retains simulation basic data management table T00900. Hypothetical rejection data creation unit 101C compares number-ofsteps field T00902 in simulation basic data management table T00900 with the number of steps in the rejection-targeted combined workflow retained in the number of steps in the rejection-targeted combined workflow field T00705 in hypothetical rejection condition data management table T00700 for combined workflows that are being executed. Hypothetical rejection data creation unit 101C calculates the number of combined workflow ID fields T00901 which are associated with number-of-steps field T00902, the value of which is equal to or less than the number of steps in rejection-targeted combined workflow and which are associated with combined workflow definition ID field T00904 that matches rejection-targeted combined workflow definition ID field T00706, and retains the calculated number in rejection-targeted combined workflow volume field T00703. This number indicates the number of combined workflows which are subjected to the rejection determination among combined workflows that are being executed, and which belong to a combined workflow definition that undergoes the agreed service level determination. Then, combined workflows, that are currently being executed and that have the number of steps equal to or less than the number of steps in the rejection-targeted combined workflow, are extracted from among combined workflows that are being currently executed, thereby reducing the number of combined workflows which are subjected to the rejection determination. In this way, it is possible to efficiently implement the rejection determination process in a shorter time. Next, hypothetical rejection data creation unit 101C retrieves the rejection volume from rejection volume field T00702 in hypothetical rejection condition data management table T00700, calculates the number of combinations of combined workflows, equal in number to the rejection volume, selected from the rejection-targeted combined workflows, and retains the number of combinations in number-of-combinations field T00704 in hypothetical rejection condition data management table T00700. After creating hypothetical rejection condition data management table T00700, hypothetical rejection data creation unit 101C ascertains whether or not evaluation value calculation unit 105 is active. When evaluation value calculation unit 105 is not activated, hypothetical rejection data creation unit 101C notifies evaluation value calculation unit 105 of evaluation value calculation unit activation signal d30. Hypothetical rejection data creation unit 101C also notifies evaluation value calculation unit 105 of hypothetical rejection condition data management table T00700 (d31) (step 413).

Evaluation value calculation unit 105 is activated in response to the receipt of evaluation value calculation unit activation signal d30 from hypothetical rejection data creation unit 101C. Evaluation value calculation unit 105 retains hypothetical rejection condition data management table T000700 (d31) notified from hypothetical rejection data creation unit 101C.

After the completion of processing at step 413, hypothetical rejection data creation unit 101C creates and retains hypothetically rejected combined workflow data management table T00600, and hypothetical rejection data management table T00800 as input data to simulation processing unit 112. Hypothetical rejection data creation unit 101C creates, as hypothetical rejection condition data management table T000800, data which results from the exclusion of hypothetically rejected combined workflows that are being executed, the number of which is equal to the rejection volume that is retained in rejection volume field T00702, from combined workflows that are being executed and which are associated with number-of-steps field T00902 in simulation basic data management table T00900, equal to or less than the number of steps in the rejection-targeted combined workflow field T00705, and associated with combined workflow definition ID field T00904 in simulation basic data management table T00900 that matches rejection-targeted combined workflow definition ID field T00706. When some combined workflow is hypothetically rejected, hypothetical rejection data creation unit 101C sets a code indicative of rejection in number-of-steps field T00803. In this case, hypothetical rejection data creation unit 101C retains combined workflow ID fields T00901 of combined workflows subjected to the rejection, the number of which is equal to the rejection volume retained in rejection volume field T00702, in rejected combined workflow ID fields T00604 in hypothetically rejected combined workflow data management table T00600. Hypothetical rejection data creation unit 101C eventually creates hypothetically rejected combined workflow data management tables T00600 and hypothetical rejection data management tables T00800, the number of which is equal to the number retained in number-of-combinations field T00704. Hypothetical rejection data creation unit 101C notifies simulation processing unit 112 of the created hypothetical rejection data management tables T00800 (d09), the number of which is equal to the number of combinations (step 414).

Simulation processing unit 112 performs a simulation process in accordance with hypothetical rejection data management table T00800 (d09), creates simulation result management table T00300 corresponding to each hypothetical rejection data management table T00800, and notifies evaluation value calculation unit 105 of simulation result management tables T00300 (d10) (step 415).

Evaluation value calculation unit 105 receives simulation result management table T00300 (d10) from simulation processing unit 112, and notifies event data statistical calculation unit 104 of rejection-targeted combined workflow definition ID (d38) which is set in rejection-targeted combined workflow definition ID field T00706 in hypothetical rejection condition data management table T00700 retained therein. Event data statistical calculation unit 104 creates statistical information data management table T01000 for a service identified by a rejection-targeted combined workflow definition ID, based on the rejection-targeted combined workflow definition ID (d38) received from evaluation value calculation unit 105 and event information (d06), and notifies evaluation value calculation unit 105 of statistical information data management table T01000 (d29) (step 416).

After receiving statistical information data management table T01000 (d29), evaluation value calculation unit 105 receives evaluation value calculation function d11 defined by condition setting unit 106. Evaluation value calculation unit 105 calculates an evaluation value in accordance with the evaluation value calculation function, based on combined workflow predicted response time field T00303 associated with combined workflow definition ID field T00304 which matches rejection-targeted combined workflow definition ID field T00706 within simulation result management table T00300, and on statistical information data management table T01000, and creates evaluation value management table T00400 (step 417).

Evaluation value calculation unit 105 waits until it creates evaluation value management tables T00400, the number of which is equal to the number of combinations which is retained in number-of-combinations field T00704 in hypothetical rejection condition data management table T00700 which is retained in evaluation value calculation unit 105. After creating all evaluation value management tables T00400, the number of which is equal to the number of combinations, evaluation value calculation unit 105 transmits time limit determination request d12 to time determination unit 102C (step 418).

Time determination unit 102C compares the time at which it received time limit determination request d12 with the determination end time retained therein (step 419). When the time at which time limit determination request d12 was received has passed the determination end time retained by time determination unit 102C, time determination unit 102C notifies evaluation value recording unit 113 of rejection determination end notification d50. Upon receipt of rejection determination end notification d50, evaluation value recording unit 113 ascertains whether or not maximum evaluation value management table T01100 is retained (step 420). When maximum evaluation value management table T01100 is not retained, evaluation value recording unit 113 determines that there is no effective rejection pattern which improves the agreed service level of combined workflows that are being executed, and terminates the series of processing operations (step 421). When maximum evaluation value management table T01100 is retained, evaluation value recording unit 113 notifies rejection command transmission unit 111C of rejection command transmission unit activation signal d47, and notifies maximum evaluation value management table T01100 (d48). Rejection command transmission unit 111C is activated in response to the receipt of rejection command transmission unit activation signal d47 from evaluation value recording unit 113. Upon receipt of maximum evaluation value management table T01100, rejection command transmission unit 111C retrieves a simulation ID from simulation ID field T01101 in maximum evaluation value management table T01100, and retrieves, from hypothetical rejection data creation unit 101C, hypothetically rejected combined workflow data management table T00600 (d20) which has simulation ID field T00602 that matches the retrieved simulation ID, among hypothetically rejected combined workflow data management tables T00600 retained in hypothetical rejection data creation unit 101C. Rejection command transmission unit 111C issues a forced rejection command to each combined workflow that is being executed which has a combined workflow ID which is retained in rejected combined workflow ID field T00604 in the retrieved hypothetically rejected combined workflow data management table T00600 (step 422).

When the time at which time limit determination request d12 was received has not passed the determination end time retained by time determination unit 102C, time determination unit 102C notifies evaluation value calculation unit 105 of control time determination response d13. Upon receipt of control time determination response d13, evaluation value calculation unit 105 ascertains whether or not minimum evaluation value extraction unit 107 is active. When it is not activated, evaluation value calculation unit 105 notifies minimum evaluation value extraction unit 107 of minimum evaluation value extraction unit activation signal d32. Minimum evaluation value extraction unit 107 is activated in response to the receipt of minimum evaluation value extraction unit activation signal d32 from evaluation value calculation unit 105. Evaluation value calculation unit 105 notifies minimum evaluation value extraction unit 107 of evaluation value management tables T00400 (d14), the number of which is equal to the number of combinations, retained therein. Upon receipt of evaluation value management tables T00400 (d14), the number of which is equal to the number of combinations, minimum evaluation value extraction unit 107 extracts those evaluation value fields T00403 that have a minimum value from respective evaluation value management tables T00400, and creates minimum evaluation value management table T00500. Minimum evaluation value extraction unit 107 ascertains whether or not maximum evaluation value extraction unit 108 is active. When maximum evaluation value extraction unit 108 is not activated, minimum evaluation value extraction unit 107 notifies maximum evaluation value extraction unit 108 of maximum evaluation value extraction unit activation signal d33. Minimum evaluation value extraction unit 107 notifies maximum evaluation value extraction unit 108 of minimum evaluation value management table T00500 (d15) (step 423).

Maximum evaluation value extraction unit 108 is activated in response to maximum evaluation value activation signal d33 received from minimum evaluation value extraction unit 107. Upon receipt of minimum evaluation value management table T00500 (d15) from minimum evaluation value extraction unit 107, maximum evaluation value extraction unit 108 extracts an evaluation value which presents a maximum value among those evaluation values retained in minimum evaluation value field T00502, and creates maximum evaluation value management table T01100. Maximum evaluation value extraction unit 108 ascertains whether rejection determination unit 109C is active or not. When rejection determination unit 109C is not activated, maximum evaluation value extraction unit 108 notifies rejection determination unit 109C of rejection determination unit activation signal d34. Maximum evaluation value extraction unit 108 also notifies rejection determination unit 109C of maximum evaluation value management table T01100 (d16) (step 424).

Rejection determination unit 109C is activated in response to the receipt of rejection determination unit activation signal d34 from maximum evaluation value extraction unit 108. Rejection determination unit 109C notifies evaluation value recording unit 113 of maximum evaluation value management table request signal d51. Upon receipt of maximum evaluation value management table request signal d51 from rejection determination unit 109C, evaluation value recording unit 113 ascertains whether or not a maximum evaluation value management table is retained therein (step 425).

When the maximum evaluation value management table is not retained in evaluation value recording unit 113, evaluation value recording unit 113 notifies rejection determination unit 109C of maximum evaluation value management table not-yet-retained signal d52. Upon receipt of maximum evaluation value management table not-yet-retained signal d52 from evaluation value recording unit 113, rejection determination unit 109C notifies evaluation value recording unit 113 of a maximum evaluation value management table (d16) received from maximum evaluation value extraction unit 108 (d53). Upon receipt of the maximum evaluation value management table from rejection determination unit 109C, evaluation value recording unit 113 retains this maximum evaluation value management table therein. Further, rejection determination unit 109C ascertains whether or not processing continuation determination unit 110C is active. When processing continuation determination unit 110C is not activated, rejection determination unit 109C notifies processing continuation determination unit 110C of processing continuation determination unit activation signal d36. Rejection determination unit 109C notifies processing continuation determination unit 110C of maximum evaluation value management table T01100 (d21), which has been notified to evaluation value recording unit 113 (step 426).

When the maximum evaluation value management table is retained in evaluation value recording unit 113, evaluation value recording unit 113 notifies rejection determination unit 109C of the maximum evaluation value management table (d54). Upon receipt of maximum evaluation value management table d54 from evaluation value recording unit 113, rejection determination unit 109C compares a maximum evaluation value retained in maximum evaluation value field T01102 in maximum evaluation value management table (d16) with a maximum evaluation value retained in maximum evaluation value field T01102 in maximum evaluation value management table (d54), and notifies evaluation value recording unit 113 of the evaluation value management table which retains the larger maximum evaluation value (d53). Upon receipt of the maximum evaluation value management table from rejection determination unit 109C, evaluation value recording unit 113 updates the maximum evaluation value management table so far retained therein with the received maximum evaluation value management table. Rejection determination unit 109C further notifies processing continuation determination unit 110C of maximum evaluation value management table T01100 (d21) (step 427), which has been notified to evaluation value recording unit 113.

Processing continuation determination unit 110C is activated in response to the receipt of processing continuation determination unit activation signal d36 from rejection determination unit 109C. Upon receipt of maximum evaluation value management table T01100 (d21) from rejection determination unit 109C, processing continuation determination unit 110C retrieves hypothetical rejection condition data management table T00700 (d22) retained in hypothetical rejection data creation unit 101C. Processing continuation determination unit 110C retrieves a rejection volume from rejection volume field T00702 in hypothetical rejection condition data management table T00700. Processing continuation determination unit 110C retrieves a rejection-targeted combined workflow volume from rejection-targeted combined workflow volume field T00703 in hypothetical rejection condition data management table T00700 (step 428).

Processing continuation determination unit 110C compares the retrieved rejection volume with the rejection-targeted combined workflow volume to see which is larger. That is, processing continuation determination unit 110C determines whether or not the rejection volume can be further increased from among rejection-targeted combined workflows to find a combination of combined workflows which can be rejected (step 429).

Processing continuation determination unit 110C compares the retrieved rejection volume with the rejection-targeted combined workflow volume. When the retrieved rejection volume is the same as the rejection-targeted combined workflow volume, processing continuation determination unit 110C determines that the rejection volume cannot be further increased from among rejection-targeted combined workflows to find a combination of combined workflows which can be rejected, and notifies evaluation value recording unit 113 of rejection determination end notification d49. Upon receipt of rejection determination end notification d49, evaluation value recording unit 113 notifies rejection command transmission unit 111C of rejection command transmission unit activation signal d47, and of maximum evaluation value management table T01100 (d48) retained therein. Rejection command transmission unit 111C is activated in response to the receipt of rejection command transmission unit activation signal d47 from evaluation value recording unit 113. Upon receipt of maximum evaluation value management table T01100 (d48), rejection command transmission unit 111C retrieves a simulation ID from simulation ID field T01101 in maximum evaluation value management table T01100, and also retrieves, from hypothetical rejection data creation unit 101C, hypothetically rejected combined workflow data management table T00600 (d20) which has simulation ID field T00602 that matches the retrieved simulation ID, in hypothetically rejected combined workflow data management tables T00600 retained in hypothetical rejection data creation unit 101C. Rejection command transmission unit 111C issues a forced rejection command to each combined workflow that is being executed which has a combined workflow ID which is retained in rejected combined workflow ID field T00604 in retrieved hypothetically rejected combined workflow data management table T00600 (step 422).

Processing continuation determination unit 110C compares the retrieved rejection volume with the rejection-targeted combined workflow volume to see which is larger. When the rejection-targeted combined workflow volume is larger than the rejection volume, processing continuation determination unit 110C determines that the rejection volume can be further increased to find a combination of combined workflows which can be rejected, Processing continuation determination unit 110C retrieves the number of steps in the rejection-targeted combined workflow from the number of steps in rejection-targeted combined workflow field T00705 in retrieved hypothetical rejection condition data management table T00700, and ascertains whether or not the number of steps in the rejection-targeted combined workflow indicates a state where no combined workflow should be rejected (step 430). When processing continuation determination unit 110C determines that the rejection volume can be further increased to find a combination of combined workflows which can be rejected, and when the number of steps in the rejection-targeted combined workflow number indicates a state where no combined workflow should be rejected, processing continuation determination unit 110C newly sets the number of steps in the rejection-targeted combined workflow into hypothetical rejection condition data management table T00700. Processing continuation determination unit 110C retrieves agreed service level determination threshold d23 from condition setting unit 106, retrieves evaluation value management table T00400 (d28) from evaluation value calculation unit 105, and retrieves hypothetical rejection data management table T00800 (d24) from hypothetical rejection data creation unit 101C. Since this state is a state in which there are no rejection-targeted combined workflows, the number of combinations is one, i.e., there is only one evaluation value management table T00400. Processing continuation determination unit 110C compares evaluation value field T00403 in retrieved evaluation value management table T00400 with retrieved agreed service level determination threshold d23, and extracts combined workflow ID field T00402 associated with evaluation value field T00403 which is less than agreed service level determination threshold d23. Processing continuation determination unit 110C retrieves the largest number of steps in number-of-steps field T00803 in hypothetical rejection data management table T00800, based on extracted combined workflow ID field T00402 and retrieved hypothetical rejection data management table T00800. The largest number of steps thus retrieved is equal to the number of steps in the rejection-targeted combined workflow, and processing continuation determination unit 110C notifies hypothetical rejection data creation unit 101C of the number of steps in the rejection-targeted combined workflow d25 (step 431).

When processing continuation determination unit 110C determines that the rejection volume can be further increased to find a combination of combined workflows which can be rejected, and when the number of steps in the rejection-targeted combined workflow does not indicate the state where no combined workflows should be rejected (i.e., when the number of steps in the rejection-targeted combined workflow is set), processing continuation determination unit 110C notifies hypothetical rejection data creation unit 101C of number of steps in the rejection-targeted combined workflow d25 (step 432). Upon receipt of number of steps in a rejection-targeted combined workflow d25 from processing continuation determination unit 110C, hypothetical rejection data creation unit 101C newly creates hypothetical rejection condition data management table T00700'. Specifically, hypothetical rejection data creation unit 101C sets the number of steps in the rejection-targeted combined workflow d25 into the number of steps in rejection-targeted combined workflow field T00705' in hypothetical rejection condition data management table T00700', and rejection-targeted combined workflow definition ID field T00706 into rejection-targeted combined workflow definition ID field T000706' in hypothetical rejection condition data management table T00700', respectively. Hypothetical rejection data creation unit 101C sets into rejection volume field T00702' the sum of one and rejection volume field T00702 in hypothetical rejection condition data management table T00700 retained by hypothetical rejection data creation unit 101C. Subsequently, hypothetical rejection data creation unit 101C discards hypothetical rejection condition data management table T00700 so far retained therein, and control proceeds to step 406 using newly created hypothetical rejection condition data management table T00700' (step 433).

In the first exemplary embodiment, at a time when a rejection pattern is found to satisfy an agreed service level within a time limit, each combined workflow that is being executed is rejected if it falls within the rejection pattern. In the second exemplary embodiment, evaluation value recording unit 113 retains and updates maximum evaluation value management table T01100, performs the rejection determination processing operations until a time limit is reached to find the most effective rejection pattern which satisfies the agreed service level, and rejects each combined workflow that is being executed and which falls under that rejection pattern. In the third exemplary embodiment, on the other hand, evaluation value recording unit 113 retains and updates maximum evaluation value management table T01100, and performs the rejection determination process until a time limit is reached, in a manner similar to the second exemplary embodiment, but updates maximum evaluation value management table T01100 provided that any improvement is expected in an agreed service level even if the agreed service level is not achieved. In this way, it is possible to find a rejection pattern which improves an agreed service level of each combined workflow that is currently being executed. Stated another way, unlike a rejection pattern found in the first and second exemplary embodiments, improvements can be expected in the agreed service level even if a rejection pattern found in the third exemplary embodiment does not satisfy the agreed service level.

Fourth Exemplary Embodiment

Figure 71:
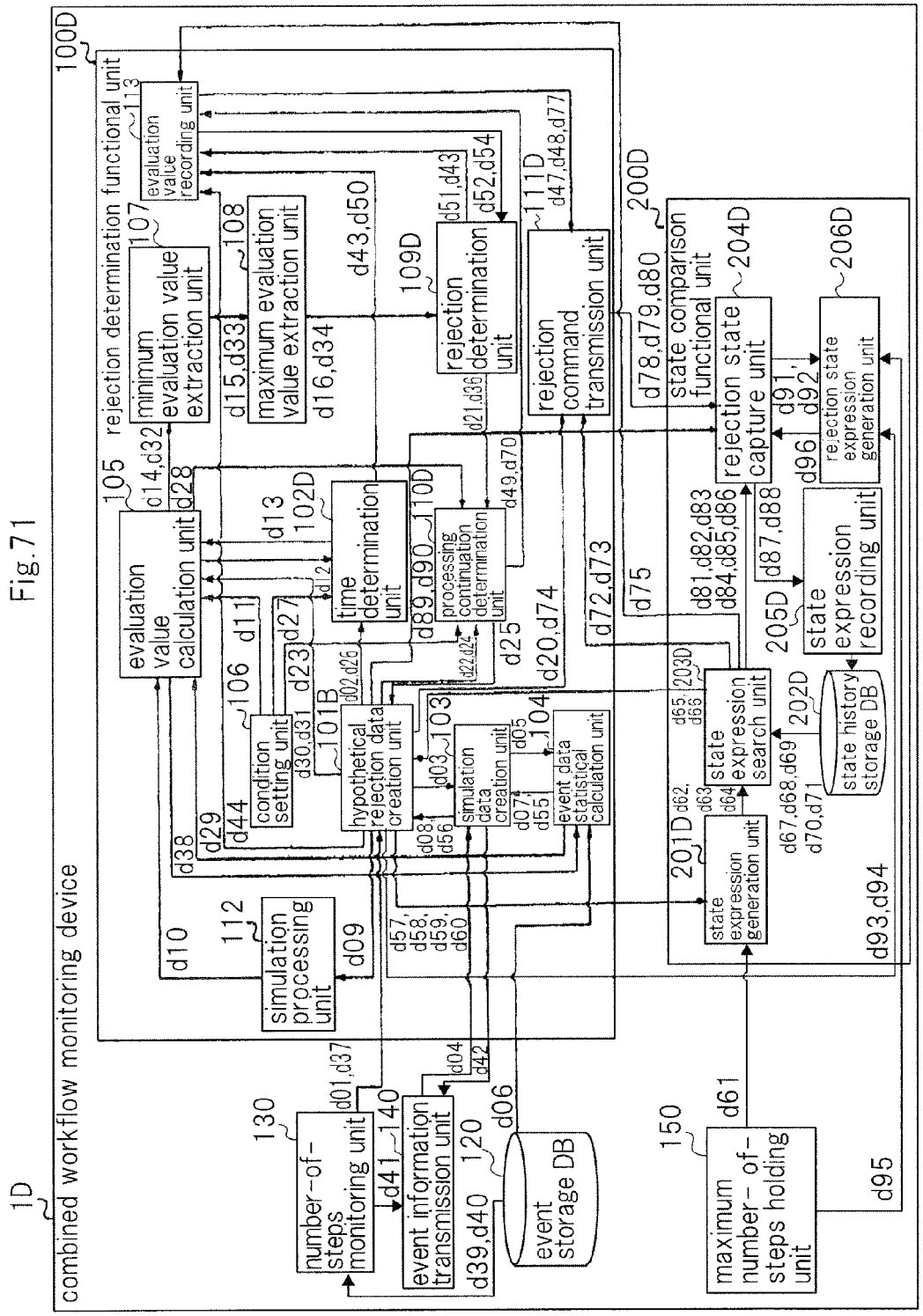
FIG. 71 is a block diagram of a combined workflow monitoring device according to the fourth exemplary embodiment of the present invention.

FIG. 71 is a block diagram showing the general configuration of a combined workflow monitoring device according to a fourth exemplary embodiment of the present invention. Rejection determination functional unit 100D in the fourth embodiment of the present invention has the same configuration as rejection determination functional unit 100C in the third exemplary embodiment of the present invention. However, since the approach of the present invention does not depend on a rejection determination method, rejection determination functional unit 100D may employ the same configuration as rejection determination functional units 100A or 100B in the first and second exemplary embodiments of the present invention. Further, in the fourth exemplary embodiment of the present invention, state comparison functional unit 200D may be included in rejection determination functional unit 100D.

Combined workflow monitoring device 1D of this exemplary embodiment comprises event storage DB 120, number-of-steps monitoring unit 130, event information transmission unit 140, maximum number-of-steps holding unit 150, rejection determination functional unit 100D, and state comparison functional unit 200D. Event storage DB 120 coordinates and associates event data related to each combined workflow with one another, and stores the associated event data. Number-of-steps monitoring unit 130 calculates the number of steps, which is indicative of the degree of the progress of each combined workflow, from the event data stored in event storage DB 120, and monitors and retains the calculated number of steps. Event information transmission unit 140, in response to a request, retrieves data representative of the current situation in which a combined workflow is executed, using the number of steps from number-of-steps monitoring unit 130, and transmits the data to rejection determination functional unit 100D. Maximum number-of-steps holding unit 150 retains a maximum number of steps which can be taken by a combined workflow that belongs to each combined workflow definition ID on a per combined workflow definition ID basis. Rejection determination functional unit 100D retrieves information from event storage DB 120, number-of-steps monitoring unit 130, and event information transmission unit 140 and performs a rejection determination.

Number-of-steps monitoring unit 130 monitors event storage DB 120. When it newly observes a request message for or a response message to a business application, or a request message for or a response message to a workflow, number-of-steps monitoring unit 130 determines that the processing of a combined workflow has progressed and updates the number of steps that is indicative of the progress of the relevant combined workflow. Number-of-steps monitoring unit 130 also retains a combined workflow definition ID which uniquely identifies combined workflows that are subjected to the rejection determination. When the number-of-steps is updated for, in particular, a combined workflow which has the combined workflow definition ID, number-of-steps monitoring unit 130 activates hypothetical rejection data creation unit 101D in rejection determination functional unit 100D and notifies hypothetical rejection data generation unit 101D of the combined workflow definition ID.

When rejection determination functional unit 200D performs a rejection determination, and if there is any information that can be utilized by rejection determination functional unit 100D with reference to past histories, state comparison functional unit 200D has a function of providing the information. Likewise, state comparison functional unit 200D also has a function of collecting information from rejection determination functional unit 100D and retaining the same as histories in order to utilize results produced by rejection determination functional unit 100D in the future.

State comparison functional unit 200D includes state expression generation unit 201D which retrieves information on a combined workflow that is currently being executed from hypothetical rejection data creation unit 101D to generate data that represents an execution state in a straightforward format. The data that represents an execution state in a straightforward format includes such elements as an ID for uniquely identifying a combined workflow definition, the number of combined workflows aggregated on a per number-of-steps basis with respect to combined workflows that are being executed and which belong to the combined workflow definition, an average and the variance of input interval of combined workflows which belong to the combined workflow definition and which is predicted to be input in the future, and the like. Expressing these pieces of information with respect to all combined workflow definitions makes it possible to represent execution states of all combined workflows in a straightforward format that are currently being executed. Although the manner of expressing an execution state in a straightforward format is assumed to be expression in a matrix form, there is no limitation on it, and the execution state may be expressed in a combination of vectors or the like.

State comparison functional unit 200D includes state history storage DB 202D which stores in an associated manner a set of data representative of a certain execution state and a rejection-targeted combined workflow definition ID, data representative of an optimal rejection pattern so far found, an evaluation value of the data, a flag indicative of whether or not a rejection determination result has converged, the number of rejected combined workflows, and the number of steps in the rejection-targeted combined workflow used for rejection determination, and the like. Although the manner of expressing data representative of the rejection pattern is assumed to be a vector, there is no limitation on it.

State comparison functional unit 200D includes state expression search unit 203D which searches state history storage DB 202D to see whether or not it stores a combination of data representative of a certain execution state and a rejection-targeted combined workflow definition ID. When the result of the search made by state expression search unit 203D reveals that the combination of a data representative of a certain execution state and a rejection-targeted combined workflow definition ID is not stored in state history storage DB 202D, this means that no rejection determination has been pronounced in the past under the same situation as that execution state, so that the rejection determination is performed from a rejection-free state. When the result of the search made by state expression search unit 203D reveals that the combination of a data representative of a certain execution state and a rejection-targeted combined workflow definition ID is stored in state history storage DB 202D, this means that the rejection determination has been pronounced in the past for combined workflows which belong to the same combined workflow definition ID in the same situation as that execution state, so that state comparison functional unit 200D retrieves a series of data which are tied to the set of a data representative of an execution state and a rejection-targeted combined workflow definition ID. When the flag indicative of whether or not the rejection determination result has converged is set, it turns out that a similar result could be provided even if the rejection determination were again made. Therefore, it is possible to identify a combined workflow which is designated as a rejection-targeted combined workflow without pronouncing the rejection determination, if the retrieved data representative of a rejection pattern is used. On the other hand, when the flag indicative of whether or not the rejection determination result has converged is not set, a more optimal rejection pattern can be searched for by resuming the rejection determination from a state where some combined workflows have already been rejected, based on the data representative of the rejection pattern, and the number of steps in the rejection-targeted combined workflow and the rejection volume which have been used in the rejection determination, rather than again performing the rejection determination from a rejection-free state.

State comparison functional unit 200D includes rejection state capture unit 204D which collects a series of data representative of the state of rejection after a forced rejection has been performed. The collected series of data is tied to the set of data representative of an execution state and a rejection-targeted combined workflow definition ID stored in the state expression search unit 203D, and is used as basic data for storing histories in state history storage DB 202D. Further, rejection state capture unit 204D determines that the rejection determination result has converged when a rejection pattern of the forced rejection is the same as a past rejection pattern stored in state history storage DB 202D, and sets the flag indicative of whether or not the rejection determination state has converged.

State comparison functional unit 200D includes rejection state expression generation unit 206D which generates data representative of a rejection pattern from information on a forced rejection which was exercised. The manner of expressing data representative of a rejection pattern is herein assumed to be one using a vector, but there is no limitation on it.

State comparison functional unit 200D includes state expression recording unit 205D which retrieves basic data to be retained in state history storage DB 202D, and newly registers state history storage DB 202D with a series of data tied to data representative of an execution state and a rejection-targeted combined workflow definition ID, or updates the series of data.

Rejection determination functional unit 100D includes event data statistic calculation unit 104 which retrieves historical information related to each combined workflow, and performs statistic calculations and creations of predicted combined workflow input data. Event data statistic calculation unit 104 references past histories identified by the combined workflow definition ID, and calculates the number of combined workflows which have been completely processed, the number of rejected combined workflows, a past average response time, and the like. Event data statistic calculation unit 104 also performs statistic processing for past histories such as calculating a combined workflow average input interval, the variance thereof and the like, and compile the average input interval, the variance and the like of each combined workflow as combined workflow input information, and also creates the most likely combined workflow input pattern in the future as combined workflow predicted input data. The combined workflow input information, which is used as one of indexes indicative of a combined workflow input situation, is only required to list each combined workflow definition ID and the average input interval, the variance and the like tied thereto, and is used by state expression generation unit 201D. The combined workflow predicted input data is used for simulator basic data, later described. Since business application systems and workflow systems which process combined workflows may sometimes share resources, loads on the respective systems are significantly affected by other combined workflows which are being simultaneously executed. Therefore, a more precise simulation is intended by making an input prediction. The predicted combined workflow input data may be simply required to describe which combined workflow definition ID contains a combined workflow to be input, and when the combined workflow will be input.

Rejection determination functional unit 100D further includes simulation data creation unit 103 which retrieves execution situation data indicative of the current situation in which a combined workflow is being executed, retrieves predicted combined workflow input data, and creates simulator basic data which represents the current and future states of each combined workflow. The execution situation data may be simply required to indicate which combined workflow definition ID contains a currently executed combined workflow uniquely identified by a combined workflow ID, and indicate, by the number of steps, the degree to which the combined workflow is progressing. Additionally, the simulator basic data may be simply required to indicate which combined workflow definition ID contains combined workflows, the combined workflows being uniquely identified by a combined workflow ID, and being currently executed or predicted to be input, to indicate when the combined workflow will be input, and to indicate, by the number of steps, the degree to which the combined workflow is progressing. Also, when simulation data creation unit 103 receives combined workflow input information, simulation data creation unit 103 notifies hypothetical rejection data creation unit 101D, later described, of the combined workflow input information.

Rejection determination functional unit 100D further includes hypothetical rejection data creation unit 101D. Hypothetical rejection data creation unit 101D retrieves a combined workflow definition ID that identifies combined workflows subjected to the rejection determination, and further retrieves the simulator basic data and combined workflow input information. After notifying state comparison functional unit 200D of the foregoing information, hypothetical rejection data creation unit 101D retrieves a rejection volume and a number-of-steps reference value for narrowing down the rejection-targets, and creates simulator data which excludes from the simulator basic data hypothetically rejected combined workflows, the number of which is equal to the rejection volume. When hypothetically rejecting combined workflows, hypothetical rejection data creation unit 101D extracts, from combined workflows that are being executed, those combined workflows, the degrees of progress of which are equal to or lower than a certain reference, as expressed by the number of steps, and considers all possible combinations of combined workflows, the number of which is equal to the rejection volume, which are to be rejected from the extracted ones. Hypothetical rejection data creation unit 101D does not designate all combined workflows which are being executed as combined workflows which are subjected to rejection, but restricts the combined workflows which are subjected to rejection to those which have the degrees of progress, expressed by the number of steps, which are equal to or lower than the certain reference. Accordingly, the rejection determination can be performed more efficiently and in a shorter time. To this end, hypothetical rejection data creation unit 101D stores a number-of-steps reference value for narrowing down combined workflows to be subjected to rejection, the number of combined workflows to be subjected to rejection, the number of combined workflows to be hypothetically rejected, and the number of combinations of combined workflows, the number of which is equal to the number of combined workflows to be hypothetically rejected, which are selected from the combined workflows to be subjected to rejection. Since simulator data of the number of combinations is created, hypothetical rejection data creation unit 101D also stores a management table which establishes a link between simulator data and a combined workflow ID that contains a combined workflow that the simulator data has hypothetically rejected. The combined workflow simulator data may be simply required to indicate which combined workflow definition ID contains combined workflows, the combined workflows being uniquely identified by a combined workflow ID, and being currently executed or predicted to be input, to indicate when the combined workflow will be input, and to indicate, by the number of steps, the degree to which the combined workflow is progressing, or whether the combined workflow will be rejected.

Upon acquisition of the number-of-steps reference value for narrowing down workflows to be rejected from processing continuation determination unit 110D, later described, hypothetical rejection data creation unit 101D increments the number of combined workflows to be hypothetically rejected by one from the retained number of combined workflows to be rejected, and again performs the rejection determination process. Stated another way, since the agreed service level that is concluded between the service provider and the service coordinator cannot be satisfied with the number of workflows to be hypothetically rejected which was determined at the preceding time, hypothetical rejection data creation unit 101D determines whether or not the agreed service level that is concluded between the service provider and the service coordinator can be satisfied by increasing by one the number of combined workflows to be hypothetically rejected.

When again performing the rejection determination process with the number of combined workflows to be hypothetically rejected being increased by one, hypothetical rejection data creation unit 101D, which stores the simulator basic data, again retrieves the simulator basic data, and determines whether or not there is a difference between the number-of-steps included in the again retrieved simulator basic data and the number-of-steps included in the stored simulator basic data. If there is a difference, in order to show that there are changes in the degrees of progress of combined workflows that are being executed; hypothetical rejection data creation unit 101D resets the number of combined workflows to be hypothetically rejected to zero, and continues the rejection determination process in a new situation, using the again retrieved simulator basic data indicative of the current situation.

Rejection determination functional unit 100D further includes simulation processing unit 112 which predicts the response time of each combined workflow once it is applied with data, expressed by the number-of-steps, indicative of the degree and the time at which a combined workflow uniquely identified by a combined workflow ID is progressing, or when it will be rejected. Simulation processing unit 112 creates and outputs a simulation result list which enumerates a combined workflow uniquely identified by a combined workflow ID, a combined workflow definition ID to which the combined workflow belongs, and the response time of the combined workflow.

Rejection determination functional unit 100D further includes condition setting unit 106 which retains a rejection determination condition that is dependent upon information on the agreed service level that is concluded between a service provider and a service coordinator. Condition setting unit 106 retains a time limit for performing the rejection determination. Condition setting unit 106 also retains an evaluation value calculation function which is created on the basis of the information on the agreed service level that is concluded between the service provider and the service coordinator. The evaluation value calculation function has variables for determining the agreed service level, such as a processing time, an average processing time, a rejection ratio and the like of a combined workflow. The evaluation value calculation function is defined such that the higher the evaluation value that is calculated from the evaluation value calculation function, the more frequently the agreed service level will be satisfied. The evaluation value calculation function need not necessarily be defined with a mathematical expression, but may be described with a computer program format. Condition setting unit 106 also retains an agreed service level determination threshold. When an evaluation value that is calculated from the evaluation value calculation function exceeds the agreed service level determination threshold, then condition setting unit 106 determines that the agreed service level that is concluded between the service provider and the service coordinator has been satisfied.

Rejection determination functional unit 100D further includes time determination unit 102D which retrieves a determination start notification and a time limit for performing the rejection determination and retains a rejection determination end time. Upon receipt of a time limit determination request, time determination unit 102D retrieves the current time, and compares the rejection determination end time with the current time to determine whether or not the rejection determination could have been completed within the time limit.

Rejection determination functional unit 100D further includes evaluation value calculation unit 105 which extracts a combined workflow ID which has a combined workflow definition ID that is subjected to the rejection determination, from the simulation result list, and calculates an evaluation value using the evaluation value calculation function based on the response time, the average response time, and the rejection ratio for the combined workflow definition ID to create an evaluation value list. Evaluation value calculation unit 105 retains the number of combinations of simulations. After creating an evaluation value list for the results of respective simulations of the number of combinations, evaluation value calculation unit 105 notifies time determination unit 102D of the time limit determination request to ascertain whether or not a process has been completed within the defined time limit. When the process has been completed within the defined time limit, rejection determination functional unit 100D continues the process. However, when the process cannot be completed within the defined time limit, rejection determination functional unit 100D queries evaluation value recording unit 113, later described, to ascertain whether or not a maximum evaluation value is retained therein.

Rejection determination functional unit 100D further includes minimum evaluation value extraction unit 107 which extracts a minimum value from each evaluation value list based on the evaluation value lists of the number equal to the number of combinations, and creates a minimum value list which enumerates the minimum values of the number equal to the number of combinations in list form.

Rejection determination functional unit 100D includes maximum evaluation value extraction unit 108 which extracts a maximum value from minimum values of the number equal to the number of combinations, based on the minimum value list. The maximum value implies that when combined workflows of the number equal to the number of combinations are hypothetically rejected from among those combined workflows which are being executed and which present the number-of-steps equal to or less than the number-of-steps reference value for narrowing down combined workflows to be rejected, evaluation values for combined workflows that were not rejected, can be set to at least the maximum value.

Rejection determination functional unit 100D further includes rejection determination unit 109D which retrieves the maximum evaluation value, and compares the retrieved maximum evaluation value with a maximum evaluation value retained in evaluation value recording unit 113, later described, to determine which presents a larger maximum evaluation value. When the retrieved maximum evaluation value is larger than the maximum evaluation value retained in evaluation value recording unit 113, later described, rejection determination unit 109D determines that an agreed service level that is concluded between a service provider and a service coordinator will be further improved if combined workflows, the number of which is equal to a hypothetical rejection volume, currently subjected to the rejection determination, are rejected from among combined workflows that are being executed, and notifies evaluation value recording unit 113, later described, of the maximum evaluation value retained therein to update the maximum evaluation value. On the other hand, when the retrieved value of the maximum evaluation value is smaller than the maximum evaluation value retained in evaluation value recording unit 113, later described, rejection determination unit 109D determines that the agreed service level that is concluded between the service provider and the service coordinator cannot be further improved even by rejecting combined workflows, the number of which is equal to the hypothetical rejection volume, currently subjected to the rejection determination, from among the combined workflows that are being executed, as compared with the case of rejecting combined workflows, the number of which is equal to the rejection volume, which gives the maximum evaluation value retained in evaluation value recording unit 113, later described.

Rejection determination functional unit 100D further includes processing continuation determination unit 110D which retrieves the number of combined workflows that are subjected to rejection, and the number of hypothetically rejected combined workflows, and determines whether or not the rejection determination process can be continued by further increasing the number of hypothetically rejected combined workflows. When determining that the number of hypothetically rejected combined workflows cannot be increased, processing continuation determination unit 110D sets the flag for determining whether or not the rejection determination result has converged, notifies evaluation value recording unit 113, later described, of the flag, and terminates the series of rejection determination processing operations. On the other hand, when determining that the number of combined workflows to be hypothetically rejected can be increased, processing continuation determination unit 110D retrieves the number-of-steps reference value for narrowing down combined workflows to be rejected. When the number-of-steps reference value includes a code set therein which indicates that all of the combined workflows that are being executed should not be rejected, processing continuation determination unit 110D retrieves the evaluation value list and the agreed service level determination threshold in order to newly set the number-of-steps reference value, extracts from the combined workflows that are being executed a combined workflow which cannot satisfy the agreed service level and which has the largest number of steps, i.e., a combined workflow which cannot satisfy the agreed service level and exhibits the most advanced processing progress, and sets the number-of-steps in this combined workflow to the number-of-steps reference value. On the other hand, when a value has been already retained in the retrieved number-of-steps reference value, processing continuation determination unit 110D designates this value as the number-of-steps reference value. Processing continuation determination unit 110D notifies hypothetical rejection data creation unit 101D of the number-of-steps reference value.

Rejection determination functional unit 100D further includes rejection command transmission unit 111D which transmits, when a maximum evaluation value is received, a command for executing a forced rejection to the relevant combined workflows to be subjected to the rejection. When rejection command transmission unit 111D receives the flag for determining whether or not the rejection determination result has converged, it notifies the flag as it is, but when rejection command transmission unit 111D does not receive the flag for determining whether or not the rejection determination result has converged, it determines that the rejection determination result has not converged, and notifies the flag.

Rejection determination functional unit 100D further includes evaluation value recording unit 113 which receives maximum evaluation values and retains and records the best maximum evaluation value in the rejection determinations so far pronounced. Evaluation value recording unit 113 ascertains whether or not the maximum evaluation value retained therein when the time limit is reached. When it does not retain the maximum evaluation value, evaluation value recording unit 113 terminates the series of processing operations, and notifies the retained maximum evaluation value e. Simultaneously, when evaluation value recording unit 113 has received the flag for determining whether or not the rejection determination result has converged, it notifies the flag.

Figure 72:
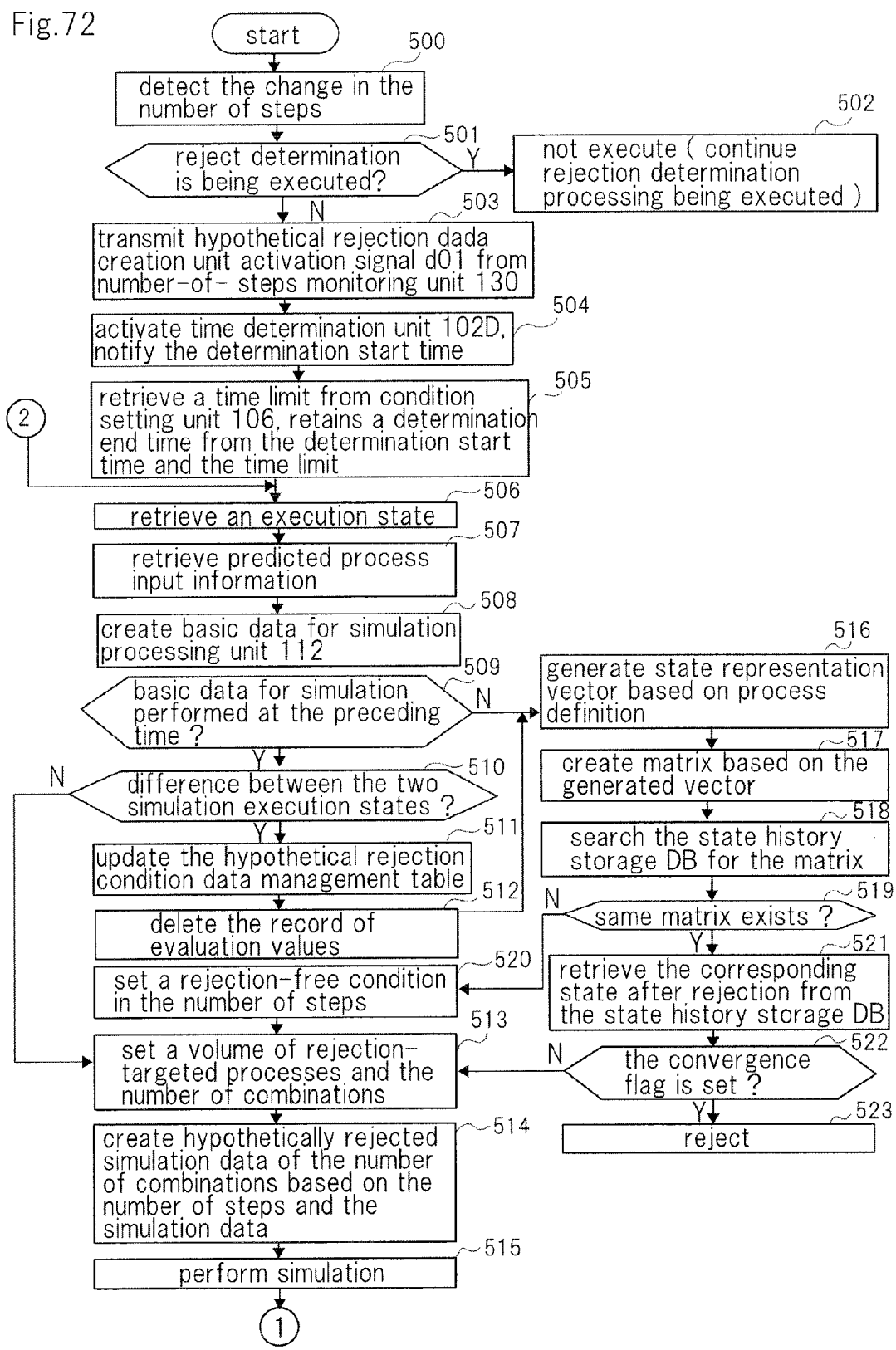
FIG. 72 is a flow chart showing the operation of the combined workflow monitoring device of the fourth exemplary embodiment.
Figure 73:
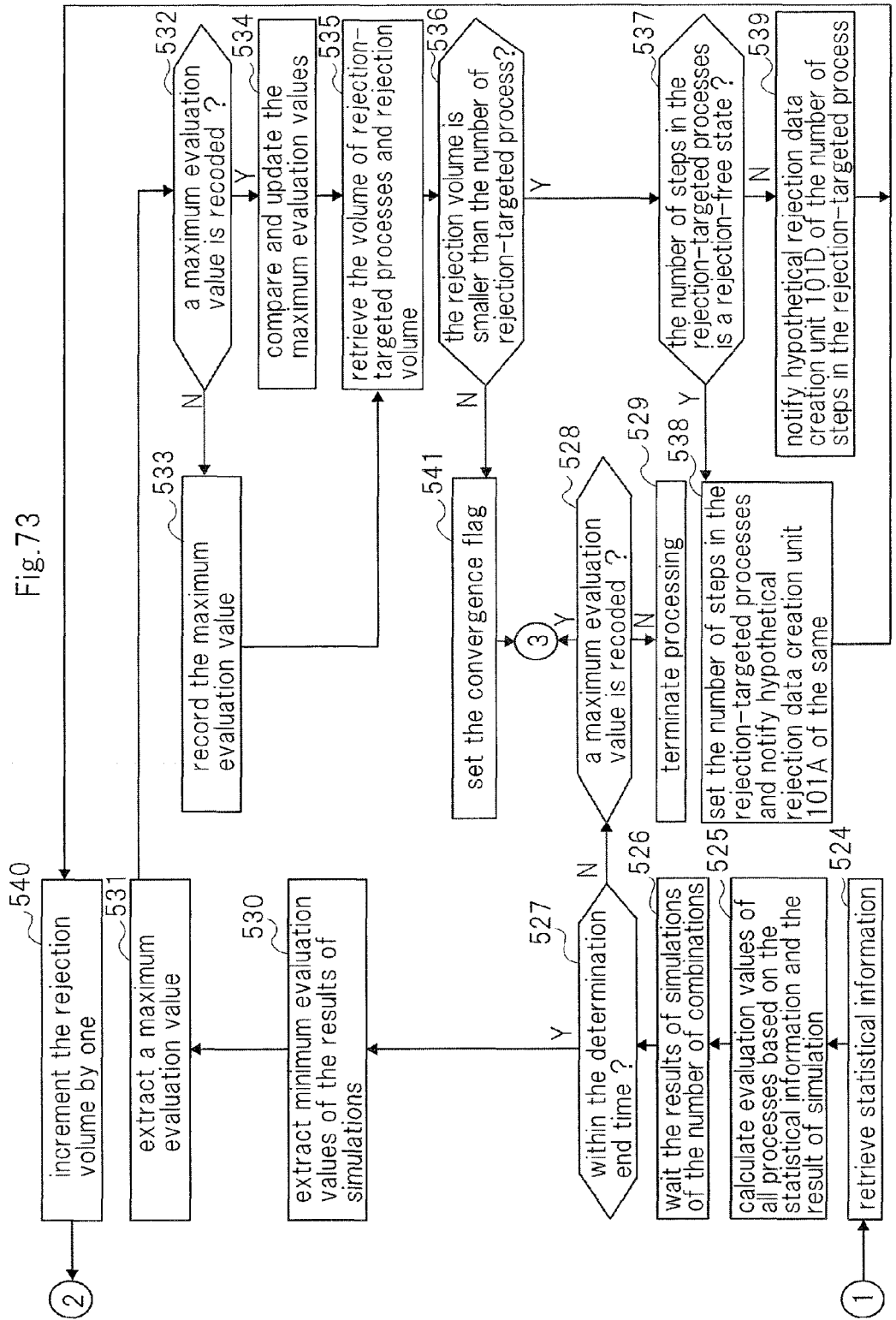
FIG. 73 is a flow chart showing the operation of the combined workflow monitoring device of the fourth exemplary embodiment.

Next, the operation of the fourth exemplary embodiment of the present invention will be described in detail with reference to FIG. 71 and flow charts of FIGS. 72, 73, and 74.

Number-of-steps monitoring unit 130 retains combined workflow definition IDs which uniquely identify combined workflows that are subjected to rejection determination, and always monitors event storage DB 120. When it newly detects event data d39, d40 related to a request message for or a response message to a business application, as well as to a request message for or a response message to a workflow, then number-of-steps monitoring unit 130 updates execution state management table T00100 stored therein. When it detects event data for a request message for or a response message to a combined workflow which, in particular, has a combined workflow definition ID, number-of-steps monitoring unit 130 causes rejection determination functional unit 100D to start the rejection determination process (step 500).

When it detects event data d39, d40 for a request message for or a response message to a combined workflow which has a combined workflow definition ID, number-of-steps monitoring unit 130 determines whether or not hypothetical rejection data creation unit 101D is active (step 501). When hypothetical rejection data creation unit 101D is active, number-of-steps monitoring unit 130 does not newly make a rejection determination because a rejection determination process is already being executed (step 502). When hypothetical rejection data creation unit 101D is not activated, number-of-steps monitoring unit 130 notifies hypothetical rejection data creation unit 101D of hypothetical rejection dada creation unit activation signal d01. Number-of-steps monitoring unit 130 also notifies hypothetical rejection data creation unit 101D of combined workflow definition ID d37 for identifying combined workflows which are subjected to the rejection determination (step 503).

Hypothetical rejection data creation unit 101D is activated in response to the receipt of hypothetical rejection data creation unit activation signal d01, and creates hypothetical rejection condition data management table T00700 when activated. Hypothetical rejection data creation unit 101D sets combined workflow definition ID d37 received from number-of-steps monitoring unit 130 into rejection-targeted combined workflow definition ID field T00706. Please note that, at this stage, no values are set into rejection-targeted combined workflow volume field T00703, number-of-combinations field T00704, rejection volume filed T00702, and the number of steps in the rejection-targeted combined workflow field T00705. Hypothetical rejection data creation unit 101D notifies simulation data creation unit 103 of simulation data creation unit activation signal d03. Hypothetical rejection data creation unit 101D notifies time determination unit 102D of time determination unit activation signal d02 and determination start time notification d26 to set a rejection determination processing end time. Time determination unit 102D notifies evaluation value recording unit 113 of evaluation value recording unit activation signal d43. Evaluation value recording unit 113 is activated in response to the receipt of evaluation value recording unit activation signal d43 (step 504).

Time determination unit 102D is activated in response to the receipt of time determination unit activation signal d02. Time determination unit 102D retrieves time limit d27 from condition setting unit 106, calculates a determination end time based on the time at which it received determination start time notification d26, and retains the determination end time (step 505).

Condition setting unit 106 retains information about conditions for performing the rejection determination based on the agreed service level that is concluded between the service provider and the service coordinator. Condition setting unit 106 defines an evaluation value calculation function which is set based on the agreed service level information. The evaluation value calculation function is defined to have variables which include a combined workflow response time, a combined workflow average response time, and a rejection ratio which are dictated by the agreed service level. The evaluation value calculation function may be arbitrarily defined, but it is defined such that the larger the value derived from the evaluation value function, the more frequently will the agreed service level be satisfied. Also, the evaluation value calculation function need not be described with a mathematical description, but may be described with a program description. Condition setting unit 106 also defines an agreed service level determination threshold for determining the agreed service level. The agreed service level determination threshold is determined by the evaluation value calculation function. The agreed service level determination threshold is an index value for determining that the agreed service level that is concluded between the service provider and the service coordinator is satisfied when the agreed service level determination threshold is exceeded by a value which is calculated by using a combined workflow response time, a combined workflow average response time, and a rejection ratio, that are found through a simulation, and by substituting them into the evaluation value calculation function.

Simulation data creation unit 103 is activated in response to the receipt of simulation data creation unit activation signal d03. Simulation data creation unit 103 notifies event information transmission unit 140 of execution state query signal d42. Event information transmission unit 140 retrieves execution state management table T00100 (d41) from number-of-steps monitoring unit 130, and notifies simulation data creation unit 103 of execution state management table T00100 (d04). Simulation data creation unit 103 notifies event data statistical calculation unit 104 of event data statistical calculation unit activation signal d05 (step 506).

Event data statistical calculation unit 104 is activated in response to the receipt of event data statistical calculation unit activation signal d05. Event data statistical calculation unit 104 retrieves event information d06 from event storage DB 120, performs statistical processing for past histories, such as calculating the combined workflow average input interval, the variance thereof and the like, and creates the combined workflow input pattern that is most likely in the future as predicted combined workflow input management table T00200. Event data statistical calculation unit 104 notifies simulation data creation unit 103 of predicted combined workflow input management table T00200 (d07) (step 507).

FIG. 75 shows an exemplary structure of combined workflow input information management table T01200. In this exemplary structure, an average input interval and its variance are intended for the combined workflow input information, by way of example. Combined workflow input information management table T01200 is a table having combined workflow definition ID field T01201 as a key, and is used to manage an average input interval of a combined workflow which belongs to a relevant combined workflow definition ID, and the variance of the input interval through the use of average input interval field T01202 and variance field T01203, respectively.

Simulation data creation unit 103 creates simulation basic data management table T00900 based on predicted combined workflow input management table T00200 received from event data statistical calculation unit 104, and execution state management table T00100. Simulation data creation unit 103 notifies hypothetical rejection data creation unit 101D of simulation basic data management table T00900 (d08) and combined workflow input information management table T01200 (d56) received from event data statistic calculation unit 104 (step 508).

Hypothetical rejection data creation unit 101D ascertains whether or not it retains basic data management table T00900' for the simulation performed at the preceding time (step 509).

When simulation basic data management table T00900' is not retained in hypothetical rejection data creation unit 101D, hypothetical rejection data creation unit 101D ascertains whether or not state expression generation unit 201D is active. When state expression generation unit 201D is not activated, hypothetical rejection data creation unit 101D notifies state expression generation unit 201D of state expression generation unit activation signal d57. Hypothetical rejection data creation unit 101D further notifies state expression generation unit 201D of simulation basic data management table T00900 (d58), combined workflow input information management table T01200 (d59), and rejection-targeted combined workflow definition ID (d60).

State expression generation unit 201D is activated in response to the receipt of state expression generation unit activation signal d57. After being activated, state expression generation unit 201D retrieves, from maximum number-of-steps holding unit 150, a maximum number of steps (d61) which can be taken by combined workflows that are being executed in all combined workflow definitions. For example, assuming that there are three combined workflow definitions, and when maximum number-of-steps holding unit 150 records that the number of steps up to three can be taken for a first combined workflow definition; up to six for a second combined workflow definition; and up to four for a third combined workflow definition, then state expression generation unit 201D retrieves the largest number of steps, i.e., six. State expression generation unit 201D generates state expression vector V00100 which represents, on a per-combined workflow definition basis, a combined workflow definition ID, the number of combined workflows aggregated on a per-number-of-steps basis with respect to combined workflows which belong to the combined workflow definition, and statistic information (average input interval and its variance) related to the combined workflow definition, based on simulation basic data management table T00900 and combined workflow input information management table T01200 received from hypothetical rejection data creation unit 101D (step 516).

FIG. 76 shows an exemplary array of state expression vector V00100. In this exemplary array, when n indicates the number of vector elements, vector element v1 is expressed by the combined workflow definition ID; vector elements v2 to vn-2 each by the number of combined workflows on a per-number-of-steps basis; vn-1 by the average input interval; and vn by the variance. Please noted that, when generating this state expression vector V00100, in order to match the number n of vector elements of each combined workflow definition ID, the number of combined workflows is aggregated up to a maximum number of steps which can be taken by combined workflows that are being executed in all of previously retrieved combined workflow definitions. For example, assuming that the maximum number of steps retrieved from maximum number-of-steps holding unit 150 is six, and a maximum number of steps that can be taken for a combined workflow definition ID currently being processed is equal to three, then state expression generation unit 201D assumes that the number of steps which can be hypothetically taken ranges from four to six, and concludes that there is no combined workflow which is being executed and which has the number of steps in the range of four to six).

State expression generation unit 201D performs the processing related to step 516 for all combined workflow definitions, and aggregates each state expression vector to create state expression matrix M00100 (step 517).

FIG. 77 shows an exemplary sequence of state expression matrix M00100. When there are m number of combined workflow definition IDs, m number of state expression vectors are created. These vectors are queued in order from the smallest combined workflow definition ID, as V1, V2, . . . , Vm, and they are collectively expressed as a single state expression matrix in the shown example.

State expression generation unit 201D notifies state expression search unit 203D of state expression search unit activation signal d62, and notifies state expression search unit 203D of state expression matrix M00100 (d63), and rejection-targeted combined workflow definition ID (d64) retrieved from hypothetical rejection data creation unit 101D.

State expression search unit 203D is activated in response to the receipt of state expression search unit activation signal d62 from state expression generation unit 201D. State expression search unit 203D searches state history storage DB 202D based on state expression matrix M00100 and rejection-targeted combined workflow definition ID received from state expression generation unit 201D to see whether or not similar combinations are stored in state history storage DB 202D (step 518).

FIG. 78 shows an exemplary structure of state historical information management table T01300 retained by state history storage DB 202D. State historical information management table T01300 is a table having a combination of state expression matrix field T01301 and rejection-targeted combined workflow definition ID field T01302 as a key, and is used to manage a relevant rejection state expression vector, an evaluation value, a convergence determination flag, a rejection volume, and the number of steps in the rejection-targeted combined workflow, through the use of rejection state expression vector field T01303, evaluation value field T01304, convergence determination flag field T01305, rejection volume field T01306, and the number of steps in the rejection-targeted combined workflow field T01307, respectively. State historical information management table T01300 represents how a rejection determination result was alike, with the rejection state expression vector, the evaluation value, the convergence determination flag, the rejection volume, and the number of steps in the rejection-targeted combined workflow, when an attempt was made in the past to determine whether to reject combined workflows belonging to a rejection-targeted combined workflow definition ID in a situation where the combined workflows are expressed by a state expression matrix. It is to be noted that the state of combined workflows at the rejection determination need not be necessarily expressed by a matrix, but may be expressed, for example, by a combination of vectors.

When the combination of state expression matrix M00100 and rejection-targeted combined workflow definition ID received from state expression generation unit 201D is not stored in state history storage DB 202D, state expression search unit 203D notifies hypothetical rejection data creation unit 101D of the number of steps in the rejection-targeted combined workflow (d65) which is equal to "−1" to indicate a rejection-free state, and the rejection volume (d66) which is equal to "0" (step 520), and control proceeds to step 513, later described. Please note that that the number of steps in the rejection-targeted combined workflow need not be "−1" as long as it can indicate that any combined workflow will not be rejected when it is being executed.

When the combination of state expression matrix M00100 and rejection-targeted combined workflow definition ID received from state expression generation unit 201D is stored in state history storage DB 202D, state expression search unit 203D retrieves, from state history storage DB 202D, rejection state expression vector V00200 (d67), evaluation value (d68), convergence determination flag (d69), rejection volume (d70), the number-of-steps in the rejection-targeted combined workflow (d71), which are tied to the combination of state expression matrix M00100 and rejection-targeted combined workflow definition ID (step 521).

FIG. 79 shows an exemplary array of rejection state expression vector V00200. In this exemplary array, when n indicates the number of vector elements, vector element w1 is expressed by a combined workflow definition ID; and w2 to wn each by the number of combined workflows to be rejected on a per number-of-steps basis.

Upon acquisition of rejection state expression vector V00200 from state history storage DB 202D, state expression search unit 203D ascertains whether or not the similarly retrieved convergence determination flag is set (step 522).

When the retrieved convergence determination flag is set, state expression search unit 203D notifies rejection command transmission unit 111D of a rejection command transmission unit activation signal (d72) and rejection state expression vector V00200 (d73). Rejection command transmission unit 111D is activated in response to the receipt of the rejection command transmission unit activation signal (d72), retrieves from hypothetical rejection data creation unit 101D simulation basic data management table T00900 (d74) retained therein, and extracts a combined workflow which is associated with combined workflow definition ID field T00904 equal to the combined workflow definition ID which is the first element of rejection state expression vector V00200. In addition to that, rejection command transmission unit 111D determines a combined workflow ID to be rejected with reference to number-of-steps field T00902 in accordance with the number of combined workflows to be rejected on a per number-of-steps basis in rejection state expression vector V00200, issues a forced rejection command to each combined workflow that is being executed and which has the relevant combined workflow ID, and terminates processing operations (step 523).

When the retrieved convergence determination flag is not set, state expression search unit 203D creates maximum evaluation value management table T01100 (d75), and notifies evaluation value recording unit 113 of the same. At this time, state expression search unit 203D sets an evaluation value retrieved from state history storage DB 202D into maximum evaluation value field T01102. State expression search unit 203D also sets "−1" into simulation ID field T01101 in maximum evaluation value management table T01100 to indicate that the evaluation value has been retrieved from state history storage DB 202D. However, a value other than "−1" may be set as long as it can indicate that the evaluation value has been retrieved from state history storage DB 202D. Evaluation value recording unit 113 retains maximum evaluation value management table T01100 (d75) received from state expression search unit 203D. State expression search unit 203D also notifies hypothetical rejection data creation unit 101D the sum of one and a rejection volume retrieved from state history storage DB 202D as the rejection volume (d66). Simultaneously, state expression search unit 203D notifies hypothetical rejection data creation unit 101D of the number of steps in the rejection-targeted combined workflow (d65), and control proceeds to step 513, later described.

When hypothetical rejection data creation unit 101D retains simulation basic data management table T00900', hypothetical rejection data creation unit 101D compares combined workflow ID field T100901 in newly received simulation basic data management table T00900 (d08) with combined workflow ID field T00901' in basic data management table T00900' for the simulation performed at the preceding time in order to determine whether or not a change has been made in the situation of combined workflows that are being execution during the rejection determination. Likewise, hypothetical rejection data creation unit 101D compares number-of-steps field T00902 in newly received simulation basic data management table T00900 with number-of-steps field T00902' in basic data management table T00900' for the simulation performed at the preceding time (step 510). When a difference results from the comparison, this means that a change has been made in the processing progress of the combined workflows that are being executed during the rejection determination, so that hypothetical rejection data creation unit 101D again ascertains whether or not the same execution situation occurred in the past. Hypothetical rejection data creation unit 101D updates hypothetical rejection condition data management table T00700, and sets a combined workflow definition ID d37 received from number-of-steps monitoring unit 130 into rejection-targeted combined workflow definition ID field T00706 (step 511). When a difference results from the comparison, hypothetical rejection data creation unit 101D notifies evaluation value recording unit 113 of rejection determination start notification d44. Upon receipt of rejection determination start notification d44, evaluation value recording unit 113 deletes all information on maximum evaluation values retained therein (step 512). Hypothetical rejection data creation unit 101D further ascertains whether or not state expression generation unit 201D is active. When state expression generation unit 201D is not activated, hypothetical rejection data creation unit 101D notifies state expression generation unit 201D of state expression generation unit activation signal d57. Hypothetical rejection data creation unit 101D notifies state expression generation unit 201D of simulation basic data management table T00900 (d58), combined workflow input information management table T01200 (d59), and rejection-targeted combined workflow definition ID (d60), and control proceeds to processing at step 516.

Hypothetical rejection data creation unit 101D receives the rejection volume (d66) and the number of steps in the rejection-targeted combined workflow (d65) from state expression search unit 203D, and sets the received rejection volume into rejection volume field T00702, and the received number of steps in the rejection-targeted combined workflow into the number of steps in the rejection-targeted combined workflow field T00705 in hypothetical rejection condition data management table T0700, respectively. Hypothetical rejection data creation unit 101D retains simulation basic data management table T00900. Hypothetical rejection data creation unit 101D compares number-of-steps field T00902 in simulation basic data management table T00900 with the number of steps in the rejection-targeted combined workflow retained in the number of steps in the rejection-targeted combined workflow field T00705 in hypothetical rejection condition data management table T00700 for combined workflows that are being executed. Hypothetical rejection data creation unit 101D calculates the number of combined workflow ID fields T00901 which are associated with number-of-steps field T00902, the value of which is equal to or less than the number of steps in the rejection-targeted combined workflow and which are associated with combined workflow definition ID field T00904 that matches rejection-targeted combined workflow definition ID field T00706, and retains the calculated number in rejection-targeted combined workflow volume field T00703. This number indicates the number of combined workflows which are subjected to the rejection determination among combined workflows that are being executed, and which belong to a combined workflow definition that undergoes the agreed service level determination. Then, combined workflows, that are currently being executed and that have the number of steps equal to or less than the number of steps in the rejection-targeted combined workflow, are extracted from among combined workflows that are being currently executed, thereby reducing the number of combined workflows which are subjected to the rejection determination. In this way, it is possible to efficiently implement the rejection determination process in a shorter time. Next, hypothetical rejection data creation unit 101D retrieves the rejection volume from rejection volume field T00702 in hypothetical rejection condition data management table T00700, calculates the number of combinations of combined workflows, equal in number to the rejection volume, selected from the rejection-targeted combined workflow volume, and retains the number of combinations in number-of-combinations field T00704 in hypothetical rejection condition data management table T00700. After creating hypothetical rejection condition data management table T00700, hypothetical rejection data creation unit 101D ascertains whether or not evaluation value calculation unit 105 is active. When evaluation value calculation unit 105 is not activated, hypothetical rejection data creation unit 101D notifies evaluation value calculation unit 105 of evaluation value calculation unit activation signal d30. Hypothetical rejection data creation unit 101D also notifies evaluation value calculation unit 105 of hypothetical rejection condition data management table T00700 (d31) (step 513).

Evaluation value calculation unit 105 is activated in response to the receipt of evaluation value calculation unit activation signal d30 from hypothetical rejection data creation unit 101D. Evaluation value calculation unit 105 retains hypothetical rejection condition data management table T000700 (d31) notified from hypothetical rejection data creation unit 101D.

After the completion of processing at step 513, hypothetical rejection data creation unit 101D creates and retains hypothetically rejected combined workflow data management table T00600, and hypothetical rejection data management table T00800 as input data to simulation processing unit 112.

Hypothetical rejection data creation unit 101D creates, as hypothetical rejection condition data management table T000800, data which results from the exclusion of hypothetically rejected combined workflows that are being executed, the number of which is equal to the rejection volume that is retained in rejection volume field T00702, from combined workflows that are being executed and which are associated with number-of-steps field T00902 in simulation basic data management table T00900, equal to or less than the number of steps in the rejection-targeted combined workflow field T00705, and associated with combined workflow definition ID field T00904 in simulation basic data management table T00900 that matches rejection-targeted combined workflow definition ID field T00706. When some combined workflow is hypothetically rejected, hypothetical rejection data creation unit 101D sets a code indicative of rejection in number-of-steps field T00803. In this case, combined workflow ID fields T00802 of combined workflows subjected to the rejection, the number of which is equal to the rejection volume retained in rejection volume field T00702, are retained in rejected combined workflow ID fields T00604 in hypothetically rejected combined workflow data management table T00600. Hypothetical rejection data creation unit 101D eventually creates hypothetically rejected combined workflow data management tables T00600 and hypothetical rejection data management tables T00800, the number of which is equal to the number retained in number-of-combinations field T00704. Hypothetical rejection data creation unit 101D notifies simulation processing unit 112 of the created hypothetical rejection data management tables T00800 (d09), the number of which is equal to the number of combinations (step 514).

Simulation processing unit 112 performs a simulation process in accordance with hypothetical rejection data management table T00800 (d09), creates simulation result management table T00300 corresponding to each hypothetical rejection data management table T00800, and notifies evaluation value calculation unit 105 simulation result management tables T00300 (d10) (step 515).

Evaluation value calculation unit 105 receives simulation result management table T00300 (d10) from simulation processing unit 112, and notifies event data statistical calculation unit 104 of rejection-targeted combined workflow definition ID (d38) which is set in rejection-targeted combined workflow definition ID field T00706 in hypothetical rejection condition data management table T00700 retained therein. Event data statistical calculation unit 104 creates statistical information data management table T01000 for a service identified by a rejection-targeted combined workflow definition ID, based on the rejection-targeted combined workflow definition ID (d38) received from evaluation value calculation unit 105 and event information (d06), and notifies evaluation value calculation unit 105 of statistical information data management table T01000 (d29) (step 524).

After receiving statistical information data management table T01000 (d29), evaluation value calculation unit 105 receives evaluation value calculation function d11 defined by condition setting unit 106. Evaluation value calculation unit 105 calculates an evaluation value in accordance with the evaluation value calculation function, based on combined workflow predicted response time field T00303 associated with combined workflow definition ID field T00304 which matches rejection-targeted combined workflow definition ID field T00706 in simulation result management table T00300, and on statistical information data management table T01000, and creates evaluation value management table T00400 (step 525).

Evaluation value calculation unit 105 waits until it creates evaluation value management tables T00400, the number of which is equal to the number of combinations which is retained in number-of-combinations field T00704 in hypothetical rejection condition data management table T00700 which is retained in evaluation value calculation unit 105. After creating all evaluation value management tables T00400, the number of which is equal to the number of combinations, evaluation value calculation unit 105 transmits time limit determination request d12 to time determination unit 102D (step 526).

Time determination unit 102D compares the time at which it received time limit determination request d12 with the determination end time retained therein (step 527). When the time at which time limit determination request d12 was received has passed the determination end time retained by time determination unit 102D, time determination unit 102D notifies evaluation value recording unit 113 of rejection determination end notification d50. Upon receipt of rejection determination end notification d50, evaluation value recording unit 113 ascertains whether or not maximum evaluation value management table T01100 is retained (step 528). When maximum evaluation value management table T01100 is not retained, evaluation value recording unit 113 determines that no effective rejection pattern could not be searched within a predefined time period, and terminates the series of processing operations (step 529). When maximum evaluation value management table T01100 is retained, evaluation value recording unit 113 notifies rejection command transmission unit 111D of rejection command transmission unit activation signal d47 and maximum evaluation value management table T01100 (d48), and control proceeds to step 542.

When the time at which time limit determination request d12 was received has not passed the determination end time retained by time determination unit 102D, time determination unit 102D notifies evaluation value calculation unit 105 of control time determination response d13. Upon receipt of control time determination response d13, evaluation value calculation unit 105 ascertains whether or not minimum evaluation value extraction unit 107 is active. When it has not been activated, evaluation value calculation unit 105 notifies minimum evaluation value extraction unit 107 of minimum evaluation value extraction unit activation signal d32. Minimum evaluation value extraction unit 107 is activated in response to the receipt of minimum evaluation value extraction unit activation signal d32 from evaluation value calculation unit 105. Evaluation value calculation unit 105 notifies minimum evaluation value extraction unit 107 of evaluation value management tables T00400 (d14), the number of which is equal to the number of combinations, retained therein. Upon receipt of evaluation value management tables T00400 (d14), the number of which is equal to the number of combinations, minimum evaluation value extraction unit 107 extracts those evaluation value fields T00403 that have a minimum value from respective evaluation value management tables T00400, and creates minimum evaluation value management table T00500. Minimum evaluation value extraction unit 107 ascertains whether or not maximum evaluation value extraction unit 108 is active. When maximum evaluation value extraction unit 108 has not been activated, minimum evaluation value extraction unit 107 notifies maximum evaluation value extraction unit 108 of maximum evaluation value extraction unit activation signal d33. Minimum evaluation value extraction unit 107 notifies maximum evaluation value extraction unit 108 of minimum evaluation value management table T00500 (d15) (step 530).

Maximum evaluation value extraction unit 108 is activated in response to the receipt of maximum evaluation value activation signal d33 from minimum evaluation value extraction unit 107. Upon receipt of minimum evaluation value management table T00500 from minimum evaluation value extraction unit 107, maximum evaluation value extraction unit 108 extracts an evaluation value which presents the maximum value from among those evaluation values retained in minimum evaluation value field T00502, and creates maximum evaluation value management table T01100. Maximum evaluation value extraction unit 108 ascertains whether or not rejection determination unit 109D is active. When rejection determination unit 109D has not been activated, maximum evaluation value extraction unit 108 notifies rejection determination unit 109D of rejection determination unit activation signal d34. Maximum evaluation value extraction unit 108 also notifies rejection determination unit 109D of maximum evaluation value management table T01100 (d16) (step 531).

Rejection determination unit 109D is activated in response to the receipt of rejection determination unit activation signal d34 from maximum evaluation value extraction unit 108. Rejection determination unit 109D notifies evaluation value recording unit 113 of maximum evaluation value management table request signal d51. Upon receipt of maximum evaluation value management table request signal d51 from rejection determination unit 109D, evaluation value recording unit 113 ascertains whether or not a maximum evaluation value management table is retained therein (step 532).

When not retaining the maximum evaluation value management table, evaluation value recording unit 113 notifies rejection determination unit 109D of maximum evaluation value management table not-yet-retained signal d52. Upon receipt of maximum evaluation value management table not-yet-retained signal d52 from evaluation value recording unit 113, rejection determination unit 109D notifies evaluation value recording unit 113 of a maximum evaluation value management table (d16) retrieved from maximum evaluation value extraction unit 108 (d53). Upon receipt of the maximum evaluation value management table from rejection determination unit 109D, evaluation value recording unit 113 retains this maximum evaluation value management table therein. Further, rejection determination unit 109D ascertains whether or not processing continuation determination unit 110D is active. When processing continuation determination unit 110D is not activated, rejection determination unit 109D notifies processing continuation determination unit 110D of processing continuation determination unit activation signal d36. Rejection determination unit 109D notifies processing continuation determination unit 110D of maximum evaluation value management table T01100 (d21), which has been notified to evaluation value recording unit 113 (step 533).

When retaining the maximum evaluation value management table, evaluation value recording unit 113 notifies rejection determination unit 109D of the maximum evaluation value management table retained therein (d54). Upon receipt of maximum evaluation value management table d54 from evaluation value recording unit 113, rejection determination unit 109D compares a maximum evaluation value retained in maximum evaluation value field T01102 in maximum evaluation value management table (d16) with a maximum evaluation value retained in maximum evaluation value field T01102 in maximum evaluation value management table (d54), and notifies evaluation value recording unit 113 of the evaluation value management table which retains the larger maximum evaluation value (d53). Upon receipt of the maximum evaluation value management table from rejection determination unit 109D, evaluation value recording unit 113 updates the maximum evaluation value management table so far retained therein with the received maximum evaluation value management table. Rejection determination unit 109D further notifies processing continuation determination unit 110D of maximum evaluation value management table T01100 (d21), which has been notified to evaluation value recording unit 113, to (step 534).

Processing continuation determination unit 110D is activated in response to the receipt of processing continuation determination unit activation signal d36 from rejection determination unit 109D. Upon receipt of maximum evaluation value management table T01100 (d21) from rejection determination unit 109D, processing continuation determination unit 110D retrieves hypothetical rejection condition data management table T00700 (d22) retained in hypothetical rejection data creation unit 101D. Processing continuation determination unit 110D retrieves a rejection volume from rejection volume field T00702 in hypothetical rejection condition data management table T00700. Processing continuation determination unit 110D also retrieves a rejection-targeted combined workflow volume from rejection-targeted combined workflow volume field T00703 in hypothetical rejection condition data management table T00700 (step 535).

Processing continuation determination unit 110D compares the retrieved rejection volume with the rejection-targeted combined workflow volume to see which is larger. That is, processing continuation determination unit 110D determines whether or not the rejection volume can be further increased from among rejection-targeted combined workflows to find any combination of combined workflows which can be rejected (step 536). When the retrieved rejection volume is the same as the rejection-targeted combined workflow volume, then processing continuation determination unit 110D determines that even if the rejection volume is further increased from among the rejection-targeted combined workflows, there will be no combination of combined workflows which can be rejected, and sets the convergence determination flag. Processing continuation determination unit 110D notifies evaluation value recording unit 113 of rejection determination end notification d49 and convergence determination flag d76. Evaluation value recording unit 113 notifies rejection command transmission unit 111D of rejection command transmission unit activation signal d47, and notifies rejection command transmission unit 111D of maximum evaluation value management table T01100 (d48) retained therein and convergence determination flag d77, and then control proceeds to step 542, later described (step 541).

Processing continuation determination unit 110D compares the retrieved rejection volume with the rejection-targeted combined workflow volume to see which is larger. When the rejection-targeted combined workflow volume is larger than the rejection volume, processing continuation determination unit 110D determines that the rejection volume can be further increased to find a combination of combined workflows which can be rejected. Processing continuation determination unit 110D retrieves the number of steps in the rejection-targeted combined workflow from the number of steps in the rejection-targeted combined workflow field T00705 in retrieved hypothetical rejection condition data management table T00700, and ascertains whether or not the number of steps in the rejection-targeted combined workflow indicates a state where no combined workflow should be rejected (step 537). When processing continuation determination unit 110D determines that the rejection volume can be further increased to find a combination of combined workflows which can be rejected, and when the number of steps in the rejection-targeted combined workflow number indicates a state where no combined workflow should be rejected, processing continuation determination unit 110D newly sets the number of steps in the rejection-targeted combined workflow into hypothetical rejection condition data management table T00700. Processing continuation determination unit 110D retrieves agreed service level determination threshold d23 from condition setting unit 106, retrieves evaluation value management table T00400 (d28) from evaluation value calculation unit 105, and retrieves hypothetical rejection data management table T00800 (d24) from hypothetical rejection data creation unit 101D. Since this state is a state in which there are no rejection-targeted combined workflows, the number of combinations is one, i.e., there is only one evaluation value management table T00400. Processing continuation determination unit 110D compares evaluation value field T00403 in retrieved evaluation value management table T00400 with retrieved agreed service level determination threshold d23, and extracts combined workflow ID field T00402 associated with evaluation value field T00403 which is less than agreed service level determination threshold d23. Processing continuation determination unit 110D retrieves the largest number of steps in number-of-steps field T00803 in hypothetical rejection data management table T00800, based on extracted combined workflow ID field T00402 and retrieved hypothetical rejection data management table T00800. The largest number of steps thus retrieved is equal to the number of steps in the rejection-targeted combined workflow, and processing continuation determination unit 110D notifies hypothetical rejection data creation unit 101D of the number of steps in the rejection-targeted combined workflow d25 (step 538).

When processing continuation determination unit 110D determines that the rejection volume can be further increased to find a combination of combined workflows which can be rejected, and when the number of steps in the rejection-targeted combined workflow does not indicate the state where no combined workflows should be rejected (i.e., when the number of steps in the rejection-targeted combined workflow is set), processing continuation determination unit 110D notifies hypothetical rejection data creation unit 101D of number of steps in the rejection-targeted combined workflow d25 (step 539). Upon receipt of the number of steps in the rejection-targeted combined workflow d25 from processing continuation determination unit 110D, hypothetical rejection data creation unit 101D newly creates hypothetical rejection condition data management table T00700'. Specifically, hypothetical rejection data creation unit 101D sets the number of steps in the rejection-targeted combined workflow d25 into the number of steps in the rejection-targeted combined workflow field T00705' in hypothetical rejection condition data management table T00700', and rejection-targeted combined workflow definition ID field T00706 into rejection-targeted combined workflow definition ID field T000706' in hypothetical rejection condition data management table T00700', respectively. Hypothetical rejection data creation unit 101D sets into rejection volume field T00702' the sum of one and rejection volume field T00702 in hypothetical rejection condition data management table T00700 retained by hypothetical rejection data creation unit 101D. Subsequently, hypothetical rejection data creation unit 101D discards hypothetical rejection condition data management table T00700 so far retained therein, and proceeds to step 506 using newly created hypothetical rejection condition data management table T00700' (step 540).

Rejection command transmission unit 111D is activated in response to the receipt of rejection command transmission unit activation signal d47 from evaluation value recording unit 113. Upon receipt of maximum evaluation value management table T01100 (d48), rejection command transmission unit 111D checks simulation ID field T01101 to see whether or not received maximum evaluation value management table T01100 was retrieved from state history storage DB 202D (step 542).

When maximum evaluation value management table T01100 (d48) received from evaluation value recording unit 113 is one which is retrieved from state history storage DB 202D (for example, "−1" is set in simulation ID field T01101), rejection command transmission unit 111D retrieves rejection state expression vector V00200 (d73) from state expression search unit 203D. Rejection command transmission unit 111D also retrieves, from hypothetical rejection data creation unit 101D, simulation basic data management table T00900 (d74) retained therein, and extracts a combined workflow which is associated with combined workflow definition ID field T00904 equal to the combined workflow definition ID which is the first element of rejection state expression vector V00200. In addition to that, rejection command transmission unit 111D determines a combined workflow ID to be rejected with reference to number-of-steps field T00902 in accordance with the number of combined workflows to be rejected on a per number-of-steps basis in rejection state expression vector V00200, issues a forced rejection command to each combined workflow which are being executed and which has the relevant combined workflow ID. Further, when convergence determination flag d77 has not been received from evaluation value recording unit 113, rejection command transmission unit 111D sets the convergence determination flag, notifies rejection state capture unit 204D of rejection state capture unit activation signal d78, and notifies the same of maximum evaluation value management table T01100 (d79) and convergence determination flag d80 (step 543).

Rejection state capture unit 204D is activated in response to the receipt of rejection state capture unit activation signal d78. When maximum evaluation value management table T01100 received from rejection command transmission unit 111D is one that is retrieved from state history storage DB 202D (for example, "−1" is set in simulation ID field T01101), rejection state capture unit 204D retrieves, from state expression search unit 203D, state expression matrix M00100 (d81), rejection-targeted combined workflow definition ID (d82), rejection state expression vector V00200 (d83), evaluation value (d84), rejection volume (d85), and the number of steps in the rejection-targeted combined workflow (d86), which are tied to the combination of state expression matrix M00100 and the rejection-targeted combined workflow definition ID, and further sets the convergence determination flag to "1" (the convergence determination flag is set) (step 544).

Rejection state capture unit 204D creates state historical information management table T01300 based on state expression matrix M00100 (d81), rejection-targeted combined workflow definition ID (d82), rejection state expression vector V00200 (d83), evaluation value (d84), rejection volume (d85), the number of steps in the rejection-targeted combined workflow (d86), and convergence determination flag. Next, rejection state capture unit 204D notifies state expression recording unit 205D of state expression recording unit activation signal d87 and notifies the same of state historical information management table T01300 (d88). State expression recording unit 205D is activated in response to the receipt of state expression recording unit activation signal d87. State expression recording unit 205D identifies and updates a history which is uniquely determined by a combination of state expression matrix field T01301 and rejection-targeted combined workflow definition ID field T01302 which are retained in the state history storage DB, based on state historical information management table T01300 (d88) received from rejection state capture unit 204D, and then terminates the processing operations (step 545).

When maximum evaluation value management table T01100 (d48) received from evaluation value recording unit 113 is not one that is retrieved from state history storage DB 202D (for example, any value other than "−1" is set in simulation ID field T01101), rejection command transmission unit 111D retrieves a simulation ID from simulation ID field T01101 in maximum evaluation value management table T01100, and retrieves, from hypothetical rejection data creation unit 101D, hypothetically rejected combined workflow data management table T00600 (d20) which has simulation ID field T00602 that matches the retrieved simulation ID, among hypothetically rejected combined workflow data management tables T00600 retained in hypothetical rejection data creation unit 101D. Rejection command transmission unit 111D issues a forced rejection command to each combined workflow which is being executed and which has a combined workflow ID which is retained in rejected combined workflow ID field T00604 in retrieved hypothetically rejected combined workflow data management table T00600. When convergence determination flag d77 has not been received from evaluation value recording unit 113, rejection command transmission unit 111D assumes that the convergence determination flag is not set (when received, rejection command transmission unit 111D assumes that the convergence determination flag is set). Further, rejection command transmission unit 111D notifies rejection state capture unit 204D of rejection state capture unit activation signal d78, and notifies the same of maximum evaluation value management table T01100 (d79) and convergence determination flag d80 (step 546).

Rejection state capture unit 204D is activated in response to the receipt of rejection state capture unit activation signal d78. When maximum evaluation value management table T01100 received from rejection command transmission unit 111D is not one that is retrieved from state history storage DB 202D (for example, any value other than "−1" is set in simulation ID field T01101), rejection state capture unit 204D retrieves rejection volume (d89) and the number of steps in the rejection-targeted combined workflow (d90) from hypothetical rejection data creation unit 101D. At this time, the rejection volume and the number of steps in the rejection-targeted combined workflow are retrieved from hypothetical rejection data creation unit 101D by extracting a hypothetical rejection condition ID field associated with simulation ID field T01101 in maximum evaluation value management table T01100 that matches simulation ID field T00602 in hypothetically rejected combined workflow data management table T00600, and then by retrieving the rejection volume and the number of steps in the rejection-targeted combined workflow from rejection volume field T00702 and the number of steps in the rejection-targeted combined workflow field T00705 in hypothetical rejection condition data management table T00700 which has hypothetical rejection condition ID field T00701 that matches the aforementioned hypothetical rejection condition ID field (step 547).

Next, rejection state capture unit 204D notifies rejection state expression generation unit 206D of rejection state expression generation unit activation signal d91 and maximum evaluation value management table T01100 (d92). Rejection state expression generation unit 206D is activated in response to the receipt of rejection state expression unit activation signal d91. Rejection state expression generation unit 206D retrieves hypothetically rejected combined workflow data management table T00600 (d93) and simulation basic data management table T00900 (d94) from hypothetical rejection data creation unit 101D. Rejection state expression generation unit 206D extracts a rejected combined workflow ID field associated with simulation ID field T00602 in hypothetically rejected combined workflow data management table T00600 which matches simulation ID field T01101 in maximum evaluation value management table T01100 received from rejection state capture unit 204D (the extracted rejected combined workflow ID is the ID of a combined workflow subjected to the rejection), in hypothetical rejection combined workflow data management table T00600. Next, rejection state expression generation unit 206D extracts number-of-steps field T00902 and combined workflow definition ID field T00904 associated with combined workflow ID field T00901 which matches the extracted rejected combined workflow ID in simulation basic data management table T00900. This operation reveals the combined workflow definition IDs and the number of steps of all combined workflows which are subjected to the rejection. Next, in order to determine the number of elements of rejection state expression vector V00200 which is to be created, rejection state expression generation unit 206D retrieves maximum number of steps (d95) which can be taken by the revealed combined workflow definition ID, from maximum number-of-steps holding unit 150. Based on these pieces of information, rejection state expression generation unit 206D aggregates the number of rejected combined workflows on a per number-of-steps basis up to the retrieved maximum number of steps (d95) to thereby create rejection state expression vector V00200. Rejection state expression generation unit 206D notifies rejection state capture unit 204D of generated rejection state expression vector V00200 (d96) (step 548).

After receiving rejection state expression vector V00200 (d96) from rejection state expression generation unit 206D, rejection state capture unit 204D retrieves state expression matrix M00100 (d81) and rejection-targeted combined workflow definition ID (d82) from state expression search unit 203D. Next, rejection state capture unit 204D creates state historical information management table T01300 based on state expression matrix M00100 (d81), rejection-targeted combined workflow definition ID (d82), rejection state expression vector V00200 (d96), an evaluation value retrieved from maximum evaluation value field T01102 in maximum evaluation value management table T01100, rejection volume (d89), number-of-steps in the rejection-targeted combined workflow (d90), and convergence determination flag (d80). Next, rejection state capture unit 204D notifies state expression recording unit 205D of state expression recording unit activation signal d87, and notifies the same of state historical information management table T01300 (d88). State expression recording unit 205D is activated in response to the receipt of state expression recording unit activation signal d87. State expression recording unit 205D identifies a history which is uniquely determined by a combination of state expression matrix field T01301 and rejection-targeted combined workflow definition ID field T01302 which are retained in the state history storage DB, based on state historical information management table T01300 (d88) received from rejection state capture unit 204D, updates the history when it is found and newly saves (insert) a history when no such history is found, and terminates the processing operations (step 549).

In the first exemplary embodiment, at the time when a rejection pattern is found within a time limit that satisfies an agreed service level, each combined workflow that is being executed is rejected if it falls under the rejection pattern. In the second exemplary embodiment, evaluation value recording unit 113 retains and updates maximum evaluation value management table T01100, performs the rejection determination process until a time limit is reached to find the most effective rejection pattern which satisfies the agreed service level, and rejects each combined workflow that is being executed which falls under that rejection pattern. In the third exemplary embodiment, evaluation value recording unit helps to find a rejection pattern with which any improvement is expected in an agreed service level even if the agreed service level is not achieved. In the fourth exemplary embodiment, execution states and rejection determinations are recorded, so that if a similar execution state is found, histories of past rejection results are referenced to enable a rejection to be immediately exercised when the result has converged, or a rejection pattern to be found, even when the result is not converging, to provide a higher agreed service level than past rejection results. In other words, the fourth exemplary embodiment is advantageous in rapidly finding a rejection pattern which provides a higher agreed service level by referring to past histories.

Fifth Exemplary Embodiment

Figure 95:
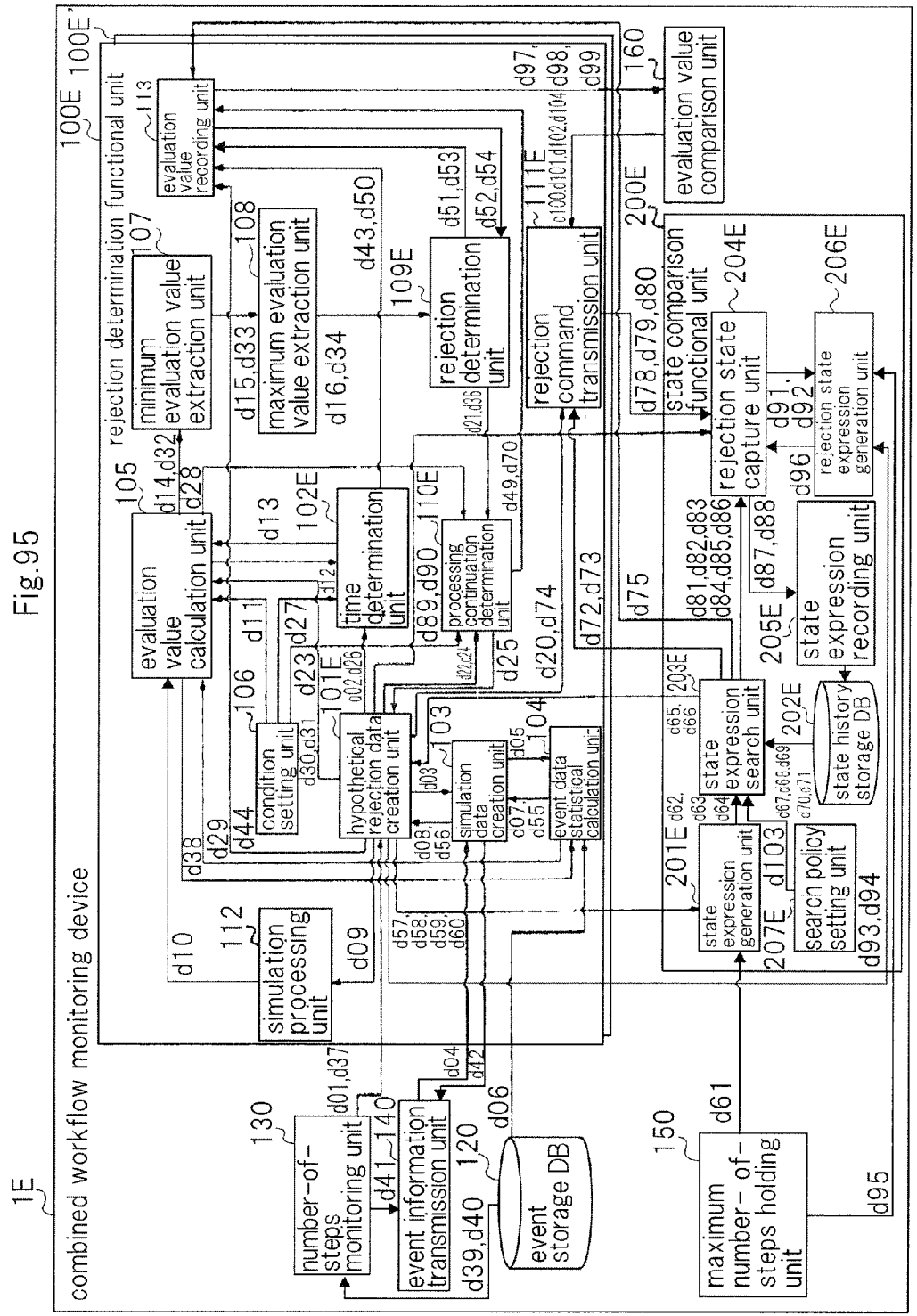
FIG. 95 is a block diagram showing a combined workflow monitoring device according to the fifth exemplary embodiment of the present invention.

FIG. 95 is a block diagram showing the general configuration of a combined workflow monitoring device according to a fifth exemplary embodiment of the present invention. Rejection determination functional unit 100E in the fifth embodiment of the present invention has the same configuration as rejection determination functional unit 100C in the third exemplary embodiment of the present invention. However, since the approach of the present invention does not depend on a rejection determination method, rejection determination functional unit 100E may employ the same configuration as rejection determination functional units 100A or 100B in the first and second exemplary embodiments of the present invention. Further, in the fifth exemplary embodiment of the present invention, state comparison functional unit 200E may be included in rejection determination functional unit 100E.

The present combined workflow monitoring device 1E comprises event storage DB 120, number-of-steps monitoring unit 130, event information transmission unit 140, maximum number-of-steps holding unit 150, evaluation value comparison unit 160, one or more rejection determination units 100E (100E'), and state comparison functional unit 200E. Event storage DB 120 coordinates and associates event data related to each combined workflow with one another, and stores the associated event data. Number-of-steps monitoring unit 130 calculates the number of steps, which is indicative of the degree of the progress of each combined workflow, from the event data stored in event storage DB 120, and monitors and retains the calculated number of steps. Event information transmission unit 140, in response to a request, retrieves data representative of the current situation in which a combined workflow is executed, using the number of steps from number-of-steps monitoring unit 130, and transmits the data to rejection determination functional unit 100D. Maximum number-of-steps holding unit 150 retains a maximum number of steps which can be taken by a combined workflow that belongs to each combined workflow definition ID on a per combined workflow definition ID basis. Evaluation value comparison unit 160 extracts the best one from evaluation values given thereto, notifies a rejection determination functional unit which gives the best evaluation value of a command for continuing a process, and simultaneously notifies the rest of rejection determination functional units of a command for terminating processing operations. Rejection determination functional unit 100E retrieves information from event storage DB 120, number-of-steps monitoring unit 130, and event information transmission unit 140 and performs a rejection determination.

Number-of-steps monitoring unit 130 monitors event storage DB 120. When it newly observes a request message for or a response message to a business application, or a request message for or a response message to a workflow, number-of-steps monitoring unit 130 determines that the processing of a combined workflow has progressed and updates the number of steps that is indicative of the progress of the relevant combined workflow. Number-of-steps monitoring unit 130 also retains a combined workflow definition ID which uniquely identifies combined workflows that are subjected to the rejection determination. When the number-of-steps is updated for, in particular, a combined workflow which has the combined workflow definition ID, number-of-steps monitoring unit 130 activates hypothetical rejection data creation unit 101E in rejection determination functional unit 100E and notifies hypothetical rejection data generation unit 101E of the combined workflow definition ID.

When rejection determination functional unit 100E performs a rejection determination, and if there is any information that can be utilized by rejection determination functional unit 100E with reference to the past histories, state comparison functional unit 200E has a function of providing the information. Likewise, state comparison functional unit 200E also has a function of collecting information from rejection determination functional unit 100E and retaining the same as histories in order to utilize results produced by rejection determination functional unit 100E in the future.

State comparison functional unit 200E includes state expression generation unit 201E which retrieves information on a combined workflow that is currently being executed from hypothetical rejection data creation unit 101E to generate data that represents an execution state in a straightforward format. The data that represents an execution state in a straightforward format includes such elements as an ID for uniquely identifying a combined workflow definition, the number of combined workflows aggregated on a per number-of-steps basis with respect to combined workflows that are being executed and which belong to the combined workflow definition, an average and the variance of input interval of combined workflows which belong to the combined workflow definition and which is predicted to be input in the future, and the like. Expressing these pieces of information with respect to all combined workflow definitions makes it possible to represent execution states of all combined workflows in a straightforward format that are currently being executed. Although the manner of expressing an execution state in a straightforward format is assumed to be expression in a matrix form, there is no limitation on it, and the execution state may be expressed in a combination of vectors or the like.

State comparison functional unit 200E includes state history storage DB 202E which stores in an associated manner a set of data representative of a certain execution state and a rejection-targeted combined workflow definition ID, data representative of an optimal rejection pattern so far found, an evaluation value for the data, a flag indicative of whether or not a rejection determination result has converged, the number of rejected combined workflows, and the number of steps in the rejection-targeted combined workflow used for rejection determination, and the like. Although the manner of expressing data representative of the rejection pattern is assumed to be a vector, there is no limitation on it.

State comparison functional unit 200E includes state expression search unit 203E which searches state history storage DB 202E to see whether or not it stores a combination of data representative of a certain execution state and a rejection-targeted combined workflow definition ID. When the result of the search made by state expression search unit 203E reveals that the combination of a data representative of a certain execution state and a rejection-targeted combined workflow definition ID is stored in state history storage DB 202E, this means that the rejection determination has been pronounced in the past for combined workflows which belong to the same combined workflow definition ID under conditions similar to that execution state, so that state comparison functional unit 200E retrieves a series of data which are tied to the set of a data representative of an execution state and a rejection-targeted combined workflow definition ID. When the flag indicative of whether or not the rejection determination result has converged is set, it turns out that a similar result could be provided even if the rejection determination were again made. Therefore, it is possible to identify a combined workflow which is designated as a rejection-targeted combined workflow without pronouncing the rejection determination, if the retrieved data representative of a rejection pattern is used. On the other hand, when the flag indicative of whether or not the rejection determination result has converged is not set, a more optimal rejection pattern can be searched for by resuming the rejection determination from a state where some combined workflows have already been rejected, based on the data representative of the rejection pattern, and the number of steps in the rejection-targeted combined workflow and the rejection volume which have been used in the rejection determination, rather than again performing the rejection determination from a rejection-free state. When the result of a search made by state expression search unit 203E reveals that the combination of a data representative of a certain execution state and a rejection-targeted combined workflow definition ID is not retained in the aforementioned state history storage DB 202E, this means that no rejection determination has been pronounced in the past under the same situation as that execution state. As such, with settings of search policy setting unit 207E, later described, a search is made to see whether or not a rejection determination has been pronounced in the past in a situation analogous to that executed state, but not in the same situation as that executed state. No particular limitations are imposed on the number of situations which are searched for a like one. When the result of the search indicates that there is no exemplary case for the same situation, another search is made in accordance with a policy set by search policy setting unit 207 for a rejection determination which has been pronounced not in the same situation, but in an analogous situation. When the result of the second search indicates that any analogous situation is not found, the rejection determination is made from a rejection-free state. On the other hand, when the result of search indicates that there is no exemplary case for the same situation, a search is made in accordance with a policy set by search policy setting unit 207 for a rejection determination which has been pronounced in an analogous situation. When an analogous situation is found as a result of the search, the rejection determination is made from a rejection-free state, and simultaneously, another rejection determination is made by retrieving a series of data which is tied to one or more sets of data representative of an execution state in which a rejection determination has been pronounced not in the same situation, but in an analogous situation, and a rejection-targeted combined workflow definition ID. When exemplary rejection determinations pronounced in an analogous situation can be retrieved in this way, it is expected that an effective rejection pattern can be found in a shorter time by utilizing the analogous situations, because a rejection pattern is anticipated to end up with similar results. However, since a rejection pattern does not always end up with a same result, an additional rejection determination is made from a rejection-free state, and evaluation value comparison unit 160 later selects the one which gives the highest evaluation value.

State comparison functional unit 200E includes rejection state capture unit 204E which collects a series of data representative of the state of rejection after a forced rejection has been performed. The collected series of data is tied to the set of data representative of an execution state and a rejection-targeted combined workflow definition ID stored in the state expression search unit 203E, and is used as basic data for storing histories in state history storage DB 202E. Further, rejection state capture unit 204E determines that the rejection determination result has converged when a rejection pattern of the forced rejection is the same as a past rejection pattern stored in state history storage DB 202E, and sets the flag indicative of whether or not the rejection determination state has converged.

State comparison functional unit 200E includes rejection state expression generation unit 206E which generates data representative of a rejection pattern from information on a forced rejection which was exercised. The manner of expressing data representative of a rejection pattern is herein assumed to be one using a vector, but there is no limitation on it.

State comparison functional unit 200E includes state expression recording unit 205E which retrieves basic data to be retained in state history storage DB 202E, and newly registers state history storage DB 202E with a series of data tied to data representative of an execution state and a rejection-targeted combined workflow definition ID, or updates the series of data.

State comparison functional unit 200E includes search policy setting unit 207E which defines a policy with which state expression search unit 203E searches state history storage DB 202E for a history which corresponds not to the same, but to an analogous situation. The policy as defined herein refers to a search volume, i.e., the number of analogous situations under which past histories are searched, a condition for regarding a situation as an "analogous situation", and the like. It is to be noted that, since a matrix or a vector is assumed as a method of expressing an execution state in a straightforward format for state history storage DB 202E, the condition for regarding as an "analogous situation" may be met by "respective elements of matrixes are similar", "a vector indicative of a current execution state is substantially the same as a vector retained in the histories in magnitude, and an angle formed by the vectors is small" and the like.

Rejection determination functional unit 100E includes event data statistic calculation unit 104 which retrieves historical information related to each combined workflow, and performs statistic calculations and creations of predicted combined workflow input data. Event data statistic calculation unit 104 references past histories identified by the combined workflow definition ID, and calculates the number of combined workflows which have been completely processed, the number of rejected combined workflows, a past average response time, and the like. Event data statistic calculation unit 104 also performs statistic processing for past histories such as calculating a combined workflow average input interval, the variance thereof and the like, and compile the average input interval, the variance and the like of each combined workflow as combined workflow input information, and also creates the most likely combined workflow input pattern in the future as combined workflow predicted input data. The combined workflow input information, which is used as one of indexes indicative of a combined workflow input situation, is only required to list each combined workflow definition ID and the average input interval, the variance and the like tied thereto. The combined workflow predicted input data is used for simulator basic data, later described. Since business application systems and workflow systems which process combined workflows may sometimes share resources, loads on the respective systems are significantly affected by other combined workflows which are being simultaneously executed. Therefore, a more precise simulation is intended by making an input prediction. The predicted combined workflow input data may be simply required to describe which combined workflow definition ID contains a combined workflow to be input, and when the combined workflow will be input.

Rejection determination functional unit 100E further includes simulation data creation unit 103 which retrieves execution situation data indicative of the current situation in which a combined workflow is being executed, retrieves predicted combined workflow input data, and creates simulator basic data which represents the current and future states of each combined workflow. The execution situation data may be simply required to indicate which combined workflow definition ID contains a currently executed combined workflow uniquely identified by a combined workflow ID, and indicate, by the number of steps, the degree to which the combined workflow is progressing. Additionally, the simulator basic data may be simply required to indicate which combined workflow definition ID contains combined workflows, the combined workflows being uniquely identified by a combined workflow ID, and being currently executed or predicted to be input, to indicate when the combined workflow will be input, and to indicate, by the number of steps, the degree to which the combined workflow is progressing. Also, when simulation data creation unit 103 receives combined workflow input information, simulation data creation unit 103 notifies hypothetical rejection data creation unit 101E, later described, of the combined workflow input information.

Rejection determination functional unit 100E further includes hypothetical rejection data creation unit 101E. Hypothetical rejection data creation unit 101E retrieves a combined workflow definition ID that identifies combined workflows subjected to the rejection determination, and further retrieves the simulator basic data and combined workflow input information. After notifying state comparison functional unit 200E of the foregoing information, hypothetical rejection data creation unit 101E retrieves a rejection volume and a number-of-steps reference value for narrowing down the rejection targets, and creates simulator data which excludes from the simulator basic data a number of hypothetically rejected combined workflows equal to the rejection volume. When hypothetically rejecting combined workflows, hypothetical rejection data creation unit 101E extracts, from combined workflows that are being executed, those combined workflows, the degrees of progress of which are equal to or lower than a certain reference, as expressed by the number of steps, and considers all possible combinations of combined workflows, the number of which is equal to the rejection volume, which are to be rejected from the extracted ones. Hypothetical rejection data creation unit 101E does not designate all combined workflows which are being executed as combined workflows which are subjected to rejection, but restricts the combined workflows which are subjected to rejection to those which have the degrees of progress, expressed by the number of steps, which are equal to or lower than the certain reference. Accordingly, the rejection determination can be performed more efficiently and in a shorter time. To this end, hypothetical rejection data creation unit 101E stores a number-of-steps reference value for narrowing down combined workflows to be subjected to rejection, the number of combined workflows to be subjected to rejection, the number of combined workflows to be hypothetically rejected, and the number of combinations of combined workflows, the number of which is equal to the number of combined workflows to be hypothetically rejected, which are selected from the combined workflows to be subjected to rejection. Since simulator data of the number of combinations is created, hypothetical rejection data creation unit 101E also stores a management table which establishes a link between simulator data and a combined workflow ID that contains a combined workflow that the simulator data has hypothetically rejected. The combined workflow simulator data may be simply required to indicate which combined workflow definition ID contains combined workflows, the combined workflows being uniquely identified by a combined workflow ID, and being currently executed or predicted to be input, to indicate when the combined workflow will be input, and to indicate, by the number of steps, the degree to which the combined workflow is progressing, or whether the combined workflow will be rejected.

Upon acquisition of the number-of-steps reference value for narrowing down workflows to be rejected from processing continuation determination unit 110E, later described, hypothetical rejection data creation unit 101E increments the number of combined workflows to be hypothetically rejected by one from the retained number of combined workflows to be rejected, and again performs the rejection determination process. Stated another way, since the agreed service level that is concluded between the service provider and the service coordinator cannot be satisfied with the number of workflows to be hypothetically rejected which was determined at the preceding time, hypothetical rejection data creation unit 101E determines whether or not the agreed service level that is concluded between the service provider and the service coordinator can be satisfied by increasing by one the number of combined workflows to be hypothetically rejected.

When again performing the rejection determination process with the number of combined workflows to be hypothetically rejected being increased by one, hypothetical rejection data creation unit 101E, which stores the simulator basic data, again retrieves the simulator basic data, and determines whether or not there is a difference between the number of steps included in the again retrieved simulator basic data and the number-of-steps included in the stored simulator basic data. If there is a difference, in order to show that there are changes in the degrees of progress of combined workflows that are being executed; hypothetical rejection data creation unit 101E continues the rejection determination process in a new situation, using the again retrieved simulator basic data indicative of the current situation.

Rejection determination functional unit 100E further includes simulation processing unit 112 which predicts the response time of each combined workflow once it is applied with data, expressed by the number-of-steps, indicative of the degree and the time at which a combined workflow uniquely identified by a combined workflow ID is progressing, or when it will be rejected. Simulation processing unit 112 creates and outputs a simulation result list which enumerates a combined workflow uniquely identified by a combined workflow ID, a combined workflow definition ID to which the combined workflow belongs, and the response time of the combined workflow.

Rejection determination functional unit 100E further includes condition setting unit 106 which retains a rejection determination condition that is dependent upon information on the agreed service level that is concluded between a service provider and a service coordinator. Condition setting unit 106 retains a time limit for performing the rejection determination. Condition setting unit 106 also retains an evaluation value calculation function which is created on the basis of the information on the agreed service level that is concluded between the service provider and the service coordinator. The evaluation value calculation function has variables for determining the agreed service level, such as a processing time, an average processing time, a rejection ratio and the like of a combined workflow. The evaluation value calculation function is defined such that the higher the evaluation value that is calculated from the evaluation value calculation function, the more frequently the agreed service level will be satisfied. The evaluation value calculation function need not necessarily be defined with a mathematical expression, but may be described with a computer program format. Condition setting unit 106 also retains an agreed service level determination threshold. When an evaluation value that is calculated from the evaluation value calculation function exceeds the agreed service level determination threshold, then condition setting unit 106 determines that the agreed service level that is concluded between the service provider and the service coordinator has been satisfied.

Rejection determination functional unit 100E further includes time determination unit 102E which retrieves a determination start notification and a time limit for performing the rejection determination and retains a rejection determination end time. Upon receipt of a time limit determination request, time determination unit 102E retrieves the current time, and compares the rejection determination end time with the current time to determine whether or not the rejection determination could have been completed within the time limit.

Rejection determination functional unit 100E further includes evaluation value calculation unit 105 which extracts a combined workflow ID which has a combined workflow definition ID that is subjected to the rejection determination, from the simulation result list, and calculates an evaluation value using the evaluation value calculation function based on the response time, the average response time, and the rejection ratio for the combined workflow definition ID to create an evaluation value list. Evaluation value calculation unit 105 retains the number of combinations of simulations. After creating an evaluation value list for the results of respective simulations of the number of combinations, evaluation value calculation unit 105 notifies time determination unit 102E of the time limit determination request to ascertain whether or not a process has been completed within the defined time limit. When the process has been completed within the defined time limit, rejection determination functional unit 100E continues processing operations. However, when the process cannot be completed within the defined time limit, rejection determination functional unit 100E queries evaluation value recording unit 113, later described, to ascertain whether or not a maximum evaluation value has been retained therein.

Rejection determination functional unit 100E further includes minimum evaluation value extraction unit 107 which extracts a minimum value from each evaluation value list based on the evaluation value lists of the number equal to the number of combinations, and creates a minimum value list which enumerates the minimum values of the number equal to the number of combinations in list form.

Rejection determination functional unit 100E includes maximum evaluation value extraction unit 108 which extracts a maximum value from minimum values of the number equal to the number of combinations, based on the minimum value list. The maximum value implies that when combined workflows of the number equal to the number of combinations are hypothetically rejected from among those combined workflows which are being executed and which present the number-of-steps equal to or less than the number-of-steps reference value for narrowing down combined workflows to be rejected, evaluation values for combined workflows that were not rejected, can be set to at least the maximum value.

Rejection determination functional unit 100E further includes rejection determination unit 109E which retrieves the maximum evaluation value, and compares the retrieved maximum evaluation value with a maximum evaluation value retained in evaluation value recording unit 113, later described, to determine which presents a larger maximum evaluation value. When the retrieved maximum evaluation value is larger than the maximum evaluation value retained in evaluation value recording unit 113, later described, rejection determination unit 109E determines that an agreed service level that is concluded between a service provider and a service coordinator will be further improved if combined workflows, the number of which is equal to a hypothetical rejection volume, currently being subjected to the rejection determination, are rejected from among combined workflows that are being executed, and notifies evaluation value recording unit 113, later described, of the maximum evaluation value retained therein to update the maximum evaluation value. On the other hand, when the retrieved value of the maximum evaluation value is smaller than the maximum evaluation value retained in evaluation value recording unit 113, later described, rejection determination unit 109E determines that the agreed service level that is concluded between the service provider and the service coordinator cannot be further improved even by rejecting combined workflows, the number of which is equal to the hypothetical rejection volume, currently being subjected to the rejection determination, from among the combined workflows that are being executed, as compared with the case of rejecting combined workflows, the number of which is equal to the rejection volume, which gives the maximum evaluation value retained in evaluation value recording unit 113, later described.

Rejection determination functional unit 100E further includes processing continuation determination unit 110E which retrieves the number of combined workflows that are subjected to rejection, and the number of hypothetically rejected combined workflows, and determines whether or not the rejection determination process can be continued by further increasing the number of hypothetically rejected combined workflows. When determining that the number of hypothetically rejected combined workflows cannot be increased, processing continuation determination unit 110E sets the flag for determining whether or not the rejection determination result has converged, notifies evaluation value recording unit 113, later described, of the flag, and terminates the series of rejection determination processing operations. On the other hand, when determining that the number of combined workflows to be hypothetically rejected can be increased, processing continuation determination unit 110E retrieves the number-of-steps reference value for narrowing down combined workflows to be rejected. When the number-of-steps reference value includes a code set therein which indicates that all of the combined workflows that are being executed should not be rejected, processing continuation determination unit 110E retrieves the evaluation value list and the agreed service level determination threshold in order to newly set the number-of-steps reference value, extracts from the combined workflows that are being executed a combined workflow which cannot satisfy the agreed service level and which has the largest number of steps, i.e., a combined workflow which cannot satisfy the agreed service level and exhibits the most advanced processing progress, and sets the number-of-steps in this combined workflow to the number-of-steps reference value. On the other hand, when a value has been already retained in the retrieved number-of-steps reference value, processing continuation determination unit 110E designates this value as the number-of-steps reference value. Processing continuation determination unit 110E notifies hypothetical rejection data creation unit 101E of the number-of-steps reference value.

Rejection determination functional unit 100E further includes rejection command transmission unit 111E which transmits, when a maximum evaluation value is received, a command for executing a forced rejection to the appropriate combined workflows to be subjected to the rejection. When rejection command transmission unit 111E receives the flag for determining whether or not the rejection determination result has converged, it notifies the flag as it is, but when rejection command transmission unit 111E does not receive the flag for determining whether or not the rejection determination result has converged, it determines that the rejection determination result has not converged, and notifies the flag. Also, when rejection command transmission unit 111E receives a command for terminating the rejection determination, it terminates the series of processing operations without transmitting a command for executing a forced rejection.

Rejection determination functional unit 100E further includes evaluation value recording unit 113 which receives maximum evaluation values and retains and records the best maximum evaluation value in the rejection determinations so far pronounced. Evaluation value recording unit 113 confirms the maximum evaluation value retained therein when the time limit is reached. Evaluation value recording unit 113 terminates the series of processing operations when it does not retain the maximum evaluation value, and notifies the retained maximum evaluation value when it retains the maximum evaluation value. Simultaneously, when evaluation value recording unit 113 has received the flag for determining whether or not the rejection determination result has converged, it notifies the flag.

Next, the operation of the fifth embodiment of the present invention will be described in detail with reference to FIG. 95 and a flow chart of FIG. 96. Please note that, since the fifth embodiment includes the same operations as those of the fourth embodiment partway, descriptions of common operations are omitted.

Initial operation of the fifth embodiment is the same as the fourth embodiment up to step 516. Specifically, the number of combined workflows is aggregated for every combined workflow definition on a per-number-of-steps basis with respect to combined workflows that are being executed when a rejection determination is pronounced. Details on a sequence of operations up to here are described in the fourth embodiment from step 500 to step 516 (step 600).

State expression generation unit 201E performs the processing related to step 600 for all combined workflow definitions, and aggregates each state expression vector to create state expression matrix M00100 (step 601).

State expression generation unit 201E notifies state expression search unit 203E of state expression search unit activation signal d62, and notifies state expression search unit 203E of state expression matrix M00100 (d63), and rejection-targeted combined workflow definition ID (d64) retrieved from hypothetical rejection data creation unit 101E.

State expression search unit 203E is activated in response to the receipt of state expression search unit activation signal d62 from state expression generation unit 201E. State expression search unit 203E searches state history storage DB 202E based on state expression matrix M00100 and rejection-targeted combined workflow definition ID received from state expression generation unit 201E to see whether or not the same combination is stored in state history storage DB 202E (step 602).

When the combination of state expression matrix M00100 received from state expression generation unit 201E and rejection-targeted combined workflow definition ID is stored in state history storage DB 202D, state expression search unit 203E may pronounce a rejection determination based on the relevant histories, subsequent processing may be all performed in a manner similar to the fourth embodiment. Thus, the process is continued from step 521 in the fourth embodiment. In regard to evaluation value comparison unit 160 which is not described in the fourth embodiment, state expression search unit 203E may simply retrieve maximum evaluation value management table T00100 (d98) from evaluation value recording unit 113 and the convergence determination flag (d99), after receiving evaluation value comparison unit activation signal (d97) from evaluation value recording unit 113, notifies rejection command transmission unit 111E of a rejection command transmission unit activation signal (d100), and then transfers maximum evaluation value management table T01100 (d101) received from evaluation value recording unit 113 and the convergence determination flag (d102) to rejection command transmission unit 111E (step 604).

When the combination of state expression matrix M00100 received from state expression generation unit 201E and rejection-targeted combined workflow definition ID is stored in state history storage DB 202E, state expression search unit 203E retrieves a search policy (d103) from search policy setting unit 207E The search policy is described from a viewpoint of how many conditions should be extracted for regarding a situation as an "analogous situation" It may be described in a computer program format. The condition for regarding as an "analogous situation" may be met by "respective elements of matrixes are similar," "a vector indicative of a current execution state is substantially the same as a vector retained in the histories in magnitude, and a small angle is formed by the vectors," and the like, but limitations are not particularly imposed thereto. State expression search unit 203E searches state history storage DB 202E in accordance with the search policy retrieved from search policy setting unit 207E to see whether state history storage DB 202E stores a history of an "analogous situation" which has the same rejection-targeted combined workflow definition ID and is similar to state expression matrix M00100 (step 605).

When state expression search unit 203E fails to find any history of an "analogous situation" which has the same rejection-targeted combined workflow definition ID and is similar to state expression matrix M00100 in accordance with the search policy retrieved from search policy setting unit 203E, the rejection determination may be made from a rejection-free state, so that subsequent processing may be all performed in a manner similar to the fourth exemplary embodiment. Thus, the process is continued from step 520 in the fourth exemplary embodiment of the present invention. Also, evaluation value comparison unit 160, which is not described in the fourth embodiment, after receiving evaluation value comparison unit activation signal (d97) from evaluation value recording unit 113, may simply retrieve maximum evaluation value management table T01100 (d98) and the convergence determination flag (d99) from evaluation value recording unit 113, notifies rejection command transmission unit 111E of rejection command transmission unit activation signal (d100), and then transfer maximum evaluation value management table T01100 (d101) and the convergence determination flag (d102) received from evaluation value recording unit 113 to rejection command transmission unit 111E (step 606).

When state expression search unit 203E successfully finds any history of an "analogous situation" which has the same rejection-targeted combined workflow definition ID and is similar to state expression matrix M00100, in accordance with the search policy retrieved from search policy setting unit 203E, state expression search unit 203E retrieves rejection volume (d70) and the number of steps in the rejection-targeted combined workflow (d71), tied to the combination of the state expression matrix indicative of the "analogous situation" and rejection-targeted combined workflow definition ID, from state history storage DB 202E. Also, the number of combinations of the rejection volume and the number of steps in the rejection-targeted combined workflow, retrieved herein, is equal to or smaller than an extraction volume determined by the search policy (step 607).

Next, in order to pronounce the rejection determination using a historical result of "analogous situation," rejection determination functional units 100E', the number of which is equal to the number of retrieved combinations are activated on a one-by-one basis. At this time, data such as each management table and the like retained in rejection determination units 100E' are all matched with data such as each management table and the like retained in initially activated rejection determination functional unit 100E (i.e., creating a number of copies of rejection determination functional unit 100E equal to the number of retrieved combinations). For each of activated rejection determination functional units 100E', a set of retrieved rejection volume (d66) and the number of steps in the rejection-targeted combined workflow (d65) is notified to respective hypothetical rejection data creation unit 101E'. Subsequently, each rejection determination functional unit 101E' continues the process from step 513 in a manner similar to the fourth embodiment based on the received rejection volume and the number of steps in the rejection-targeted combined workflow (step 608), and each rejection determination functional unit 100E' continues the process up to immediately before step 542 of the fourth embodiment (step 609).

On the other hand, in regard to originally activated rejection determination functional unit 100E, since this rejection determination functional unit 100E makes the rejection determination from a rejection-free state, rejection determination functional unit 100E sets a value indicative of the rejection-free state into the number of steps in the rejection-targeted combined workflow, notifies hypothetical rejection data creation unit 101E of the number of steps in the rejection-targeted combined workflow (d65) which is equal to "−1" and the rejection volume (d66) which is equal to "0". Please note that the number of steps in the rejection-targeted combined workflow need not be "−1" as long as it can be indicated that any combined workflow will not be rejected when it is being executed. Subsequently, since rejection determination functional unit 100E makes the rejection determination from a rejection-free state, rejection determination functional unit 100E continues the process from step 520 in a manner similar to the fourth embodiment of the present invention (step 610), and continues the process up to immediately before step 542 in the fourth embodiment of the present invention (step 611).

Evaluation value recording unit 113 included in rejection determination functional unit 100E and each evaluation value recording unit 113' included in each rejection determination functional unit 100E' ascertain whether or not evaluation value comparison unit 160 is active. When evaluation value comparison unit 160 is not activated, evaluation value recording unit 113 and 113' notify evaluation value comparison unit 160 of an evaluation value comparison unit activation signal (d97). Evaluation value recording unit 113 and each evaluation value recording unit 113' notify evaluation value comparison unit 160 of maximum evaluation value management tables T01100 (T01100') (d98) respectively retained therein and the convergence determination flag (d99), if the convergence determination flag has been received. Evaluation value comparison unit 160 waits until it receives maximum evaluation value management tables T01100 (T01100'), the number of which is equal to the number of active rejection determination functional units 100E (100E'), and after receiving maximum evaluation value management tables, the number of which is equal to the number of active rejection determination functional units 100E (100E'), extracts maximum evaluation value management table T01100 (T01100') which presents the highest maximum evaluation value and the convergence determination flag corresponding thereto (step 612).

Evaluation value comparison unit 160 notifies the rejection determination functional unit which has provided the maximum evaluation value management table that presents the highest maximum evaluation value, of rejection command transmission unit activation signal (d100), and notifies the rejection determination functional unit of extracted maximum evaluation value management table (d101) and convergence determination flag (d102), if the convergence determination flag has been received. On the other hand, evaluation value comparison unit 160 notifies the remaining rejection determination functional units of rejection command transmission unit activation signal (d100) and rejection determination end notification (d104) to deactivate the rejection determination functional units except for the rejection determination functional unit which has notified the maximum evaluation value management table. Rejection command transmission unit 111E is activated in response to the rejection command transmission unit activation signal (d100) received thereby. Rejection command transmission unit 111E retrieves a simulation ID from a simulation ID field in the maximum evaluation value management table, and retrieves, from hypothetical rejection data creation unit 101E, a hypothetically rejected combined workflow data management table (d20) which has a simulation ID field that matches the retrieved simulation ID, among hypothetically rejected combined workflow data management tables retained in hypothetical rejection data creation unit 101E. Rejection command transmission unit 111E issues a forced rejection command to each combined workflow that are being executed and which has a combined workflow ID retained in the rejected combined workflow ID field in the retrieved hypothetically rejected combined workflow data management table. When convergence determination flag d102 has not been received from evaluation value comparison unit 160, rejection command transmission unit 111E assumes that the convergence determination flag is not set (when received, rejection command transmission unit 111E assumes that the convergence determination flag is set). Further, rejection command transmission unit 111E notifies rejection state capture unit 204E of rejection state capture unit activation signal d78, and notifies the same of the maximum evaluation value management table (d79) and convergence determination flag d80 (step 613).

Rejection state capture unit 204E is activated in response to rejection state capture unit activation signal d78 received thereby. Rejection state capture unit 204E retrieves rejection volume (d89) and the number of steps in the rejection-targeted combined workflow (d90) from hypothetical rejection data creation unit 101E. At this time, the rejection volume and the number of steps in the rejection-targeted combined workflow are retrieved from hypothetical rejection data creation unit 101E by extracting a hypothetical rejection condition ID field associated with the simulation ID field in the maximum evaluation value management table that matches the simulation ID field in the hypothetically rejected combined workflow data management table, and retrieving the rejection volume and the number of steps in the rejection-targeted combined workflow from the rejection volume field and the number of steps in rejection-targeted combined workflow field in the hypothetical rejection condition data management table which has the hypothetical rejection condition ID field that matches the aforementioned hypothetical rejection condition ID field (step 614).

Next, rejection state capture unit 204E notifies rejection state expression generation unit 206E of rejection state expression generation unit activation signal d91 and maximum evaluation value management table (d92) Rejection state expression generation unit 206E is activated in response to rejection state expression generation unit activation signal d91 received thereby. Rejection state expression generation unit 206E retrieves a hypothetically rejected combined workflow data management table (d93) and a simulation basic data management table (d94) from hypothetical rejection data creation unit 101E. Rejection state expression generation unit 206E extracts a rejected combined workflow ID field associated with a simulation ID field which matches the simulation ID field in the maximum evaluation value management table received from rejection state capture unit 204E (the extracted rejected combined workflow ID is the ID of a combined workflow subjected to the rejection), in the hypothetical rejection combined workflow data management table. Next, rejection state expression generation unit 206E extracts a number-of-steps field and a combined workflow definition ID field associated with a combined workflow ID field which matches the extracted rejected combined workflow ID in the simulation basic data management table. This operation reveals the combined workflow definition IDs and the number of steps in all combined workflows which are subjected to the rejection. Next, rejection state expression generation unit 206E retrieves maximum number of steps (d95) which can be taken by the revealed combined workflow definition ID, from maximum number of steps holding unit 150, in order to determine the number of elements of rejection state expression vector V00200 which is to be created thereby. Based on these pieces of information, rejection state expression generation unit 206E aggregates the number of rejected combined workflows on a per number of steps basis up to the retrieved maximum number of steps (d95) to create rejection state expression vector V00200. Rejection state expression generation unit 206E notifies rejection state capture unit 204E of generated rejection state expression vector V00200 (d96) (step 615).

After receiving rejection state expression vector V00200 (d96) from rejection state expression generation unit 206E, rejection state capture unit 204E retrieves state expression matrix M00100 (d81) and rejection-targeted combined workflow definition ID (d82) from state expression search unit 203E. Next, rejection state capture unit 204E creates state historical information management table T01300 based on state expression matrix M00100 (d81), rejection-targeted combined workflow definition ID (d82), rejection state expression vector V00200 (d96), an evaluation value retrieved from the maximum evaluation value field on the maximum evaluation value management table, rejection volume (d89), the number of steps in the rejection-targeted combined workflow (d90), and convergence determination flag (d80). Next, rejection state capture unit 204E notifies state expression recording unit 205E of state expression recording unit activation signal d87, and notifies the same of state historical information management table T01300 (d88). State expression recording unit 205E is activated in response to state expression recording unit activation signal d87 received thereby. State expression recording unit 205E newly saves (inserts) a history based on state historical information management table T01300 received from rejection state capture unit 204E in state history storage DB 202E, and terminates processing operations (step 549).

In the fourth embodiment, execution states and rejection determinations are recorded, and if a similar execution state is found, histories of past rejection results are referenced. This allows a rejection to be immediately exercised when the result has converged, and allows a rejection pattern to be found, even when the result does not converge, thus providing a higher agreed service level than past rejection results. The fourth embodiment is the same as the fifth embodiment in that if a similar execution state is found, histories of past rejection results are referenced, allowing a rejection to be immediately exercised when the result has converged, and allowing a rejection pattern to be found, even when the result does not converge, thus providing a higher agreed service level than past rejection results. However, the fifth embodiment differs from the fourth embodiment in the operation when a similar execution state is not found. That is, when no similar execution state is found, the rejection determination is made from a rejection-free state in the fourth embodiment. In contrast, in the fifth embodiment, histories of past rejection results are searched to see whether or not any rejection determination has been pronounced in an "analogous situation" similar to a current execution state in accordance with a search policy. When found, an additional rejection determination is simultaneously pronounced using that information as well, and the result of the rejection determination pronounced on the basis of the current execution state is compared with the result of the rejection determination pronounced on the basis of information on minus one or more "analogous situations" similar to the current execution state. Then, combined workflows are rejected using a rejection pattern which ends up with the best result, and simultaneously with this, the rejection pattern is recorded in relation to the result of rejection in the current execution state. When no similar execution state is found, and when no rejection determination has been pronounced in "analogous situations" similar to the current execution state, or when no "analogous situation" is found even by searching the histories of past rejection results in accordance with the search policy, the rejection determination is performed from a rejection-free state, as is the case with the fourth embodiment.

In this way, in the fifth exemplary embodiment, the results of the rejection determinations pronounced in "analogous situations" similar to a current execution state are also used in the rejection determination. Thus, a better rejection pattern can be found, as compared with the fourth embodiment, when there are no histories of rejection results similar to the current execution situation. Therefore, the fifth embodiment is more effective than the fourth embodiment.

Now, a description will be given of the correspondence of respective means described in claims to the respective components in FIGS. 1, 4, 68, 71, and 95. Event information recording means corresponds to event storage DB 120. Progress observing means corresponds to number-of-steps monitoring unit 130. Hypothetical rejection state expressing means corresponds to hypothetical rejection data creation unit 101A, 101B, 101C, 101D, 101E. Processing operation predicting means corresponds to simulation processing unit 112. Evaluation value expressing means corresponds to event data statistic calculation unit 104, evaluation value calculation unit 105, and condition setting unit 106. Determining means corresponds to a combination of minimum evaluation value extraction unit 107, maximum evaluation value extraction unit 108, and rejection determination unit 109A (109B, 109C, 109D, 109E). Rejection-targeted limited progress generating means corresponds to a combination of evaluation value calculation unit 105, condition setting unit 106, processing continuation determination unit 110A (110B, 110C, 110D, 110E). Time determining means corresponds to time determination unit 102A, 102B, 102C, 102D, 102E. Condition setting means corresponds to condition setting unit 106. Evaluation value recording means corresponds to evaluation value recording unit 113. Event data statistic calculating means corresponds to event data statistic calculation unit 104. Evaluation value calculating means corresponds to evaluation value calculation unit 105. Minimum evaluation value extracting means corresponds to minimum evaluation value extraction unit 107. Maximum evaluation value extracting means corresponds to maximum evaluation value extraction unit 108. Rejection determining means corresponds to rejection determination unit 109A, 109B, 109C, 109D, 109E. Processing continuation determining means corresponds to processing continuation determination unit 110A, 110B, 110C, 110D, 110E. State determining means corresponds to state comparison functional unit 200D, 200E. State expression generating means corresponds to state expression generation unit 201D, 201E and rejection state expression generation unit 206D, 206E. Rejection determination historical information recording means corresponds to state history storage DB 202D, 202E and state expression recording unit 205D, 206D. History searching means corresponds to state expression search unit 203D, 203E. Search policy holding means corresponds to search policy setting unit 207E. Evaluation value comparing means corresponds to evaluation value comparison unit 160.

Next, examples of the first, second, third, fourth, and fifth embodiments will be described below.

First Example

A first example will be described below in the assumption that the ID of a combined workflow definition to be subjected to a rejection determination is "0001", and information in an agreed service level that is concluded between a service provider and a service coordinator is set such that required combined workflow response time T is 60 seconds, required combined workflow average response execution time Ta 50 seconds, and required rejection ratio R is 5%. Also, assume that an evaluation value calculation function f that is concluded between the service provider and the service coordinate is defined by $f=(T/Ts)*(Ta/Tsa)*((R+1)/(Rs+1))$, where Ts is a predicted response time Ts calculated by a simulator, Tsa is a combined workflow average response time, and Rs is a rejection ratio. Then, assume that an agreement has been made in which the agreed service level is satisfied when f is equal to or greater than one. In other words, an agreed service level determination threshold is set at one. Also, assume that a simulation is limited to one second in time.

Assume that number-of-steps monitoring unit 130 has retained the combined workflow definition ID "0001" for uniquely identifying combined workflows which are subjected to the rejection determination, and has already retained execution state management table T10100 (FIG. 18). Execution state management table T10100 shows an example in which five combined workflows are being executed. Number-of-steps monitoring unit 130 is monitoring event storage DB 120, and detects that response message event data has been newly added from a business application for a combined workflow which is identified by a combined workflow ID "000364." Number-of-steps monitoring unit 130 updates execution state management table T10100, and creates execution state management table T10101 (FIG. 19). Since number-of-steps monitoring unit 130 has sensed that a change had been made in the number of steps with respect to a combined workflow, the combined workflow definition ID of which is "0001", number-of-steps monitoring unit 130 ascertains whether hypothetical rejection data creation unit 101A is active or not. Number-of-steps monitoring unit 130 activates hypothetical rejection data creation unit 101A because it is not active. Number-of-steps monitoring unit 130 notifies hypothetical rejection data creation unit 101A of combined workflow definition ID "0001".

Hypothetical rejection data creation unit 101A creates hypothetical rejection condition data management table T10700 (FIG. 20). Hypothetical rejection condition data management table T10700 shows an example where a hypothetical rejection condition ID is preliminarily set to "00025", and since a simulation is performed under rejection-free conditions, the rejection volume is zero, and the rejection-targeted combined workflow definition ID is "0001." Also, the number of steps in the rejection-targeted combined workflow has been set to "−1." Please note that the rejection-targeted combined workflow volume and the number of combinations are not yet determined at this time.

Time determination unit 102A calculates and retains a determination end time as "13:48:33.107" based on the fact that the current time is "13:48:32. 107" and the time limit of the simulation is one second.

After being activated by hypothetical rejection data creation unit 101A, simulation data creation unit 103 notifies event information transmission unit 140 of execution state query signal d42. Event information transmission unit 140 retrieves execution state management table T10101 that is retained by number-of-steps monitoring unit 130, and notifies simulation data creation unit 103 of the same.

Event data statistic calculation unit 104 retrieves historical information from event storage DB 120, analyzes the combined workflow average input time, the variance thereof and the like to deduce the most likely combined workflow input pattern, and creates predicted combined workflow input management table T10200 (FIG. 21).

Simulation data creation unit 103 creates simulation basic data management table T10900 (FIG. 22) based on execution state management table T10100 and predicted combined workflow input management table T10200. Simulation basic data management table T10900 shows an example where the current time, "13:48:33. 107" is set in time fields of combined workflow IDs "000363" to "000367," and zero is set in number-of-steps field of combined workflow IDs "S001" to "S003" which have been predicted to be input in the future.

Hypothetical rejection data creation unit 101A determines that the rejection-targeted combined workflow volume is four, i.e., combined workflow IDs "000363," "000364," "000366," and "000367," from the fact that the rejection-targeted combined workflow number-of-steps is "−1" (rejection-free), and the rejection-targeted combined workflow definition ID is "0001," and from simulation basic data management table T10900, and retains these combined workflow IDs in hypothetical rejection condition data management table T10700 (FIG. 20). Also, since the rejection volume is zero, and since the number of combinations of combined workflows of the rejection volume to be selected from the rejection-targeted combined workflow volume, i.e., the number of combinations to be selected zero from four targets is one ($4C0=1$), the number of combinations equal to "1" is retained in hypothetical rejection condition data management table T10700 (FIG. 20).

Hypothetical rejection data creation unit 101A creates hypothetical rejection data management table T10800 (FIG. 23) based on simulation basic data management table T10900 (FIG. 22) as input data to simulation processing unit 112. At the first time, minus one hypothetical rejection data management table T10800 is created because the rejection volume is zero and the number of combinations is one. Hypothetical rejection data management table T10800 shows an example where a simulation ID is preliminarily set to "00027." Hypothetical rejection data creation unit 101A creates hypothetically rejected combined workflow data management table T10600 (FIG. 24), and creates hypothetically rejected combined workflow data entry T10601 by preliminarily setting the hypothetically rejected combined workflow ID to "00058". At this time, since the rejection volume is zero, the rejected combined workflow ID is set to "None."

Assume that processing is executed by simulation processing unit 112 based on hypothetical rejection data management table T10800 and simulation result management table T10300 (FIG. 25) has been created in the present example. Simulation processing unit 112 notifies evaluation value calculation unit 105 of simulation result management table T10300.

Evaluation value calculation unit 105 notifies event data statistic calculation unit 104 of the rejection-targeted combined workflow definition ID "0001" retained therein, and retrieves statistic information data management table T11000 (FIG. 26). Statistic information data management table T11000 shows an example where a statistic information ID is set to "005," the number of combined workflows so far executed is 200 among combined workflows, the combined workflow definition ID of which is "0001," an average response time of the executed combined workflows is 47.0 seconds, and the number of rejected combined workflows is nine. Evaluation value calculation unit 105 creates evaluation value management table T10400 (FIG. 27) based on entries for the combined workflow definition ID set to "0001" in simulation result management table T10300 and in statistic information data management table T11000, with the use of evaluation value calculation function f. The total combined workflow predicted response time is 355 seconds for the entries, the combined workflow definition ID of which is "0001," in simulation result management table T10300, and the number of combined workflows input this time, having the combined workflow definition ID being "0001," is six, so that combined workflow average response time Tsa is calculated as:

$$(47.0*200+355)/(200+6)=47.354$$

when the present simulation result is reflected, so that combined workflow average response time Tsa as used by evaluation value calculation function f is 47.354 seconds. Similarly, rejection ratio Rs is calculated as (9+0)/(200+9+6) =0.042 taking into consideration of the simulation performed without rejection. Accordingly, the evaluation value for the combined workflow ID "000363" in evaluation value management table T10400 is calculated as (50.0/47.354)*(60/50)*((0.05+1)40.042+1))=1.277.

Since evaluation value calculation unit 105 currently retains the number of combinations equal to one, evaluation value calculation unit 105 creates only one evaluation value management table which is evaluation value management table T10400 (FIG. 27). After creating evaluation value management table T10400, evaluation value calculation unit 105 notifies time determination unit 102A of time limit determination request d12. Time determination unit 102A reads the current time "13:48:32. 130" and notifies evaluation value calculation unit 105 of time limit determination response d13 since the current time has not passed the determination end time "13:48:33. 107" retained therein. Since evaluation value calculation unit 105 receives time limit determination response d13, it activates minimum evaluation value extraction unit 107 and notifies minimum evaluation value extraction unit 107 of evaluation value management table T10400. Minimum evaluation value extraction unit 107 compares the minimum evaluation values with one another in evaluation value management table T10400, and extracts evaluation value entry T10401 which presents a minimum value to create minimum evaluation value management table T10500 (FIG. 28). Minimum evaluation value extraction unit 107 activates maximum evaluation value extraction unit 108, and notifies maximum evaluation value extraction unit 108 of minimum evaluation value management table T10500. Since minimum evaluation value management table T10500 has only one minimum evaluation value entry, maximum evaluation value extraction unit 108 determines a maximum value to be "0.798", and creates maximum evaluation value management table T11100 (FIG. 29). Maximum evaluation value extraction unit 108 activates rejection determination unit 109A, and notifies rejection determination unit 109A of maximum evaluation value management table T11100. Since the maximum evaluation value "0.798" is equal to or less than the agreed service level determination threshold "1", rejection determination unit 109A activates processing continuation determination unit 110A, and notifies processing continuation determination unit 110A of maximum evaluation value management table T11100.

Processing continuation determination unit 110A reads the rejection volume "0" and rejection-targeted combined workflow volume "4" from hypothetical rejection condition data management table T10700 (FIG. 20) retrieved from hypothetical rejection data creation unit 101A. Since the rejection volume is smaller than the rejection-targeted combined workflow volume, and since "None" is set in the number of steps in the rejection-targeted combined workflow in hypothetical rejection condition data management table T10700, i.e., it presents the rejection-free state, processing continuation determination unit 110A newly sets the number of steps in the rejection-targeted combined workflow. Processing continuation determination unit 110A retrieves evaluation value management table T10400 (FIG. 27) from evaluation value calculation unit 105, and extracts evaluation value entries T10401, T10402 which present evaluation values that are less than agreed service level determination threshold "1." Processing continuation determination unit 110A also retrieves hypothetical rejection data management table T10800 (FIG. 23) from hypothetical rejection data creation unit 101A, and reads therefrom the number-of-steps corresponding to evaluation value entries T10401, T10402. Since hypothetical rejection data entry T10801 corresponds to evaluation value entry T10401 and hypothetical rejection data entry T10802 corresponds to evaluation value entry T10402, the number of steps is "5" and "2", respectively. Accordingly, the maximum number of steps is "5", so that processing continuation determination unit 110A notifies hypothetical rejection data creation unit 101A of this number of steps as the number of steps in the rejection-targeted combined workflow.

Hypothetical rejection data creation unit 101A newly creates hypothetical rejection condition data management table T10701 (FIG. 30) based on hypothetical rejection condition data management table T10700 (FIG. 20). Hypothetical rejection data creation unit 101A sets the number of steps in the rejection-targeted combined workflow "5" received from processing continuation determination unit 110 into the number of steps in the rejection-targeted combined workflow in hypothetical rejection condition data management table T10701, and sets "1" into the rejection volume, where one is added to the rejection volume "0" in hypothetical rejection condition data management table T14 to derive the "1." After setting the rejection-targeted combined workflow definition ID "0001" in hypothetical rejection condition data management table T10700 (FIG. 20) into the rejection-targeted combined workflow definition ID, hypothetical rejection condition data management table T10700 is discarded. Please note that, at this time, the rejection-targeted combined workflow volume and the number of combinations, are not yet determined in hypothetical rejection condition data management table T10701 (FIG. 30).

Simulation data creation unit 103 again notifies event information transmission unit 140 of execution state query signal d42. Event information transmission unit 140 retrieves execution state management table T10102 (FIG. 31) retained by number-of-steps monitoring unit 130, and notifies simulation data creation unit 103 of this execution state management table T10102.

Event data statistic calculation unit 104 again retrieves historical information from event storage DB 120, analyzes a combined workflow average input time, the variance thereof and the like to deduce the most likely combined workflow input pattern, and creates predicted combined workflow input management table T10201 (FIG. 32).

Simulation data creation unit 103 newly creates simulation basic data management table T10901 (FIG. 33) based on execution state management table T10102 (FIG. 31) and predicted combined workflow input management table T10201 (FIG. 32), and notifies hypothetical rejection data creation unit 101A of simulation basic data management table T10901.

Since hypothetical rejection data creation unit 101A has already retained simulation basic data management table T10900 (FIG. 22), it compares simulation basic data management table T10900 with newly created simulation basic data management table T10901 (FIG. 33) in regard to the combined workflow ID and the number of steps. The present example shows a scenario where no change has been made in the situation in which combined workflows are being executed. Since there is no change in the situation in which combined workflows are being executed, the rejection determination is continued as before. Hypothetical rejection data creation unit 101A reads the number of steps in the rejection-targeted combined workflow "5" from hypothetical rejection condition data management table T10701 (FIG. 30) retained therein, and counts the number of entries which present the number of steps equal to or less than the number of steps in the rejection-targeted combined workflow "5" among combined workflows that are being executed which have the combined workflow definition ID "0001." In the present example, the combined workflows having combined workflow definition ID "0001" among the combined workflows that are being executed have combined workflow IDs "000363," "000364", "000366", and "000367," and the combined workflows having number-of-steps equal to or less than "5" among them are three which have combined workflow IDs "000364", "000366", and "000367." Accordingly, "3" is set into the rejection-targeted combined workflow volume in hypothetical rejection condition data management table T10701 (FIG. 30). Next, since the rejection volume is "1" in hypothetical rejection condition data management table T10701, and since the number of combinations of combined workflows of the rejection volume to be selected from the rejection-targeted combined workflow volume, i.e., the number of combinations to be selected one from three targets is three (3C1=3), the number of combinations equal to "3" is retained in hypothetical rejection condition data management table T10701.

Hypothetical rejection data creation unit 101A creates a hypothetical rejection data management table for combined workflows with the number-of-steps equal to or less than the number of steps in the rejection-targeted combined workflow "5," among those combined workflows that are being executed and which have the combined workflow definition ID "0001," from which a number of combined workflows equal to the rejection volume "1" have been hypothetically rejected. In the present example, hypothetical rejection condition data management table T10803 (FIG. 34) results from the rejection of combined workflow ID "000364," where "REJECT" has been set in number-of-steps of hypothetical rejection data entry T10804 of combined workflow ID "000364" to indicate a hypothetical rejection. Likewise, hypothetical rejection condition data management table T10805 (FIG. 35) results from the hypothetical rejection of combined workflow ID "000366," and hypothetical rejection condition data management table T10806 (FIG. 36) results from the hypothetical rejection of combined workflow ID "000367." Hypothetical rejection data creation unit 101A also adds a hypothetically rejected combined workflow data entry to hypothetically rejected combined workflow data management table T10600 (FIG. 24), and notifies simulation processing unit 112 of three hypothetical rejection condition data management tables T10803, T10805, and T10806.

Assume that simulation processing unit 112 has executed the processing, and has created, in the present example, simulation result management table T10301 (FIG. 37) for hypothetical rejection data management table T10803 (FIG. 34); simulation result management table T10302 (FIG. 38) for hypothetical rejection data management table T10805 (FIG. 35); and simulation result management table T10303 (FIG. 39) for hypothetical rejection data management table T10806 (FIG. 36). Simulation processing unit 112 notifies evaluation value calculation unit 105 of simulation result management tables T10301, T10302, and T10303.

Evaluation value calculation unit 105 creates evaluation value management table T10403 (FIG. 40) for simulation result management table T10301 (FIG. 37); evaluation value management table T10404 (FIG. 41) for simulation result management table T10302 (FIG. 38); and evaluation value management table T10405 (FIG. 42) for simulation result management table T10303 (FIG. 39). In calculating the evaluation value for simulation result management table T10301, simulation result management table T10301 presents a total of 280 seconds of the combined workflow predicted response times stored in those entries which have the combined workflow definition ID "0001," and six combined workflows which have the combined workflow ID "0001" and which have been input this time (the number of input combined workflows is six, and from which one is hypothetically rejected). Accordingly, combined workflow average response time Tsa, which reflects this simulation result, is calculated as $$(47.0*200+280)/(200+6)=46.990,$$

and combined workflow average response time Tsa used by evaluation value calculation function f is calculated to be 46.990 seconds. Similarly, rejection ratio Rs is calculated as $$(9+1)/(200+9+6)=0.047,$$

taking into consideration of the hypothetical rejection which is set to one. Consequently, the evaluation value for the combined workflow ID "000363" in evaluation value management table T10403 (FIG. 40) is calculated as:

$$(50.0/46.990)*(60/50)*((0.05+1)/(0.047+1))=1.281$$

Since the number of combinations retained in evaluation value calculation unit 105 is equal to "3," evaluation value calculation unit 105 notifies time determination unit 102A of time limit determination request d12 after it has created three evaluation value management tables T10403, T10404, and T10405.

Time determination unit 102A reads the current time "13:48:32. 552" and notifies evaluation value calculation unit 105 of time limit determination response d13 since the current time has not passed the determination end time "13:48:33. 107" retained therein.

Since evaluation value calculation unit 105 receives time limit determination response d13, it notifies minimum evaluation value extraction unit 107 of evaluation value management tables T10403, T10404, and T10405.

Minimum evaluation value extraction unit 107 extracts evaluation value entries which present minimum values, from respective evaluation value management tables T10403, T10404, and T10405, and creates minimum evaluation value management table T10501 (FIG. 43) which is then notified to maximum evaluation value extraction unit 108.

Maximum evaluation value extraction unit 108 extracts a maximum value "0.915" from minimum evaluation value management table T10501, and creates maximum evaluation value management table T11101 (FIG. 44) which is then notified to rejection determination unit 109A.

Since the maximum evaluation value "0.915" is equal to or less than the agreed service level determination threshold "1", rejection determination unit 109A notifies processing continuation determination unit 110A of maximum evaluation value management table T11101.

Processing continuation determination unit 110A reads the rejection volume "1" and rejection-targeted combined workflow volume "3" from hypothetical rejection data management table T10701 (FIG. 30) received from hypothetical rejection data creation unit 101A. Since the rejection volume is smaller than the rejection-targeted combined workflow volume, and since "5" is set in the number of steps in the rejection-targeted combined workflow in hypothetical rejection data management table T10701, processing continuation determination unit 110A notifies hypothetical rejection data creation unit 101A of the rejection-targeted combined workflow number-of-steps "5".

Hypothetical rejection data creation unit 101A newly creates hypothetical rejection condition data management table T10702 (FIG. 45) based on hypothetical rejection data management table T10701. Hypothetical rejection data creation unit 101A sets the number of steps in the rejection-targeted combined workflow "5" received from processing continuation determination unit 110A into the number of steps in the rejection-targeted combined workflow in hypothetical rejection data management table T10702, and sets "2" into the rejection volume, where one is added to the rejection volume "1" in hypothetical rejection data management table T1071 to derive the "2." After setting the rejection-targeted combined workflow definition ID "0001" in hypothetical rejection data management table T10701 into the rejection-targeted combined workflow definition ID, hypothetical rejection data management table T10701 is discarded. Please note that at this time, the rejection-targeted combined workflow volume and the number of combinations in hypothetical rejection data management table T10702 are not yet determined.

Simulation data creation unit 103 again notifies event information transmission unit 140 of an execution state query signal. Event information transmission unit 140 retrieves execution state management table T10103 (FIG. 46) retained by number-of-steps monitoring unit 130, and notifies simulation data creation unit 103 of this execution state management table T10103.

Event data statistic calculation unit 104 again retrieves the historical information from event storage DB 120, analyzes a combined workflow average input time, the variance thereof and the like to deduce the most likely combined workflow input pattern, and creates predicted combined workflow input management table T10202 (FIG. 47).

Simulation data creation unit 103 newly creates simulation basic data management table T10902 (FIG. 48) based on execution state management table T10103 and predicted combined workflow input management table T10202, and notifies hypothetical rejection data creation unit 101A of simulation basic data management table T10902.

Since hypothetical rejection data creation unit 101A has already retained simulation basic data management table T10901 (FIG. 33), it compares simulation basic data management table T10901 with newly created simulation basic data management table T10902 (FIG. 48) in regard to the combined workflow ID and the number of steps. The present example shows a scenario where no change has been made in the situation in which combined workflows are being executed. Since there is no change in the situation in which combined workflows are executed, the rejection determination is continued as before. Hypothetical rejection data creation unit 101A reads the number of steps in the rejection-targeted combined workflow "5" from hypothetical rejection data management table T10702 (FIG. 45) retained therein, and counts the number of entries which present the number of steps equal to or less than the number of steps in the rejection-targeted combined workflow "5" among combined workflows that are being executed and which have the combined workflow definition ID "0001." In the present example, the combined workflows having the combined workflow definition ID "0001" in the combined workflows that are being executed have combined workflow IDs "000363", "000364", "000366", and "000367", and the combined workflows having the number of steps equal to or less than "5" among them are three which have combined workflow IDs "000364", "000366", and "000367." Accordingly, "3" is set into the rejection-targeted combined workflow volume in hypothetical rejection data management table T10702 (FIG. 45). Next, since the rejection volume is "2" in hypothetical rejection data management table T10702 (FIG. 45), and since the number of combinations for selecting the number of combined workflows to be rejected from the rejection-targeted combined workflow volume, i.e., the number of combinations of combined workflows of the rejection volume to be selected from the rejection-targeted combined workflow volume, i.e., the number of combinations to be selected two from three targets is one (3C2=3), the number of combinations equal to "3" is retained in hypothetical rejection data management table T10702.

Hypothetical rejection data creation unit 101A creates a hypothetical rejection data management table for combined workflows with the number-of-steps equal to or less than the rejection-targeted combined workflow number-of-steps "5," among those combined workflows that are being executed and which have the combined workflow definition ID "0001," from which the number of combined workflows equal to the rejection volume "2" have been hypothetically rejected. In the present example, hypothetical rejection condition data management table T10807 (FIG. 49) results from the rejection of combined workflow ID "000364" and "000366"; hypothetical rejection data management table T10808 (FIG. 50) results from the hypothetical rejection of combined workflow IDs "000364" and "000367"; hypothetical rejection data management table T10809 (FIG. 51) results from the hypothetical rejection of combined workflow IDs "000366" and "000367." Hypothetical rejection data creation unit 101A also adds a hypothetically rejected combined workflow data entry to hypothetically rejected combined workflow data management table T10600 (FIG. 24), and notifies simulation processing unit 112 of three hypothetical rejection data management tables T10807, T10808, and T10809.

Assume that simulation processing unit 112 has executed the processing, and has created, in the present example, simulation result management table T10304 (FIG. 52) for hypothetical rejection data management table T10807 (FIG. 49); simulation result management table T10305 (FIG. 53) for hypothetical rejection data management table T10808 (FIG. 50); and simulation result management table T10306 (FIG. 54) for hypothetical rejection data management table T10809 (FIG. 51). Simulation processing unit 112 notifies evaluation value calculation unit 105 of simulation result management tables T10304, T10305, and T10306.

Evaluation value calculation unit 105 creates evaluation value management table T10406 (FIG. 55) for simulation result management table T10304 (FIG. 52); evaluation value management table T10407 (FIG. 56) for simulation result management table T10305 (FIG. 53); and evaluation value management table T10408 (FIG. 57) for simulation result management table T10306 (FIG. 54). In calculating the evaluation value for simulation result management table T10304, simulation result management table T10304 presents a total of 210 seconds of the combined workflow predicted response times stored in those entries which have the combined workflow definition ID "0001," and six combined workflows which have the combined workflow ID "0001" and which have been input this time (the number of input combined workflows is six, and from which two is hypothetically rejected). Accordingly, combined workflow average response time Tsa, which reflects this simulation result, is calculated as $$(47.0*200+210)/(200+6)=46.650,$$

and combined workflow average response time Tsa used by evaluation value calculation function f is calculated to be 46.650 seconds. Similarly, rejection ratio Rs is calculated as $$(9+2)/(200+9+6)=0.052,$$

taking into consideration of the hypothetical rejection which is set to two. Consequently, the evaluation value for the combined workflow ID "000363" in evaluation value management table T10406 (FIG. 55) is calculated as:

$$(50.0/46.650)*(60/50)*((0.05+1)/(0.052+1))=1.285$$

Since the number of combinations retained in evaluation value calculation unit 105 is equal to "3," evaluation value calculation unit 105 notifies time determination unit 102A of time limit determination request d12 after it has created three evaluation value management tables T10406, T10407, and T10408.

Time determination unit 102A reads the current time "13:48:33. 021" and notifies evaluation value calculation unit 105 of time limit determination response d13 since the current time has not passed the determination end time "13:48:33. 107" retained therein.

Since evaluation value calculation unit 105 receives time limit determination response d13, it notifies minimum evaluation value extraction unit 107 of evaluation value management tables T10406, T10407, and T10408.

Minimum evaluation value extraction unit 107 extracts evaluation value entries which present minimum values from respective evaluation value management tables T10406, T10407, and T10408, and creates minimum evaluation value management table T10502 (FIG. 58) which is then notified to maximum evaluation value extraction unit 108.

Maximum evaluation value extraction unit 108 extracts a maximum value "1.071" from minimum evaluation value management table T10502, and creates maximum evaluation value management table T11102 (FIG. 59) which is then notified to rejection determination unit 109A.

Since the maximum evaluation value "1.071" is larger than the agreed service level determination threshold "1," rejection determination unit 109A activates rejection command transmission unit 111A, and notifies the same of maximum evaluation value management table T11102.

Rejection command transmission unit 111A extracts the simulation ID "00031" from maximum evaluation value management table T11102. Since entries having the simulation ID "00031" are associated with rejected combined workflow IDs "000364" and "000366" in hypothetically rejected combined workflow data management table T10600 (FIG. 24) retained in hypothetical rejection data creation unit 101A, rejection command transmission unit 111A issues a forced rejection command to combined workflows that are being executed and which have the combined workflow IDs "000364" and "000366," and terminates the processing operations.

As shown above, it is anticipated that when the rejection determination is not made, the evaluation values for combined workflows identified by the combined workflow IDs "000364" and "000367" fall below the agreed service level determination threshold among the combined workflows that are being executed, thus failing to satisfy the concluded agreed service level. On the other hand, when the rejection determination is applied according to the first embodiment, the evaluation value is anticipated to be "1.071," at lowest, by rejecting combined workflows identified by the combined workflow IDs "000364" and "000366" among combined workflows that are being executed, so that it is anticipated that the concluded agreed service level can be satisfied.

Second Example

A second example will be described below in the assumption that the ID of a combined workflow definition to be subjected to a rejection determination is "0001," and information in an agreed service level that is concluded between a service provider and a service coordinator is set such that required combined workflow response time T is 60 seconds, required combined workflow average response execution time Ta 50 seconds, and required rejection ratio R is 5%. Also, assume that an evaluation value calculation function f that is concluded between the service provider and the service coordinate is defined by $f=(T/Ts)*(Ta/Tsa)*((R+1)/(Rs+1))$, where Ts is a predicted response time Ts calculated by a simulator, Tsa is a combined workflow average response time, and Rs is a rejection ratio. Then, assume that an agreement has been made in which the agreed service level is satisfied when f is equal to or greater than one. In other words, the agreed service level determination threshold is set at one. Also, assume that the simulation is limited to one second in time.

Assume that number-of-steps monitoring unit 130 has retained the combined workflow definition ID "0001" for uniquely identifying combined workflows which are subjected to the rejection determination, and has already retained execution state management table T10100 (FIG. 18). Execution state management table T10100 shows an example in which five combined workflows are being executed. Number-of-steps monitoring unit 130 is monitoring event storage DB 120, and detects that response message event data has been newly added from a business application for a combined workflow which is identified by a combined workflow ID "000364." Number-of-steps monitoring unit 130 updates execution state management table T10100, and creates execution state management table T10101 (FIG. 19). Since number-of-steps monitoring unit 130 has sensed that a change had been made in the number-of-steps with respect to a combined workflow, the combined workflow definition ID of which is "0001," number-of-steps monitoring unit 130 ascertains whether hypothetical rejection data creation unit 101B is active or not. Number-of-steps monitoring unit 130 activates hypothetical rejection data creation unit 101B because it is not active. Number-of-steps monitoring unit 130 notifies hypothetical rejection data creation unit 101B of combined workflow definition ID "0001".

Hypothetical rejection data creation unit 101B creates hypothetical rejection condition data management table T10700 (FIG. 20). Hypothetical rejection condition data management table T10700 shows an example where a hypothetical rejection condition ID is preliminarily set to "00025," and since a simulation is performed under rejection-free conditions, the rejection volume is zero, and the rejection-targeted combined workflow definition ID is "0001." Also, the number of steps in the rejection-targeted combined workflow has been set to "−1." Please note that the rejection-targeted combined workflow volume and the number of combinations are not yet determined at this time.

Hypothetical rejection data creation unit 101B activates evaluation value recording unit 113.

Time determination unit 102B calculates and retains a determination end time as "13:48:33.107" based on the fact that the current time is "13:48:32. 107" and the time limit of the simulation is one second.

After being activated by hypothetical rejection data creation unit 101B, simulation data creation unit 103 notifies event information transmission unit 140 of the execution state query signal. Event information transmission unit 140 retrieves execution state management table T10101 (FIG. 19) that is retained by number-of-steps monitoring unit 130, and notifies simulation data creation unit 103 of the same.

Event data statistic calculation unit 104 retrieves historical information from event storage DB 120, analyzes the combined workflow average input time, the variance thereof and the like to deduce the most likely combined workflow input pattern, and creates predicted combined workflow input management table T10200 (FIG. 21).

Simulation data creation unit 103 creates simulation basic data management table T10900 (FIG. 22) based on execution state management table T10100 and predicted combined workflow input management table T10200. Simulation basic data management table T10900 shows an example where the current time, "13:48:33. 107" is set in time fields of combined workflow IDs "000363" to "000367," and zero is set in the number-of-steps field in the combined workflow IDs "S001" to "S003" which have been predicted to be input in the future.

Hypothetical rejection data creation unit 101B determines that the rejection-targeted combined workflow volume is four, i.e., combined workflow IDs "000363" "000364" "000366" and "000367" from the fact that the number of steps in the rejection-targeted combined workflow is "−1" (rejection-free), and the rejection-targeted combined workflow definition ID is "0001," and from simulation basic data management table T10900 (FIG. 22), and retains these combined workflow IDs in hypothetical rejection condition data management table T10700 (FIG. 20). Also, since the rejection volume is zero, and since the number of combinations of combined workflows of the rejection volume to be selected from the rejection-targeted combined workflow volume, i.e., the number of combinations to be selected zero from four targets is one (4C0=1), the number of combinations equal to "1" is retained in hypothetical rejection condition data management table T10700.

Hypothetical rejection data creation unit 101B creates hypothetical rejection data management table T10800 (FIG. 23) based on simulation basic data management table T10900 (FIG. 22) as input data to simulation processing unit 112. At the first time, minus one hypothetical rejection data management table T10800 is created because the rejection volume is zero and the number of combinations is one. Hypothetical rejection data management table T10800 shows an example where a simulation ID is preliminarily set to "00027." Hypothetical rejection data creation unit 101A creates hypothetically rejected combined workflow data management table T10600 (FIG. 24), and creates hypothetically rejected combined workflow data entry T10601 (FIG. 24) by preliminarily setting the hypothetically rejected combined workflow ID to "00058." At this time, since the rejection volume is zero, the rejected combined workflow ID is set to "None."

Assume that the processing is executed by simulation processing unit 112 based on hypothetical rejection data management table T10800 (FIG. 23) to create simulation result management table T10300 (FIG. 25) in the present example. Simulation processing unit 112 notifies evaluation value calculation unit 105 of simulation result management table T10300.

Evaluation value calculation unit 105 notifies event data statistic calculation unit 104 of the rejection-targeted combined workflow definition ID "0001" retained therein, and retrieves statistic information data management table T11000 (FIG. 26). Statistic information data management table T11000 shows an example where a statistic information ID is set to "005," the number of combined workflows so far executed is 200 among combined workflows, the combined workflow definition ID of which is "0001," an average response time of the executed combined workflows is 47.0 seconds, and the number of rejected combined workflows is nine. Evaluation value calculation unit 105 creates evaluation value management table T10400 (FIG. 27) based on entries for the combined workflow definition ID set to "0001" in simulation result management table T10300 (FIG. 25) and in statistic information data management table T11000, (FIG. 27) with the use of evaluation value calculation function f. The total of combined workflow predicted response time is 355 seconds for the entries, the combined workflow definition ID of which is "0001", in simulation result management table T10300 (FIG. 25), and the number of combined workflows input this time, in which the combined workflow definition ID is "0001" is six, so that combined workflow average response time Tsa is calculated as:

$$(47.0*200+355)/(200+6)=47.354$$

when the present simulation result is reflected, so that combined workflow average response time Tsa as used by evaluation value calculation function f is 47.354 seconds. Similarly, rejection ratio Rs is calculated as $$(9+0)/(200+9+6)=0.042,$$

taking into consideration of the simulation performed without rejection. Accordingly, the evaluation value for the combined workflow ID "000363" in evaluation value management table T10400 is calculated as $$(50.0/47.354)*(60/50)*((0.05+1)/(0.042+1))=1.277.$$

Since evaluation value calculation unit 105 currently retains the number of combinations equal to one, evaluation value calculation unit 105 creates only one evaluation value management table which is evaluation value management table T10400. After creating evaluation value management table T10400, evaluation value calculation unit 105 notifies time determination unit 102B of time limit determination request d12.

Time determination unit 102B reads the current time "13:48:32. 130" and notifies evaluation value calculation unit 105 of time limit determination response d13 since the current time has not passed the determination end time "13:48:33. 107" retained therein.

Since evaluation value calculation unit 105 receives time limit determination response d13, it activates minimum evaluation value extraction unit 107 and notifies minimum evaluation value extraction unit 107 of evaluation value management table T10400.

Minimum evaluation value extraction unit 107 compares the minimum evaluation values with one another in evaluation value management table T10400, and extracts evaluation value entry T10401 which presents a minimum value to create minimum evaluation value management table T10500 (FIG. 28). Minimum evaluation value extraction unit 107 activates maximum evaluation value extraction unit 108, and notifies maximum evaluation value extraction unit 108 of minimum evaluation value management table T10500.

Maximum evaluation value extraction unit 108 extracts a maximum value "0.798" from minimum evaluation value management table T10500 and creates maximum evaluation value management table T11100 (FIG. 29). Maximum evaluation value extraction unit 108 activates rejection determination unit 109B, and notifies rejection determination unit 109B of maximum evaluation value management table T11100.

Since the maximum evaluation value "0.798" is equal to or less than the agreed service level determination threshold "1", rejection determination unit 109B activates processing continuation determination unit 110B, and notifies processing continuation determination unit 110B of maximum evaluation value management table T11100.

Processing continuation determination unit 110B reads the rejection volume "0" and rejection-targeted combined workflow volume "4" from hypothetical rejection condition data management table T10700 (FIG. 20) retrieved from hypothetical rejection data creation unit 101B. Since the rejection volume is smaller than the rejection-targeted combined workflow volume, and since "None" is set in the number of steps in the rejection-targeted combined workflow in hypothetical rejection condition data management table T10700, i.e., it presents a rejection-free state, processing continuation determination unit 110B newly sets the number of steps in the rejection-targeted combined workflow. Processing continuation determination unit 110B retrieves evaluation value management table T10400 (FIG. 27) from evaluation value calculation unit 105, and extracts evaluation value entries T10401, T10402 which present evaluation values that are less than the agreed service level determination threshold "1." Processing continuation determination unit 110B also retrieves hypothetical rejection data management table T10800 (FIG. 23) from hypothetical rejection data creation unit 101B, and reads therefrom the number-of-steps corresponding to evaluation value entries T10401 and T10402. Since hypothetical rejection data entry T10801 corresponds to evaluation value entry T10401 and hypothetical rejection data entry T10802 corresponds to evaluation value entry T10402, the number-of-steps is "5" and "2," respectively. Accordingly, the maximum number-of-steps is "5," so that processing continuation determination unit 110B notifies hypothetical rejection data creation unit 101B of this number-of-steps as the number of steps in the rejection-targeted combined workflow.

Hypothetical rejection data creation unit 101B newly creates hypothetical rejection condition data management table T10701 (FIG. 30) based on hypothetical rejection condition data management table T10700 (FIG. 20). Hypothetical rejection data creation unit 101B sets the number of steps in the rejection-targeted combined workflow "5" received from processing continuation determination unit 110 into the number of steps in the rejection-targeted combined workflow in hypothetical rejection condition data management table T10701, and sets "1" into the rejection volume, where one is added to the rejection volume "0" in hypothetical rejection condition data management table T14 to derive "1." After setting the rejection-targeted combined workflow definition ID "0001" in hypothetical rejection condition data management table T10700 into the rejection-targeted combined workflow definition ID, hypothetical rejection condition data management table T10700 is discarded. Please note that the rejection-targeted combined workflow volume and the number of combinations in hypothetical rejection condition data management table T10701 are not yet determined at this time.

Simulation data creation unit 103 again notifies event information transmission unit 140 of execution state query signal d42. Event information transmission unit 140 retrieves execution state management table T10102 (FIG. 31) retained by number-of-steps monitoring unit 130, and notifies simulation data creation unit 103 of this execution state management table T10102.

Event data statistic calculation unit 104 again retrieves historical information from event storage DB 120, analyzes a combined workflow average input time, the variance thereof and the like to deduce the most likely combined workflow input pattern, and creates predicted combined workflow input management table T10201 (FIG. 32).

Simulation data creation unit 103 newly creates simulation basic data management table T10901 (FIG. 33) based on execution state management table T10102 and predicted combined workflow input management table T10201, and notifies hypothetical rejection data creation unit 101B of simulation basic data management table T10901.

Since hypothetical rejection data creation unit 101B has already retained simulation basic data management table T10900, it compares simulation basic data management table T10900 with newly created simulation basic data management table T10901 in regard to the combined workflow ID and the number of steps. The present example shows a scenario where no change has been made in the situation in which combined workflows are being executed. Since there is no change in the situation in which combined workflows are being executed, the rejection determination is continued as before. Hypothetical rejection data creation unit 101B reads the number of steps in the rejection-targeted combined workflow "5" from hypothetical rejection condition data management table T10701 (FIG. 30) retained therein, and counts the number of entries which present the number-of-steps equal to or less than the number of steps in the rejection-targeted combined workflow "5" among combined workflows that are being executed and which have the combined workflow definition ID "0001." In the present example, the combined workflows having combined workflow definition ID "0001" among the combined workflows that are being executed have combined workflow IDs "000363", "000364", "000366," and "000367," and the combined workflows having the number-of-steps equal to or less than "5" among them are three which have combined workflow IDs "000364", "000366", and "000367." Accordingly, "3" is set into the rejection-targeted combined workflow volume in hypothetical rejection condition data management table T10701. Next, since the rejection volume is "1" in hypothetical rejection condition data management table T10701, and since the number of combinations of combined workflows of the rejection volume to be selected from the rejection-targeted combined workflow volume, i.e., the number of combinations to be selected one from three targets is three (3C1=3), the number of combinations equal to "3" is retained in hypothetical rejection condition data management table T10701 (FIG. 30).

Hypothetical rejection data creation unit 101B creates a hypothetical rejection data management table for combined workflows with the number-of-steps equal to or less than the number of steps in the rejection-targeted combined workflow "5," among those combined workflows that are being executed and which have the combined workflow definition ID "0001", from which combined workflows, the number of which is equal to the rejection volume "1" have been hypothetically rejected. In the present example, hypothetical rejection condition data management table T10803 (FIG. 34) results from the rejection of combined workflow ID "000364," where "REJECT" has been set in the number-of-steps of hypothetical rejection data entry T10804 of combined workflow ID "000364" to indicate a hypothetical rejection. Likewise, hypothetical rejection condition data management table T10805 (FIG. 35) results from the hypothetical rejection of combined workflow ID "000366", and hypothetical rejection condition data management table T10806 (FIG. 36) results from the hypothetical rejection of combined workflow ID "000367." Hypothetical rejection data creation unit 101B also adds a hypothetically rejected combined workflow data entry to hypothetically rejected combined workflow data management table T10600, and notifies simulation processing unit 112 of three hypothetical rejection condition data management tables T10803, T10805, and T10806.

Assume that simulation processing unit 112 has executed the processing, and has created, in the present example, simulation result management table T10307 (FIG. 60) for hypothetical rejection data management table T10803 (FIG. 34); simulation result management table T10302 (FIG. 38) for hypothetical rejection data management table T10805 (FIG. 35); and simulation result management table T10303 (FIG. 39) for hypothetical rejection data management table T10806 (FIG. 36). Simulation processing unit 112 notifies evaluation value calculation unit 105 of simulation result management tables T10307, T10302, and T10303.

Evaluation value calculation unit 105 creates evaluation value management table T10409 (FIG. 61) for simulation result management table T10307 (FIG. 60); evaluation value management table T10404 (FIG. 41) for simulation result management table T10302 (FIG. 38); and evaluation value management table T10405 (FIG. 42) for simulation result management table T10303 (FIG. 39). In calculating the evaluation value for simulation result management table T10307, simulation result management table T10307 (FIG. 60) presents a total of 262 seconds of the combined workflow predicted response times stored in those entries which have the combined workflow definition ID "0001," and six combined workflows which have the combined workflow ID "0001" and have been input this time (the number of input combined workflows is six, and from which one is hypothetically rejected). Accordingly, combined workflow average response time Tsa, which reflects this simulation result, is calculated as $$(47.0*200+262)/(200+6)=46.903,$$

and combined workflow average response time Tsa used by evaluation value calculation function f is calculated as 46.903 seconds. Similarly, rejection ratio Rs is calculated as $$(9+1)/(200+9+6)=0.047,$$

taking into consideration of the hypothetical rejection which is set to one. Consequently, the evaluation value for the combined workflow ID "000363" in evaluation value management table T10409 (FIG. 61) is calculated as:

$$(50.0/46.903)*(60/50)*((0.05+1)/(0.047+1))=1.284$$

Since the number of combinations retained in evaluation value calculation unit 105 is equal to "3", evaluation value calculation unit 105 notifies time determination unit 102B of time limit determination request d12 after it has created three evaluation value management tables T10409, T10404, and T10405.

Time determination unit 102B reads the current time "13:48:32. 552" and notifies evaluation value calculation unit 105 of time limit determination response d13 since the current time has not passed the determination end time "13:48:33. 107" retained therein. Since evaluation value calculation unit 105 has received time limit determination response d13, it notifies minimum evaluation value extraction unit 107 of evaluation value management tables T10409, T10404, and T10405. Minimum evaluation value extraction unit 107 extracts evaluation value entries which present minimum values, from respective evaluation value management tables T10409, T10404, and T10405, and creates minimum evaluation value management table T10503 (FIG. 62) which is then notified to maximum evaluation value extraction unit 108.

Maximum evaluation value extraction unit 108 extracts a maximum value "1.035" from minimum evaluation value management table T10503, and creates maximum evaluation value management table T11103 (FIG. 63) which is then notified to rejection determination unit 109B. Since the maximum evaluation value "1.035" is larger than the agreed service level determination threshold "1," rejection determination unit 109B notifies evaluation value recording unit 113 of maximum evaluation value management table T11103, and notifies processing continuation determination unit 110B of maximum evaluation value management table T11103.

After receiving maximum evaluation value management table T11103, evaluation value recording unit 113 ascertains whether or not it has retained a maximum evaluation value management table. Evaluation value recording unit 113 retains maximum evaluation value management table T11103 because it has not retained one in the present example.

Processing continuation determination unit 110B reads the rejection volume "1" and rejection-targeted combined workflow volume "3" from hypothetical rejection data management table T10701 (FIG. 30) received from hypothetical rejection data creation unit 101B. Since the rejection volume is smaller than the rejection-targeted combined workflow volume, and "5" is set in the number of steps in the rejection-targeted combined workflow in hypothetical rejection data management table T10701, processing continuation determination unit 110B notifies hypothetical rejection data creation unit 101B of the number of steps in the rejection-targeted combined workflow "5".

Hypothetical rejection data creation unit 101B newly creates hypothetical rejection condition data management table T10702 (FIG. 45) based on hypothetical rejection data management table T10701 (FIG. 30). Hypothetical rejection data creation unit 101A sets the number of steps in the rejection-targeted combined workflow "5" received from processing continuation determination unit 110B into the number of steps in the rejection-targeted combined workflow in hypothetical rejection data management table T10702, and sets "2" into the rejection volume, where one is added to the rejection volume "1" in hypothetical rejection data management table T10701 to derive "2." After setting the rejection-targeted combined workflow definition ID "0001" in hypothetical rejection data management table T10701 into the rejection-targeted combined workflow definition ID, hypothetical rejection data management table T10701 is discarded. Please note that at this time, the rejection-targeted combined workflow volume and the number of combinations in hypothetical rejection data management table T10702 are not yet determined.

Simulation data creation unit 103 again notifies event information transmission unit 140 of an execution state query signal. Event information transmission unit 140 retrieves execution state management table T10103 (FIG. 46) retained by number-of-steps monitoring unit 130, and notifies simulation data creation unit 103 of this execution state management table T10103.

Event data statistic calculation unit 104 again retrieves the historical information from event storage DB 120, analyzes a combined workflow average input time, the variance thereof and the like to deduce the most likely combined workflow input pattern, and creates predicted combined workflow input management table T10202 (FIG. 47).

Simulation data creation unit 103 newly creates simulation basic data management table T10902 (FIG. 48) based on execution state management table T10103 and predicted combined workflow input management table T10202, and notifies hypothetical rejection data creation unit 101B of simulation basic data management table T10902.

Since hypothetical rejection data creation unit 101B has already retained simulation basic data management table T10901 (FIG. 33), it compares simulation basic data management table T10901 with newly created simulation basic data management table T10902 in regard to the combined workflow ID and the number of steps. The present example shows a scenario where no change has been made in the situation in which combined workflows are being executed. Since there is no change in the situation in which combined workflows are being executed, the rejection determination is continued as before. Hypothetical rejection data creation unit 101B reads the number of steps in the rejection-targeted combined workflow "5" from hypothetical rejection data management table T10702 (FIG. 45) retained therein, and counts the number of entries which present the number-of-steps equal to or less than the number of steps in the rejection-targeted combined workflow "5" among combined workflows that are being executed and which have the combined workflow definition ID "0001." In the present example, the combined workflows having the combined workflow definition ID "0001" in the combined workflows that are being executed have combined workflow IDs "000363", "000364", "000366", and "000367," and the combined workflows having the number-of-steps equal to or less than "5" among them are three which have combined workflow IDs "000364", "000366", and "000367." Accordingly, "3" is set into the rejection-targeted combined workflow volume in hypothetical rejection data management table T10702 (FIG. 45). Next, since the rejection volume is "2" in hypothetical rejection data management table T10702 (FIG. 45), and since the number of combinations for selecting the number of combined workflows to be rejected from the rejection-targeted combined workflow volume, i.e., the number of combinations of combined workflows of the rejection volume to be selected from the rejection-targeted combined workflow volume, i.e., the number of combinations to be selected two from three targets is three (3C2=3), the number of combinations equal to "3" is retained in hypothetical rejection data management table T10702.

Hypothetical rejection data creation unit 101B creates a hypothetical rejection data management table for combined workflows with the number-of-steps equal to or less than the number of steps in the rejection-targeted combined workflow "5," among those combined workflows that are being executed and which have the combined workflow definition ID "0001", from which combined workflows, the number of which is equal to the rejection volume "2", have been hypothetically rejected. In the present example, hypothetical rejection condition data management table T10807 (FIG. 49) results from the rejection of combined workflow ID "000364" and "000366"; hypothetical rejection data management table T10808 (FIG. 50) results from the hypothetical rejection of combined workflow IDs "000364" and "000367"; hypothetical rejection data management table T10809 (FIG. 51) results from the hypothetical rejection of combined workflow IDs "000366" and "000367." Hypothetical rejection data creation unit 101B also adds a hypothetically rejected combined workflow data entry to hypothetically rejected combined workflow data management table T10600 (FIG. 24), and notifies simulation processing unit 112 of three hypothetical rejection data management tables T10807, T10808, and T10809.

Assume that simulation processing unit 112 has executed the processing, and has created, in the present example, simulation result management table T10308 (FIG. 64) for hypothetical rejection data management table T10807 (FIG. 49); simulation result management table T10305 (FIG. 53) for hypothetical rejection data management table T10808 (FIG. 50); and simulation result management table T10306 (FIG. 54) for hypothetical rejection data management table T10809 (FIG. 51). Simulation processing unit 112 notifies evaluation value calculation unit 105 of simulation result management tables T10308, T10305, and T10306.

Evaluation value calculation unit 105 creates evaluation value management table T10410 (FIG. 65) for simulation result management table T10308 (FIG. 64); evaluation value management table T10407 (FIG. 56) for simulation result management table T10305 (FIG. 53); and evaluation value management table T10408 (FIG. 57) for simulation result management table T10306 (FIG. 54). In calculating the evaluation value for simulation result management table T10308, simulation result management table T10308 presents a total of 213 seconds of the combined workflow predicted response times stored in those entries which have the combined workflow definition ID "0001," and six combined workflows which have the combined workflow ID "0001" and which have been input this time (the number of input combined workflows is six, and from which two are hypothetically rejected). Accordingly, combined workflow average response time Tsa, which reflects this simulation result, is calculated as $(47.0*200+213)/(200+6)=46.665,$ and combined workflow average response time Tsa used by evaluation value calculation function f is calculated to be 46.665 seconds. Similarly, rejection ratio Rs is calculated as $(9+2)4200+9+6)=0.052,$ taking into consideration of the hypothetical rejection which is set to two. Consequently, the evaluation value for the combined workflow ID "000363" in evaluation value management table T10410 is calculated as:

$(50.0/46.665)*(60/50)*((0.05+1)/(0.052+1))=1.019$

Since the number of combinations retained in evaluation value calculation unit 105 is equal to "3," evaluation value calculation unit 105 notifies time determination unit 102B of time limit determination request d12 after it has created three evaluation value management tables T10410, T10407, and T10408.

Time determination unit 102B reads the current time "13:48:33. 021" and notifies evaluation value calculation unit 105 of time limit determination response d13 since the current time has not passed the determination end time "13:48:33. 107" retained therein. Since evaluation value calculation unit 105 receives time limit determination response d13, it notifies minimum evaluation value extraction unit 107 of evaluation value management tables T10410, T10407, and T10408.

Minimum evaluation value extraction unit 107 extracts evaluation value entries which present minimum values from respective evaluation value management tables T10410, T10407, and T10408, and creates minimum evaluation value management table T10504 (FIG. 65) which is then notified to maximum evaluation value extraction unit 108. Maximum evaluation value extraction unit 108 extracts a maximum value "1.019" from minimum evaluation value management table T10504, and creates maximum evaluation value management table T11104 (FIG. 66) which is then notified to rejection determination unit 109B. Since the maximum evaluation value "1.019" is larger than the agreed service level determination threshold "1," rejection determination unit 109B notifies evaluation value recording unit 113 of maximum evaluation value management table T11104, and also notifies processing continuation determination unit 110B of maximum evaluation value management table T11104. After receiving maximum evaluation value management table T11104, evaluation value recording unit 113 ascertains whether or not it has retained a maximum evaluation value management table. In the present example, since evaluation value recording unit 113 has already retained maximum evaluation value management table T11103 (FIG. 64), evaluation value recording unit 113 compares the maximum value "1.035" in maximum evaluation value management table T11103 with the maximum value "1.019" in maximum evaluation value management table T11104 (FIG. 68), and continuously retains maximum evaluation value management table T11103 which has the maximum value "1.035" that is a lager value.

Assume that subsequently, the process has advanced to the step at which time determination unit 102B performs a time limit determination after increasing the rejection volume to "3", performing a simulation under the conditions of no changes in the situation in which the combined workflows are executed, and creating an evaluation value management table. Time determination unit 102B retrieves the current time "13: 48:33. 502". Since the current time has passed the determination end time "13:48:33. 107" retained therein, time determination unit 102B notifies evaluation value recording unit 113 of rejection determination end notification d50. Evaluation value recording unit 113 ascertains whether or not it has retained a maximum evaluation value management table. In the present example, since evaluation value recording unit 113 has already retained maximum evaluation value management table T11103, evaluation value recording unit 113 activates rejection command transmission unit 111B, and notifies the same of maximum evaluation value management table T11103. Rejection command transmission unit 111B extracts the simulation ID "00028" from maximum evaluation value management table T11103. Since an entry having the simulation ID "00028" is associated with a rejection-targeted combined workflow ID "000364" in hypothetically rejected combined workflow data management table T10600 (FIG. 24) retained in hypothetical rejection data creation unit 101B, rejection command transmission unit 111B issues a forced rejection command to a combined workflow that is being executed and which has the combined workflow ID "000364", and terminates processing operations.

As described above, when the rejection determination is not made, the evaluation values for combined workflows identified by the combined workflow IDs "000364" and "000367", among the combined workflows that are being executed, will fall below the agreed service level determination threshold, so that it is anticipated that the concluded agreed service level may not be satisfied. On the other hand, when the rejection determination is applied according to the second exemplary embodiment of the present invention, the evaluation value is anticipated to be "1.035" at lowest, by rejecting a combined workflow identified by the combined workflow ID "000364" among combined workflows that are being executed, and the evaluation value is anticipated to be "1.019" at lowest, by rejecting combined workflows identified by the combined workflow IDs "000364" and "000366" among combined workflows that are being executed. While it is anticipated that the agreed service level is satisfied both by rejecting only the combined workflow identified by the combined workflow ID "000364" and by rejecting the combined workflows identified by the combined workflow IDs "000364" and "000366," it is anticipated that the concluded agreed service level can be more satisfied by rejecting only the combined workflow identified by the combined workflow ID "000364" which provides the evaluation value of "1.035" at lowest.

Third Example

A third example will be described below in the assumption that the ID of a combined workflow definition to be subjected to a rejection determination is "0001," and information in an agreed service level that is concluded between a service provider and a service coordinator is set such that required combined workflow response time T is 60 seconds, required combined workflow average response execution time Ta 50 seconds, and required rejection ratio R is 5%. Also, assume that an evaluation value calculation function f that is concluded between the service provider and the service coordinate is defined by $f=(T/Ts)*(Ta/Tsa)*((R+1)/(Rs+1))$, where Ts is a predicted response time Ts calculated by a simulator, Tsa is a combined workflow average response time, and Rs is a rejection ratio. Then, assume that an agreement has been made in which the agreed service level is satisfied when f is equal to or greater than one. In other words, an agreed service level determination threshold is set at one. Also, assume that a simulation is limited to one second in time.

Assume that number-of-steps monitoring unit 130 has retained the combined workflow definition ID "0001" for uniquely identifying combined workflows which are subjected to the rejection determination, and has already retained execution state management table T10100 (FIG. 18). Execution state management table T10100 shows an example in which five combined workflows are being executed. Number-of-steps monitoring unit 130 is monitoring event storage DB 120, and detects that response message event data has been newly added from a business application for a combined workflow which is identified by a combined workflow ID "000364." Number-of-steps monitoring unit 130 updates execution state management table T10100, and creates execution state management table T10101 (FIG. 19). Since number-of-steps monitoring unit 130 has sensed that a change had been made in the number-of-steps with respect to a combined workflow, the combined workflow definition ID of which is "0001," number-of-steps monitoring unit 130 ascertains whether hypothetical rejection data creation unit 101C is active or not. Number-of-steps monitoring unit 130 activates hypothetical rejection data creation unit 101C because it is not active. Number-of-steps monitoring unit 130 notifies hypothetical rejection data creation unit 101C of combined workflow definition ID "0001".

Hypothetical rejection data creation unit 101C creates hypothetical rejection condition data management table T10700 (FIG. 20). Hypothetical rejection condition data management table T10700 shows an example where a hypothetical rejection condition ID is preliminarily set to "00025", and since a simulation is performed under rejection-free conditions, the rejection volume is zero, and the rejection-targeted combined workflow definition ID is "0001." Also, the number of steps in the rejection-targeted combined workflow has been set to "−1." Please note that the rejection-targeted combined workflow volume and the number of combinations are not yet determined at this time.

Time determination unit 102C calculates and retains a determination end time as "13:48:33.107" based on the fact that the current time is "13:48:32. 107" and the time limit of the simulation is one second, and activates evaluation value recording unit 113.

After being activated by hypothetical rejection data creation unit 101C, simulation data creation unit 103 notifies event information transmission unit 140 of the execution state query signal. Event information transmission unit 140 retrieves execution state management table T10101 (FIG. 19) that is retained by number-of-steps monitoring unit 130, and notifies simulation data creation unit 103 of the same.

Event data statistic calculation unit 104 retrieves historical information from event storage DB 120, analyzes the combined workflow average input time, the variance thereof and the like to deduce the most likely combined workflow input pattern, and creates predicted combined workflow input management table T10200 (FIG. 21).

Simulation data creation unit 103 creates simulation basic data management table T10900 (FIG. 22) based on execution state management table T10100 and predicted combined workflow input management table T10200. Simulation basic data management table T10900 shows an example where the current time, "13:48:33. 107" is set in time fields of combined workflow IDs "000363"-"000367," and zero is set in number-of-steps field of combined workflow IDs "S001"-"S003" which have been predicted to be input in the future.

Hypothetical rejection data creation unit 101C determines that the number of the rejection-targeted combined workflow volume is four, i.e., combined workflow IDs "000363", "000364", "000366", and "000367" from the fact that the number of steps in the rejection-targeted combined workflow is "−1" (rejection-free), and the rejection-targeted combined workflow definition ID is "0001," and from simulation basic data management table T10900 (FIG. 22), and retains the number "4" in hypothetical rejection condition data management table T10700 (FIG. 20). Also, since the rejection volume is zero, and the number of combinations of combined workflows of the rejection volume to be selected from the rejection-targeted combined workflow volume, i.e., the number of combinations in which zero is selected zero from four targets is one (4C0=1), the number of combinations equal to "1" is retained in hypothetical rejection condition data management table T10700.

Hypothetical rejection data creation unit 101C creates hypothetical rejection data management table T10800 (FIG. 23) based on simulation basic data management table T10900 (FIG. 22) as input data to simulation processing unit 112. At the first time, minus one hypothetical rejection data management table T10800 is created because the rejection volume is zero and the number of combinations is one. Hypothetical rejection data management table T10800 shows an example where a simulation ID is preliminarily set to "00027". Hypothetical rejection data creation unit 101A creates hypothetically rejected combined workflow data management table T10600 (FIG. 24), and creates hypothetically rejected combined workflow data entry T10601 (FIG. 24) by preliminarily setting the hypothetically rejected combined workflow ID to "00058." At this time, since the rejection volume is zero, the rejected combined workflow ID is set to "None."

Assume that processing is executed by simulation processing unit 112 based on hypothetical rejection data management table T10800 (FIG. 23) and simulation result management table T10300 (FIG. 25) has been created in the present example. Simulation processing unit 112 notifies evaluation value calculation unit 105 of simulation result management table T10300.

Evaluation value calculation unit 105 notifies event data statistic calculation unit 104 of the rejection-targeted combined workflow definition ID "0001" retained therein, and retrieves statistic information data management table T11000 (FIG. 26). Statistic information data management table T11000 shows an example where a statistic information ID is set to "005," the number of combined workflows so far executed is 200 among combined workflows, the combined workflow definition ID of which is "0001," an average response time of the executed combined workflows is 47.0 seconds, and the number of rejected combined workflows is nine. Evaluation value calculation unit 105 creates evaluation value management table T10400 (FIG. 27) based on entries for the combined workflow definition ID set to "0001" in simulation result management table T10300 (FIG. 25) and on statistic information data management table T11000 (FIG. 26), with the use of evaluation value calculation function f. The total of combined workflow predicted response time is 355 seconds for the entries, the combined workflow definition ID of which is "0001," in simulation result management table T10300 (FIG. 25), and the number of combined workflows input this time, in which the combined workflow definition ID is "0001," is six, so that the combined workflow average response time is calculated as:

$$(47.0*200+355)/(200+6)=47.354$$

when the present simulation result is reflected, so that combined workflow average response time Tsa as used by evaluation value calculation function f is 47.354 seconds. Similarly, rejection ratio Rs is calculated as $$(9+0)/(200+9+6)=0.042,$$

taking into consideration of the simulation performed without rejection. Accordingly, the evaluation value for the combined workflow ID "000363" in evaluation value management table T10400 (FIG. 27) is calculated as $$(50.0/47.354)*(60/50)*((0.05+1)/(0.042+1))=1.277.$$

Since evaluation value calculation unit 105 currently retains the number of combinations equal to one, evaluation value calculation unit 105 creates only one evaluation value management table which is evaluation value management table T10400. After creating evaluation value management table T10400, evaluation value calculation unit 105 notifies time determination unit 102C of time limit determination request d12.

Time determination unit 102C reads the current time "13:48:32. 130" and notifies evaluation value calculation unit 105 of time limit determination response d13 since the current time has not passed the determination end time "13:48:33. 107" retained therein.

Since evaluation value calculation unit 105 receives time limit determination response d13, it activates minimum evaluation value extraction unit 107 and notifies minimum evaluation value extraction unit 107 of evaluation value management table T10400.

Minimum evaluation value extraction unit 107 compares the minimum evaluation values with one another in evaluation value management table T10400, and extracts evaluation value entry T10401 which presents a minimum value to create minimum evaluation value management table T10500 (FIG. 28). Minimum evaluation value extraction unit 107 activates maximum evaluation value extraction unit 108, and notifies maximum evaluation value extraction unit 108 of minimum evaluation value management table T10500.

Maximum evaluation value extraction unit 108 extracts a maximum value "0.798" from minimum evaluation value management table T10500 and creates maximum evaluation value management table T11100 (FIG. 29). Maximum evaluation value extraction unit 108 activates rejection determination unit 109C, and notifies rejection determination unit 109C of maximum evaluation value management table T11100.

After receiving maximum evaluation value management table T11100, rejection determination unit 109C notifies evaluation value recording unit 113 of a maximum evaluation value management table request signal. After receiving the maximum evaluation value management table request signal, evaluation value recording unit 113 notifies rejection determination unit 109C of a maximum evaluation value management table not-yet-retained signal because evaluation value recording unit 113 does not retain the maximum evaluation value management table. Since rejection determination unit 109C has received the maximum evaluation value management table not-yet-retained signal from evaluation value recording unit 113, rejection determination unit 109C notifies evaluation value recording unit 113 of maximum evaluation value management table T11100. Also, rejection determination unit 109C activates processing continuation determination unit 110C, and notifies processing continuation determination unit 110C of maximum evaluation value management table T11100.

Processing continuation determination unit 110C reads the rejection volume "0" and rejection-targeted combined workflow volume "4" from hypothetical rejection condition data management table T10700 (FIG. 20) retrieved from hypothetical rejection data creation unit 101C. Since the rejection volume is smaller than the rejection-targeted combined workflow volume, and "None" is set in the number of steps in the rejection-targeted combined workflow in hypothetical rejection condition data management table T10700, i.e., it presents the state of rejection-free, processing continuation determination unit 110C newly sets the number of steps in the rejection-targeted combined workflow. Processing continuation determination unit 110C retrieves evaluation value management table T10400 (FIG. 27) from evaluation value calculation unit 105, and extracts evaluation value entries T10401, T10402 which present evaluation values that are less than the agreed service level determination threshold "1." Processing continuation determination unit 110C also retrieves hypothetical rejection data management table T10800 (FIG. 23) from hypothetical rejection data creation unit 101C, and reads therefrom the number-of-steps corresponding to evaluation value entries T10401, T10402. Since hypothetical rejection data entry T10801 corresponds to evaluation value entry T10401 and hypothetical rejection data entry T10802 corresponds to evaluation value entry T10402, the number-of-steps is "5" and "2," respectively. Accordingly, the maximum number of steps is "5," so that processing continuation determination unit 110C notifies hypothetical rejection data creation unit 101C of this number of steps as the number of steps in the rejection-targeted combined workflow.

Hypothetical rejection data creation unit 101C newly creates hypothetical rejection condition data management table T10701 (FIG. 30) based on hypothetical rejection condition data management table T10700 (FIG. 20). Hypothetical rejection data creation unit 101C sets the number of steps in the rejection-targeted combined workflow "5" received from processing continuation determination unit 110 into the number of steps in the rejection-targeted combined workflow in hypothetical rejection condition data management table T10701, and sets "1" into the rejection volume, where one is added to the rejection volume "0" in hypothetical rejection condition data management table T14 to derive the "1." After setting the rejection-targeted combined workflow definition ID "0001" in hypothetical rejection condition data management table T10700 into the rejection-targeted combined workflow definition ID, hypothetical rejection condition data management table T10700 is discarded. Please note that at this time, the rejection-targeted combined workflow volume and the number of combinations are not yet determined in hypothetical rejection condition data management table T10701 (FIG. 30).

Simulation data creation unit 103 again notifies event information transmission unit 140 of execution state query signal d42. Event information transmission unit 140 retrieves execution state management table T10102 (FIG. 31) retained by number-of-steps monitoring unit 130, and notifies simulation data creation unit 103 of this execution state management table T10102.

Event data statistic calculation unit 104 again retrieves historical information from event storage DB 120, analyzes a combined workflow average input time, the variance thereof and the like to deduce the most likely combined workflow input pattern, and creates predicted combined workflow input management table T10201 (FIG. 32).

Simulation data creation unit 103 newly creates simulation basic data management table T10901 (FIG. 33) based on execution state management table T10102 and predicted combined workflow input management table T10201, and notifies hypothetical rejection data creation unit 101C of simulation basic data management table T10901.

Since hypothetical rejection data creation unit 101C has already retained simulation basic data management table T10900, it compares simulation basic data management table T10900 with newly created simulation basic data management table T10901 in regard to the combined workflow ID and the number of steps. The present example shows a scenario where no change has been made in the situation in which combined workflows are being executed. Since there is no change in the situation in which combined workflows are being executed, the rejection determination is continued as before. Hypothetical rejection data creation unit 101C reads the number of steps in the rejection-targeted combined workflow "5" from hypothetical rejection condition data management table T10701 (FIG. 30) retained therein, and counts the number of entries which present the number-of-steps equal to or less than the number of steps in the rejection-targeted combined workflow "5" among combined workflows that are being executed and which have the combined workflow definition ID "0001." In the present example, the combined workflows having combined workflow definition ID "0001" among the combined workflows that are being executed have combined workflow IDs "000363", "000364", "000366," and "000367," and the combined workflows having the number-of-steps equal to or less than "5" among them are three which have combined workflow IDs "000364", "000366", and "000367." Accordingly, "3" is set into the rejection-targeted combined workflow volume in hypothetical rejection condition data management table T10701. Next, since the rejection volume is "1" in hypothetical rejection condition data management table T10701, and since the number of combinations of combined workflows of the rejection volume to be selected from the rejection-targeted combined workflow volume, i.e., the number of combinations to be selected one from three targets is three (3C1=3), the number of combinations equal to "3" is retained in hypothetical rejection condition data management table T10701 (FIG. 30).

Hypothetical rejection data creation unit 101C creates a hypothetical rejection data management table for combined workflows with the number-of-steps equal to or less than the number of steps in the rejection-targeted combined workflow "5," among those combined workflows that are being executed and which have the combined workflow definition ID "0001", from which combined workflows, the number of which is equal to the rejection volume "1", have been hypothetically rejected. In the present example, hypothetical rejection condition data management table T10803 (FIG. 34) results from the rejection of combined workflow ID "000364," where "REJECT" has been set in number-of-steps of hypothetical rejection data entry T10804 of combined workflow ID "000364" to indicate a hypothetical rejection. Likewise, hypothetical rejection condition data management table T10805 (FIG. 35) results from the hypothetical rejection of combined workflow ID "000366," and hypothetical rejection condition data management table T10806 (FIG. 36) results from the hypothetical rejection of combined workflow ID "000367." Hypothetical rejection data creation unit 101C also adds a hypothetically rejected combined workflow data entry to hypothetically rejected combined workflow data management table T10600, and notifies simulation processing unit 112 of three hypothetical rejection condition data management tables T10803, T10805, and T10806.

Assume that simulation processing unit 112 has executed the processing, and has created, in the present example, simulation result management table T10301 (FIG. 37) for hypothetical rejection data management table T10803 (FIG. 34); simulation result management table T10302 (FIG. 38) for hypothetical rejection data management table T10805 (FIG. 35); and simulation result management table T10303 (FIG. 39) for hypothetical rejection data management table T10806 (FIG. 36). Simulation processing unit 112 notifies evaluation value calculation unit 105 of simulation result management tables T10301, T10302, and T10303.

Evaluation value calculation unit 105 creates evaluation value management table T10403 (FIG. 40) for simulation result management table T10301 (FIG. 37); evaluation value management table T10404 (FIG. 41) for simulation result management table T10302 (FIG. 38); and evaluation value management table T10405 (FIG. 42) for simulation result management table T10303 (FIG. 39). In calculating the evaluation value for simulation result management table T10301, simulation result management table T10301 (FIG. 37) presents a total of 280 seconds of the combined workflow predicted response times stored in those entries which have the combined workflow definition ID "0001," and six combined workflows which have the combined workflow ID "0001" and have been input this time (the number of input combined workflows is six, and from which one is hypothetically rejected). Accordingly, combined workflow average response time Tsa, which reflects this simulation result, is calculated as (47.0*200+280)/(200+6)=46.990, and combined workflow average response time Tsa used by evaluation value calculation function f is calculated to be 46.990 seconds. Similarly, rejection ratio Rs is calculated as (9+1)/(200+9+6)=0.047, taking into consideration of the hypothetical rejection which is set to one. Consequently, the evaluation value for the combined workflow ID "000363" in evaluation value management table T10403 (FIG. 40) is calculated as:

(50.0/46.990)*(60/50)*((0.05+1)/(0.047+1))=1.281

Since the number of combinations retained in evaluation value calculation unit 105 is equal to "3," evaluation value calculation unit 105 notifies time determination unit 102C of time limit determination request d12 after it has created three evaluation value management tables T10403, T10404, and T10405.

Time determination unit 102C reads the current time "13:48:32. 552" and notifies evaluation value calculation unit 105 of time limit determination response d13 since the current time has not passed the determination end time "13:48:33. 107" retained therein. Since evaluation value calculation unit 105 receives time limit determination response d13, it notifies minimum evaluation value extraction unit 107 of evaluation value management tables T10403, T10404, and T10405. Minimum evaluation value extraction unit 107 extracts evaluation value entries which present minimum values, from respective evaluation value management tables T10403, T10404, and T10405, and creates minimum evaluation value management table T10501 (FIG. 43) which is then notified to maximum evaluation value extraction unit 108.

Maximum evaluation value extraction unit 108 extracts a maximum value "0.915" from minimum evaluation value management table T10501, and creates maximum evaluation value management table T11101 (FIG. 44) which is then notified to rejection determination unit 109C. After receiving maximum evaluation value management table T11101, rejection determination unit 109C notifies evaluation value recording unit 113 of a maximum evaluation value management table request signal. After receiving the maximum evaluation value management table request signal, evaluation value recording unit 113 notifies rejection determination unit 109C of maximum evaluation value management table T11100 retained therein. Rejection determination unit 109C compares the maximum evaluation value in maximum evaluation value management table T11101 received from maximum evaluation value extraction unit 108 with the maximum evaluation value in maximum evaluation value management table T11100 received from evaluation value recording unit 113. Rejection determination unit 109C determines that maximum evaluation value management table T11101 will provide a better evaluation value, because 0.798<0.915, and notifies evaluation value recording unit 113 of maximum evaluation value management table T11101. After receiving maximum evaluation value management table T11101, evaluation value recording unit 113 updates maximum evaluation value management table T11100 retained therein with maximum evaluation value management table T11101. Then, rejection determination unit 109C notifies processing continuation determination unit 110C of maximum evaluation value management table T11101.

Processing continuation determination unit 110C reads the rejection volume "1" and rejection-targeted combined workflow volume "3" from hypothetical rejection data management table T10701 (FIG. 30) received from hypothetical rejection data creation unit 101C. Since the rejection volume is smaller than the rejection-targeted combined workflow volume, and "5" is set in the number of steps in the rejection-targeted combined workflow in hypothetical rejection data management table T10701, processing continuation determination unit 110C notifies hypothetical rejection data creation unit 101C of the number of steps in the rejection-targeted combined workflow "5".

Hypothetical rejection data creation unit 101C newly creates hypothetical rejection condition data management table T10702 (FIG. 45) based on hypothetical rejection data management table T10701 (FIG. 30). Hypothetical rejection data creation unit 101C sets the number of steps in the rejection-targeted combined workflow "5" received from processing continuation determination unit 110C into the number of steps in the rejection-targeted combined workflow in hypothetical rejection data management table T10702, and sets "2" into the rejection volume, where one is added to the rejection volume "1" in hypothetical rejection data management table T10701 to derive the "2." After setting the rejection-targeted combined workflow definition ID "0001" in hypothetical rejection data management table T10701 into the rejection-targeted combined workflow definition ID, hypothetical rejection data management table T10701 is discarded. Please note that the rejection-targeted combined workflow volume and the number of combinations in hypothetical rejection data management table T10702 are not yet determined at this time.

Simulation data creation unit 103 again notifies event information transmission unit 140 of an execution state query signal. Event information transmission unit 140 retrieves execution state management table T10103 (FIG. 46) retained by number-of-steps monitoring unit 130, and notifies simulation data creation unit 103 of this execution state management table T10103.

Event data statistic calculation unit 104 again retrieves the historical information from event storage DB 120, analyzes a combined workflow average input time, the variance thereof and the like to deduce the most likely combined workflow input pattern, and creates predicted combined workflow input management table T10202 (FIG. 47).

Simulation data creation unit 103 newly creates simulation basic data management table T10902 (FIG. 48) based on execution state management table T10103 and predicted combined workflow input management table T10202, and notifies hypothetical rejection data creation unit 101C of simulation basic data management table T10902.

Since hypothetical rejection data creation unit 101C has already retained simulation basic data management table T10901 (FIG. 33), it compares simulation basic data management table T10901 with newly created simulation basic data management table T10902 in regard to the combined workflow ID and the number of steps. The present example shows a scenario where no change has been made in the situation in which combined workflows are being executed. Since there is no change in the situation in which combined workflows are executed, the rejection determination is continued as before. Hypothetical rejection data creation unit 101C reads the number of steps in the rejection-targeted combined workflow "5" from hypothetical rejection data management table T10702 (FIG. 45) retained therein, and counts the number of entries which present the number of steps equal to or less than the number of steps in the rejection-targeted combined workflow "5" among combined workflows that are being executed and which have the combined workflow definition ID "0001." In the present example, the combined workflows having the combined workflow definition ID "0001" within the combined workflows that are being executed have combined workflow IDs "000363", "000364", "000366", and "000367," and the combined workflows having the number of steps equal to or less than "5" among them are three which have combined workflow IDs "000364", "000366", and "000367". Accordingly, "3" is set into the rejection-targeted combined workflow volume in hypothetical rejection data management table T10702 (FIG. 45). Next, since the rejection volume is "2" in hypothetical rejection data management table T10702 (FIG. 45), and since the number of combinations for selecting the number of combined workflows to be rejected from the rejection-targeted combined workflow volume, i.e., the number of combinations of combined workflows of the rejection volume to be selected from the rejection-targeted combined workflow volume, i.e., the number of combinations to be selected two from three targets is three (3C2=3), the number of combinations equal to "3" is retained in hypothetical rejection data management table T10702.

Hypothetical rejection data creation unit 101C creates a hypothetical rejection data management table for combined workflows with the number-of-steps equal to or less than the number of steps in the rejection-targeted combined workflow "5," among those combined workflows that are being executed and which have the combined workflow definition ID "0001," from which a number of combined workflows equal to the rejection volume "2" have been hypothetically rejected. In the present example, hypothetical rejection condition data management table T10807 (FIG. 49) results from the rejection of combined workflow ID "000364" and "000366"; hypothetical rejection data management table T10808 (FIG. 50) results from the hypothetical rejection of combined workflow IDs "000364" and "000367"; hypothetical rejection data management table T10809 (FIG. 51) results from the hypothetical rejection of combined workflow IDs "000366" and "000367". Hypothetical rejection data creation unit 101C also adds a hypothetically rejected combined workflow data entry to hypothetically rejected combined workflow data management table T10600 (FIG. 24), and notifies simulation processing unit 112 of three hypothetical rejection data management tables T10807, T10808, and T10809.

Assume that simulation processing unit 112 has executed the processing, and has created, in the present example, simulation result management table T10308 (FIG. 64) for hypothetical rejection data management table T10807 (FIG. 49); simulation result management table T10305 (FIG. 53) for hypothetical rejection data management table T10808 (FIG. 50); and simulation result management table T10306 (FIG. 54) for hypothetical rejection data management table T10809 (FIG. 51). Simulation processing unit 112 notifies evaluation value calculation unit 105 of simulation result management tables T10308, T10305, and T10306.

Assume that simulation processing unit 112 has executed the processing to create, in the present example, simulation result management table T10308 (FIG. 64) for hypothetical rejection data management table T10807 (FIG. 49); simulation result management table T10305 (FIG. 53) for hypothetical rejection data management table T10808 (FIG. 50); and simulation result management table T10306 (FIG. 54) for hypothetical rejection data management table T10809 (FIG. 51). Simulation processing unit 112 notifies evaluation value calculation unit 105 of simulation result management tables T10308, T10305, and T10306.

Evaluation value calculation unit 105 creates evaluation value management table T10410 (FIG. 65) for simulation result management table T10308 (FIG. 64); evaluation value management table T10407 (FIG. 56) for simulation result management table T10305 (FIG. 53); and evaluation value management table T10408 (FIG. 57) for simulation result management table T10306 (FIG. 54). In calculating the evaluation value for simulation result management table T10308, simulation result management table T10308 presents a total of 213 seconds of the combined workflow predicted response times stored in those entries which have the combined workflow definition ID "0001," and six combined workflows which have the combined workflow ID "0001" and have been input this time (the number of input combined workflows is six, and from which two are hypothetically rejected). Accordingly, combined workflow average response time Tsa, which reflects this simulation result, is calculated as $$(47.0*200+213)/(200+6)=46.665,$$

and combined workflow average response time Tsa used by evaluation value calculation function f is calculated to be 46.665 seconds. Similarly, rejection ratio Rs is calculated as $$(9+2)/(200+9+6)=0.052,$$

taking into consideration of the hypothetical rejection which is set to two. Consequently, the evaluation value for the combined workflow ID "000363" in evaluation value management table T10410 is calculated as:

$$(50.0/46.665)*(60/50)*((0.05+1)/(0.052+1))=1.019$$

Since the number of combinations retained in evaluation value calculation unit 105 is equal to "3", evaluation value calculation unit 105 notifies time determination unit 102C of time limit determination request d12 after it has created three evaluation value management tables T10410, T10407, and T10408.

Time determination unit 102C retrieves the current time "13:48:33. 125". Since the current time has passed the determination end time "13:48:33. 107" retained therein, time determination unit 102C notifies evaluation value recording unit 113 of rejection determination end notification d43. Evaluation value recording unit 113 ascertains whether or not it retains a maximum evaluation value management table. In the present example, since evaluation value recording unit 113 has already retained maximum evaluation value management table T11101, evaluation value recording unit 113 activates rejection command transmission unit 111C, and notifies the same of maximum evaluation value management table T11101. Rejection command transmission unit 111C extracts the simulation ID "00028" from maximum evaluation value management table T11101. Since an entry having the simulation ID "00028" is associated with a rejection-targeted combined workflow ID "000364" in hypothetically rejected combined workflow data management table T10600 (FIG. 24) retained in hypothetical rejection data creation unit 101C, rejection command transmission unit 111C issues a forced rejection command to a combined workflow that is being executed and which has the combined workflow ID "000364", and terminates processing operations.

As described above, when the rejection determination is not made, the evaluation values for combined workflows identified by the combined workflow IDs "000364" and "000367", among the combined workflows that are being executed, fall below the agreed service level determination threshold, so that it is anticipated that the concluded agreed service level may not be satisfied. On the other hand, when the rejection determination is applied according to the third embodiment of the present invention, the evaluation value is anticipated to be "0.915" at lowest, by rejecting a combined workflow identified by the combined workflow ID "000364" among combined workflows that are being executed. Accordingly, from the anticipation that the evaluation value will be "0.798" if no combined workflow that are being executed is rejected, the evaluation value is anticipated to be improved to "0.915" if the combined workflow identified by the combined workflow ID "000364" is rejected among the combined workflows that are being executed, though the concluded agreed service level cannot be satisfied because it still falls below the agreed service level determination threshold, so that it is anticipated that the evaluation value can be brought closer to the concluded agreed service level.

The rejection determination according to the third embodiment can find a rejection pattern which provides the highest evaluation value among rejection patterns determined within a time limit irrespective of whether the agreed service level determination threshold is satisfied or not. Accordingly, the rejection determination according to the third embodiment is advantageous over the first and second embodiments in that the evaluation value can be improved even if the concluded agreed service level cannot be satisfied.

Fourth Example

A fourth example will be described below in the assumption that the ID of a combined workflow definition to be subjected to a rejection determination is "0001," and information in an agreed service level that is concluded between a service provider and a service coordinator is set such that required combined workflow response time T is 60 seconds, required combined workflow average response execution time Ta 50 seconds, and required rejection ratio R is 5%. Also, assume that an evaluation value calculation function f that is concluded between the service provider and the service coordinate is defined by $f=(T/Ts)*(Ta/Tsa)*((R+1)/(Rs+1))$, where Ts is a predicted response time Ts calculated by a simulator, Tsa is a combined workflow average response time, and Rs is a rejection ratio. Then, assume that an agreement has been made in which the agreed service level is satisfied when f is equal to or greater than one. In other words, an agreed service level determination threshold is set at one. Also, assume that a simulation is limited to one second in time.

Assume that number-of-steps monitoring unit 130 has retained the combined workflow definition ID "0001" for uniquely identifying combined workflows which are subjected to the rejection determination, and has already retained execution state management table T10100 (FIG. 18). Execution state management table T10100 shows an example in which five combined workflows are being executed. Number-of-steps monitoring unit 130 is monitoring event storage DB 120, and detects that response message event data has been newly added from a business application for a combined workflow which is identified by a combined workflow ID "000364." Number-of-steps monitoring unit 130 updates execution state management table T10100, and creates execution state management table T10101 (FIG. 19). Since number-of-steps monitoring unit 130 has sensed that a change had been made in the number-of-steps with respect to a combined workflow, the combined workflow definition ID of which is "0001," number-of-steps monitoring unit 130 ascertains whether or not hypothetical rejection data creation unit 101D is active. Number-of-steps monitoring unit 130 activates hypothetical rejection data creation unit 101D because it is not active. Number-of-steps monitoring unit 130 notifies hypothetical rejection data creation unit 101D of combined workflow definition ID "0001".

Hypothetical rejection data creation unit 101D creates hypothetical rejection condition data management table T10703 (FIG. 85). Hypothetical rejection condition data management table T10703 shows an example where a hypothetical rejection condition ID is preliminarily set to "00025," and the rejection-targeted combined workflow definition ID is "0001." Please note that the rejection-targeted combined workflow volume and the number of combinations are not yet determined at this time.

Time determination unit 102D calculates and retains a determination end time as "13:48:33.107" based on the fact that the current time is "13:48:32. 107" and the time limit of the simulation is one second.

After being activated by hypothetical rejection data creation unit 101D, simulation data creation unit 103 notifies event information transmission unit 140 of an execution state query signal. Event information transmission unit 140 retrieves execution state management table T10101 (FIG. 19) that is retained by number-of-steps monitoring unit 130, and notifies simulation data creation unit 103 of the same.

Event data statistic calculation unit 104 retrieves historical information from event storage DB 120, analyzes a combined workflow average input time, the variance thereof and the like to create combined workflow input information management table T11200 (FIG. 80), then deduces the most likely combined workflow input pattern, and creates predicted combined workflow input management table T10200 (FIG. 21). Combined workflow input information management table T11200 shows an example where input information includes an average input time of combined workflows belonging to the combined workflow definition ID "0001" which is set to 493 seconds; its variance to 64.9 $sec^2$; an average input interval of combined workflows belonging to the combined workflow definition ID "0002" which is set to 526 seconds; and its variance to 160.5 sec².

Simulation data creation unit 103 creates simulation basic data management table T10900 (FIG. 22) based on execution state management table T10100 and predicted combined workflow input management table T10200. Simulation basic data management table T10900 shows an example where the current time, "13:48:33. 107" is set in time fields of combined workflow IDs "000363" to "000367," and zero is set in number-of-steps field of combined workflow IDs "S001" to "S003" which have been predicted to be input in the future. Simulation data creation unit 103 notifies hypothetical rejection data creation unit 101D of combined workflow input information management table T11200 received from event data statistical calculation unit 104.

After receiving simulation basic data management table T10900 from simulation data creation unit 103 and combined workflow input information management table T11200, hypothetical rejection data creation unit 101D ascertains whether or not state expression generation unit 201D is active. Hypothetical rejection data creation unit 101D activates state expression generation unit 201D because it is not activated. Hypothetical rejection data creation unit 101D notifies state expression generation unit 201D of simulation basic data management table T10900, combined workflow input information management table T11200, and rejection-targeted combined workflow definition ID "0001".

After being activated, state expression generation unit 201D retrieves a maximum number-of-steps which can be taken by a combined workflow that is being executed in all combined workflow definitions, from maximum number-of-steps holding unit 150. Assume in the present example that a combined workflow belonging to the combined workflow definition ID "0001" can take the number-of-steps up to six, and a combined workflow belonging to the combined workflow definition ID "0002" up to three, so that state expression generation unit 201D retrieves the maximum number-of-steps "6" from maximum number-of-steps holding unit 150 in the present example.

State expression generation unit 201D extracts, from received simulation basic data management table T10900 and combined workflow input information management table T11200, for each combined workflow definition ID, the number of combined workflows which belong to a combined workflow definition that has the combined workflow definition ID and aggregated on a per number-of-steps basis, an average input interval, and the variance, to thereby create state expression vector V10100 (FIG. 81). State expression vector V10100 shows an exemplary vector which represents an execution state which belongs to combined workflow definition ID "0001." From simulation basic data management table T10900, it can be seen that the number of combined workflows with one step is one; the number of combined workflows with two steps is one; the number of combined workflows with three or four steps is zero; the number of combined workflows with five steps is one; and the number of combined workflows with six steps is one. It can also be seen from combined workflow input information management table T11200 that the average input interval is 493 seconds, and its variance is 64.9 sec². These pieces of information together with the combined workflow definition ID are expressed by state expression vector V10100. Similarly, state expression generation unit 201D represents an execution state belonging to the combined workflow definition ID "0002" in the form of state expression vector. Here, in order to match the number of elements of the state expression vector associated with the combined workflow definition ID "0002" to the number of elements of the state expression vector associated with the combined workflow definition ID "0001", the number of combined workflows is aggregated up to a maximum number-of-steps of six, retrieved from maximum number-of-steps holding unit 150, with respect to the number-of-steps of combined workflows associated with combined workflow definition ID "0002."

State expression generation unit 201D generates state expression vectors with respect to the respective combined workflow definition IDs, and aggregates them to generate state expression matrix M10100.

FIG. 82 shows state expression matrix M10100 which is generated from simulation basic data management table T10900 and combined workflow input information management table 00. State expression generation unit 201D activates state expression search unit 203D, and notifies state expression search unit 203D of state expression matrix M10100 generated thereby, and rejection-targeted combined workflow definition ID "0001" received from hypothetical rejection data creation unit 101D.

State expression search unit 203D searches state history management table T11300 stored in state history storage DB 202D using received state expression matrix M10100 and rejection-targeted combined workflow definition ID "0001" as keys. FIG. 83 shows state historical information management table T11300 which is retained in state history storage DB 202D in the present example. Please note that in state historical information management table T11300, state expression matrixes and rejection state vectors are expressed by character strings for convenience, but they are actually matrixes and vectors, respectively. Since the present invention is not intended for an approach for retaining matrixes and vectors in DB, the approach is not explicitly described, and in the following description, matrixes and vectors are expressed by character strings for convenience in a manner similar to state historical information management table T11300 when they are retained in DB. Since state expression matrix M10100 and rejection-targeted combined workflow definition ID "0001" are retained in relation to each other in state historical information management table T11300, state expression search unit 203D retrieves corresponding rejection state expression vector V10200, evaluation value "0.915," convergence determination flag "0," rejection volume "2," and the number of steps in the rejection-targeted combined workflow "5." Thus, according to the result of a past rejection determination under the conditions expressed by state expression matrix M10100, it is understood that when the rejection volume is set to two; rejection-targeted combined workflow number-of-steps to five; and the rejection condition to rejection state expression vector V10200 (which involves rejecting one each of combined workflows having the number-of-steps equal to "1" and the number-of-steps equal to "5"), a prediction can be made that an evaluation value of 0.915 can be achieved, though it is not the best (because the convergence determination flag is not set). Please note that in the present example, the convergence determination flag is set when it is "1" and is not set when it is "0."

Since the read convergence determination flag is not set, state expression search unit 203D creates maximum evaluation value management table T11105 (FIG. 84) which is then notified to evaluation value recording unit 113. Evaluation value recording unit 113 retains received maximum evaluation value T11105. At this time, since the evaluation value is retrieved from state history storage DB 202D, the simulation ID in maximum evaluation value management table T11105 is set to "−1." Further, state expression search unit 203D adds one to the rejection volume "2" retrieved from state history storage DB 202D to derive "3" which is notified to hypothetical rejection data creation unit 101D as the rejection volume. Similarly, state expression search unit 203D notifies hypothetical rejection data creation unit 101D of the number of steps in the rejection-targeted combined workflow number "5" retrieved from state history storage DB 202D.

Hypothetical rejection data creation unit 101D determines that the rejection-targeted combined workflow volume is three, i.e., combined workflow IDs "000364", "000366", and "000367" from the fact that the number of steps in the rejection-targeted combined workflow is "5", and the rejection-targeted combined workflow definition ID is "0001," and from simulation basic data management table T10900 (FIG. 22), and retains the number "3" in hypothetical rejection condition data management table T10703 (FIG. 85). Also, since the rejection volume is three received from state expression search unit 203D, and the number of combinations of combined workflows of the rejection volume to be selected from the rejection-targeted combined workflow volume, i.e., the number of combinations in which three is selected from three targets is one (3C3=1), the number of combinations equal to "1" is retained in hypothetical rejection condition data management table T10703.

Hypothetical rejection data creation unit 101D creates hypothetical rejection data management table T10810 (FIG. 86) based on simulation basic data management table T10900 (FIG. 22) as input data to simulation processing unit 112. Hypothetical rejection data management table T10810 shows an example where a simulation ID is preliminarily set to "00027". Hypothetical rejection data creation unit 101D also creates hypothetically rejected combined workflow data management table T10602 (FIG. 87).

Assume that processing is executed by simulation processing unit 112 based on hypothetical rejection data management table T10810 and simulation result management table T10309 (FIG. 88) has been created in the present example. Simulation processing unit 112 notifies evaluation value calculation unit 105 of simulation result management table T10309.

Evaluation value calculation unit 105 notifies event data statistic calculation unit 104 of the rejection-targeted combined workflow definition ID "0001" retained therein, and retrieves statistic information data management table T11000 (FIG. 26). Statistic information data management table T11000 shows an example where a statistic information ID is set to "005," the number of combined workflows so far executed is 200 among combined workflows, the combined workflow definition ID of which is "0001," an average response time of the executed combined workflows is 47.0 seconds, and the number of rejected combined workflows is nine. Evaluation value calculation unit 105 creates evaluation value management table T10411 (FIG. 89) based on entries for the combined workflow definition ID set to "0001" in simulation result management table T10300 (FIG. 25) and in statistic information data management table T11000 (FIG. 26), with the use of evaluation value calculation function f. The total of combined workflow predicted response times is 140 seconds for the entries, the combined workflow definition ID of which is "0001" in simulation result management table T10309, and the number of combined workflows input this time, having the combined workflow definition ID being "0001" is six, so that the combined workflow average response time is calculated as:

$$(47.0*200+140)/(200+6)=46.311$$

when the present simulation result is reflected, so that combined workflow average response time Tsa as used by evaluation value calculation function f is 46.311 seconds. Similarly, rejection ratio Rs is calculated as $$(9+3)/(200+9+6)=0.059,$$

taking into consideration of the three hypothetically rejected combined workflows. Accordingly, the evaluation value for the combined workflow ID "000363" in evaluation value management table T10411 is calculated as $$(50.0/46.311)*(60/50)*((0.05+1)/(0.059+1))=1.285.$$

Since evaluation value calculation unit 105 currently retains the number of combinations equal to one, evaluation value calculation unit 105 creates only one evaluation value management table which is evaluation value management table T10411. After creating evaluation value management table T10411, evaluation value calculation unit 105 notifies time determination unit 102D of time limit determination request d12.

Time determination unit 102D reads the current time "13:48:32. 130" and notifies evaluation value calculation unit 105 of time limit determination response d13 since the current time has not passed the determination end time "13:48:33. 107" retained therein.

Since evaluation value calculation unit 105 receives time limit determination response d13, it activates minimum evaluation value extraction unit 107 and notifies minimum evaluation value extraction unit 107 of evaluation value management table T10411.

Minimum evaluation value extraction unit 107 compares the minimum evaluation values with one another in evaluation value management table T10411, extracts a minimum value, and creates minimum evaluation value management table T10505 (FIG. 90). Minimum evaluation value extraction unit 107 activates maximum evaluation value extraction unit 108, and notifies maximum evaluation value extraction unit 108 of minimum evaluation value management table T10505.

Maximum evaluation value extraction unit 108 extracts a maximum value "1.285" from minimum evaluation value management table T10505, and creates maximum evaluation value management table T11106 (FIG. 91). Maximum evaluation value extraction unit 108 activates rejection determination unit 109D, and notifies rejection determination unit 109D of maximum evaluation value management table T11106.

After receiving maximum evaluation value management table T11106, rejection determination unit 109D notifies evaluation value recording unit 113 of a maximum evaluation value management table request signal. Since evaluation value recording unit 113 retains maximum evaluation value management table T11105 after receiving the maximum evaluation value management table request signal, evaluation value recording unit 113 notifies rejection determination unit 109D of maximum evaluation value management table T11105. Rejection determination unit 109D compares the maximum evaluation value in maximum evaluation value management table T11105 received from evaluation value recording unit 113 with the maximum evaluation value in maximum evaluation value management table T11106 received from maximum evaluation value extraction unit 108, and notifies evaluation value recording unit 113 of maximum evaluation value management table T11106 which retains the higher maximum evaluation value. Also, rejection determination unit 109D activates processing continuation determination unit 110D, and notifies processing continuation determination unit 110D of maximum evaluation value management table T11106. Rejection determination unit 109D further activates processing continuation determination unit 110D, and notifies the same of maximum evaluation value management table T11106.

Processing continuation determination unit 110D reads the rejection volume "3" and rejection-targeted combined workflow volume "3" from hypothetical rejection data management table T10703 (FIG. 85) retrieved from hypothetical rejection data creation unit 101D. Since the rejection volume is equal to the rejection-targeted combined workflow volume, processing continuation determination unit 110D determines that there is no more combination of combined workflows to be rejected, and sets the convergence determination flag to "1." Next, processing continuation determination unit 110D notifies evaluation value recording unit 113 of a rejection determination end notification and the convergence determination flag "1".

Since evaluation value recording unit 113 has received the rejection determination end notification, evaluation value recording unit 113 activates rejection command transmission unit 111D, and notifies rejection command transmission unit 111D of maximum evaluation value management table T11106 retained therein and the convergence determination flag.

Upon receipt of maximum evaluation value management table T11106, rejection command transmission unit 111D ascertains whether or not maximum evaluation value management table T11106 has been retrieved from histories retained in state history storage DB 202D. In the present example, rejection command transmission unit 111D can determine that maximum evaluation value management table T11106 has not been retrieved from the state history storage DB because maximum evaluation value management table T11106 has the simulation ID set to "00027," which is different from the simulation ID "−1" that would be given if maximum evaluation value management table T11106 had been retrieved from state history storage DB 202D.

Since rejection-targeted combined workflow IDs for the entries having the simulation ID "00027" in hypothetically rejected combined workflow data management table T10602 retained in hypothetical rejection data creation unit 101D are "00364", "00366", and "00367", rejection command transmission unit 111D issues a forced rejection command to combined workflows that are being executed and which have the combined workflow IDs "00364", "00366", and "00367". Next, rejection command transmission unit 111D activates rejection state capture unit 204D, and notifies rejection state capture unit 204D of maximum evaluation value management table T11106 and convergence determination flag "1".

Rejection state capture unit 204D ascertains whether or not maximum evaluation value management table T11106 received from rejection command transmission unit 111D has been retrieved from histories retained in state history storage DB 202D. In the present example, rejection state capture unit 204D can determine that maximum evaluation value management table T11106 has not been retrieved from the state history storage DB because maximum evaluation value management table T11106 has the simulation ID set to "00027," which is different from the simulation ID "−1" that would be given if maximum evaluation value management table T11106 had been retrieved from state history storage DB 202D. Next, rejection state capture unit 204D retrieves a rejection volume and the number of steps in the rejection-targeted combined workflow from hypothetical rejection data creation unit 101D. First, since the simulation ID in maximum evaluation value management table T11106 is "00027," rejection state capture unit 204D extracts a hypothetical rejection condition ID "00025" of an entry, the simulation ID of which matches "00027" in hypothetically rejected combined workflow data management table T10602 (FIG. 87) retained in hypothetical rejection data creation unit 101D. Next, rejection state capture unit 204D searches hypothetical rejection data creation unit 101D for hypothetical rejection data management table T10703 (FIG. 85) which has the hypothetical rejection condition ID "00025" in the hypothetical rejection condition ID field, and can retrieve the rejection volume "3" and the number of steps in the rejection-targeted combined workflow "5" which are retained in hypothetical rejection data management table T10703. Next, rejection state capture unit 204D activates rejection state expression generation unit 206D, and notifies rejection state expression generation unit 206D of maximum evaluation value management table T11106.

Rejection state expression generation unit 206D retrieves hypothetically rejected combined workflow data management table T10602 (FIG. 87) and simulation basic data management table T10900 from hypothetical rejection data creation unit 101D. First, since the simulation ID of maximum evaluation value management table T11106 is "00027," rejection state expression generation unit 206D retrieves rejected combined workflow IDs "000364," "000366," "000367" associated with the simulation ID which matches "00027" from hypothetically rejected combined workflow data management table T10602. Next, rejection state expression generation unit 206D extracts entries, the combined workflow ID of which matches the retrieved rejected combined workflow ID "000364", "000366", and "000367" from simulation basic data management table T10900 (FIG. 22), and retrieves the combined workflow definition ID "0001" and the number of steps "5", "2", and "1." Next, rejection state expression generation unit 206D retrieves a maximum number of steps "6" which can be taken by the combined workflow definition ID "0001" retrieved from the maximum number-of-steps holding unit. Accordingly, rejection state expression generation unit 206D aggregates the number of rejected combined workflows which have the combined workflow definition ID "0001" up to the number of steps of six, on a per number-of-steps basis, and creates rejection state expression vector V10201 (FIG. 92). Rejection state expression generation unit 206D notifies rejection state capture unit 204D of generated rejection state expression vector V10201.

After receiving rejection state expression vector V10201, rejection state capture unit 204D retrieves state expression matrix M10100 and rejection-targeted combined workflow definition ID "0001" from state expression search unit 203D. Thus, since rejection state capture unit 204D has fully collected information required to create a state historical information management table, i.e., state expression matrix M10100, rejection-targeted combined workflow definition ID "0001," rejection state expression vector V10201, evaluation value "1.285," convergence determination flag "1," rejection volume "3," and the number of steps in the rejection-targeted combined workflow "5," rejection state capture unit 204D creates state historical information management table T11301 (FIG. 93). Next, rejection state capture unit 204D activates state expression recording unit 205D, and notifies state expression recording unit 205D of created state historical information management table T11301.

After receiving state historical information management table T11301, state expression recording unit 205D searches state historical information management table T11300 (FIG. 83) retained in the state history storage DB. Since a set of state expression matrix M10100 and rejection-targeted combined workflow definition ID "0001" found in state historical information management table T11301 exists in state historical information management table T11300, state expression recording unit 205D updates state historical information management table T11300 such that information tied to the set of state expression matrix M10100 and rejection-targeted combined workflow definition ID "0001" becomes similar to state historical information management table T11301 (updated state historical information management table T11302 is shown in FIG. 94), and terminates processing operations.

As described hereinabove, when the rejection determination according to the fourth embodiment is applied, provided that state history storage DB 202D retains a state similar to a state in which the rejection determination is made, it is anticipated that at least a retained evaluation value will be ensured if combined workflows are rejected in accordance with a rejection pattern expressed by a retained rejection state expression vector. Also, when the convergence determination flag is not set, the rejection determination is started using a rejection volume which results from addition of one to the retained rejection volume, thereby making it possible to search for a rejection pattern which provides a better evaluation value. In the present example, it is anticipated that an evaluation value of "0.915" can be achieved if combined workflows that are being executed are rejected in accordance with a rejection pattern originally expressed by rejection state expression vector V10200. Moreover, it is anticipated that an evaluation value of "1.285" can be achieved if combined workflows that are being executed are rejected in accordance with a rejection pattern expressed by rejection state expression vector V10201, as a result of a rejection determination which is made with an increased number of rejected combined workflows. Also, in the present example, since the convergence determination flag is eventually set, it is anticipated that the evaluation value of "1.285" will be achieved if combined workflows that are being executed are rejected in accordance with the rejection pattern expressed by rejection state expression vector V10201 retained in state history storage DB 202D without performing the rejection determination process, if a situation similar to the present example is found in the future.

In this way, from the fact that past rejection determination histories are retained and utilized to search for a rejection pattern which provides a better evaluation value, and that the rejection determination process is not needed if the convergence determination flag is set, it can be expected that the evaluation value will be further improved, and the rejection determination process will be reduced in time and in cost. Thus, the rejection determination according to the fourth embodiment of the present invention is more advantageous.

Fifth Example

In describing a fifth example, since detailed operations of rejection determination function unit 100E are similar to those of rejection determination function unit 100D in the fourth example, detailed descriptions in rejection determination function unit 100E are omitted.

Assume that number-of-steps monitoring unit 130 has retained the combined workflow definition ID "0001" for uniquely identifying combined workflows which are subjected to the rejection determination, and has already retained execution state management table T10100 (FIG. 18). Execution state management table T10100 shows an example of five combined workflows that are being executed. Number-of-steps monitoring unit 130 is monitoring event storage DB 120 to sense that response message event data has been newly added from a business application for a combined workflow which is identified by a combined workflow ID "000364." Number-of-steps monitoring unit 130 updates execution state management table T10100 to create execution state management table T10101 (FIG. 19). Since number-of-steps monitoring unit 130 has sensed that a change had been made in the number of steps with respect to a combined workflow, the combined workflow definition ID of which is "0001," number-of-steps monitoring unit 130 ascertains whether or not hypothetical rejection data creation unit 101E is active, and activates the same because hypothetical rejection data creation unit 101E is not active. Number-of-steps monitoring unit 130 notifies hypothetical rejection data creation unit 101D of combined workflow definition ID "0001".

Hypothetical rejection data creation unit 101E creates hypothetical rejection data management table T10703 (FIG. 20). Hypothetical rejection data management table T10703 shows an example where a hypothetical rejection condition ID is preliminarily set to "00025", and a rejection-targeted combined workflow definition ID is "0001." Please note that the rejection-targeted combined workflow volume and the number of combinations are not yet determined at this time.

Time determination unit 102E calculates and retains a determination end time as "13:48:33.107" from the fact that the current time is "13:48:32. 107" and the time limit of the simulation is one second, and activates evaluation value recording unit 113.

After being activated by hypothetical rejection data creation unit 101E, simulation data creation unit 103 notifies event information transmission unit 140 of an execution state query signal. Event information transmission unit 140 retrieves execution state management table T10101 (FIG. 19) retained by number-of-steps monitoring unit 130, and notifies simulation data creation unit 103 of the same.

Event data statistic calculation unit 104 retrieves historical information from event storage DB 120, analyzes a combined workflow average input time, the variance thereof and the like to create combined workflow input information management table T11200 (FIG. 80), deduces the most likely combined workflow input pattern, and creates predicted combined workflow input management table T10200 (FIG. 21). Combined workflow input information management table T11200 shows an example where input information includes an average input time of combined workflows belonging to the combined workflow definition ID "0001," which is set to 493 seconds; its variance to 64.9 $sec^2$; an average input interval of combined workflows belonging to the combined workflow definition ID "0002," which is set to 526 seconds; and its variance to 160.5 $sec^2$.

Simulation data creation unit 103 creates simulation basic data management table T10900 (FIG. 22) based on execution state management table T10100 and predicted combined workflow input management table T10200. Simulation basic data management table T10900 shows an example where the current time, "13:48:33. 107" is set in time fields of combined workflow IDs "000363" to "000367" in simulation basic data management table T10900, and zero is set in the number-of-steps field of combined workflow IDs "S001" to "S003" which have been predicted to be input in the future.

After receiving simulation basic data management table T10900 from simulation data creation unit 103 and combined workflow input information management table T11200, hypothetical rejection data creation unit 101E ascertains whether or not state expression generation unit 201E is active, and activates the same because state expression generation unit 201E is not activated. Hypothetical rejection data creation unit 101E notifies state expression generation unit 201E of simulation basic data management table T10900, combined workflow input information management table T11200, and rejection-targeted combined workflow definition ID "0001".

After being activated, state expression generation unit 201E retrieves from maximum number-of-steps holding unit 150, maximum number of steps which can be taken by a combined workflow that is being executed in all combined workflow definitions. Assume in the present example that a combined workflow belonging to the combined workflow definition ID "0001" can take the number of steps up to six, while a combined workflow belonging to the combined workflow definition ID "0002" up to three, so that state expression generation unit 201E retrieves maximum number of steps "6" from maximum number of steps holding unit 150 in the present example.

State expression generation unit 201E creates state expression vector V10100 (FIG. 81) by extracting, on a per combined workflow definition ID basis, the number of combined workflows aggregated on a per number-of-steps basis with respect to combined workflows which belong to combined workflow definitions that belong to the combined workflow definition IDs, an average input interval, and the variance, from received simulation basic data management table T10900 and combined workflow input information management table T11200. State expression vector V10100 shows an exemplary vector which represents an execution state which belongs to combined workflow definition ID "0001." It can be seen from simulation basic data management table T10900 that there is one combined workflow with the number-of-steps set to one; one combined workflow with the number-of-steps set to two; zero each of combined workflow with the number-of-steps set to three or four; one combined workflow with the number-of-steps set to five; and one combined workflow with the number-of-steps set to six. It can seen from combined workflow input information management table T11200 that the average input interval is 493 seconds, and its variance is 64.9 sec$^2$. These pieces of information and the combined workflow definition ID are together expressed by state expression vector V10100. Similarly, state expression generation unit 201D expresses an execution state belonging to the combined workflow definition ID "0002" in the form of state expression vector. Here, in order to match the number of vector elements in the state expression vectors, the number of combined workflows is aggregated up to a maximum number of steps of six, retrieved from maximum number-of-steps holding unit 150, with respect to the number-of-steps of combined workflows associated with combined workflow definition ID "0002."

State expression generation unit 201E generates state expression vectors with respect to the respective combined workflow definition IDs, and aggregates them to generate state expression matrix M10100.

FIG. 82 shows state expression matrix M10100 which is generated from simulation basic data management table T10900 and combined workflow input information management table T11200. State expression generation unit 201E activates state expression search unit 203E, and notifies state expression matrix M10100 generated thereby, and rejection-targeted combined workflow definition ID "0001" received from hypothetical rejection data creation unit 101E.

State expression search unit 203E searches state history management table T11300 stored in state history storage DB 202E with received state expression matrix M10100 and rejection-targeted combined workflow definition ID "0001" used as keys. FIG. 97 shows state historical information management table T11303 which is retained in state history storage DB 202E in the present example. In state historical information management table T11300, state expression matrixes and rejection state vectors are expressed by character strings for convenience, but they are actually matrixes and vectors, respectively. Since the present invention is not intended for an approach for holding matrixes and vectors in DB, the approach is not explicitly described, and in the following description, matrixes and vectors are expressed by character strings for convenience in a manner similar to state historical information management table T11303 when they are retained in DB. Since state expression matrix M10100 and rejection-targeted combined workflow definition ID "0001" are not retained in relation to each other in state historical information management table T11303, state 203E retrieves a search policy from search policy setting unit 207E, and searches state historical information management table T11303 retained in state history storage DB 202E to see whether or not there is a rejection determination history in an "analogous situation" to state expression matrix M10100 in accordance with the retrieved search policy.

In the present example, assume that the policy retained in search policy setting unit 207E for determining an "analogous situation" dictates that an analogous situation is declared when a difference of one or less is found between each element indicative of the number of combined workflows aggregated on a per number-of-steps basis with each combined workflow definition in the state expression matrix retained in state history storage DB 202D and a relevant element in a current state expression matrix corresponding thereto, and a difference of one or less is found between the sum of respective elements each indicative of the number of combined workflows aggregated on a per number-of-steps basis with each combined workflow definition and the sum of relevant elements in a current state expression matrix corresponding thereto, and that up to two "analogous situations" are extracted.

First, since the rejection-targeted combined workflow definition ID retained by state expression search unit 203E is "0001", histories to be extracted from among those histories retained in state historical information management table 11303 are those associated with state expression matrixes M10101 and M10102. Here, state expression matrix M10101 is shown in FIG. 98, and state expression matrix M10102 in FIG. 99. Now, verification is made in the first policy of the search policy, "a difference of one or less is found between each element indicative of the number of combined workflows aggregated on a per number-of-steps basis with each combined workflow definition, and a relevant element in a current state expression matrix corresponding thereto." In regard to state expression matrix M10101, for combined workflow definition ID "0001", there is one element with the number-of-steps equal to one; one element with the number-of-steps equal to two; no element with the number-of-steps equal to three; one element with the number-of-steps equal to four; no element with the number-of-steps equal to five; and no element with the number-of-steps equal to six, and for workflow definition ID "0002", there are no element with the number-of-steps equal to one; one element with the number-of-steps equal to two; no element with the number-of-steps equal to three; no element with the number-of-steps equal to four; no element with the number-of-steps equal to five; and no element with the number-of-steps equal to six. Accordingly, by comparing between the numbers of elements for each number of steps in state expression matrix M10101 and the numbers of elements for corresponding number of steps in state expression matrix M10100, it can be determined that state expression matrix M10101 can satisfy the first search policy because the difference between the numbers of the respective elements is equal to or less than one. A similar verification is also made with respect to state expression matrix M10102. For combined workflow definition ID "0001", there are one element with the number-of-steps equal to one; one element with the number-of-steps equal to two; no element with the number-of-steps equal to three; one element with the number-of-steps equal to four; one element with the number-of-steps equal to five; and one element with number-of-steps equal to six, and for combined workflow definition ID "0002", there are one element with the number-of-steps equal to one; one element with the number-of-steps equal to two; no element with the number-of-steps equal to three; no element with the number-of-steps equal to four; no element with the number-of-steps equal to five; and no element with the number-of-steps equal to six. Accordingly, by comparing between the numbers of elements for each number of steps in state expression matrix M10102 and the numbers of elements for corresponding number of steps in state expression matrix M10100, it can be determined that state expression matrix M10102 can also satisfy the first search policy because the difference between the numbers of the respective elements is equal to or less than one. Next, verification is made in the second policy of the search policy, "a difference of one or less is found between the sum of respective elements each indicative of the number of combined workflows aggregated on a per number-of-steps basis with each combined workflow definition and the sum of relevant elements in a current state expression matrix corresponding thereto. In regard to state expression matrix M10101, the sum of the number of the respective elements each indicative of the number of combined workflows is 1+1+0+1+0+1 for the elements having the combined workflow definition ID "0001", and 0+1+0+0+0+0 for the elements having the combined workflow definition ID "0002", thus eventually resulting in "5." The sum is calculated for state expression matrix M10100 as well in a similar manner, resulting in "5." Thus, the difference in the sum between state expression matrix M10100 and state expression matrix M10101 is zero. Therefore, it is determined that state expression matrix M10101 can satisfy the second the search policy as well. The sum is calculated for state expression matrix M10102 as well in a similar manner, eventually resulting in:

(1+1+0+1+1+1)+(1+1+0+0+0+0)=7

Thus, the difference in the sum between state expression matrixes M10100 and M10102 is two. Therefore, it is determined that state expression matrix M10102 does not satisfy the second search policy. From the foregoing, state expression matrix M10101 alone represents an "analogous situation" similar to state expression matrix M10100 in accordance with the policies determined by the search policy.

Since the search policy dictates that the number of state expression matrixes representative of "analogous situations" to be extracted is limited to two, state expression search unit 203E extracts state expression matrix M10101 as an "analogous state" similar to state expression matrix M10100 which represents the state of each combined workflow that is being executed, and retrieves the rejection volume "3" and the number of steps in the rejection-targeted combined workflow "5", tied to state representative matrix M10101, from state historical information management table T11303 retained in state history storage DB 202E.

Since state expression search unit 203E has retrieved one set of rejection volume "2" and the number of steps in the rejection-targeted combined workflow "5" from state history storage DB 202E, state expression search unit 203E activates rejection function unit 100E' similar to currently active rejection function unit 100E. Data retained in rejection function unit 100E for the rejection determination are all copied and are retained in rejection determination function unit 100E'.

Since rejection determination function unit 100E makes the rejection determination in a "rejection-free" state, state expression search unit 203E notifies hypothetical rejection data creation unit 100E of the rejection volume "0". Likewise, state expression search unit 203E notifies hypothetical rejection data creation unit 100E of the number of steps in the rejection-targeted combined workflow "−1".

Since rejection determination function unit 100E' makes the rejection determination based on histories tied to the "analogous state" similar to the current state, state expression search unit 203E notifies hypothetical rejection data creation unit 100E' of the retrieved rejection volume "2" as the rejection volume. Likewise, state expression search unit 203E notifies hypothetical rejection data creation unit 101E of the number of steps in the rejection-targeted combined workflow "5" retrieved from state history storage DB 202E.

Subsequently, the rejection determination process is performed in rejection determination function unit 100E and rejection determination function unit 100E', respectively. And assume that in evaluation value recording unit 113 in rejection determination function unit 100E, the rejection determination is eventually pronounced without the convergence flag and with maximum evaluation value management table T11107 (FIG. 100) retained therein, whereas in evaluation value recording unit 113' in rejection determination function unit 100E', the rejection determination is similarly pronounced without the convergence flag and with maximum evaluation value management table T11108 (FIG. 101) retained therein.

Evaluation value recording unit 113 and evaluation value recording unit 113' notify evaluation value comparison unit 160 of maximum evaluation value management table T11107 and maximum evaluation value management table T11108 retained therein. Evaluation value comparison unit 160 determines that all maximum evaluation value management tables have been received because two rejection determination function units are currently active and two maximum evaluation value management tables have been received thereby, and compares maximum evaluation values. Evaluation value comparison unit 160 compares the maximum evaluation value field in received maximum evaluation value management table T11107 with that in received maximum evaluation value management table T11108, and extracts maximum evaluation value management table T11108 which retains a higher evaluation value.

Evaluation value comparison unit 160 activates rejection command transmission unit 111E which belongs to rejection determination function unit 100E that has notified the lower evaluation value, and notifies the same of a rejection determination end notification. Upon receipt of the rejection determination end notification, rejection command transmission unit 111E terminates the series of rejection determination processing.

On the other hand, evaluation value comparison unit 160 activates rejection command transmission unit 111E' which belongs to rejection determination function unit 100E' that has notified the higher evaluation value, and notifies rejection command transmission unit 111E' of the extracted maximum evaluation value management table T11108.

It is herein assumed that a hypothetically rejected combined workflow data management table, a hypothetical rejection data management table, and a simulation basic data management table retained by hypothetical rejection data creation unit 101E' belonging to rejection determination function unit 100E' are hypothetically rejected combined workflow data management table T10603 (FIG. 102), hypothetical rejection data management table T10704 (FIG. 103), and simulation basic data management table T10900 (FIG. 22), respectively.

Rejection command transmission unit 111E' extracts the simulation ID "00027" from maximum evaluation value management table T11108. Since entries having the simulation ID "00027" are associated with rejection-targeted combined workflow IDs "000366" and "000367" in hypothetically rejected combined workflow data management table T10603 retained in hypothetical rejection data creation unit 101E', rejection command transmission unit 111E' issues a forced rejection command to combined workflows that are being executed and which have the combined workflow IDs "00366" and "00367." Also, since rejection command transmission unit 111E' has not received the convergence flag from evaluation value comparison unit 160, the convergence determination flag is retained as "0." Next, rejection command transmission unit 111E' activates rejection state capture unit 204E, and notifies the same of maximum evaluation value management table T11108 and convergence determination flag "0".

After receiving maximum evaluation value management table T11108 and convergence determination flag "0" from rejection command transmission unit 111E', rejection state capture unit 204E retrieves a rejection volume and the number of steps in the rejection-targeted combined workflow from hypothetical rejection data creation unit 101E'. First, since the simulation ID of maximum evaluation value management table T11108 is "00027," rejection state capture unit 204E extracts a hypothetical rejection condition ID "00025" in an entry, the simulation ID of which matches "00027" in hypothetically rejected combined workflow data management table T10603 retained in hypothetical rejection data creation unit 101E'. Next, rejection state capture unit 204E searches hypothetical rejection data creation unit 101E' for hypothetical rejection data management table T10704 which has the hypothetical rejection condition ID "00025" in the hypothetical rejection condition ID field, and can retrieve the rejection volume "2" and the number of steps in the rejection-targeted combined workflow "5" which are retained in hypothetical rejection data management table T10704. Next, rejection state capture unit 204E activates rejection state expression generation unit 206E, and notifies rejection state expression generation unit 206E of maximum evaluation value management table T11108.

Rejection state expression generation unit 206E retrieves hypothetically rejected combined workflow data management table T10603 and simulation basic data management table T10900 from hypothetical rejection data creation unit 101E'. First, since the simulation ID of maximum evaluation value management table T11108 is "00027", rejection state expression generation unit 206E retrieves rejected combined workflow IDs "000366", "000367" associated with the simulation ID which matches "00027" from hypothetically rejected combined workflow data management table T10603. Next, rejection state expression generation unit 206E extracts entries, the combined workflow ID of which matches the retrieved rejected combined workflow IDs "000366", "000367" from simulation basic data management table T10900, and retrieves the combined workflow definition ID "0001" and number-of-steps "2" and "1." Next, rejection state expression generation unit 206E retrieves a maximum number-of-steps "6" which can be taken by the combined workflow definition ID "0001" retrieved from the maximum number-of-steps holding unit 150. Thus, rejection state expression generation unit 206E aggregates the number of rejected combined workflows which have the combined workflow definition ID "0001" up to number-of-steps of six, on a per number-of-steps basis, to create rejection state expression vector V10202 (FIG. 104). Rejection state expression generation unit 206E notifies rejection state capture unit 204E of generated rejection state expression vector V10202.

After receiving rejection state expression vector V10202, rejection state capture unit 204E retrieves state expression matrix M10100 and rejection-targeted combined workflow definition ID "0001" from state expression search unit 203E. Thus, since rejection state capture unit 204E has fully collected information required to create a state historical information management table, i.e., state expression matrix M10100, rejection-targeted combined workflow definition ID "0001", rejection state expression vector V10202, evaluation value "1.281", convergence determination flag "0", rejection volume "2" and rejection-targeted combined workflow number-of-steps "5", rejection state capture unit 204E creates state historical information management table T11304 (FIG. 105). Next, rejection state capture unit 204E activates state expression recording unit 205E, and notifies state expression recording unit 205E of created state historical information management table T11301.

After receiving state historical information management table T11304, state expression recording unit 205E searches state historical information management table T11303 retained in the state history storage DB. Since a set of state expression matrix M10100 and rejection-targeted combined workflow definition ID "0001" found in state historical information management table T11304 does not exist in state historical information management table T11303, state expression recording unit 205E records state historical information management table T11305 such that information tied to the set of state expression matrix M10100 and rejection-targeted combined workflow definition ID "0001" becomes similar to state historical information management table T11304 (recorded state historical information management table T11305 is shown in FIG. 106), and terminates processing operations.

As described above, when the rejection determination is applied according to the fifth embodiment, even if state history storage DB 202E does not retain a state similar to a state in which the rejection determination is made, it can be expected that if a history of an "analogous state" is found as a result of search made in accordance with policies determined by a search policy, better results will be provided by utilizing the "analogous state" than the rejection determination made from a "rejection-free" state (it can be expected that when the rejection determination is made in an analogous situation, analogous results will come out). In the present example, if the rejection determination is made in the rejection-free state, a rejection pattern resulting from the rejection determination is expected to achieve an evaluation value of "0.915", whereas if the rejection determination is made based on the history of "analogous situation," a resulting rejection pattern is expected to achieve an evaluation value of "1.281." Accordingly, by utilizing the result of the rejection determination which is made based on the history of "analogous situation" which provides a better evaluation value, combined workflows are rejected in accordance with the rejection pattern, and the result is retained in state history storage DB 202E.

In this way, by utilizing rejection determination histories of "analogous situations" as well as rejection determination histories of "same situations," the fifth embodiment can find a better rejection pattern than the fourth embodiment, when there are no histories of rejection results similar to a current "rejection-free" execution situation, and is therefore more advantageous.

The combined workflow monitoring device of the present invention may be carried out by recording a program for performing its functions in a computer-readable recording medium, reading the program recorded in the recording medium into a computer. The computer-readable recording medium may refer to recording medium such as flexible disk, a magneto-optical disk, CD-ROM and the like, and storage devices such as a hard disk drive incorporated in a computer system and the like. The computer-readable recording medium may also refer to a medium for dynamically holding a program for a short period of time (transmission medium or transmission wave) for use in applications for transmitting a program through the Internet, or a medium for holding the program for a certain period of time, e.g., a volatile memory in a computer system which operates as a server in such application.

While the present invention has been described above with reference to several embodiments, such descriptions are made only for purposes of illustration, and the present invention is not limited to the embodiments described above. It should be understood by those skilled in the art that a variety of alterations and modifications can be made without departing from the spirit and scope of the invention defined by the appended claims.

This application claims the priority based on Japanese Patent Application No. 2007-340383 filed on Dec. 28, 2007 and Japanese Patent Application No. 2008-206914 filed on Aug. 11, 2008, the disclosure of which are incorporated herein by reference in their entireties.

INDUSTRIAL AVAILABILITY

The present invention can be implemented in a combined workflow monitoring product for monitoring combined workflows which are being executed in a business system that allows a plurality of business applications and a plurality of workflow systems to collaborate with one another, and applied to such applications for appropriately determining rejection of combined workflows so as to satisfy an agreed service level concluded between a service provider and a service coordinator.

The invention claimed is:
1. Method of monitoring combined workflows comprising:
coordinating and associating with one another, using a processor, each item of event information related to combined workflows which are defined through collaboration of a plurality of business application systems and a plurality of workflow systems;
storing, using the processor, the coordinated and associated items of event information in an event storage device;
monitoring, using the processor, each item of event information in the event storage device to obtain progresses of said combined workflows;
expressing, using the processor, each of said combined workflows which are hypothetically rejected, in terms of said progresses and expressing each of said combined workflows which are not hypothetically rejected, in terms of said progresses, to express a state of each of said combined workflows;
predicting, using the processor, a processing operation of said combined workflows based on said expressed state, taking into consideration an influence exerted on the plurality business application systems and on the plurality of workflow systems in respect of response performance;
retrieving, using the processor, the processing operation, which is the result of said prediction, and event information from the event storage device, performing statistical processing for historical information of the event information, and calculating, based on the result of the statistical processing, an evaluation value from an evaluation value calculation function which is created on the basis of information on an agreed service level that is concluded with respect to the combined workflows;
determining, using the processor, whether or not said evaluation value satisfies a condition defined by said agreed service level;
generating, using the processor, a rejection-target-specific progress for selecting/specifying a sub-set of said combined workflows in execution, which has a progress equal to or less than a maximum progress, as a rejection target, said sub-set being a number less than or equal to a rejection volume, when said evaluation value calculated using the progress related to the combined workflows and defined on the basis of the agreed service level does not satisfy the condition defined by said agreed service level, wherein a code is set indicating a state of rejection, said code reflecting a number of steps; and
determining, using the processor, a degree of similarity between each of state expression vectors of combined workflows definitions in the past histories and a state expression vector of the current workflow definition based on magnitudes of the two vectors and an angle formed by the two vectors, said state expression vectors being based on the progress of the combined workflows being executed and the event data,
wherein when there is rejection determination historical information that shows a situation identical to the current situation stored in a rejection determination historical information recording means, the method further comprising: performing a rejection determination processing, using the processor, wherein said rejection determination historical information recording means coordinates and associates with each other, information related to a result of a past rejection determination processing, and retains and records the result,
wherein there is rejection determination historical information that shows a situation not identical to the current situation, but similar to the current situation based the degree of similarity, stored in the rejection determination historical information recording means, the method further comprises:
performing a rejection determination processing, using the processor, based on the rejection determination historical information that shows a situation not identical to the current situation, but similar to the current situation based on the degree of similarity.
2. The method of monitoring combined workflows according to claim 1, comprising:
determining, using the processor, that, among state expression matrixes of the past histories, a state expression matrix, whose elements exhibit differences less than a preset value defined in a search policy with respect to elements of the current expression matrix, is similar.
3. Combined workflow monitoring device comprising:
an event storage device;
event information recording means for coordinating and associating with one another each item of event information related to combined workflows which are defined through collaboration of a plurality of business application systems and a plurality of workflow systems, and for storing the coordinated and associated items of event information in the event storage device;

progress observing means for monitoring each items of event information in said event storage device to obtain progresses of the combined workflows;

hypothetical rejection state expressing means for expressing each of said combined workflows which are-hypothetically rejected, in terms of said progresses and for expressing each of said combined workflows which are not hypothetically rejected, in terms of said progresses, to express a state of each of said combined workflows;

processing operation predicting means for predicting a processing operation of said combined workflows based on the state expressed by said hypothetical rejection state expressing means, taking into consideration an influence exerted on the plurality business application systems and the plurality of workflow systems in respect of response performance;

evaluation value expressing means for retrieving information from the processing operation, which is the result of prediction by said processing operation predicting means, and event information from said event storage device, for performing statistical processing for historical information of the event information, and for calculating, based on the result of the statistical processing, an evaluation value from an evaluation value calculation function which is created on the basis of information on an agreed service level that is concluded with respect to said combined workflows;

determining means for determining whether or not said evaluation value satisfies a condition defined by said agreed service level;

rejection-target-specific progress generating means for generating a rejection-target-specific progress for selecting/specifying a sub-set of said combined workflows in execution, which has a progress equal to or less than a maximum progress, as a rejection target, said sub-set being a number less than or equal to a rejection volume, when said evaluation value calculated using the progress related to said combined workflows and defined on the basis of the agreed service level does not satisfy the condition defined by said agreed service level, wherein a code is set indicating a state of rejection, said code reflecting a number of steps; and state determination means for determining whether or not a rejection determination has been pronounced in the past for combined workflows under the same situation as a situation in which a rejection determination is currently being executed for purposes of utilizing the result of rejection determination processing in the future rejection determination processing, said state determining means comprising:

state expression generation means for generating state information based on the progress of a combined workflow that is being executed or is subjected to rejection;

rejection determination historical information recording means for coordinating and associating with one another said state information in the past and information related to the results of rejection determination processing and for retaining and recording the results; and history search means for searching said rejection determination historical information recording means for histories of the results of rejection determination processing corresponding to said state information, wherein said history search means comprises:

search policy holding means for retaining a search policy which is a definition information for searching for histories of the result of rejection determination processing corresponding to information similar to said state information determined based on a degree of similarity, in addition to information identical to said state information; and evaluation value comparison means for selecting, from among evaluation values obtained in a plurality of rejection determination processing, the best evaluation value, and wherein said search policy is defined such that the degree of similarly between each of state expression vectors of combined workflows definitions in the past histories, and a state expression vector of the current workflow definition is determined based on magnitudes of the two vectors and an angle formed by the two vectors, said state expression vectors being based on the progress of the combined workflows being executed and the event data.

4. The combined workflow monitoring device according to claim 3, wherein said hypothetical rejection state expressing means expresses a state in which said workflow is hypothetically rejected, including a combined workflow which is predicted to be input, by retrieving event information from said event storage device and performing statistical processing for historical information of the event information.

5. The combined workflow monitoring device according to claim 3, further comprising time determination means for retaining a rejection determination start time, and for determining whether or not a rejection determination has been completed within a time limit.

6. The combined workflow monitoring device according to claim 3, further comprising evaluation value recording means for recording and updating the evaluation value calculated by said evaluation value expressing means for purposes of extracting a rejection pattern for the combined workflow that provides a maximum evaluation value during a rejection determination.

7. The combined workflow monitoring device according to claim 3, wherein said evaluation value expressing means comprises:

condition setting means for retaining said evaluation value calculation function;

event data statistical calculation means for retrieving event information from said event storage device, for performing statistical processing for historical information of the event information, and for creating a combined workflow input pattern that is most likely in the future, as a predicted combined workflow input management table; and evaluation value calculation means for calculating evaluation values using said evaluation value calculation function to create an evaluation value list, based on a response time of a combined workflow that has a combined workflow definition ID which is subjected to rejection determination, an average response time, and a rejection ratio.

8. The combined workflow monitoring device according to claim 7, wherein said condition setting means comprises:

minimum evaluation value extraction means for extracting, based on said evaluation value lists, the number of which is equal to the number of combinations, a minimum value from each evaluation value list, to create a minimum value list which tabulates the minimum values, the number of which is equal to the number of combinations;

maximum evaluation value extraction means for extracting, based on said minimum value list, a maximum value from the minimum values, the number of which is equal to the number of combinations; and rejection determination means for retrieving said maximum value and an agreed service level determination threshold, and for determining whether or not said maximum value satisfies said agreed service level determination threshold.

9. The combined workflow monitoring device according to claim 3, wherein said rejection-target-specific progress generating means comprises:

condition setting means for retaining the evaluation value calculation function;

evaluation value calculation means for calculating evaluation values using said evaluation value calculation function to create an evaluation value list, based on a response time of a combined workflow that has a combined workflow definition ID which is subjected to rejection determination, an average response time, and a rejection ratio;

processing continuation determination means for comparing a retrieved rejection volume with rejection-targeted combined workflow volume to see which is larger, and when the retrieved rejection volume is the same as the rejection-targeted combined workflow volume, then for determining that even if the rejection volume is further increased from among the rejection-targeted combined workflows, there will be no combination of combined workflows which can be rejected, and for terminating the series of rejection determination processing, and when the rejection-targeted combined workflow volume is larger than the rejection volume, and for determining that the rejection volume can be further increased to find a combination of combined workflows which can be rejected.

10. The combined workflow monitoring device according to claim 3, wherein said progress comprises the number of steps in each combined workflow.

11. The combined workflow monitoring device according to claim 3, wherein said processing operation comprises a response time of each combined workflow.

12. The combined workflow monitoring device according to claim 3, wherein said search policy is defined such that among state expression matrixes of the past histories, a state expression matrix, whose elements exhibit differences less than a preset value defined in said search policy with respect to elements of the current expression matrix, is determined to be similar.

13. A non-transitory computer-readable storage medium storing a combined workflow monitoring program for causing a computer to perform:

event information recording process that coordinates and associates with one another each item of event information related to combined workflows which are defined through collaboration of a plurality of business application systems and a plurality of workflow systems and stores the coordinated and associated items of event information in an event storage device;

progress observing process that monitors each item of event information in the event storage device to obtain progresses of said combined workflows;

hypothetical rejection state expressing process that expresses each of said combined workflows which are hypothetically rejected, in terms of said progresses, and expressing each of said combined workflows which are not hypothetically rejected, in terms of said progresses, to express a state of each of said combined workflows;

processing operation predicting process that predicts a processing operation of said combined workflows based on the state expressed by said hypothetical rejection state expressing process, taking into consideration an influence exerted on the plurality business application systems and the plurality of workflow systems in respect of response performance;

evaluation value expressing process that retrieves information from the processing operation, which is the result of prediction by said processing operation predicting means, and event information from said event storage device, performs statistical processing for historical information of the event information, and calculates, based on the result of the statistical processing, an evaluation value from an evaluation value calculation function which is created on the basis of information on an agreed service level that is concluded with respect to said combined workflows;

determining process that determines whether or not said evaluation value satisfies a condition defined by said agreed service level;

rejection-target-specific progress generating process that generates a rejection-target-specific progress for selecting/specifying a sub-set of said combined workflows in execution which has a progress equal to or less than a maximum progress, as a rejection target, said sub-set being a number less than or equal to a rejection volume, when said evaluation value calculated using the progress related to said combined workflows and defined on the basis of the agreed service level does not satisfy the condition defined by said agreed service level, wherein a code is set indicating a state of rejection, said code reflecting a number of steps; and determining a degree of similarity between each of state expression vectors of combined workflows definitions in the past histories and a state expression vector of the current workflow definition based on magnitudes of the two vectors and an angle formed by the two vectors, said state expression vectors being based on the progress of the combined workflows being executed and the event data, wherein when there is rejection determination historical information that shows a situation identical to the current situation stored in a rejection determination historical information recording means, the method further comprising: performing a rejection determination processing, wherein a rejection determination historical information recording means coordinates and associates with each other, information related to a result of a past rejection determination processing, and retains and records the result, and wherein there is rejection determination historical information that shows a situation not identical to the current situation, but similar to the current situation based on the degree of similarity, stored in the rejection determination historical information recording means, the method further comprises:

performing a rejection determination processing, based on the rejection determination historical information that shows a situation not identical to the current situation, but similar to the current situation based on the degree of similarity.

* * * * *